US012717595B2

(12) United States Patent
Liu

(10) Patent No.: US 12,717,595 B2
(45) Date of Patent: Aug. 25, 2026

(54) METHOD FOR COMBINING MULTIPLE APPLICATIONS AND SIMULTANEOUSLY STARTING MULTIPLE APPLICATIONS, AND ELECTRONIC DEVICE

(71) Applicant: HUAWEI TECHNOLOGIES CO., LTD., Shenzhen (CN)

(72) Inventor: Chao Liu, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 256 days.

(21) Appl. No.: 18/692,575

(22) PCT Filed: Aug. 24, 2022

(86) PCT No.: PCT/CN2022/114542
§ 371 (c)(1),
(2) Date: Mar. 15, 2024

(87) PCT Pub. No.: WO2023/051111
PCT Pub. Date: Apr. 6, 2023

(65) Prior Publication Data

US 2025/0130825 A1 Apr. 24, 2025

(30) Foreign Application Priority Data

Sep. 30, 2021 (CN) .......................... 202111173306.3

(51) Int. Cl.
*G06F 3/048* (2013.01)
*G06F 3/0481* (2022.01)
(Continued)

(52) U.S. Cl.
CPC ............ *G06F 9/451* (2018.02); *G06F 3/0481* (2013.01); *G06F 3/0484* (2013.01); *G06F 2203/04803* (2013.01)

(58) Field of Classification Search
None
See application file for complete search history.

(56) References Cited

U.S. PATENT DOCUMENTS

2013/0187861 A1 7/2013 Lavallee
2014/0245203 A1* 8/2014 Lee .................... G06F 3/04845
715/765

(Continued)

FOREIGN PATENT DOCUMENTS

CN 104793875 A 7/2015
CN 105094656 A 11/2015

(Continued)

OTHER PUBLICATIONS

EP Communication Pursuant to Article 94(3) EPC in European Appln. No. 21874503.0, mailed on Oct. 14, 2025, 6 pages.

(Continued)

*Primary Examiner* — Thanh T Vu
(74) *Attorney, Agent, or Firm* — Fish & Richardson P.C.

(57) ABSTRACT

The present disclosure relates to methods and devices for combining and simultaneously starting a plurality of applications. In one example method, a plurality of applications are combined to generate a combined application. A user taps an icon of the combined application to simultaneously start and run an interface of each of the plurality of applications. Start speeds, color styles, and the like of the plurality of applications are synchronized by default. In addition, the interface of each of the plurality of applications is automatically displayed in a split-screen window, and each of the plurality of applications enables data sharing space for the plurality of applications.

20 Claims, 66 Drawing Sheets

(51) Int. Cl.

*G06F 3/0484* (2022.01)
*G06F 9/451* (2018.01)

(56) References Cited

U.S. PATENT DOCUMENTS

| | | | | |
|---|---|---|---|---|
| 2017/0188213 | A1* | 6/2017 | Nirantar | H04L 67/564 |
| 2018/0234373 | A1 | 8/2018 | Tal et al. | |
| 2019/0324603 | A1* | 10/2019 | Shin | G06F 3/04886 |
| 2020/0133487 | A1* | 4/2020 | Zhang | G06F 3/04817 |
| 2021/0014591 | A1* | 1/2021 | Kim | G06F 3/167 |
| 2021/0383373 | A1* | 12/2021 | Eirinberg | G06Q 20/4014 |

FOREIGN PATENT DOCUMENTS

| | | | |
|---|---|---|---|
| CN | 106940616 | A | 7/2017 |
| CN | 107967151 | A | 4/2018 |
| CN | 108279950 | A | 7/2018 |
| CN | 111208925 | A | 5/2020 |
| CN | 112882777 | A | 6/2021 |
| CN | 114003324 | A | 2/2022 |
| EP | 4057119 | A1 | 9/2022 |

OTHER PUBLICATIONS

Extended European Search Report in European Appln. No. 22874503.0, mailed on Nov. 8, 2024, 46 pages.

International Search Report and Written Opinion in International Appln. No. PCT/CN2022/114542, mailed on Nov. 11, 2022, 19 pages (with English translation).

* cited by examiner (a)

(b)

2000

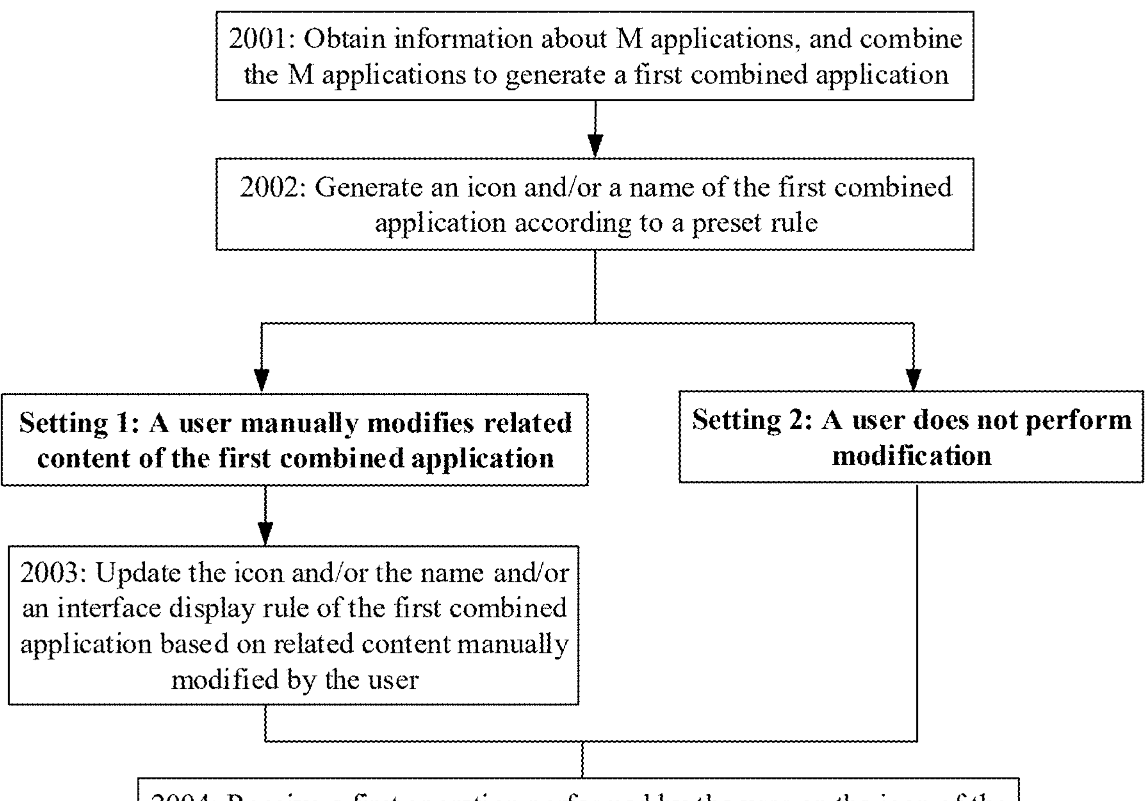

2004: Receive a first operation performed by the user on the icon of the first combined application, simultaneously start the M applications in response to the first operation, and determine N to-be-displayed split-screen windows and a first pattern of the N split-screen windows 2005: Obtain a target interface corresponding to each of the N split-screen windows, and determine a target display region of the target interface corresponding to each split-screen window, where the target display region is all or a part of a region of the target interface 2006: A display simultaneously displays content in the corresponding target display region in each of the N split-screen windows in the first pattern at a first moment based on a size of each of the N split-screen windows and the content in the target display region corresponding to each split-screen window and by using a moment of starting the M applications as a start moment

FIG. 20

METHOD FOR COMBINING MULTIPLE APPLICATIONS AND SIMULTANEOUSLY STARTING MULTIPLE APPLICATIONS, AND ELECTRONIC DEVICE

CROSS-REFERENCE TO RELATED APPLICATIONS

This application is a National Stage of International Application No. PCT/CN2022/114542, filed on Aug. 24, 2022, which claims priority to Chinese Patent Application No. 202111173306.3, filed on Sep. 30, 2021. Both of the aforementioned applications are hereby incorporated by reference in their entireties.

TECHNICAL FIELD

This application relates to the field of electronic technologies, and in particular, to a method for combining a plurality of applications and simultaneously starting the plurality of applications, and an electronic device.

BACKGROUND

With the development of the digital intelligence era and electronic devices, there are more types of electronic devices, and each electronic device has increasingly rich functions. A user can simultaneously use different functions of one electronic device.

For example, a mobile phone is used as an example. In a possible scenario, the user may use the mobile phone to take an online course and watch an online course video. In addition, the user may expect to take class notes by using the Notepad application, without affecting playing of the online course video. In this scenario, the user may use "Multi-Window" in Accessibility features of the mobile phone to open and run an online course learning application and the Notepad application in a floating window or split-screen browsing manner. A playing interface of the online course video and an editable notes interface of the Notepad application are simultaneously displayed in different windows of a display of the mobile phone, to support the user in taking the class notes while watching the online course video. It should be understood that "Multi-Window" in Accessibility features of the mobile phone can enable the mobile phone to open and run a plurality of applications in the floating window or split-screen browsing manner, to support the user in simultaneously using the plurality of applications, thereby improving use efficiency of the mobile phone.

When the user expects to open and run the plurality of applications in the split-screen browsing manner, in a possible implementation, the user may first open and run an application 1, and the display of the mobile phone displays any interface of the application 1; then, the user downsizes the interface of the application 1 to half-screen display through a shortcut such as a knuckle slide; and finally, the user may open and run an application 2, and the other half screen of the display of the mobile phone may display an interface of the application 2, so that the display of the mobile phone displays the interface of the application 1 and the interface of the application 2 in split screen.

In another possible implementation, the user may enable the Multi-Window dock. When the display of the mobile phone displays any interface of an application 1, the user may slide inward from a screen edge of the mobile phone and pause for preset duration, to trigger the mobile phone to display the Multi-Window dock in a screen side region. In addition, the user may touch and hold an icon of an application 2 in the Multi-Window dock, drag it to any screen position outside the Multi-Window dock, and release it. In response to the operations of the user, the display of the mobile phone can display the interface of the application 1 and an interface of the application 2 in split screen.

In the foregoing process, the mobile phone can support display of interfaces of a maximum of two different applications in split screen, and cannot support display of interfaces of more applications in split screen. If the user expects to simultaneously display interfaces of more applications, after the Multi-Window dock is displayed in the screen side region, the user may tap an icon of an application 3 in the Multi-Window dock. In response to the tap operation of the user, the display of the mobile phone may display a floating window, and an interface of the application 3 is displayed in the floating window. However, the floating window overlays content of the interfaces of the two applications displayed in split screen, thereby affecting user experience.

In addition, in a process in which the mobile phone displays the interface of the application 1 and the interface of the application 2 in split screen, an operation of starting each application needs to be independently performed. For example, the application 1 is first started, and then the application 2 is started. The application 2 and the application 1 are triggered to perform splicing of displayed interfaces. The operation process is complex. The application 1 and the application 2 cannot be simultaneously started. As a result, time consumed for split-screen display is relatively long. Particularly, if applications have open-screen advertisements with different duration, time of the user is greatly occupied, and use experience of the user is affected.

SUMMARY

This application provides a method for combining a plurality of applications and simultaneously starting the plurality of applications, and an electronic device. In the method, a plurality of applications are combined to generate a combined application. A user may simultaneously start and run an interface of each of the plurality of applications by using the combined application. The interface of each application is automatically displayed by using a split-screen window. Each of the plurality of applications can enable data sharing space for the plurality of applications. In the method, operation steps of the user are reduced, and operations are simple, thereby improving use experience of the user.

According to a first aspect, a method for simultaneously displaying a plurality of interfaces is provided, and is applied to an electronic device including a display. The method includes: receiving a first operation that is performed by a user on an icon of a first combined application, where the first combined application is associated with N target interfaces, the N target interfaces are running interfaces from M applications, each of the N target interfaces includes content in all of a display region when the display displays a running interface of a corresponding application in full screen, N≥M, M is an integer greater than or equal to 1, and N is an integer greater than or equal to 2; simultaneously starting the M applications in response to the first operation, and determining N to-be-displayed split-screen windows and a first pattern of the N split-screen windows, where any two of the N split-screen windows do not include an overlapping region, the first pattern corresponds to a first configuration parameter, and the first configuration parameter includes one or more types of information: a size of each of the N split-screen windows, position coordinates of each split-screen window, or a one-to-one correspondence between each of the N split-screen windows and each of the N target interfaces; obtaining a target interface corresponding to each of the N split-screen windows, and determining a target display region of the target interface corresponding to each split-screen window, where the target display region is all or a part of a region of the target interface; and simultaneously displaying, by the display, content in the corresponding target display region in each of the N split-screen windows in the first pattern at a first moment based on the size of each of the N split-screen windows and the content in the target display region corresponding to each split-screen window and by using a moment of starting the M applications as a start moment.

In the foregoing method, a plurality of applications can be combined. Specifically, the user may select a plurality of applications from a local device according to different personal use requirements; or the user may select a plurality of applications from different electronic devices; or the user may further trigger application twin of a same application and select different twin applications of the same application; or the user selects a same application and different function interfaces of the same application for a plurality of times; or the like. The user may combine the plurality of applications in different operation manners, to generate a new combined application and display the new combined application on the display of the electronic device.

It should be understood that a single application usually cannot meet a use requirement of the user. In a scenario in which a plurality of applications need to be used repeatedly or simultaneously, in this application, for such a requirement of the user, the user can freely combine different function interfaces in a plurality of required different applications in a user-defined manner, or combine different function interfaces of the same application in a user-defined manner, to generate anew combined application.

Based on the new combined application, each application associated with the combined application can be no longer an isolated data island and/or an isolated function island. In a subsequent use process, the user can tap an icon of the combined application to simultaneously start and run each of the plurality of applications associated with the combined application. The display of the electronic device automatically displays an interface of each of the plurality of applications in a split-screen window form. Start speeds, color styles, and the like of the plurality of applications may be synchronized by default. The plurality of applications enable data sharing space. In the method, the plurality of applications are simultaneously started, to prevent the user from separately performing complex operations of starting each application and triggering split-screen display, thereby simplifying an operation procedure and shortening an operation time. In addition, in the method, a quantity of applications included in the plurality of applications is not limited, to meet a requirement for simultaneously using more applications by the user, thereby improving use experience of the user.

Optionally, information about the M applications includes one or more types of information: an application identifier, an application name, an application icon, or a source of each of the M applications.

After the M applications are combined to generate the first combined application, the display may display an icon and/or a name of the first combined application.

It should be understood that, in this embodiment of this application, two or more applications may be combined to obtain a new application, that is, the first combined application. This process does not affect display of an icon and a name of each application in the "two or more applications" on a display of a mobile phone, independent use of each application, and the like.

It should be further understood that, for the first combined application, the user may tap the icon of the first combined application to simultaneously start each of the two or more applications included in the first combined application. In other words, through tapping the icon of the first combined application only once, the user can simultaneously start each application associated with the first combined application, and can directly access a target interface of each application. The target interface of each application is any interface that may be displayed in a process of running the application.

For example, in this embodiment of this application, a combination process of the "M applications" is used as an example. Optionally, a specific application in the M applications may be combined twice or more times. For example, different function interfaces of the same application are used as "target interfaces", and the application is added twice or more times. Alternatively, some applications such as the WeChat application and the QQ application may have an application twin capability, and the user may trigger, by using a preset operation, application twin of some applications such as the WeChat application and the QQ application. In this case, when the user adds, to the first combined application, a WeChat application obtained by using an application twin function, the two WeChat applications may be understood as the same application corresponding to different login accounts.

Therefore, in this embodiment of this application, it is assumed that the first combined application is associated with the M applications, and the M applications correspond to the N target interfaces. In other words, the "first combined application" in this embodiment of this application is associated with the "N target interfaces". To be specific, the N target interfaces are the running interfaces from the M applications, where N≥M, M is an integer greater than or equal to 1, and N is an integer greater than or equal to 2. Details are not described below again.

Optionally, when M=N, that is, N applications are combined in the first combined application, the N applications are simultaneously started, and interfaces of the N applications are displayed in N split-screen windows.

It should be further understood that when the display displays a running interface of a corresponding application in full screen, each of the N target interfaces includes content in all of a display region of the running interface.

With reference to the first aspect, in some implementations of the first aspect, the M applications include: a local application of the electronic device; any application from a trusted device that has access permission on the electronic device; or at least one application of any device that can be currently found by the electronic device.

With reference to the first aspect and the foregoing implementations, in some implementations of the first aspect, the M applications are applications that are manually selected by the user; the M applications are applications that are automatically selected by the electronic device based on at least one of a current use scenario or use frequency of the user in a preset period; or the M applications are preset applications that are determined based on a device type of the electronic device.

With reference to the first aspect and the foregoing implementations, in some implementations of the first aspect, the N target interfaces are interfaces that are separately manually set by the user from the running interfaces of the M applications; the N target interfaces are interfaces that are automatically selected by the electronic device based on at least one of a current use scenario or use frequency of the user in a preset period; or when N is equal to M, the N target interfaces include a preset interface of each of the M applications.

For example, the preset interface of each application may be a start page (that is, an initial interface) of each application, or any other interface. For example, for the WeChat application, a two-dimensional code payment interface may be used as a start page of the WeChat application, or a WeChat chat list interface may be used as a start page of the WeChat application. This is not limited in this embodiment of this application.

With reference to the first aspect and the foregoing implementations, in some implementations of the first aspect, the obtaining a target interface corresponding to each of the N split-screen windows includes: determining, based on the first configuration parameter, the target interface corresponding to each of the N split-screen windows; and the determining a target display region of the target interface corresponding to each split-screen window includes:

determining all of a region of the target interface corresponding to each split-screen window as the target display region corresponding to each split-screen window; receiving a setting operation that is performed by the user on the target interface corresponding to each split-screen window, and determining, as the target display region corresponding to each split-screen window, a region manually set by the user; determining a preset region of the target interface corresponding to each split-screen window as the target display region corresponding to each split-screen window; or determining, based on the size of each of the N split-screen windows and a preset ratio, the target display region corresponding to each split-screen window.

With reference to the first aspect and the foregoing implementations, in some implementations of the first aspect, the simultaneously displaying, by the display, content in the corresponding target display region in each of the N split-screen windows in the first pattern at a first moment based on the size of each of the N split-screen windows and the content in the target display region corresponding to each split-screen window and by using a moment of starting the M applications as a start moment includes: obtaining an interface element and a size of the target display region corresponding to each split-screen window; determining a display parameter of each split-screen window based on the size of each of the N split-screen windows, the size of the target display region corresponding to each split-screen window, and the interface element, where the display parameter of each split-screen window includes a size and/or position coordinates of the interface element in each split-screen window; and simultaneously displaying, by the display, the content in the corresponding target display region in each of the N split-screen windows in the first pattern at the first moment based on the display parameter of each split-screen window.

With reference to the first aspect and the foregoing implementations, in some implementations of the first aspect, information about the M applications is obtained. The information about the M applications includes one or more types of information: an application identifier, an application name, an application icon, or a source of each of the M applications. The M applications are combined to generate the first combined application. The display displays the icon and/or a name of the first combined application.

With reference to the first aspect and the foregoing implementations, in some implementations of the first aspect, the icon and/or the name of the first combined application are/is generated according to any one of the following rules: combining the icons and/or the names of the M applications in a sequence of adding the M applications, to generate the icon and/or the name of the first combined application; combining the icons and/or the names of the M applications in a sequence of installing the M applications, to generate the icon and/or the name of the first combined application; combining the icons and/or the names of the M applications in descending order of frequency of using the M applications by the user, to generate the icon and/or the name of the first combined application; combining the icons and/or the names of the M applications in descending order of memory resources occupied during running of the M applications, to generate the icon and/or the name of the first combined application; or combining the icons and/or the names of the M applications in descending order of required duration from starting the M applications to displaying the preset interfaces, to generate the icon and/or the name of the first combined application.

For example, the mobile phone may combine and arrange icons of a plurality of selected applications in an application selection sequence of the user, and then scale down the icons by a specific ratio, to generate an icon of a new combined application and display the icon on a home screen of the mobile phone.

It should be understood that after the user selects the M applications, the mobile phone may first automatically generate the icon of the "first combined application" according to one of the foregoing possible preset rules, and display the icon on the home screen of the mobile phone.

It should be further understood that in a subsequent use process, the user is supported in modifying the preset icon of the "first combined application" in this embodiment of this application. To be specific, the rule for generating the icon of the combined application is reset. The icon of the first combined application displayed on the home screen is updated according to a new rule for generating the icon of the combined application.

With reference to the first aspect and the foregoing implementations, in some implementations of the first aspect, the first combined application corresponds to a target storage area of the electronic device, the target storage area can store data of each of the M applications, and any two of the M applications have permission to access each other and obtain data of each other.

With reference to the first aspect and the foregoing implementations, in some implementations of the first aspect, the method further includes: obtaining required duration from the start moment to a moment at which the electronic device displays each of the N target interfaces; and allocating a memory resource for running of each of the M applications based on the required duration for displaying each of the N target interfaces, so that the electronic device can simultaneously display the content in the corresponding target display region in each of the N split-screen windows at the first moment.

With reference to the first aspect and the foregoing implementations, in some implementations of the first aspect, the method further includes: receiving a second operation that is performed by the user on the icon of the first combined application; and displaying an operation window in response to the second operation, where the operation window includes at least one operation option that can be performed by the user on the first combined application, and the at least one operation option includes one or more of a share option, a delete option, an icon editing option, an application modification option, an interface pattern option, or a permission setting option.

With reference to the first aspect and the foregoing implementations, in some implementations of the first aspect, when the operation window includes the share option, the method further includes: receiving a tap operation that is performed by the user on the share option; in response to the tap operation, obtaining information about the N target interfaces associated with the first combined application, and generating a configuration file of the first combined application based on the information about the N target interfaces; receiving a third operation of the user, and determining a sharing manner of the first combined application and a receive-end device with which sharing is to be performed that are set by the user; and in response to the third operation, sending the configuration file of the first combined application to the receive-end device in the sharing manner.

The configuration file of the first combined application includes one or more types of information: the icon of the first combined application; the name of the first combined application; the first configuration parameter corresponding to the first pattern; an application identifier, an application icon, or an application name corresponding to each of the N target interfaces; a device identifier or a device type of an application source device; a link of each of the N target interfaces; duration between the start moment and the first moment; or advertisement setting information in a process of starting an application corresponding to each target interface.

It should be understood that the electronic device serves as a transmit-end device in this embodiment of this application. In a process in which the transmit-end device shares a combined application with the receive-end device, both the transmit-end device and the receive-end device are electronic devices that have a multi-application combination function, that is, that can provide a multi-application combination service.

In this embodiment of this application, a process of "sharing the first combined application" may be understood as a process in which the transmit-end device may obtain the information about the first combined application, and send, to the receive-end device, a file (that is, the configuration file of the first combined application) including the information about the first combined application, and then the receive-end device obtains the information about the first combined application based on the received file.

In this embodiment of this application, the to-be-shared "configuration file of the first combined application" may include one or more of the following types of information: for example, a device ID of the transmit-end device, a device type of the transmit-end device, hardware parameter information of the transmit-end device, software parameter information of the transmit-end device, a quantity of applications of the first combined application, an application list (package names) associated with the first combined application, an application identifier (for example, an application package name) associated with the first combined application, an icon of each application, whether a remote application/distributed application (remote device) is included, information about a remote device (for example, information about a plurality of devices such as a super terminal), an application start page (target interface) link, application layout information (a size/position coordinates of a split-screen window, and the like), and whether a single-application multi-open window (App mirror) is included. This is not limited in this embodiment of this application.

The "interface display pattern" described in the foregoing embodiment may be determined based on information about the "application start page (target interface) link" and the application layout information (for example, a size/position coordinates of a split-screen window). This is not limited in this embodiment of this application.

In a possible implementation, after receiving the "configuration file of the first combined application" sent by the transmit-end device, the receive-end device may prompt, in an automatic pop-up window manner, the user whether to choose to receive the configuration file. And/or, the mobile phone may display a prompt icon, text prompt information, and the like on a status bar at the top of the display, and the user may view the prompt through performing a pull-down operation, and choose whether to receive the file. And/or, the receive-end device may send a preset prompt tone such as "beep . . . " to prompt the user whether to choose to receive the "configuration file of the first combined application" sent by the mobile phone of the user. This is not limited in this embodiment of this application.

In another possible implementation, if the plurality of applications associated with the shared first combined application are all local applications on the transmit-end device, when the user shares the first combined application to the receive-end device and displays the icon of the first combined application on an interface of the receive-end device, the sharing process may be understood as follows: The plurality of applications associated with the first combined application are still actually installed on the transmit-end device. When the user taps the icon of the first combined application on the receive-end device, the tap operation of the user may be sent back to the transmit-end device, to trigger simultaneous starting and running of each application associated with the first combined application in the background of the transmit-end device, and display, in a split-screen window corresponding to the receive-end device, a target interface after each application is started.

In still another possible implementation, the sharing process may be further understood as follows: After the first combined application is shared to the receive-end device, the receive-end device and the transmit-end device may implement sharing of the first combined application. In other words, the receive-end device and the transmit-end device can share each application associated with the first combined application.

Optionally, if the receive-end device does not have an application 1 associated with the first combined application, the receive-end device may automatically download and install the application 1 by using an application market, to ensure that each application associated with the first combined application is installed on the receive-end device.

Optionally, if an application 1 associated with the first combined application is installed on the receive-end device, after receiving the first combined application sent by the transmit-end device, the receive-end device detects that a version of the application 1 associated with the first combined application on the transmit-end device is different from a version of the application 1 installed on the receive-end device, or a card pattern of the application 1 on the transmit-end device is different from that of the application 1 on the receive-end device, and the receive-end device may automatically update the application 1 or a card of the application 1. This is not limited in this embodiment of this application.

In yet another possible implementation, if the plurality of applications associated with the shared combined application include a local application of the transmit-end device, an application 2 on a trusted device B of the transmit-end device is further included. Therefore, when the user shares the first combined application to the receive-end device, and the icon of the first combined application is displayed on the interface of the receive-end device, the sharing process may be understood as follows: The receive-end device and the transmit-end device may share the local application on the transmit-end device, and the receive-end device and the trusted device B of the transmit-end device may further share the application 2 on the device B. For another application other than the plurality of applications associated with the first combined application, the receive-end device does not have access permission for neither another local application on the transmit-end device nor another application other than the application 2 on the trusted device B of the transmit-end device. Details are not described in this embodiment of this application.

In the foregoing method, for different electronic devices, the user may share the generated combined application on the transmit-end device to another electronic device with the multi-application combination function, and the user is supported in using the first combined application on the another electronic device. In this process, the user does not need to independently perform a process of downloading an application, installing an application, and combining a plurality of applications, to simultaneously start the plurality of applications on the another electronic device and display interfaces of the plurality of applications in split-screen windows. This implementation is more intelligent. Operation steps of the user are reduced, thereby improving user experience of using a plurality of devices.

In addition, in the process of sharing the combined application, information such as an icon that is associated with the first combined application and that is set by the user on the transmit-end device, information about the plurality of applications associated with the first combined application, and the interface display pattern of split-screen display after the plurality of applications are simultaneously started may be shared to another electronic device, so that the user can directly use the plurality of associated applications on the another electronic device through the first combined application in a manner that best conforms to a use habit of the user, thereby improving use experience of the user.

With reference to the first aspect and the foregoing implementations, in some implementations of the first aspect, when the operation window includes the delete option, the method further includes: receiving a tap operation that is performed by the user on the delete option; and in response to the tap operation, deleting the M applications associated with the first combined application; or in response to the tap operation, displaying the icons and/or the names of the M applications associated with the first combined application; receiving a fourth operation of the user, and determining one or more target applications that are selected by the user from the M applications; and deleting, from the first combined application, a target interface corresponding to the one or more target applications selected by the user, and updating and saving information that is included in the configuration file of the first combined application.

With reference to the first aspect and the foregoing implementations, in some implementations of the first aspect, when the operation window includes the interface pattern option, the method further includes: receiving a tap operation that is performed by the user on the interface pattern option; and in response to the tap operation, displaying a setting interface of one or more interface patterns, where the setting interface of the one or more interface patterns can be used by the user to change the first pattern to a second pattern, and the second pattern corresponds to a second configuration parameter; and updating and saving information that is included in the configuration file of the first combined application.

In conclusion, a plurality of applications can be combined according to the method for combining a plurality of applications that is provided in this application. Specifically, the user may select a plurality of applications from a local device according to different personal use requirements; or the user may select a plurality of applications from different electronic devices; or the user may further trigger application twin of a same application and select different twin applications of the same application; or the user selects a same application and different function interfaces of the same application for a plurality of times; or the like. The user may combine the plurality of applications in different operation manners, to generate a new combined application and display the new combined application on the display of the electronic device.

It should be understood that a single application usually cannot meet a use requirement of the user. In a scenario in which a plurality of applications need to be used repeatedly or simultaneously, in this application, for such a requirement of the user, the user can freely combine different function interfaces in a plurality of required different applications in a user-defined manner, or combine different function interfaces of the same application in a user-defined manner, to generate a new combined application.

Based on the new combined application, each application associated with the combined application can be no longer an isolated data island and/or an isolated function island. In a subsequent use process, the user can tap an icon of the combined application to simultaneously start and run each of the plurality of applications associated with the combined application. The display of the electronic device automatically displays an interface of each of the plurality of applications in a split-screen window form. Start speeds, color styles, and the like of the plurality of applications may be synchronized by default. The plurality of applications enable data sharing space. In the method, the plurality of applications are simultaneously started, to prevent the user from separately performing complex operations of starting each application and triggering split-screen display, thereby simplifying an operation procedure and shortening an operation time. In addition, in the method, a quantity of applications included in the plurality of applications is not limited, to meet a requirement for simultaneously using more applications by the user, thereby improving use experience of the user.

In addition, this application further provides a plurality of methods for setting a combined application and a plurality of methods for modifying content related to a combined application. The method can support the user in customizing a possible operation process of setting an icon and/or a name of the combined application and an interface display pattern of split-screen windows after a plurality of applications associated with the combined application are simultaneously started. Specifically, the method supports the user in customizing, based on different use scenarios and according to personal use requirements, the interface display pattern of split-screen display after the plurality of applications associated with the combined application are simultaneously started. For example, the user may set one or more of a layout and an arrangement sequence of a plurality of split-screen windows displayed on the display, a size of each split-screen window, and a target interface of each application displayed in a split-screen window of the application. In this way, after the user simultaneously starts the plurality of applications, the sizes, the layout, and the like of split-screen windows of the plurality of applications displayed in split screen can better meet a display requirement of the user. In addition, a target interface expected by the user can be directly reached through each application. Therefore, the user does not need to perform a plurality of tap operations to display the expected target interface, to simplify an operation procedure, thereby improving use experience of the user. In a subsequent process of using the combined application, the user may further modify, delete, or replace one or more applications associated with the combined application, to update the combined application.

In addition, this application further provides a method for sharing a combined application. The user may share the combined application to another electronic device, so that the user can use the combined application on a plurality of electronic devices. In this process, the user does not need to independently perform a process of downloading an application, installing an application, and combining a plurality of applications on different electronic devices, to use the combined application on different electronic devices, that is, to simultaneously start the plurality of applications and display interfaces of the plurality of applications in a split-screen window form. This implementation is more intelligent. Operation steps of the user are reduced, thereby improving user experience of using a plurality of devices.

In addition, this application further provides a method for simultaneously starting a plurality of applications. The user can tap the icon and/or the name of the combined application to simultaneously start the plurality of applications associated with the combined application. An interface of each application is displayed in a split-screen window of the application. In the method, different applications may be controlled to have same actual start duration. To be specific, when the user taps the icon of the combined application, the applications associated with the combined application can be simultaneously started, and start duration of the applications is controlled to be the same. In this way, the following problem is avoided: A current super application has an excessively long function path in use, thereby meeting use experience of the user.

Finally, in this application, for different scenarios and different requirements of the user in different scenarios, the electronic device may automatically select a plurality of applications according to a plurality of possible preset rules, and generate a combined application based on the plurality of applications. A process of automatically generating the combined application is more intelligent, and a daily use requirement of the user is better met. The combined application can be directly used without a manual operation of the user. Operation steps of the user are reduced, thereby improving use experience of the user.

According to a second aspect, an electronic device is provided, including: a display, one or more processors, one or more memories, and a module on which a plurality of applications are installed. The memory stores one or more programs. The one or more programs include instructions. When the instructions are executed by the electronic device, the electronic device is enabled to perform the method in any one of the first aspect and the implementations of the first aspect.

According to a third aspect, a graphical user interface system on an electronic device is provided. The electronic device includes a display, one or more memories, and one or more processors. The one or more processors are configured to execute one or more computer programs stored in the one or more memories. The graphical user interface system includes a graphical user interface that is displayed when the electronic device performs the method in any one of the first aspect and the implementations of the first aspect.

According to a fourth aspect, an apparatus is provided. The apparatus is included in an electronic device. The apparatus has a function of implementing behaviors of the electronic device in the first aspect and the possible implementations of the first aspect. The function may be implemented by hardware, or may be implemented by hardware executing corresponding software. The hardware or software includes one or more modules or units corresponding to the foregoing function, for example, a display module or unit, a detection module or unit, or a processing module or unit.

According to a fifth aspect, a computer-readable storage medium is provided. The computer-readable storage medium stores computer instructions. When the computer instructions are run on an electronic device, the electronic device is enabled to perform the method in any one of the first aspect and the implementations of the first aspect.

According to a sixth aspect, a computer program product is provided. When the computer program product runs on an electronic device, the electronic device is enabled to perform the method in any one of the first aspect and the possible implementations of the first aspect.

BRIEF DESCRIPTION OF DRAWINGS

FIG. 20 is a schematic flowchart of an example of a method for simultaneously starting a plurality of applications according to an embodiment of this application.

DESCRIPTION OF EMBODIMENTS

Figure 1A:
FIG. 1(*a*), FIG. 1(*b*), FIG. 1(*c*), and FIG. 1(*d*) are a schematic diagram of an example of a process in which a user enables the Multi-Window dock on a mobile phone.
Figure 1B:
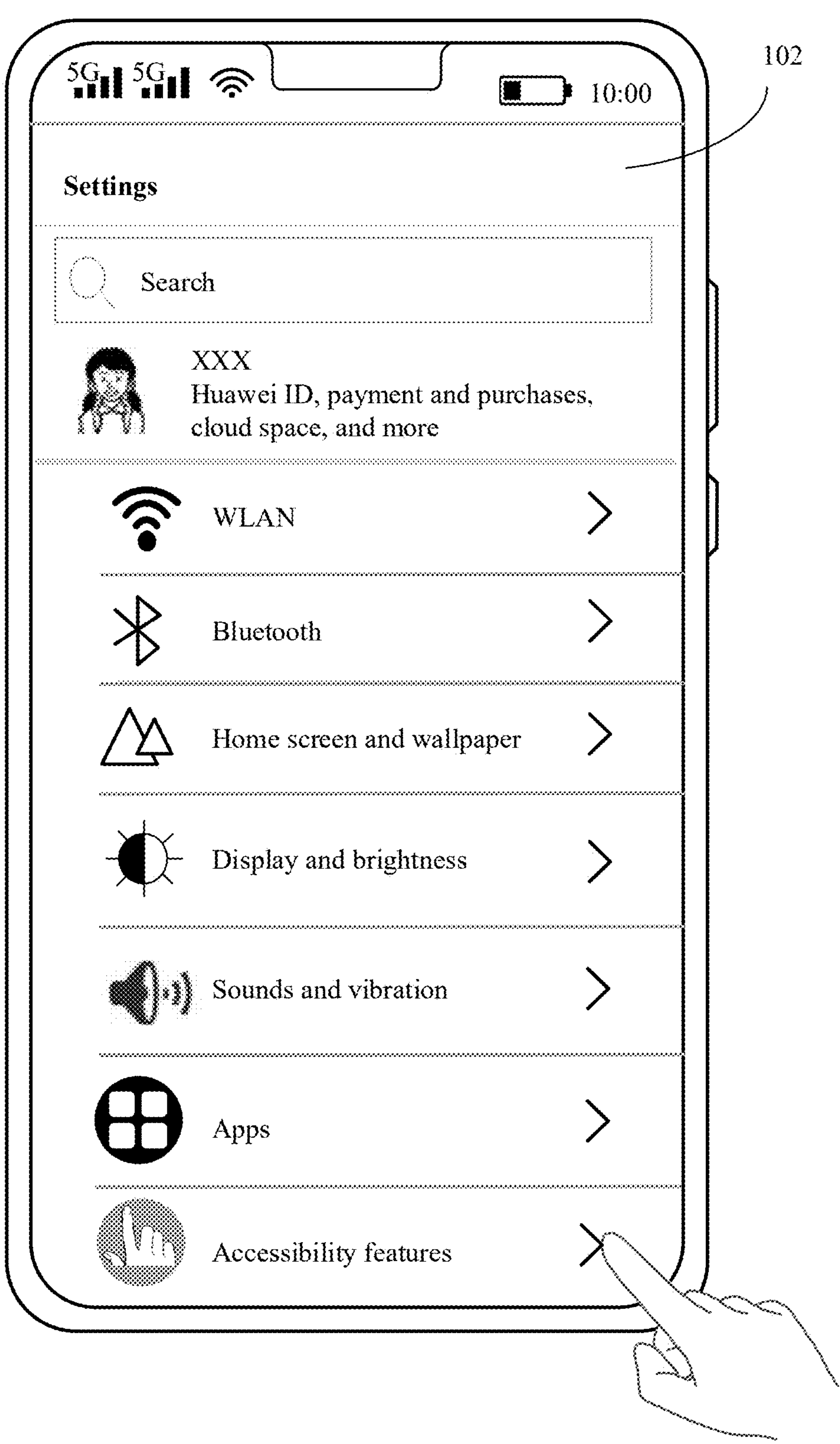
Figure 1C:
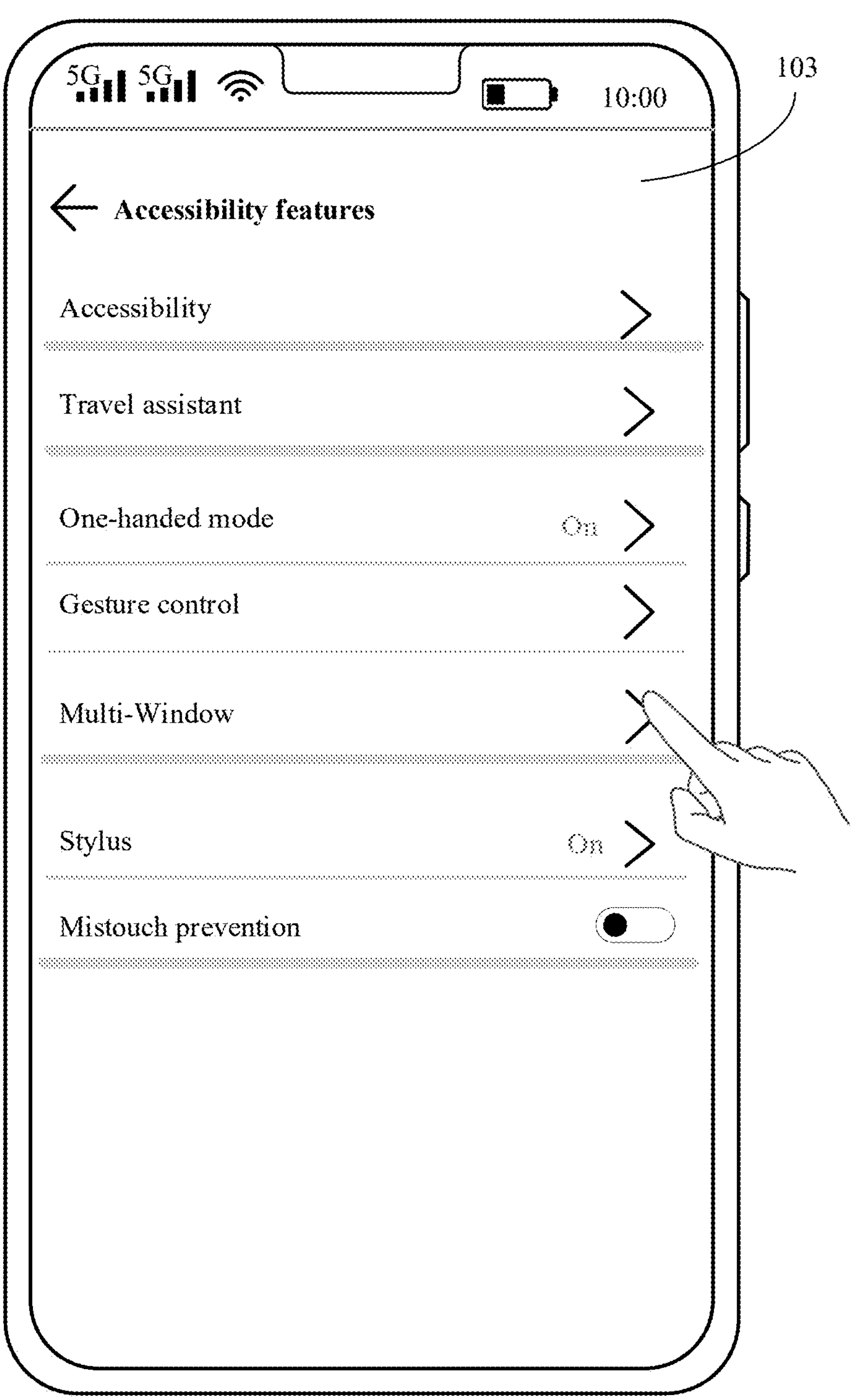
Figure 1D:
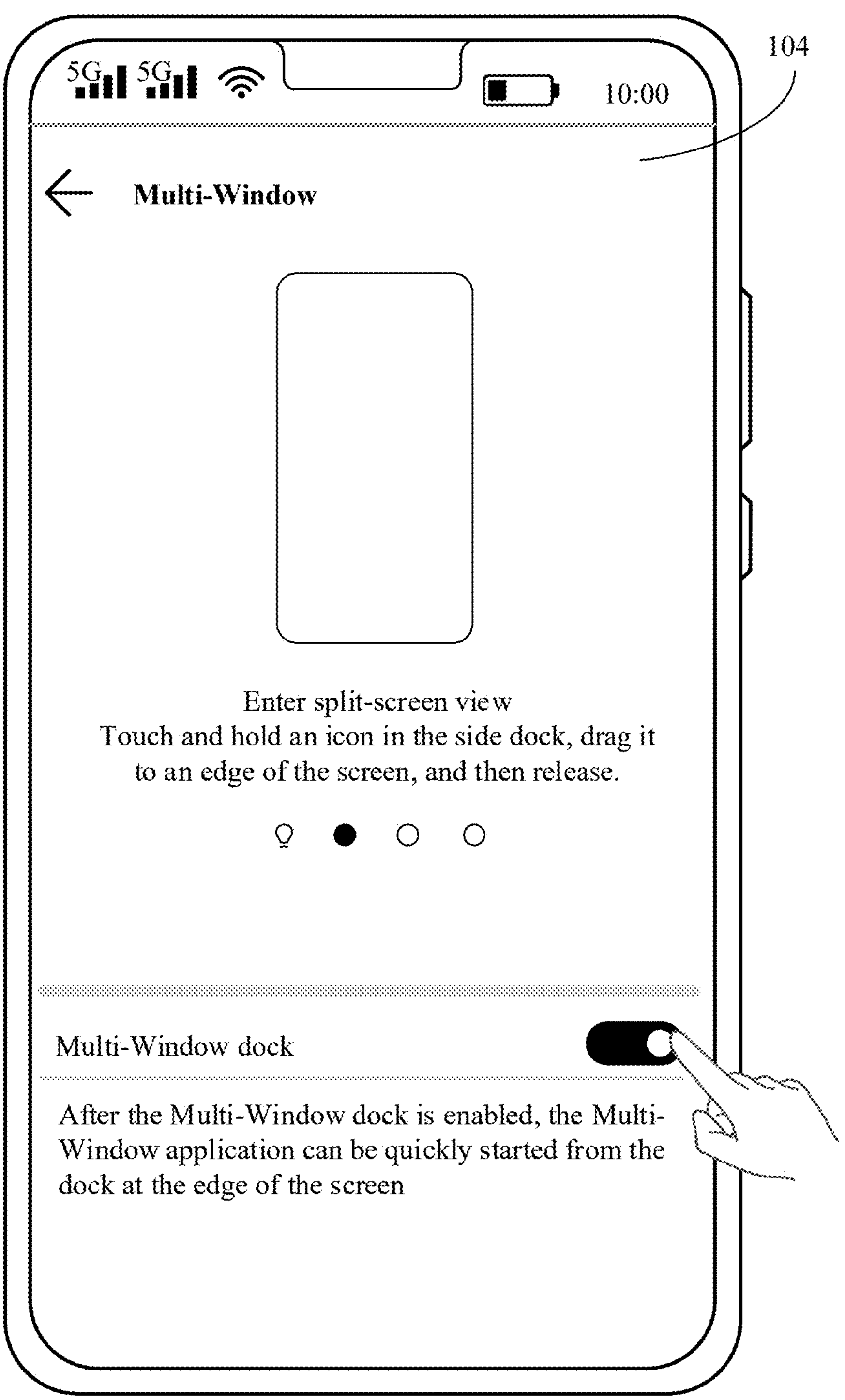
Figure 2A:
FIG. 2(*a*), FIG. 2(*b*), FIG. 2(*c*), FIG. 2(*d*), and FIG. 2(*e*) are a schematic diagram of an example of a process in which a user triggers a mobile phone to display interfaces of two different applications in split screen.
Figure 2B:
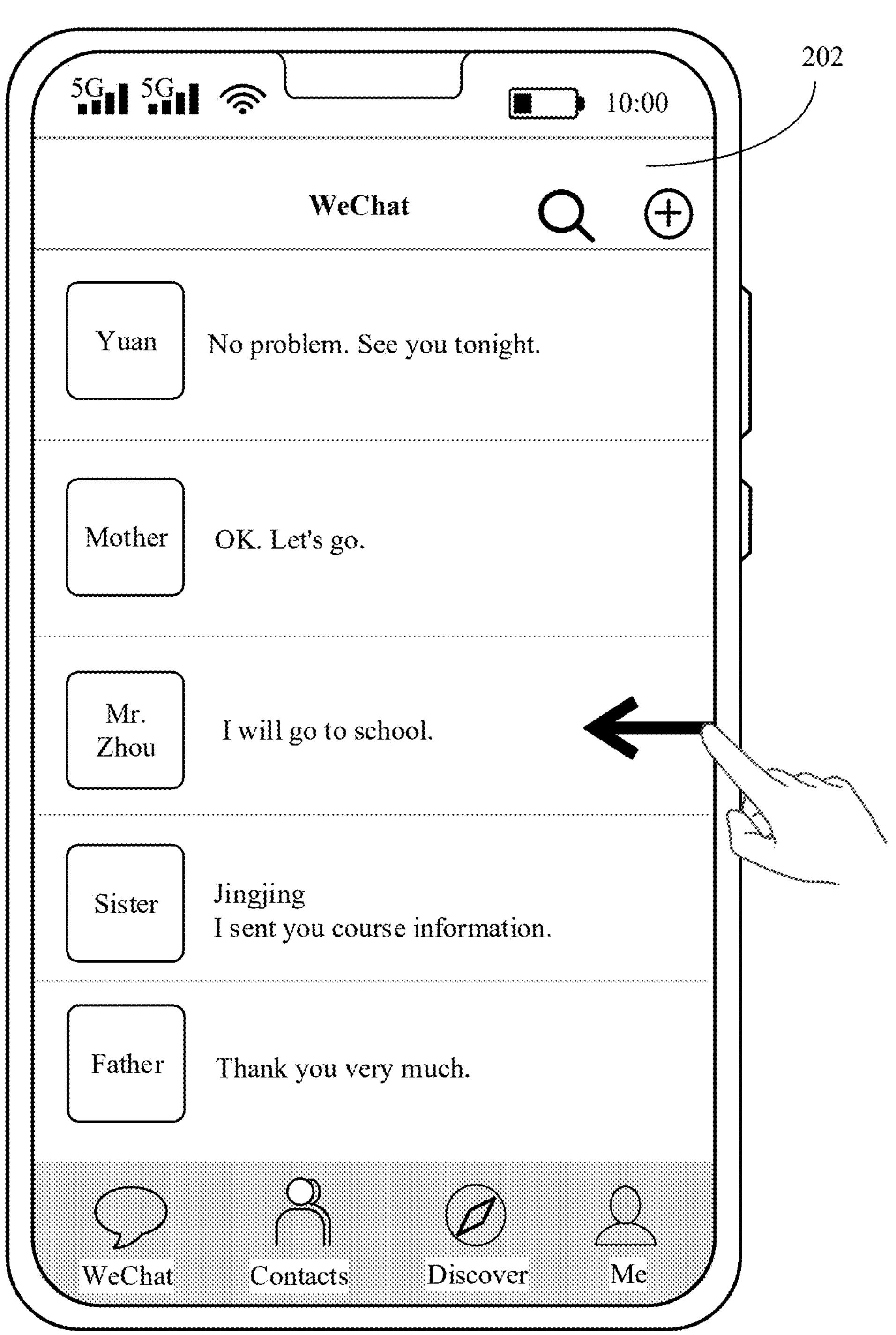
Figure 2C:
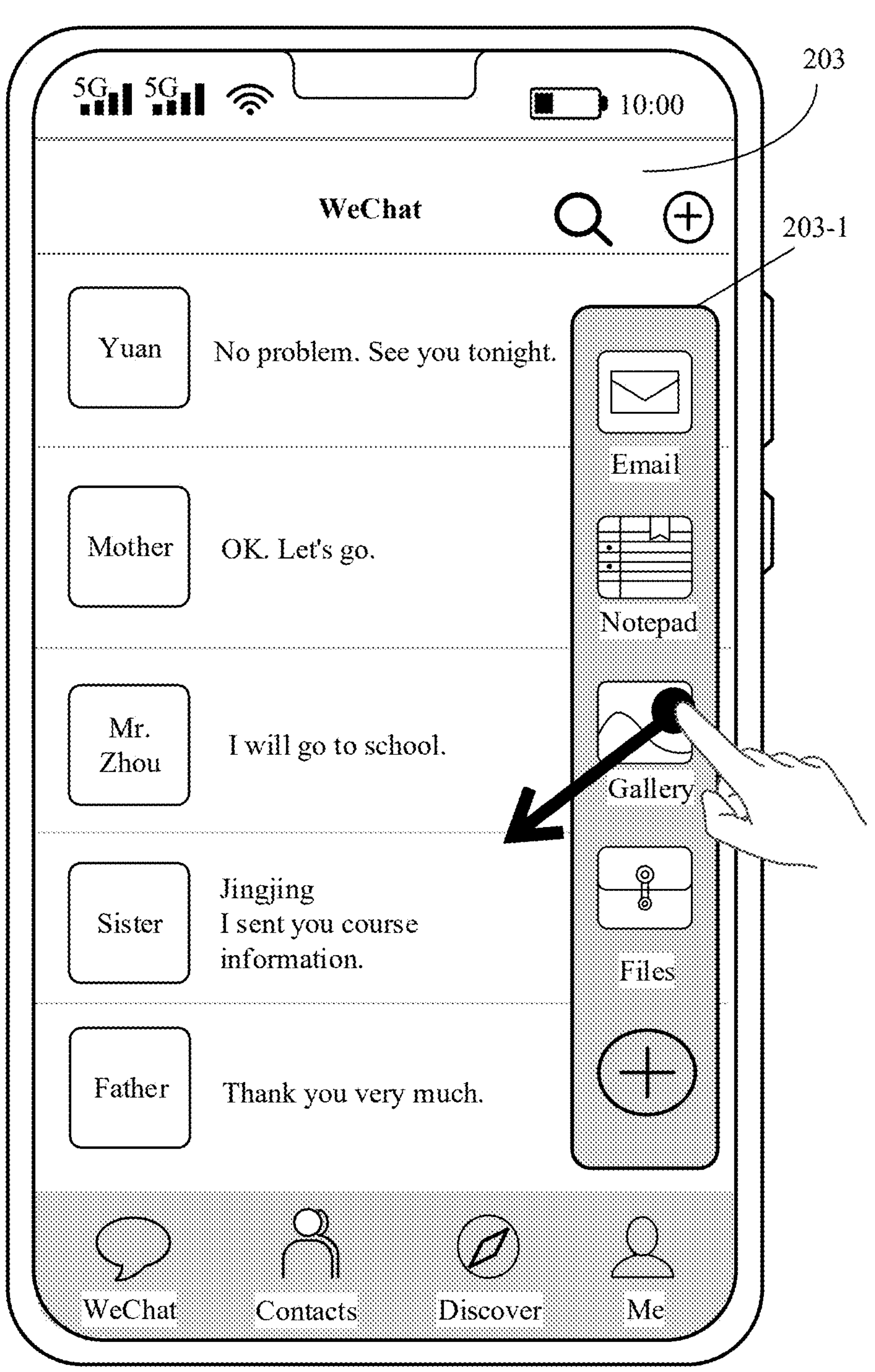
Figure 2D:
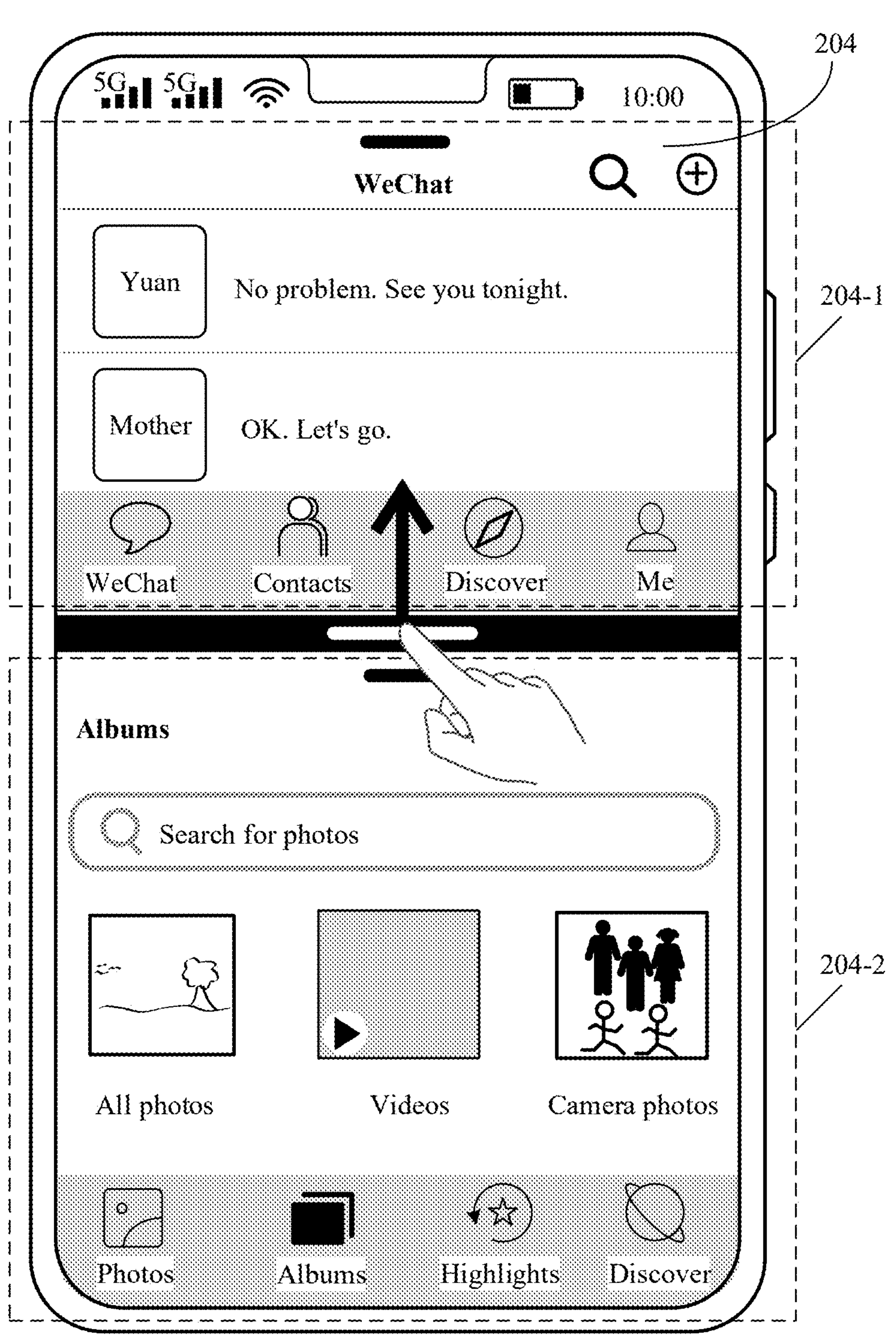
Figure 2E:
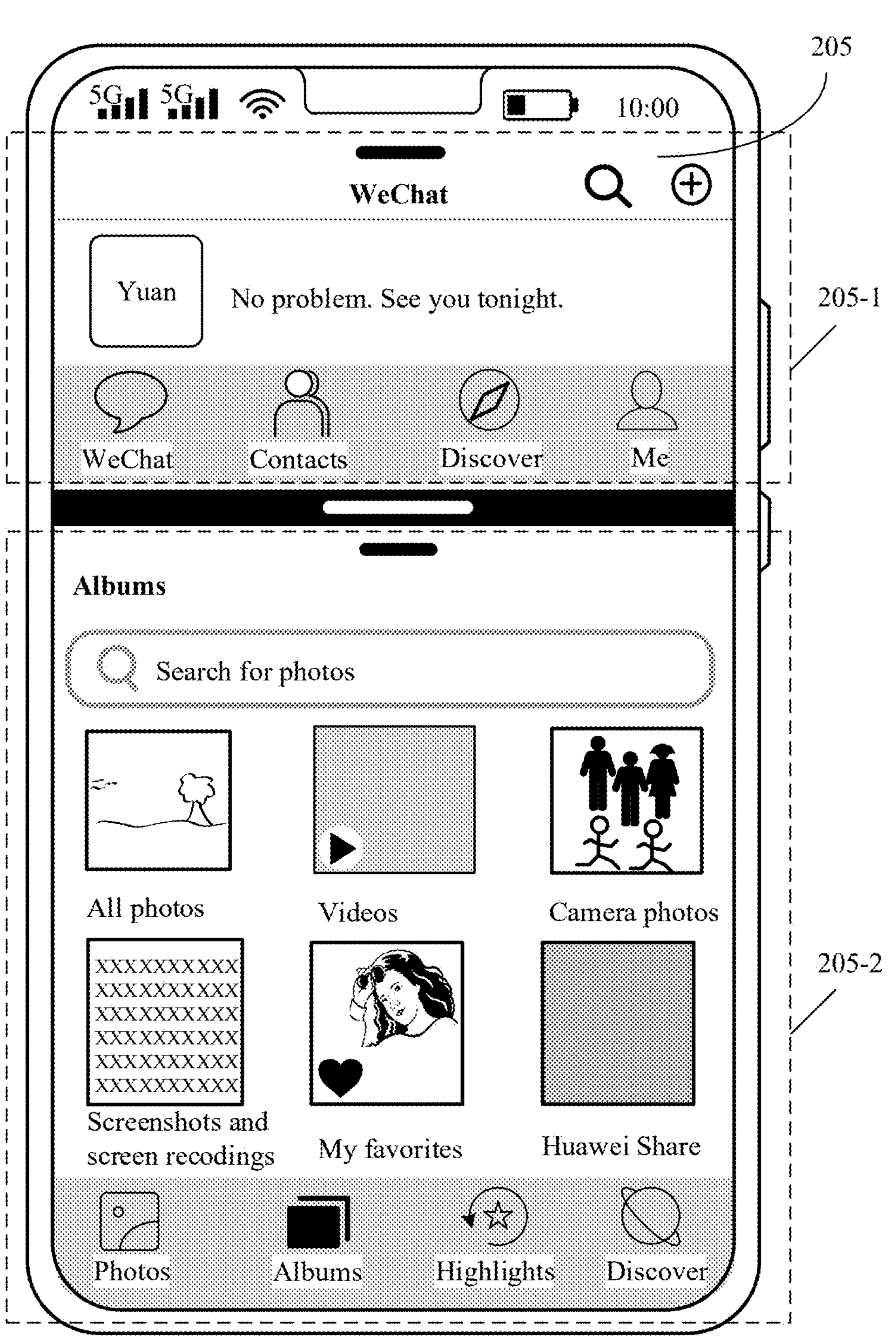
Figure 3A:
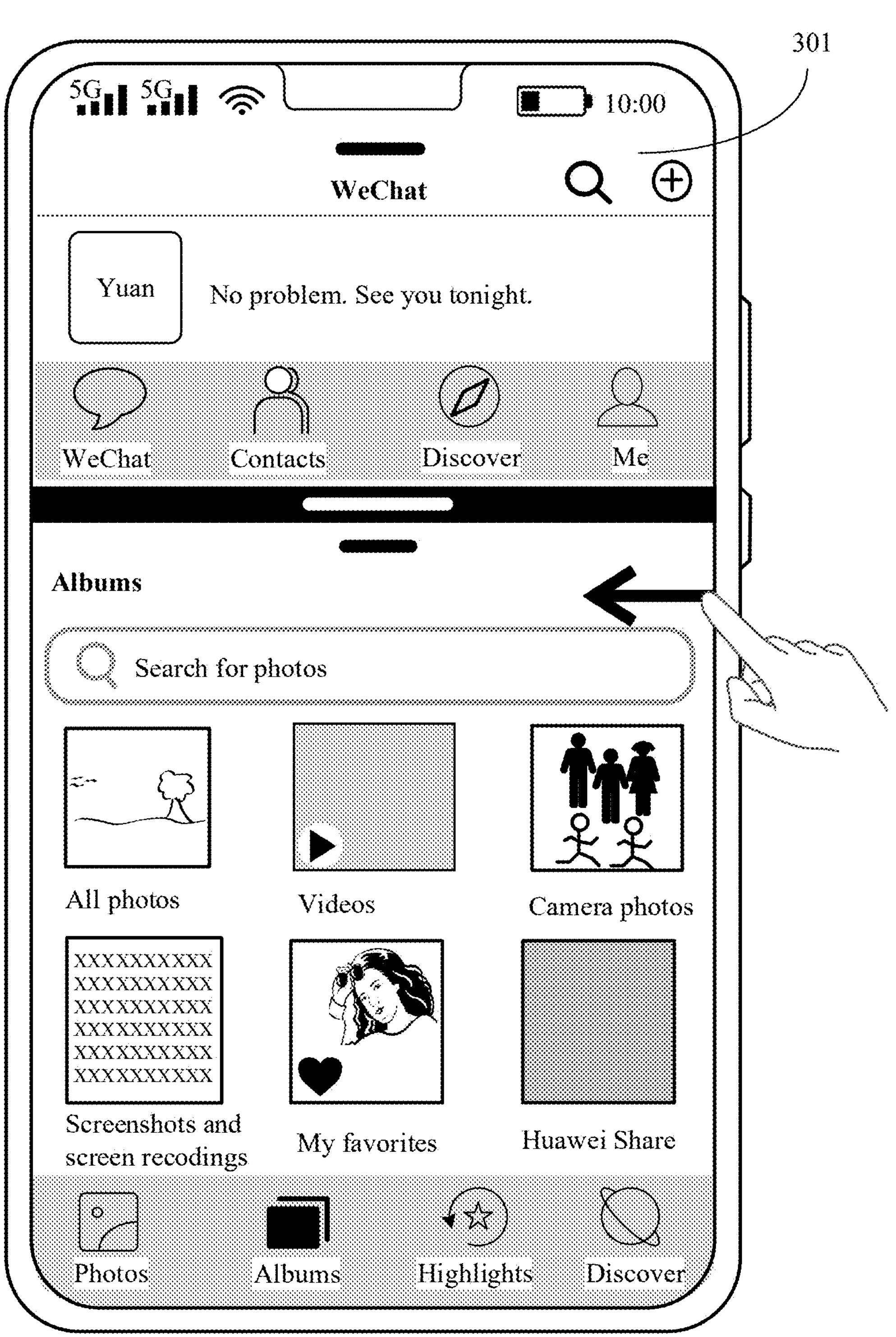
FIG. 3(*a*), FIG. 3(*b*), FIG. 3(*c*), and FIG. 3(*d*) are a schematic diagram of an example of a process in which a user triggers display of a specific application interface in a floating window on a split-screen view of a mobile phone.
Figure 3B:
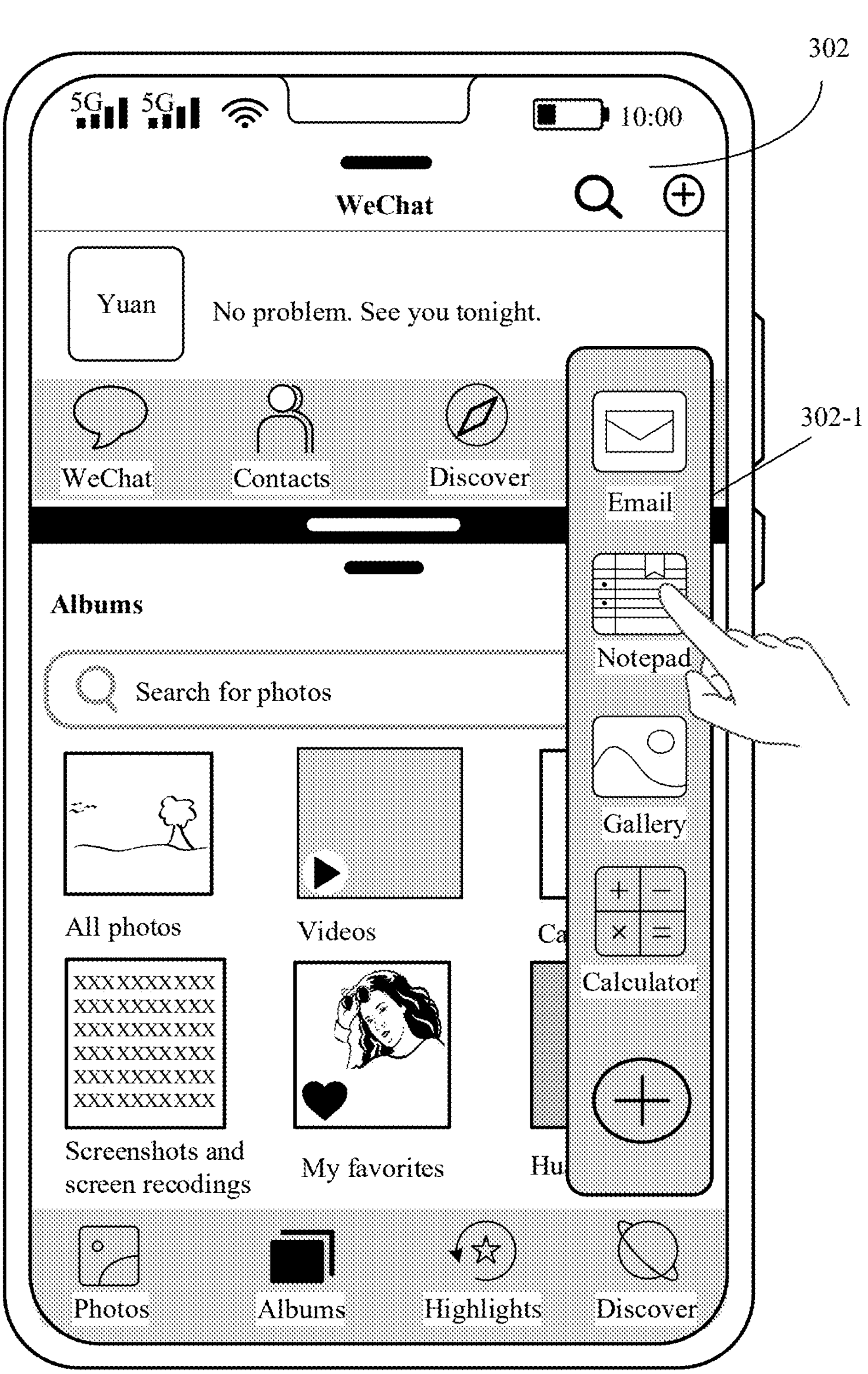
Figure 3C:
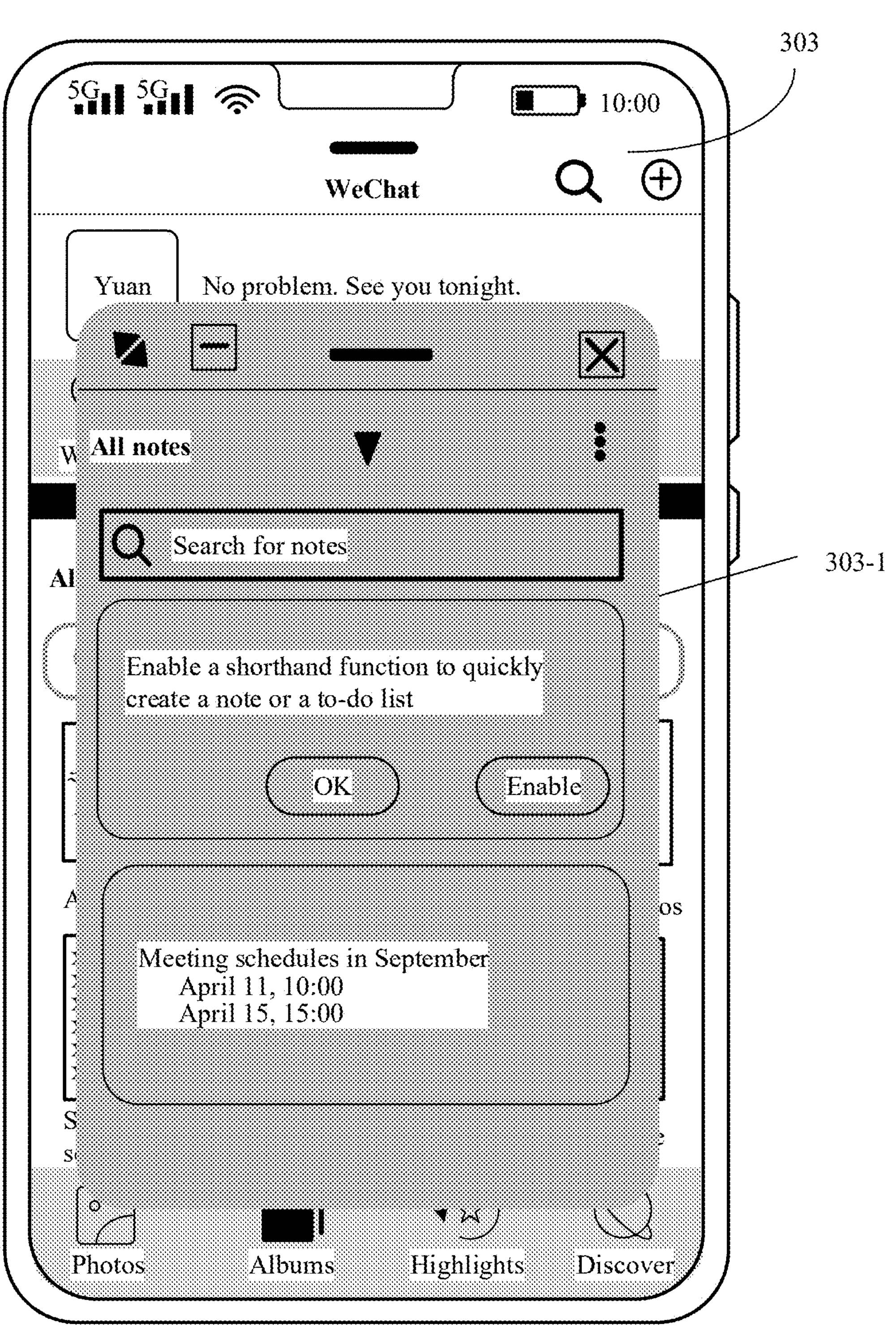
Figure 3D:
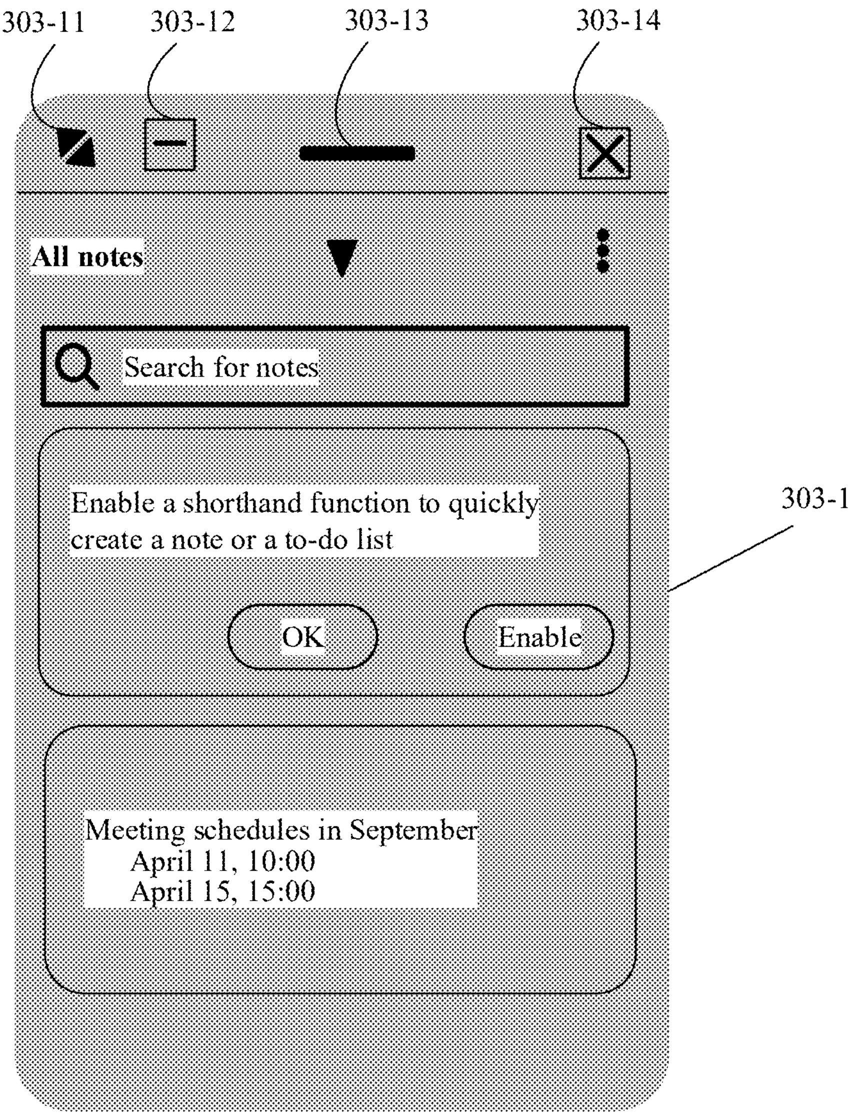
Figure 4A:
FIG. 4(*a*), FIG. 4(*b*), FIG. 4(*c*), FIG. 4(*d*), and FIG. 4(*e*) are a schematic diagram of an example of a process in which a user enables an application combination service on a mobile phone according to an embodiment of this application.
Figure 4B:
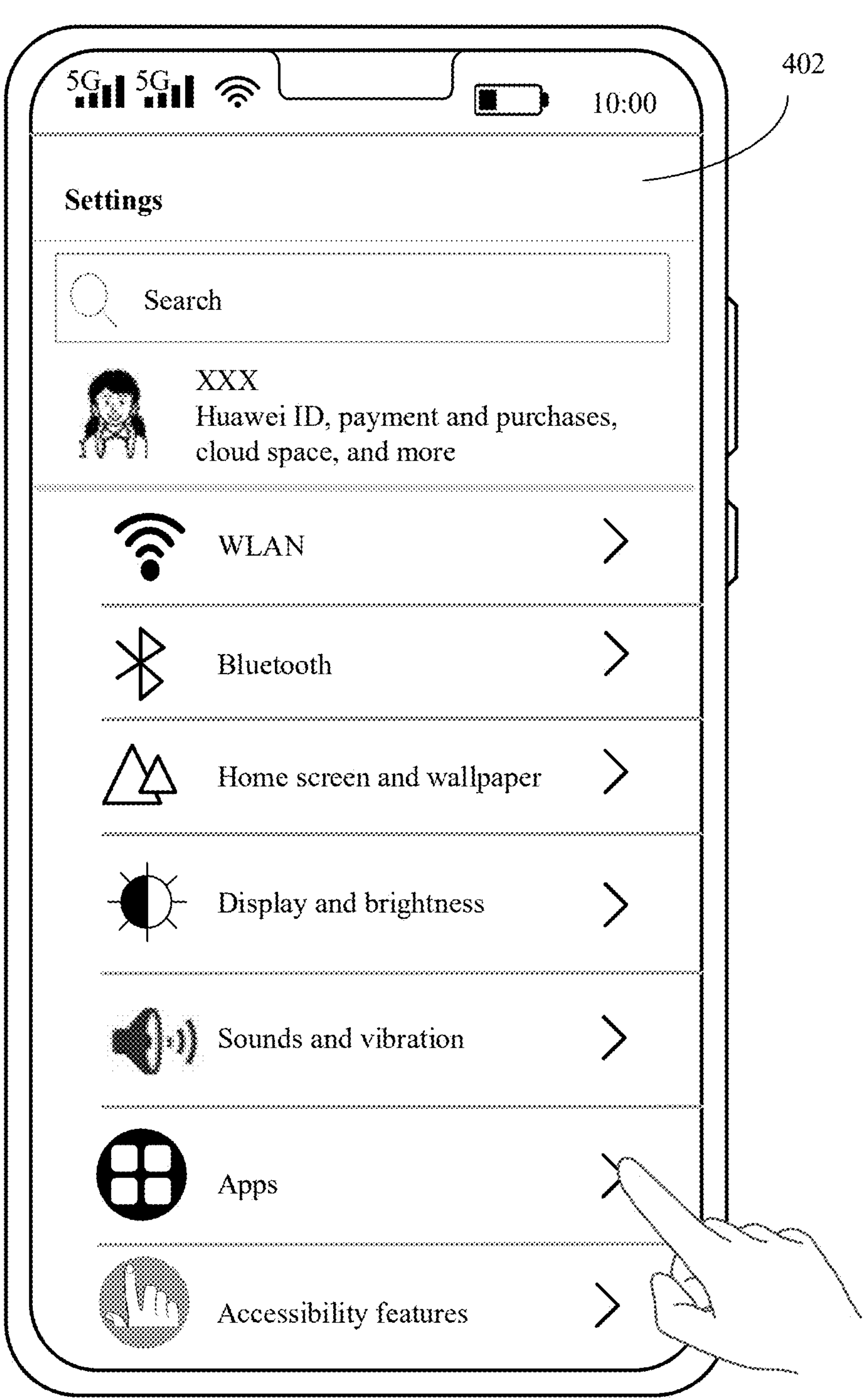
Figure 4C:
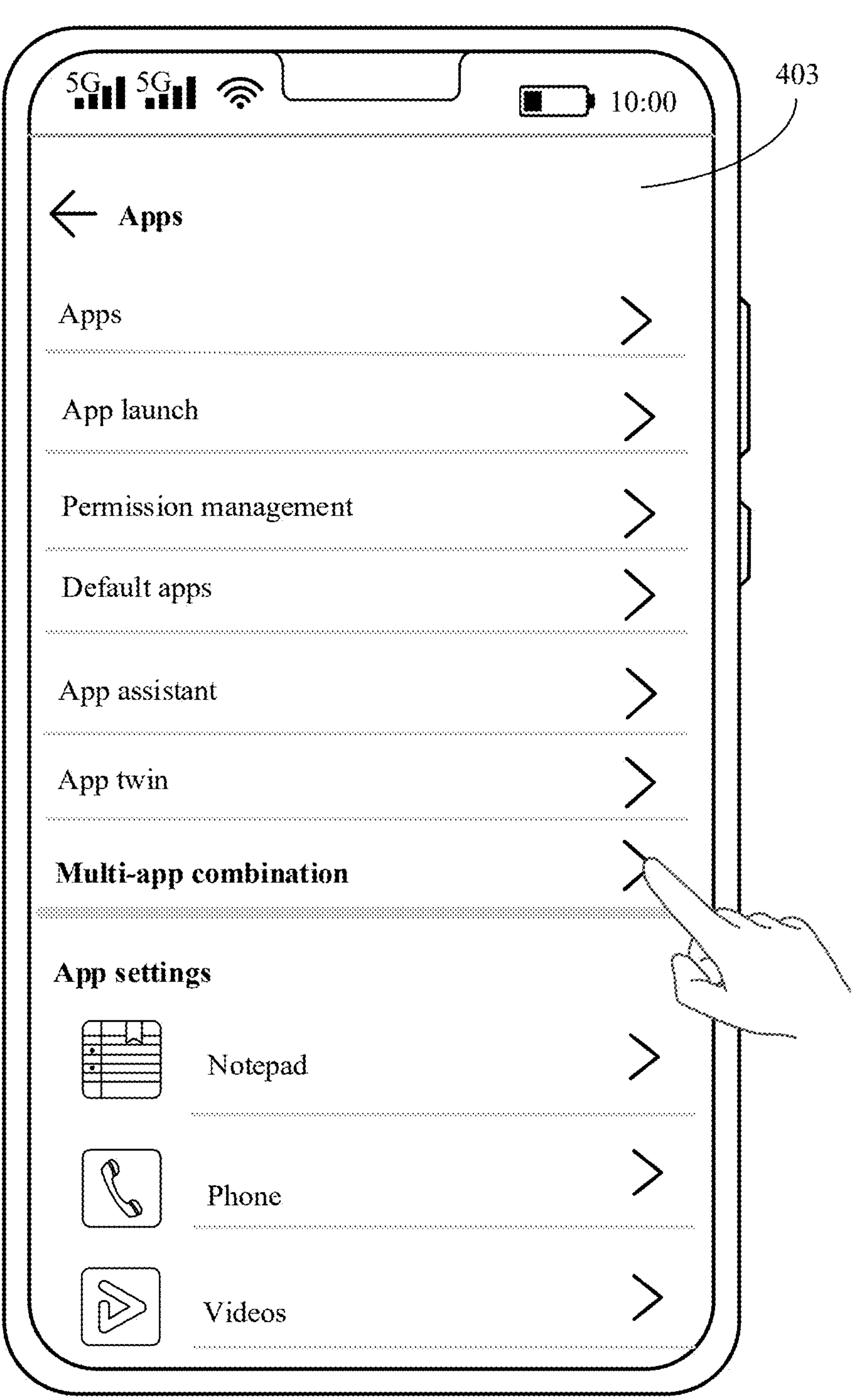
Figure 4D:
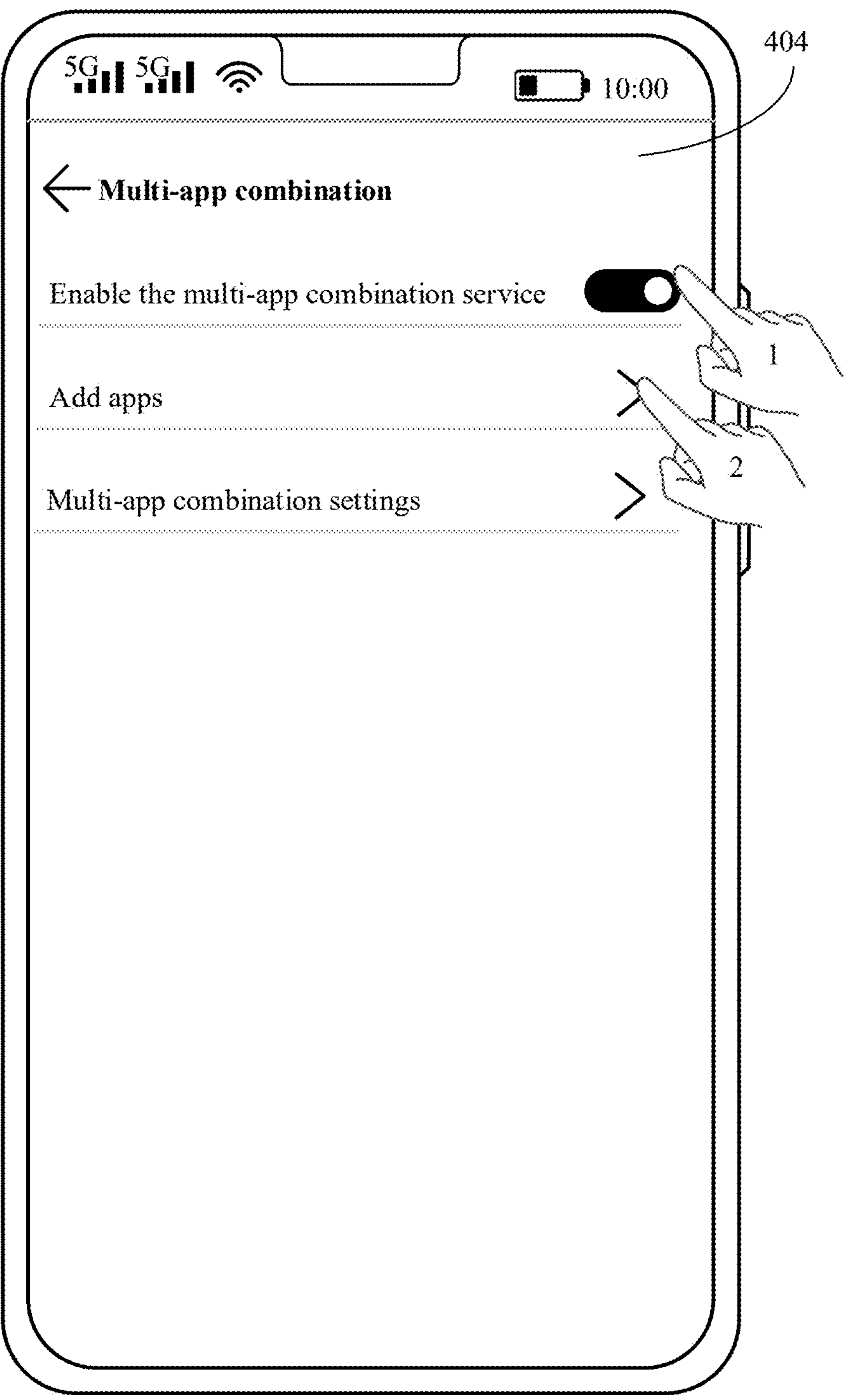
Figure 4E:
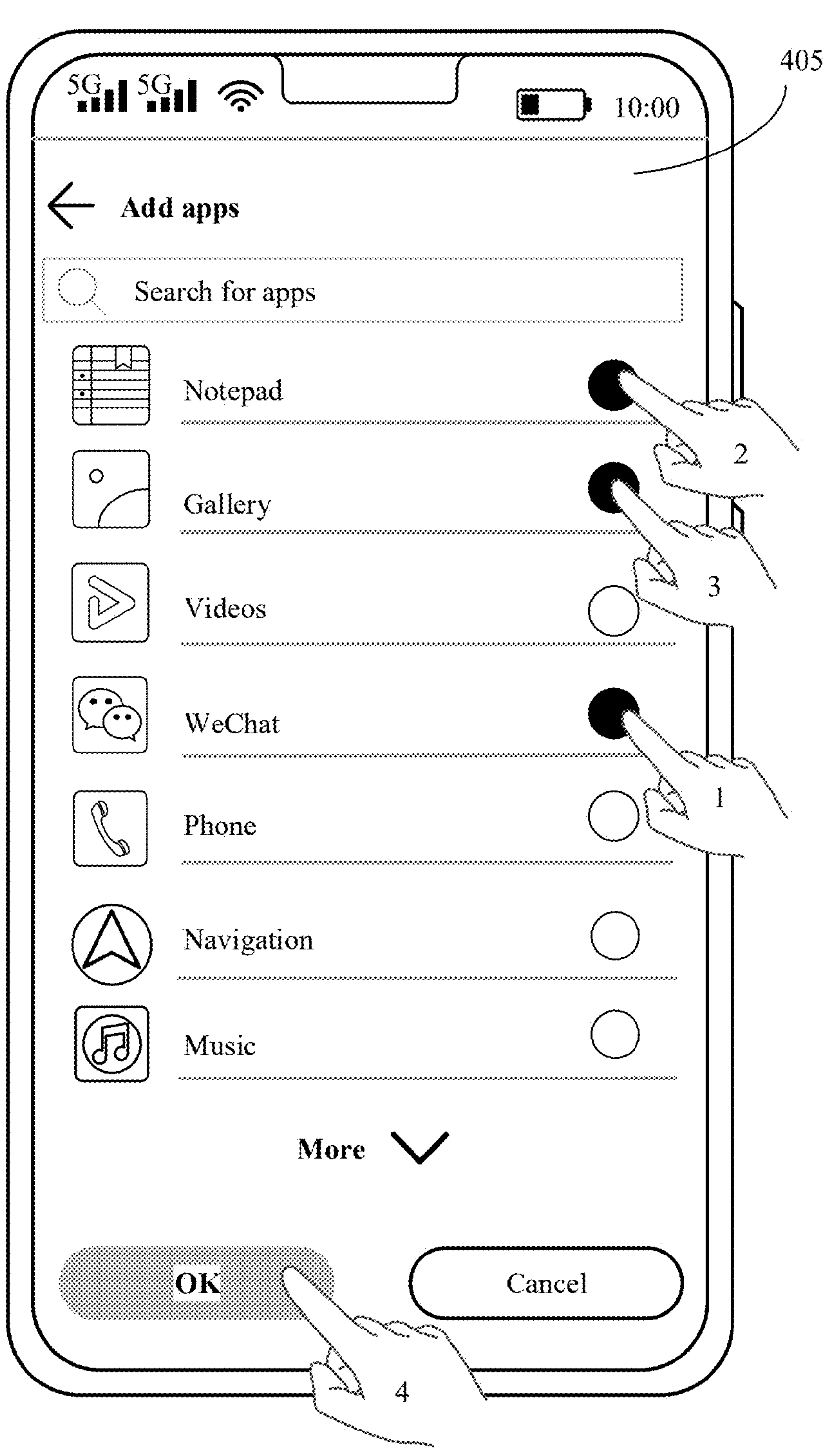
Figure 5A:
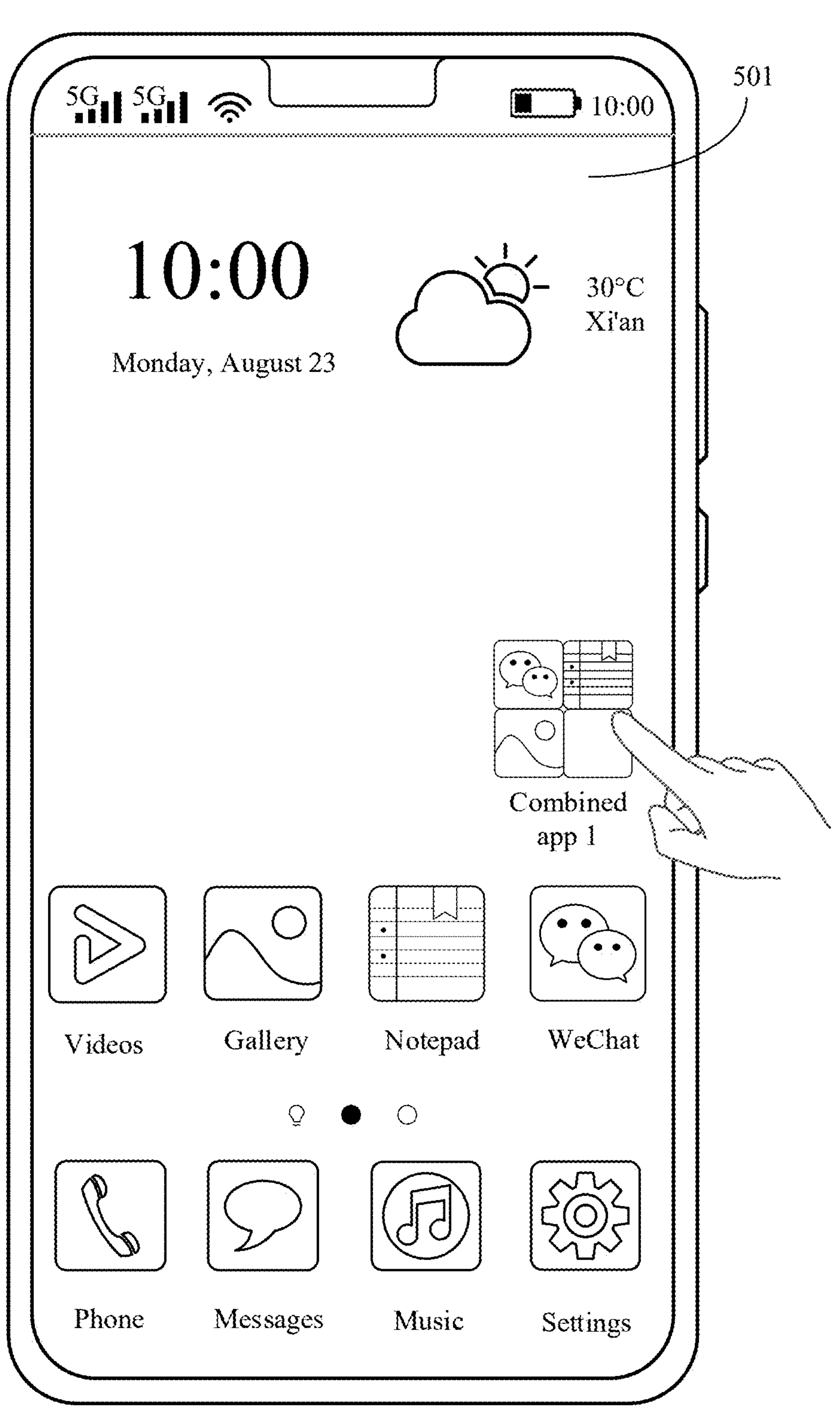
FIG. 5(*a*), FIG. 5(*b*), FIG. 5(*c*), FIG. 5(*d*), FIG. 5(*e*), FIG. 5(*f*), FIG. 5(*g*), and FIG. 5(*h*) are a schematic diagram of an example of a process in which a user sets display of a combined application according to an embodiment of this application.
Figure 5B:
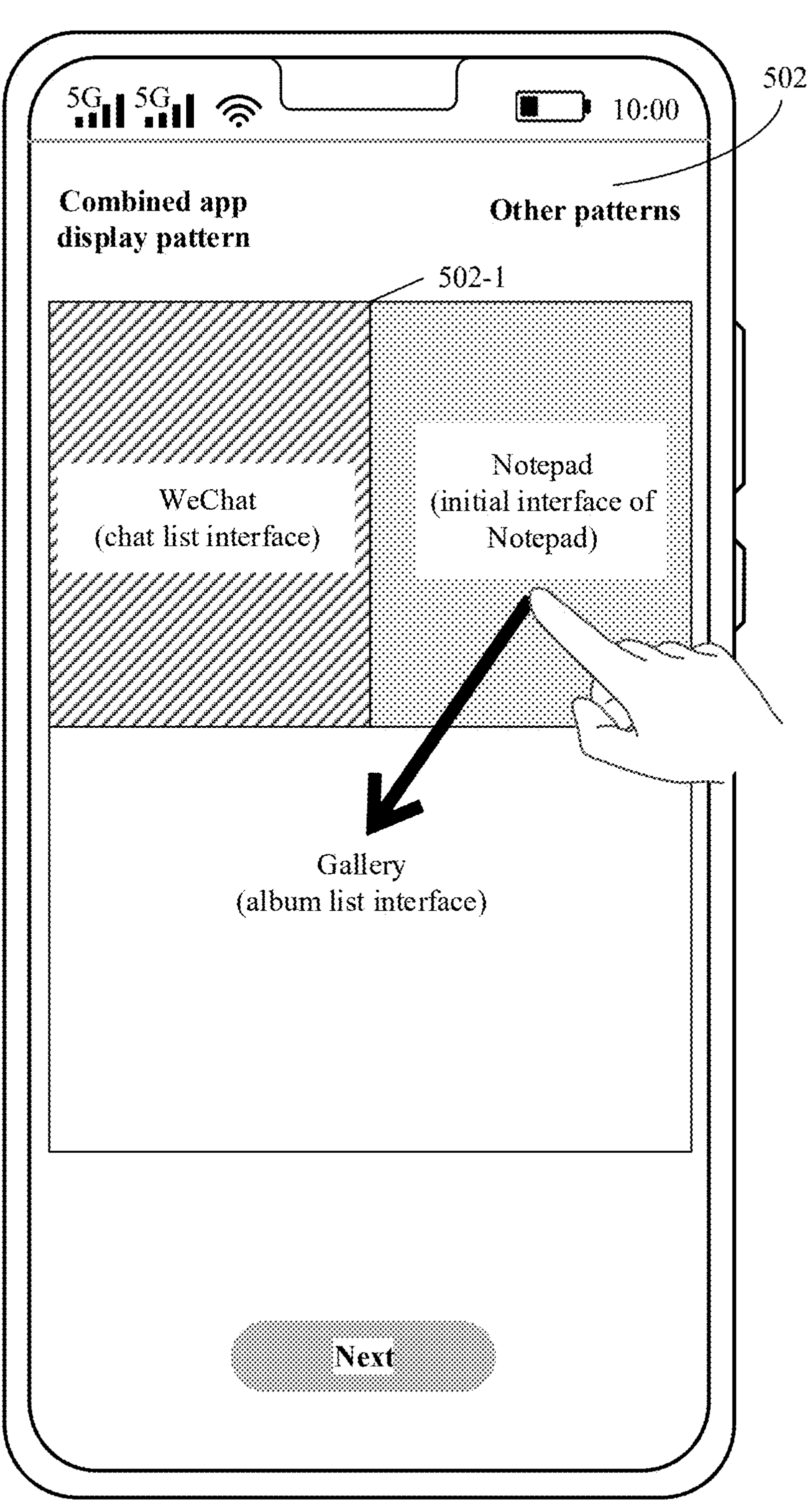
Figure 5C:
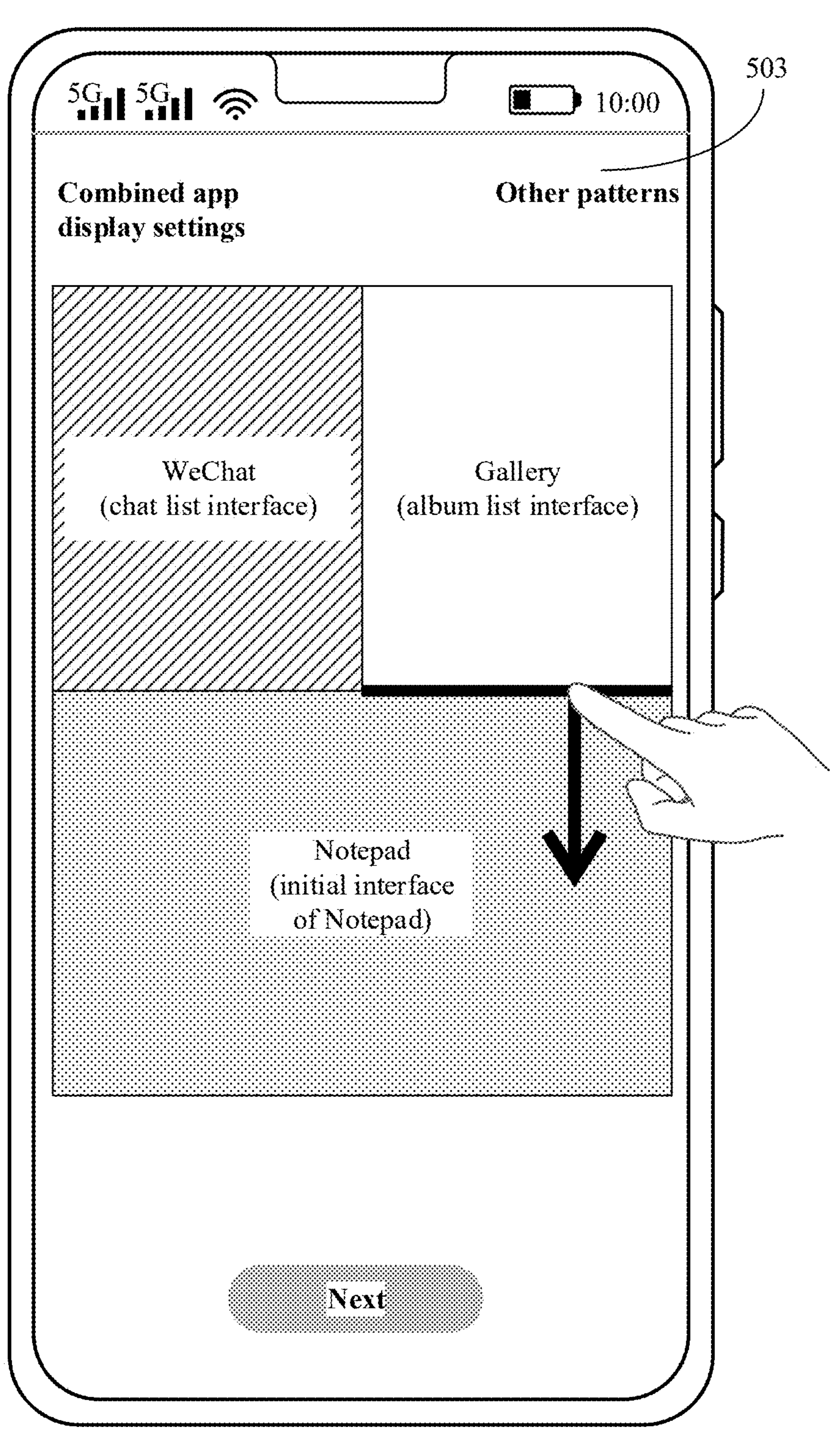
Figure 5D:
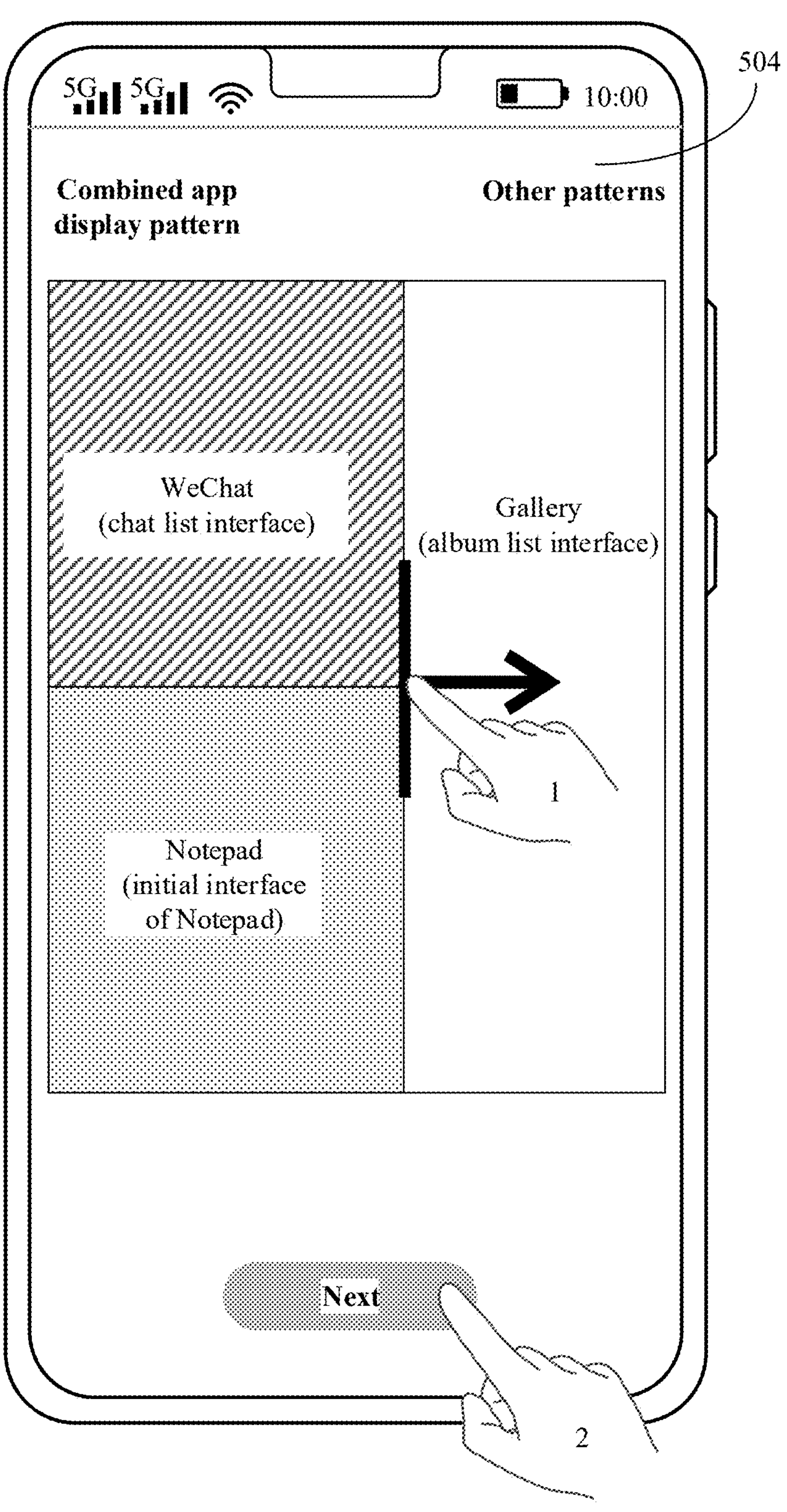
Figure 5E:
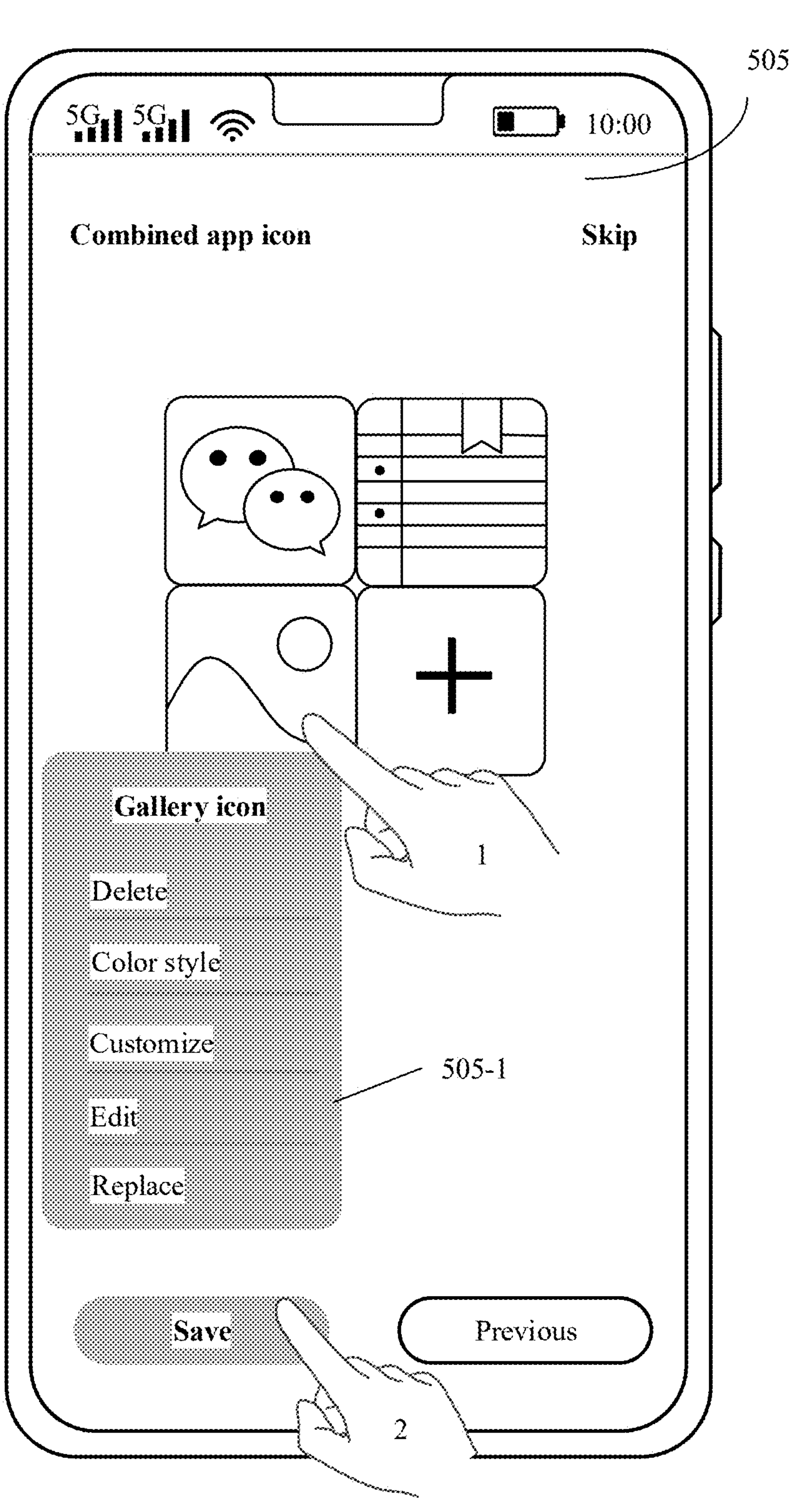
Figure 5F:
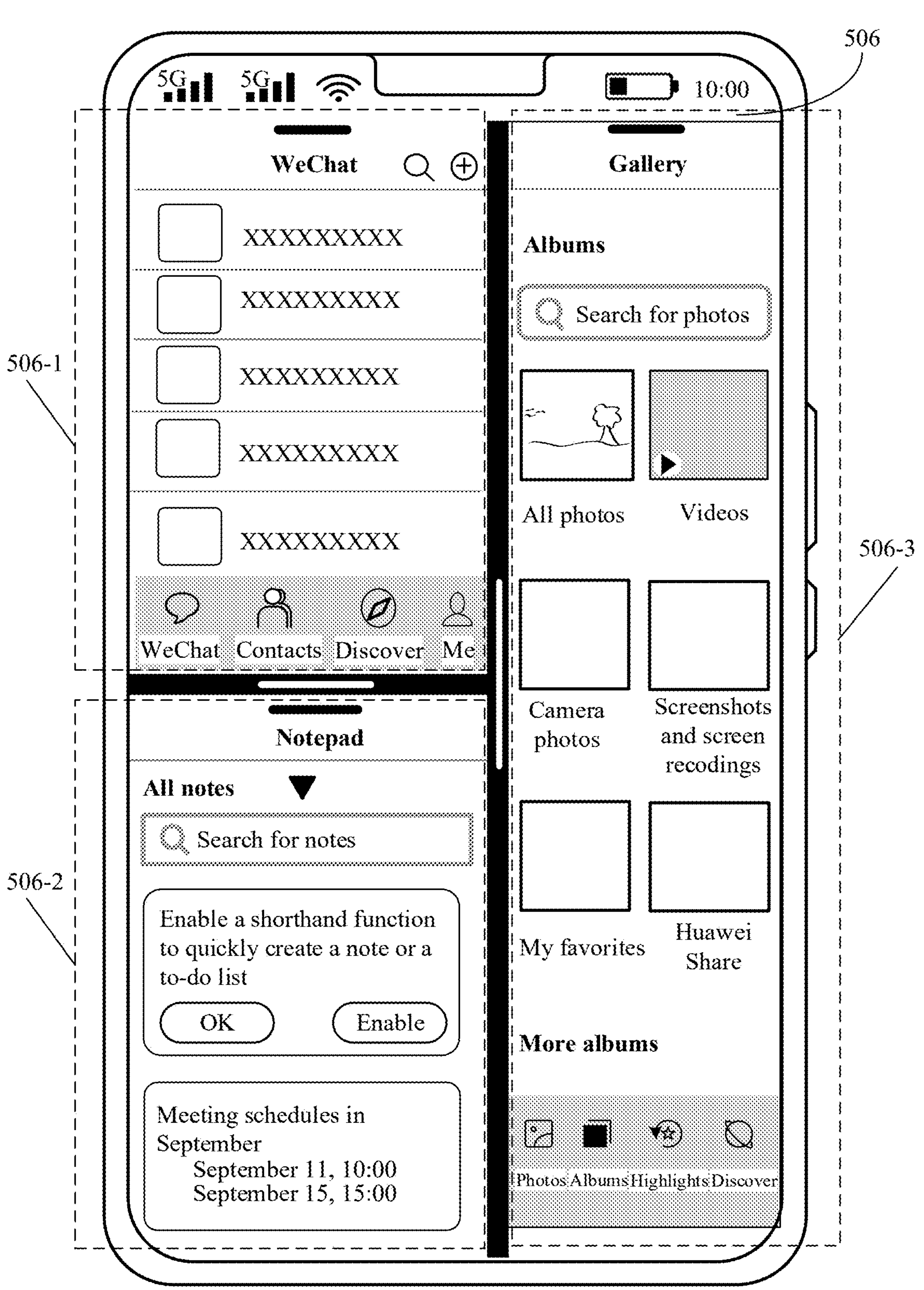
Figures 5G, 5H:
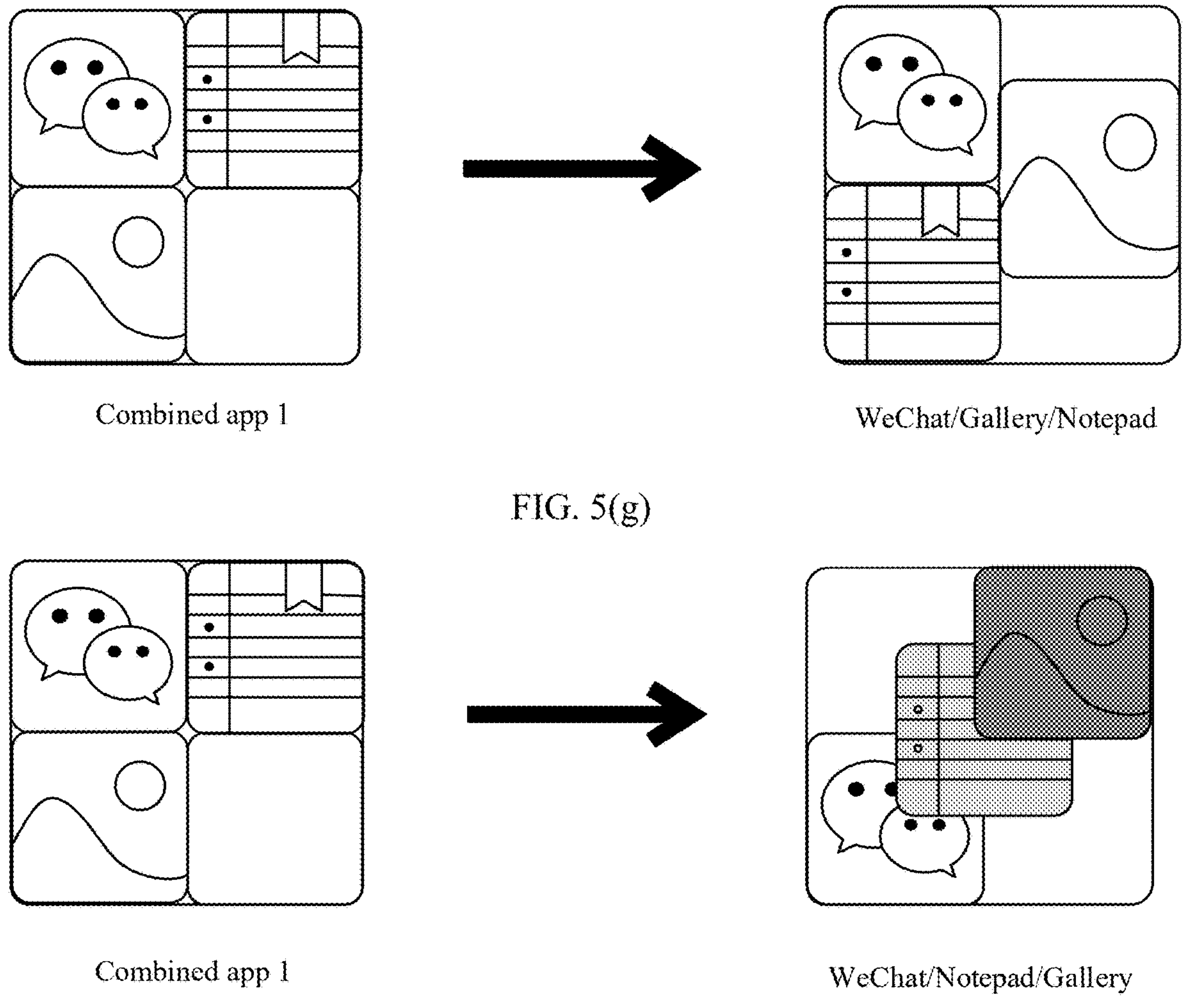
Figure 6A:
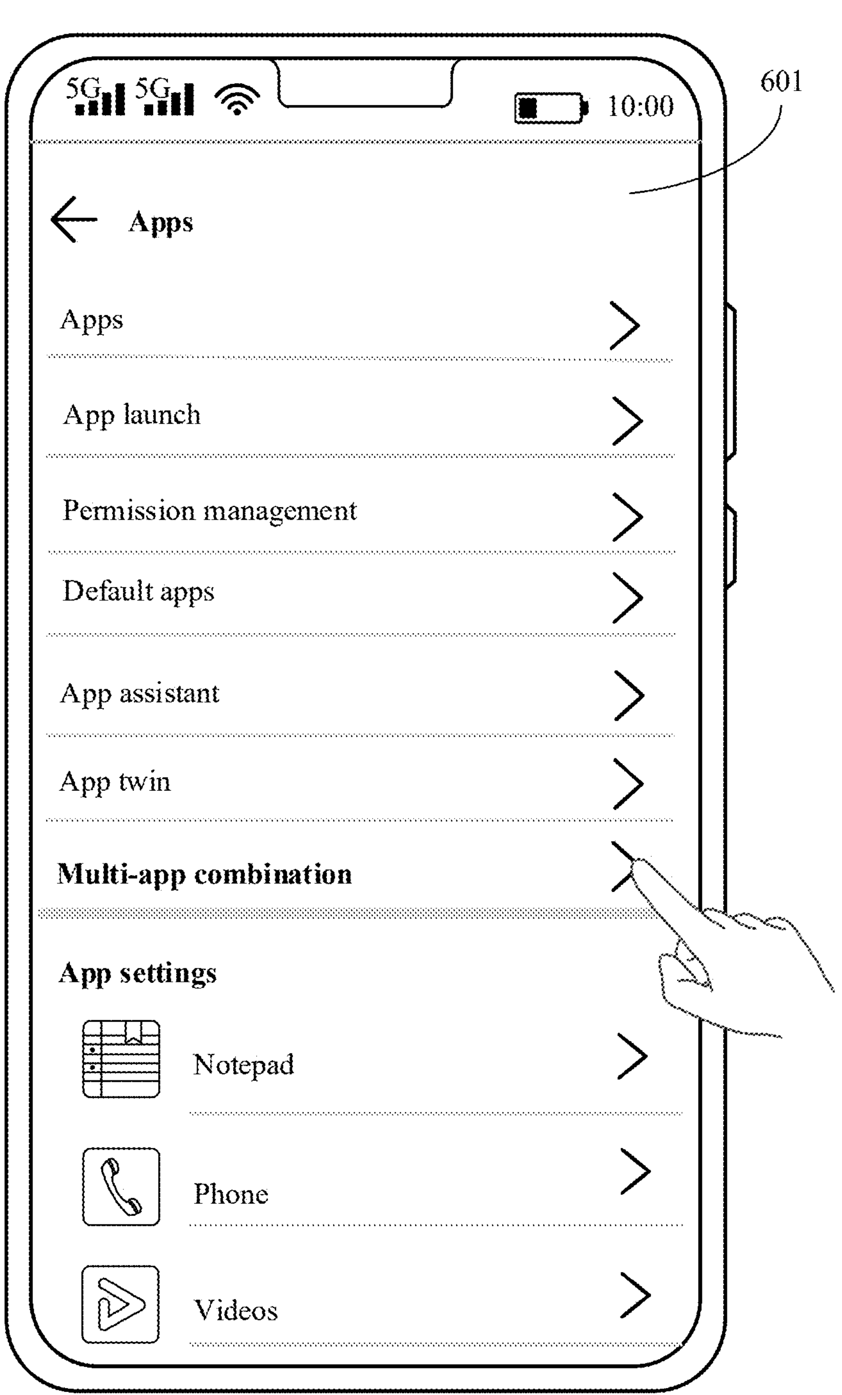
FIG. 6(*a*), FIG. 6(*b*), FIG. 6(*c*), and FIG. 6(*d*) are a schematic diagram of another example of a process in which a user enables an application combination service on a mobile phone according to an embodiment of this application.
Figure 6B:
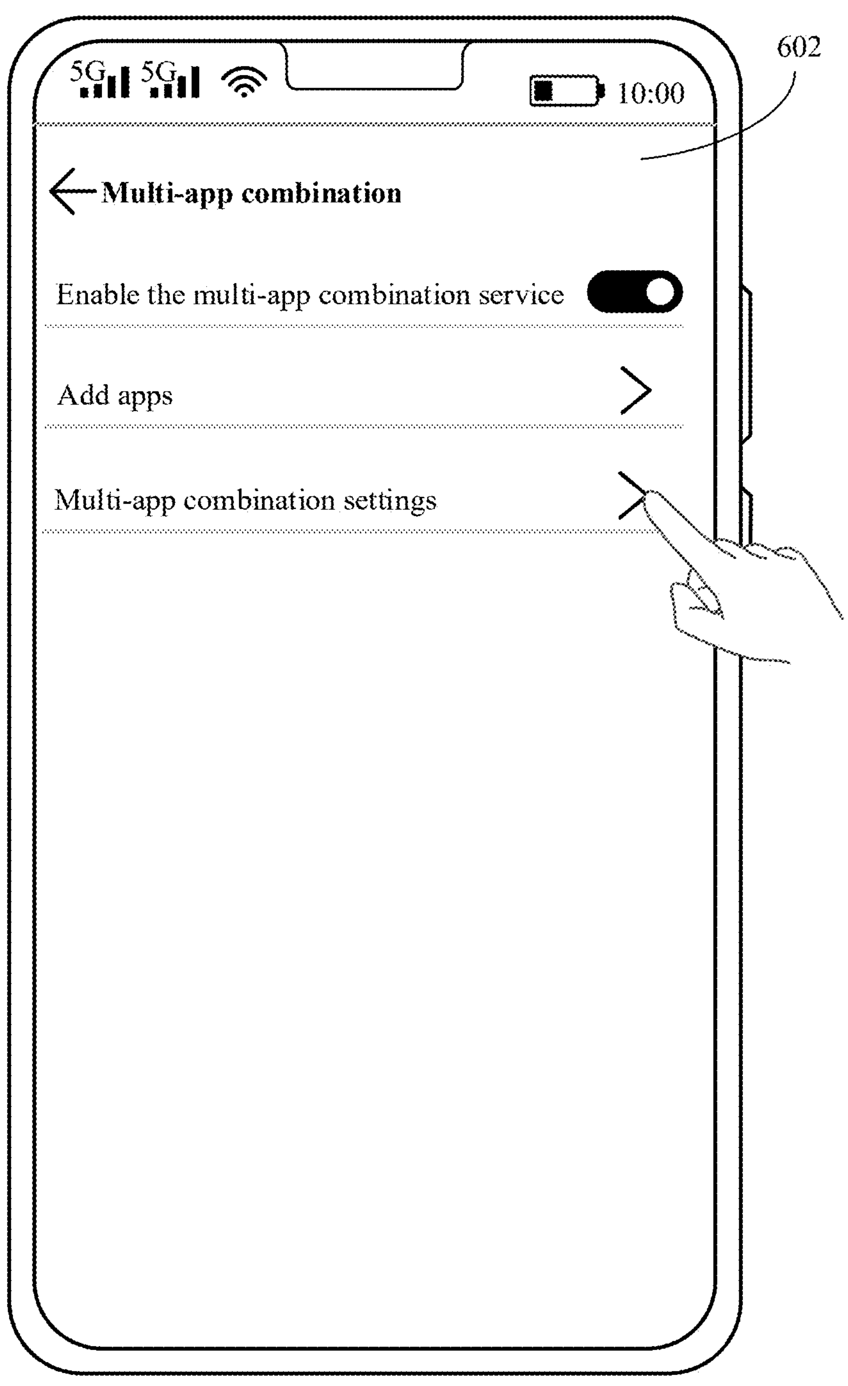
Figure 6C:
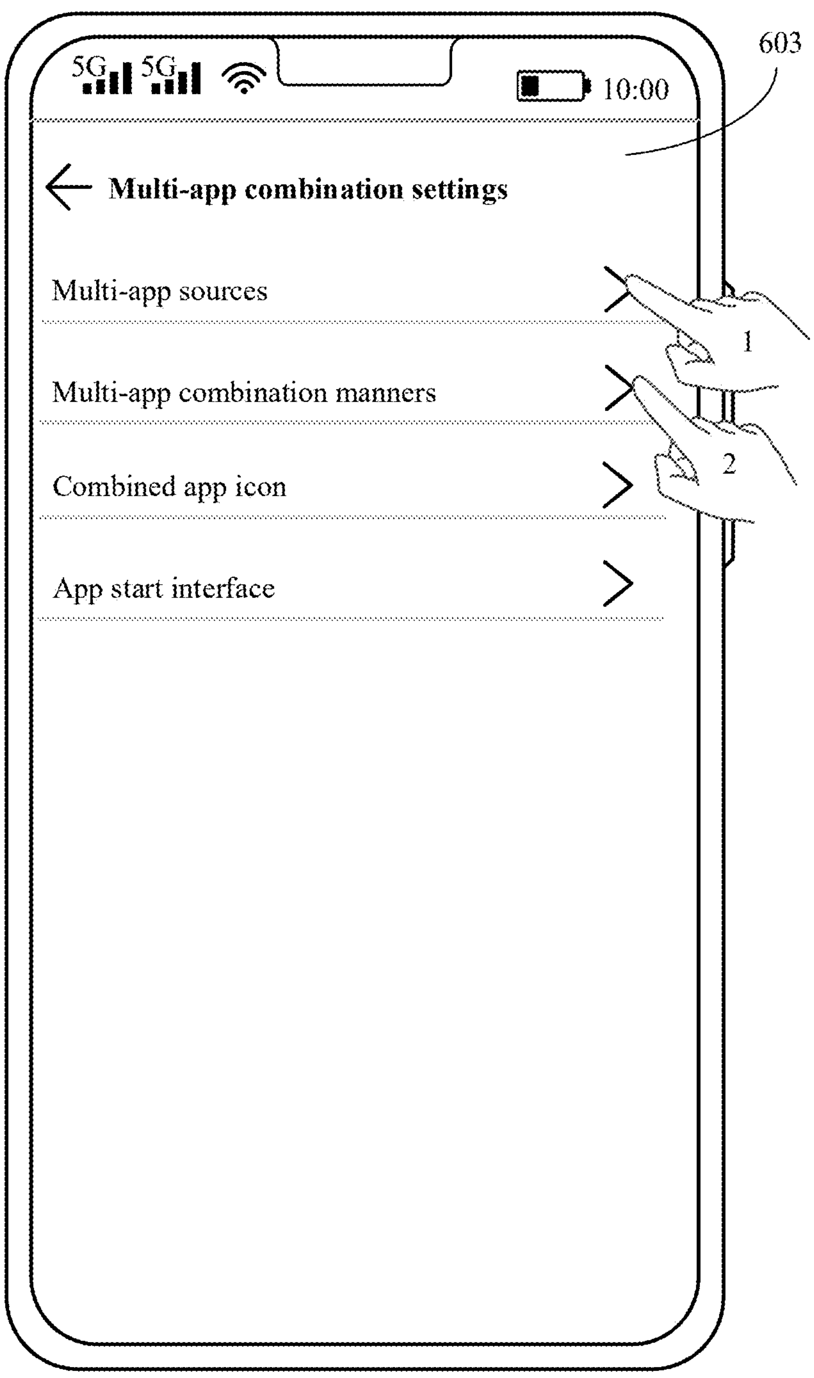
Figure 6D:
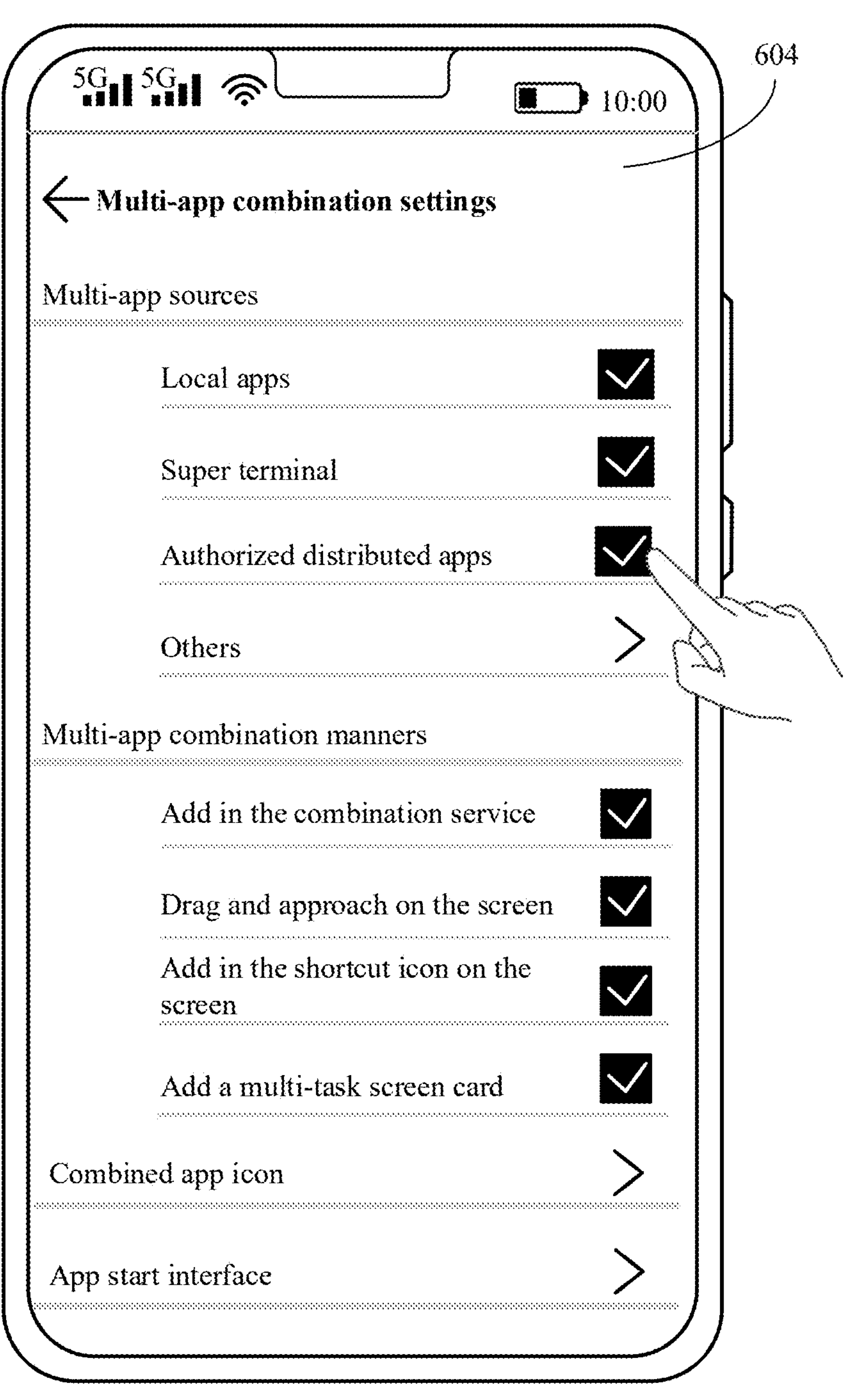
Figure 7A:
FIG. 7(*a*), FIG. 7(*b*), FIG. 7(*c*), and FIG. 7(*d*) are a schematic diagram of an example of a process in which a user combines a plurality of applications according to an embodiment of this application.
Figure 7B:
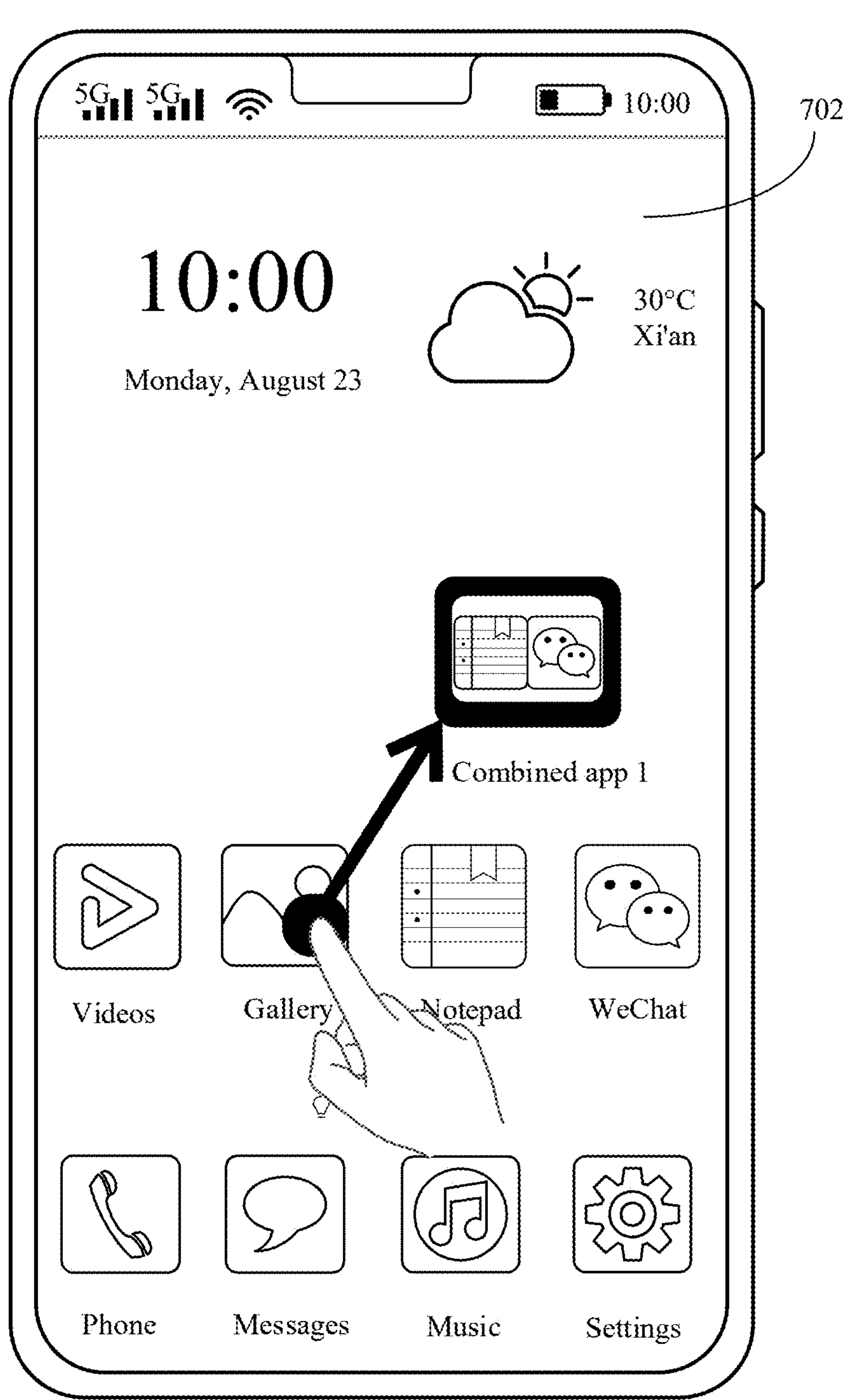
Figure 7C:
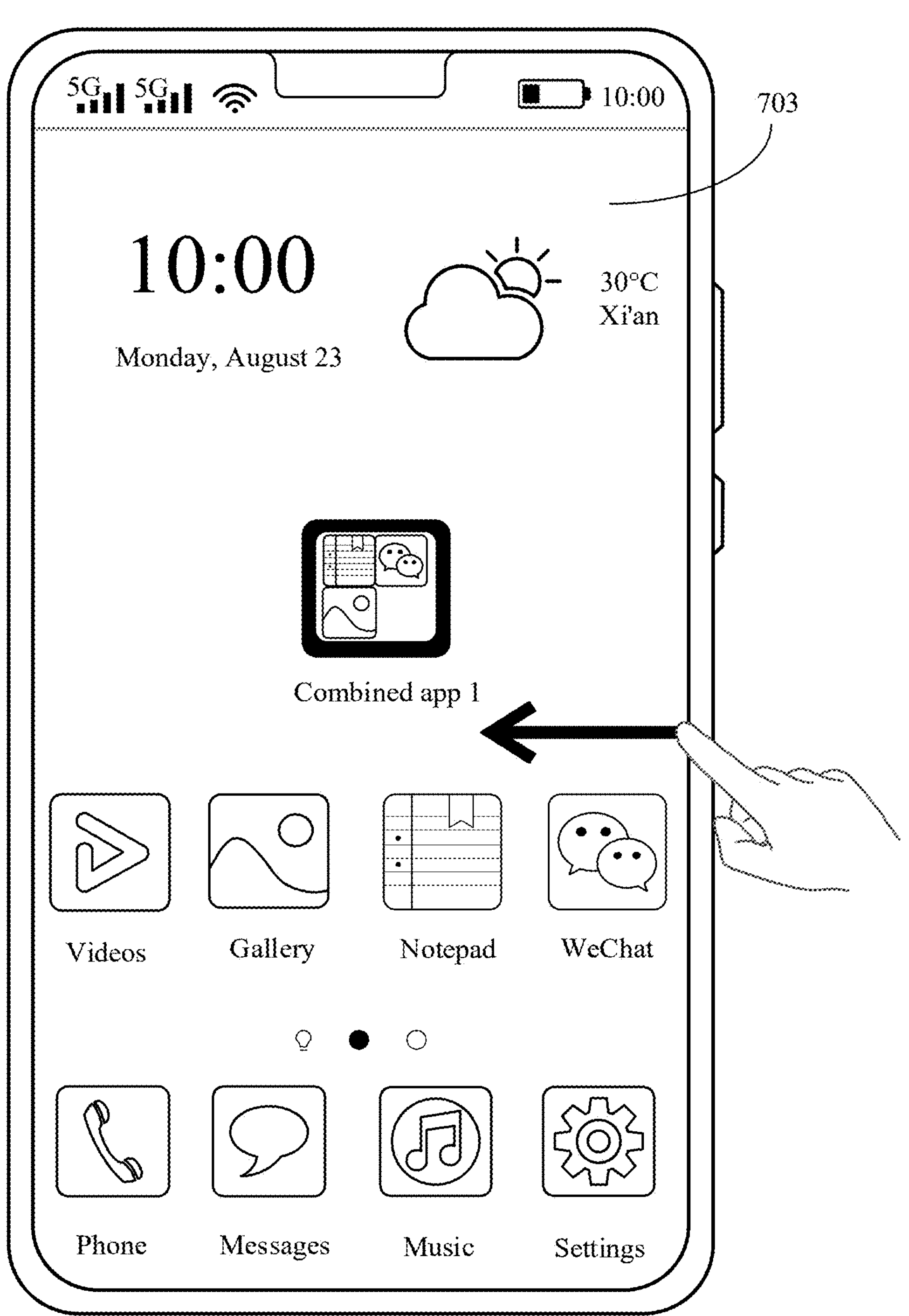
Figure 7D:
Figure 8A:
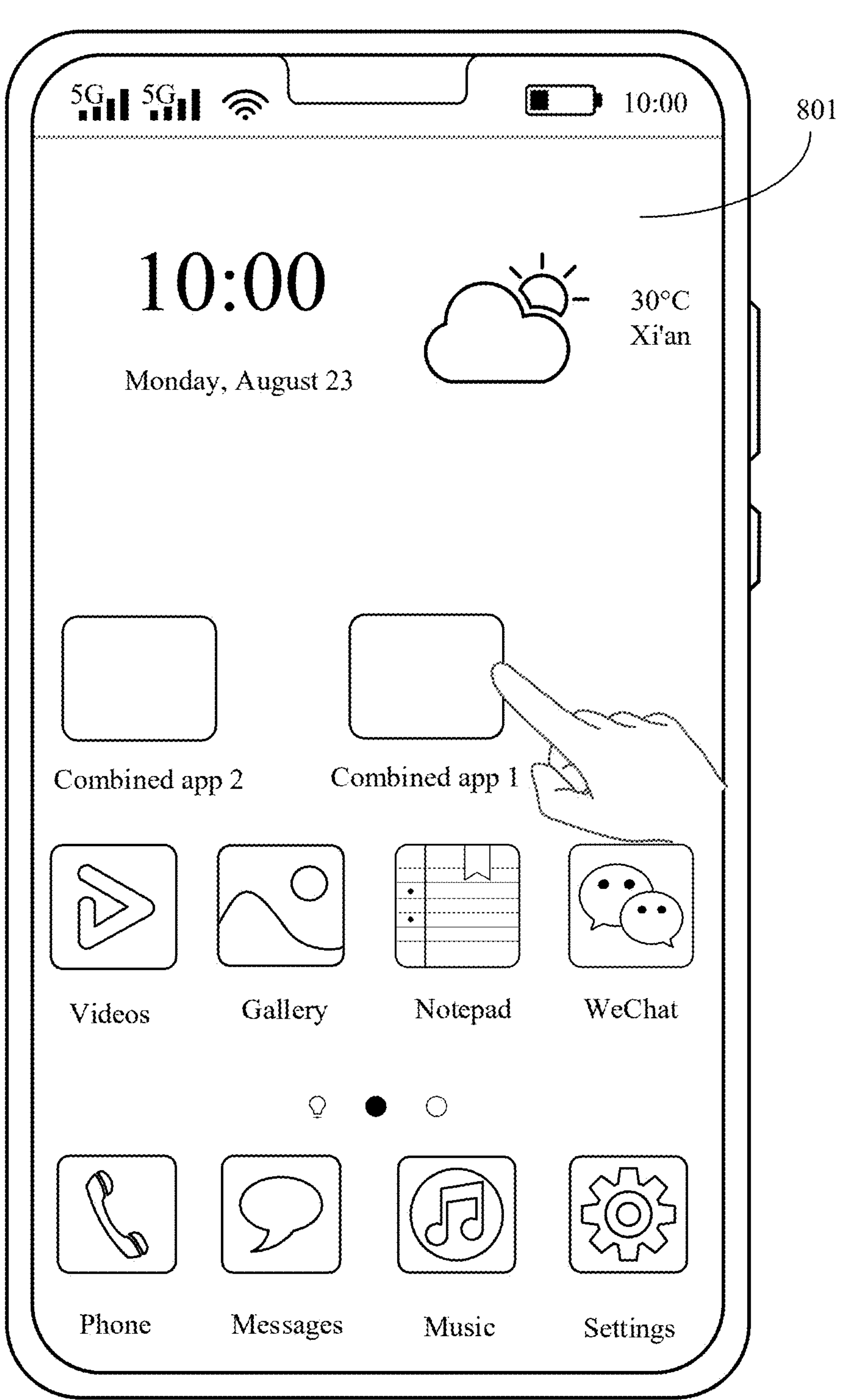
FIG. 8(*a*), FIG. 8(*b*), FIG. 8(*c*), and FIG. 8(*d*) are a schematic diagram of another example of a process in which a user combines a plurality of applications according to an embodiment of this application.
Figure 8B:
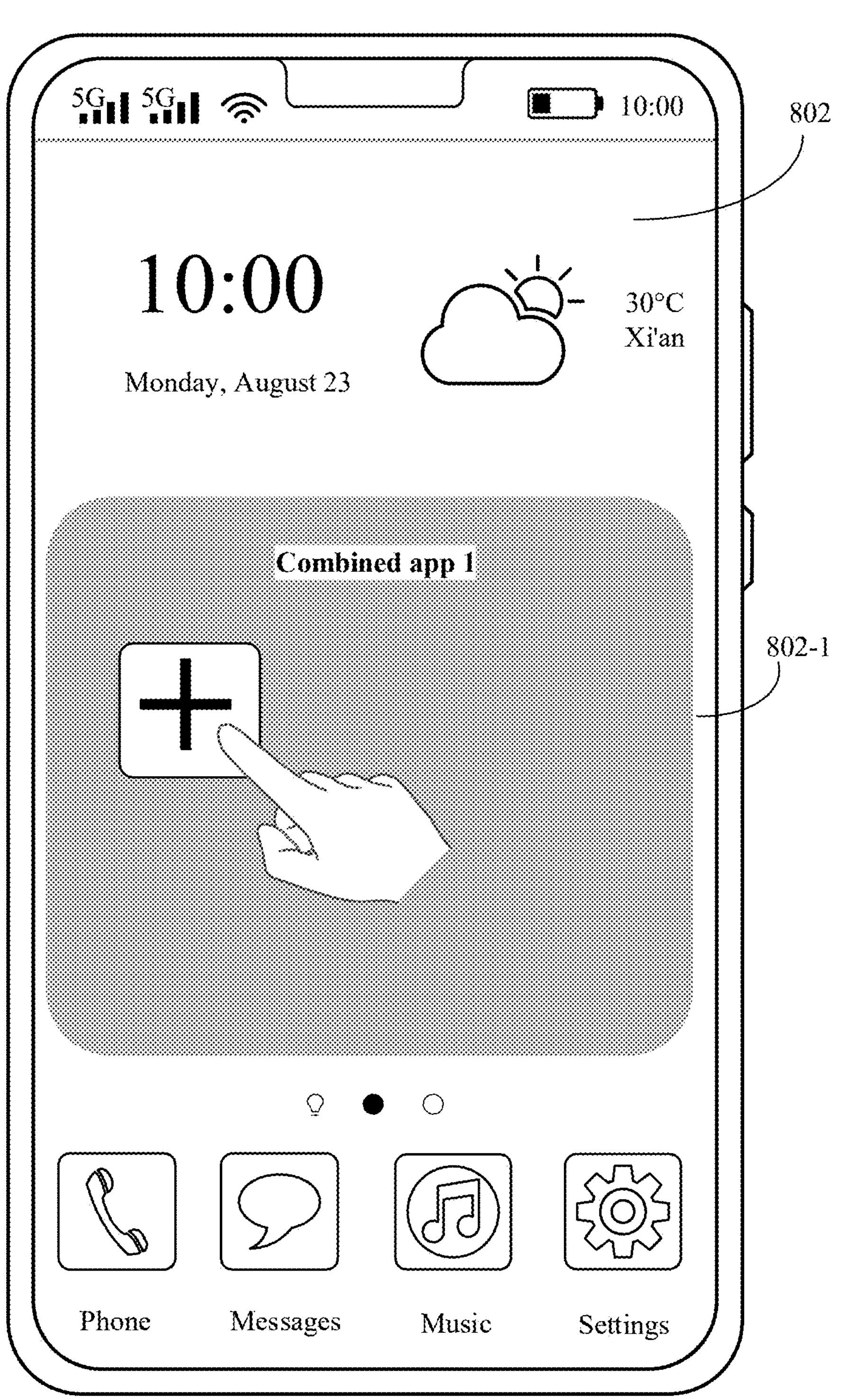
Figure 8C:
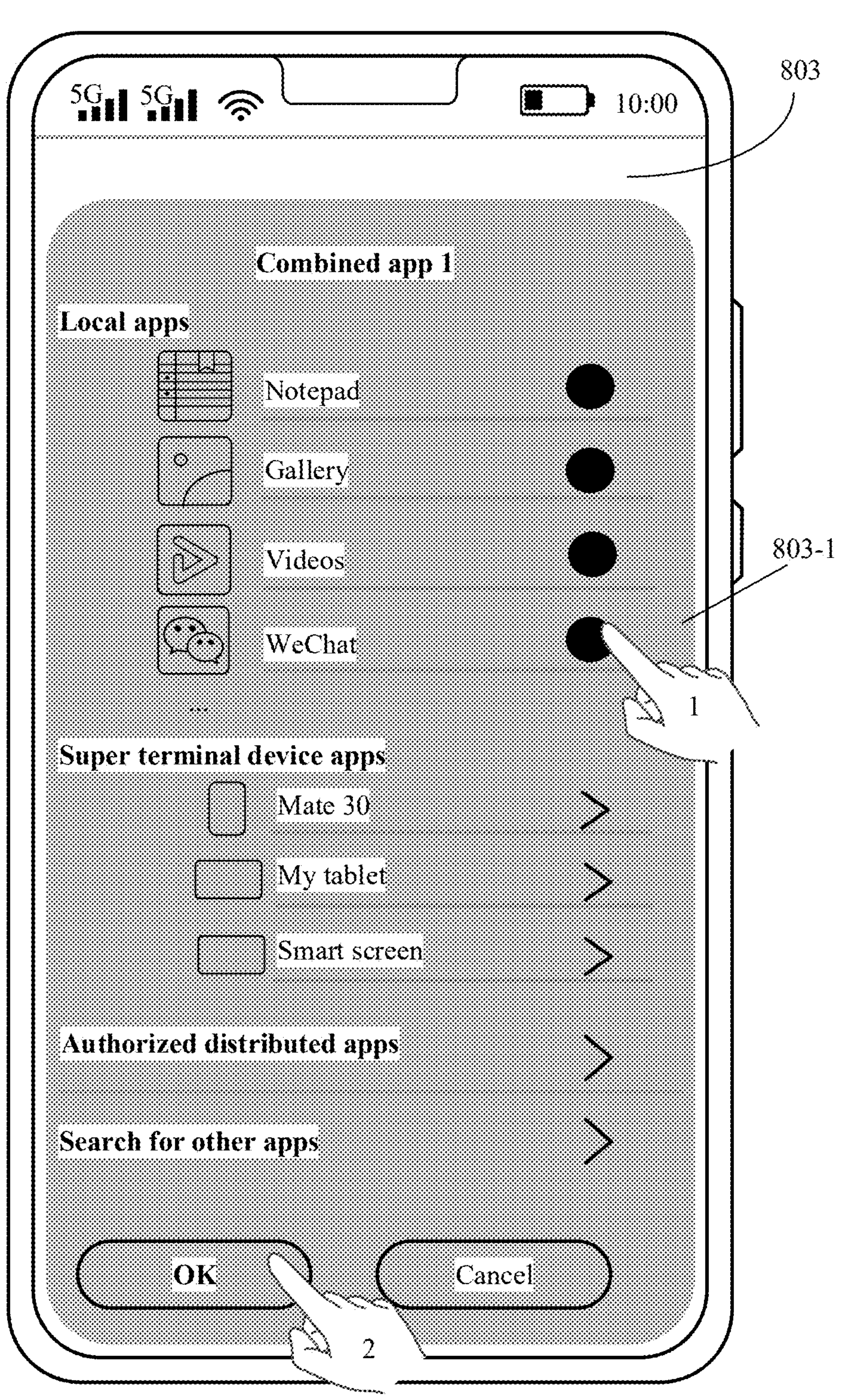
Figure 8D:
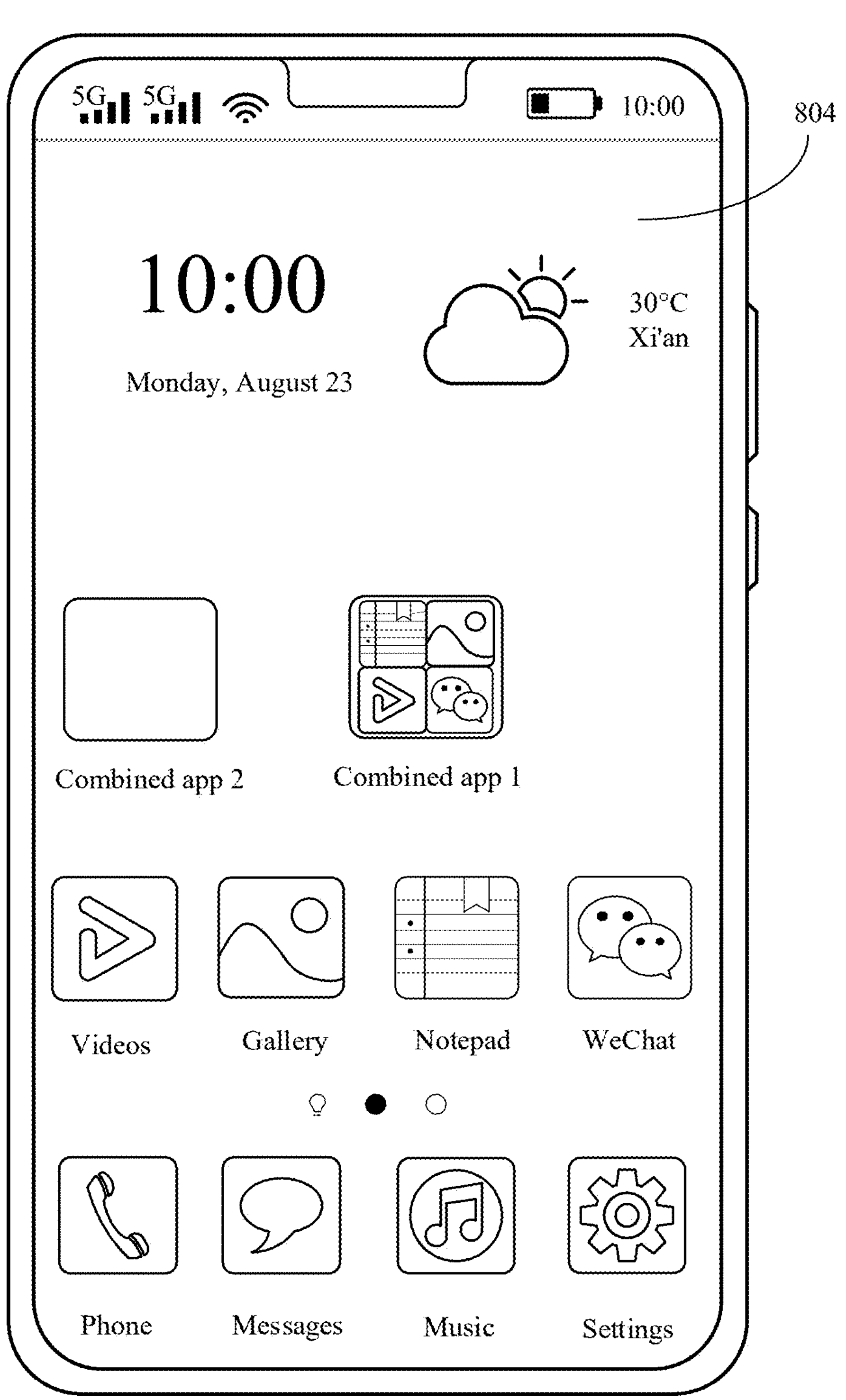

For ease of understanding, the following uses a mobile phone as an example to describe in detail cover generating methods in different scenarios with reference to the accompanying drawings and application scenarios.

FIG. 1(*a*), FIG. 1(*b*), FIG. 1(*c*), and FIG. 1(*d*) are a schematic diagram of an example of a process in which a user enables the Multi-Window dock on a mobile phone. Herein, FIG. 1(*a*) shows a home screen 101 that is currently output by the mobile phone in an unlock mode. A top status bar, a weather-and-clock widget, and a plurality of applications (application, App) are displayed on the home screen 101. As shown in FIG. 1(*a*), the top status bar of the home screen 101 may include content such as a signal identifier, a battery level, and current time, and the applications on the home screen 101 may include Phone, Messages, Music, Settings, Videos, Camera, Gallery, WeChat®, and the like. It should be understood that the home screen 101 may further include more other content or applications. This is not limited in this embodiment of this application.

As shown in FIG. 1(*a*), the user taps an icon of the Settings application. In response to the tap operation of the user, the mobile phone displays a main interface 102 of the Settings application shown in FIG. 1(*b*). The main interface 102 of the Settings application may include a plurality of different operation options, for example, a WALAN option used to set a wireless local area network (wireless local area network, WLAN) (such as a wireless fidelity (wireless fidelity, Wi-Fi) network), a Bluetooth (Bluetooth, BT) option used to set a Bluetooth connection, and options such as Home screen and wallpaper, Display and brightness, Sounds and vibration, Apps, and Accessibility features. The user may tap different options to perform corresponding settings according to a setting requirement of the user. Details are not described herein.

The user performs an operation shown in FIG. 1(*b*) to tap the Accessibility features option. In response to the tap operation of the user, the mobile phone displays an interface 103 shown in FIG. 1(*c*). A plurality of types of content that can be set by the user and that may be included in the Accessibility features option of the mobile phone are displayed on the interface 103, for example, Accessibility, Travel assistant, One-handed mode, Gesture control, Multi-Window, Stylus, and Mistouch prevention. The user taps the "Multi-Window" option on the interface 103. In response to the tap operation of the user, the mobile phone displays an interface 104 shown in FIG. 1(*d*). Functions and operation details of Multi-Window are displayed on the interface 104. For example, Multi-Window has a function: "Enable the split-screen mode". The user may enable a split-screen display function of the mobile phone through performing an operation such as "Touch and hold an icon in the side dock, drag it to an edge of the screen, and then release it". In addition, the interface 104 further includes a switch of the Multi-Window dock. The user performs an operation shown in FIG. 1(*d*), and taps the switch of the Multi-Window dock, so that the switch of the Multi-Window dock is in an on (or "ON") state. Details are not described herein.

It should be understood that, through the operation process described in FIG. 1(*a*), FIG. 1(*b*), FIG. 1(*c*), and FIG. 1(*d*), the user enables "Multi-Window dock" in "Multi-Window" in Accessibility features of the mobile phone. In a subsequent process of using the mobile phone by the user, the mobile phone can open and run different applications through different windows by using a preset operation, and the mobile phone is supported in simultaneously displaying interfaces of different applications, thereby improving efficiency of using the mobile phone by the user.

Optionally, "the mobile phone opens and runs different applications through different windows" may include any one of the following scenarios:

(1) The mobile phone displays a window of an interface of an application and a floating window in full screen.

(2) The mobile phone displays interfaces of two different applications in split screen. To be specific, two split-screen windows are included on a display of the mobile phone, and an interface of one application may be displayed in each split-screen window.

(3) Two split-screen windows and one floating window are included on a display of the mobile phone, and interfaces of three different applications are respectively displayed in the three windows.

It should be understood that this embodiment of this application is mainly used for a scenario in which the user expects to open and run different applications by using different windows. The following mainly describes possible implementation processes for the scenario (2) and the scenario (3) above. For the scenario (1), refer to an implementation process of the scenario (3). Details are not described below.

Optionally, in this embodiment of this application, when the mobile phone displays interfaces of two different applications in split screen, the "preset operation" that triggers the mobile phone to perform split-screen display may include any one of the following:

(1) Knuckle Slide Operation

For example, when the mobile phone displays an interface of an application 1, the user may tap the screen in the middle and draw a straight line by using a knuckle. In response to the operations, the mobile phone may automatically downsize the currently displayed interface of the application 1 to half-screen display. Then, the user opens and runs an application 2, and the other half screen of the display of the mobile phone may display an interface of the application 2, so that the display of the mobile phone displays the interface of the application 1 and the interface of the application 2 in split screen.

It should be noted herein that a manner of triggering split-screen display of the mobile phone through a "knuckle slide" supports only some mobile phones that can identify a knuckle operation, for example, Huawei Mate series mobile phones and Huawei P series mobile phones. Details are not described in this embodiment of this application.

(2) Trigger Split-Screen Display of the Mobile Phone by Using the Multi-Window Dock.

For example, it is assumed that the user has enabled the "Multi-Window dock" of the mobile phone by using the process described in FIG. 1(*a*), FIG. 1(*b*), FIG. 1(*c*), and FIG. 1(*d*). When the mobile phone displays the interface of the application 1, the user may slide from outside to inside at an edge (a left edge or a right edge) of the screen of the mobile phone and pause for preset duration. In response to the operations of the user, the mobile phone displays the Multi-Window dock in a side screen region close to a frame. One or more other applications other than the application 1 may be displayed in the Multi-Window dock. Further, the user touches and holds an icon of the application 2 in the Multi-Window dock, drags it to any screen position outside the Multi-Window dock, and releases it. In response to the operations of the user, the display of the mobile phone can display the interface of the application 1 and the interface of the application 2 in split screen.

FIG. 2(*a*), FIG. 2(*b*), FIG. 2(*c*), FIG. 2(*d*), and FIG. 2(*e*) are a schematic diagram of an example of a process in which a user triggers a mobile phone to display interfaces of two different applications in split screen.

For example, the mobile phone displays a home screen 201 shown in FIG. 2(*a*). A user taps an icon of the WeChat® application on the home screen 201. In response to the tap operation of the user, the mobile phone displays a screen 202 shown in FIG. 2(*b*). A bottom menu region shown in gray on the screen 202 includes a "WeChat" menu, a "Contacts" menu, a "Discover" menu, and a "Me" menu. The user may tap any menu, so that a display of the mobile phone switches to an interface corresponding to the menu. It should be understood that the currently displayed screen 202 is an interface corresponding to the "WeChat" menu, and may be referred to as an "initial page of the WeChat application", a "main interface of the WeChat application", or a "WeChat chat list interface". Details are not described herein.

When the mobile phone displays the screen 202, the user may perform an operation shown in FIG. 2(*b*) to slide from outside to inside at a right screen edge of the mobile phone in a direction indicated by using a black arrow and pause for preset duration. In response to the operation of the user, the mobile phone displays a screen 203 shown in FIG. 2(*c*), that is, displays a Multi-Window dock 203-1 in a screen edge region close to a right frame.

For example, icons of one or more other applications may be displayed in the Multi-Window dock 203-1, for example, icons of applications such as the Email application, the Notepad application, the Gallery application, and the Files application. A quantity of applications and types of applications that can be displayed in the Multi-Window dock 203-1 are not limited in this embodiment of this application.

Optionally, the "one or more other applications" in the Multi-Window dock 203-1 may not include the WeChat application that has been started and displayed in full screen by the mobile phone; or the Multi-Window dock 203-1 may include the WeChat application, and the WeChat application is marked in a gray icon, to prompt the user that the WeChat application cannot be opened or run again by using a split-screen window or a floating window. This is not limited in this embodiment of this application.

Optionally, an add control may be further included at a bottom position of the Multi-Window dock 203-1. When the user expects to view more other applications, the user may tap the add control in the Multi-Window dock 203-1 to view more other applications locally installed on the mobile phone. Details are not described in this embodiment of this application.

For example, when the user performs an operation shown in FIG. 2(*c*), the user touches and holds an icon of the Gallery application in the Multi-Window dock 203-1, drags it to any screen position outside the Multi-Window dock 203-1, and releases it. In response to the operation of the user, the mobile phone may display a split-screen view 204 shown in FIG. 2(*d*). The split-screen view 204 may include different "display regions" that may be alternatively referred to as "split-screen windows", for example, a split-screen window 204-1 and a split-screen window 204-2. An interface of the WeChat application may be displayed in the split-screen window 204-1, and an interface of the Gallery application may be displayed in the split-screen window 204-2.

Optionally, in the split-screen view 204, a boundary shown by using a black filled region is included between the two split-screen windows, and the black filled region may include a "horizontal boundary bar" shown by using a blank line. The user may adjust sizes or areas of the two split-screen windows by using the "horizontal boundary bar" according to a use requirement of the user.

For example, as shown in FIG. 2(*d*), the boundary shown by using the black filled region and the "horizontal boundary bar" shown by using the blank line are displayed between the split-screen window 204-1 for displaying the interface of the WeChat application and the split-screen window 204-2 for displaying the interface of the Gallery application. The user may touch and hold, by using a finger, the "boundary horizontal bar" shown by using the blank line, and drag it upward in a direction of a black arrow. In response to the operations of the user, the boundary shown by using the black filled region (or the boundary horizontal bar shown by using the blank line) moves upward. In a moving process, the split-screen window 204-2 for displaying the interface of the Gallery application is gradually scaled up, and the split-screen window 204-1 for displaying the interface of the WeChat application is gradually scaled down.

When the user pauses the operation of dragging the "boundary horizontal bar" and releases the finger, the mobile phone may display a screen 205 shown in FIG. 2(*e*). On the screen 205, a split-screen window 205-1 for displaying the interface of the WeChat application has a relatively small size, and a split-screen window 205-2 for displaying the interface of the Gallery application has a relatively large size.

Optionally, when the user adjusts the sizes of the two split-screen windows so that a size of a split-screen window is reduced to a specific extent, the reduced split-screen window may disappear. In other words, the mobile phone exits split-screen display. In this case, the display of the mobile phone displays an interface of an application corresponding to an increased split-screen window in full screen.

For example, as shown in FIG. 2(*d*), if the user continuously touches and holds the "boundary horizontal bar" and drags it upward in the direction of the black arrow, the split-screen window 204-1 for displaying the interface of the WeChat application is continuously scaled down until the split-screen window completely disappears, and the display of the mobile phone displays the interface of the Gallery application in full screen.

It should be noted herein that some applications installed on the mobile phone may not support split-screen display, for example, an interface of the Settings application and the home screen shown in FIG. 2(*a*). It should be understood that this embodiment of this application is mainly for a plurality of applications that can support split-screen display in a split-screen display scenario. Details are not described below.

Optionally, the user may further exchange display positions of the two split-screen windows.

For example, the top of each split-screen window includes a "horizontal split-screen bar" shown by using a thick black solid line. The user may touch and hold the "horizontal split-screen bar" of any split-screen window until the split-screen window is in a scaled-down state, and drag the split-screen window to a display position of the other split-screen window. In response to the operations of the user, the display positions of the two split-screen windows are exchanged, and a size of each split-screen window remains unchanged in an exchange process. It should be understood that, for an operation performed by the user on the split-screen window, reference may be made to the existing implementation process of split-screen display. For brevity, details are not described herein again.

In the foregoing implementation process, when the user expects to simultaneously run a plurality of applications by using one mobile phone, the display of the mobile phone may display interfaces of two different applications respectively in two split-screen windows by using a split-screen display function of the mobile phone. However, split-screen display of the mobile phone can support display of interfaces of a maximum of two different applications, and the display cannot display more split-screen windows. In this case, a requirement of the user for using more applications cannot be met.

In addition, when the user triggers the mobile phone to display the interfaces of the two applications in split screen, the user needs to separately perform an operation of starting each application. For example, for the process in FIG. 2(*a*), FIG. 2(*b*), FIG. 2(*c*), FIG. 2(*d*), and FIG. 2(*e*), the user needs to first start the WeChat application; and after the screen of the mobile phone displays any interface of the WeChat application, the user starts the Gallery application and triggers splicing of displayed interfaces with the WeChat application. The operation process is complex and time-consuming. In addition, two different applications cannot be simultaneously started. Particularly, if applications have open-screen advertisements with different duration, time of the user is greatly occupied, and use experience of the user is affected.

In addition, when the display of the mobile phone displays two split-screen windows, application interface content displayed in each split-screen window cannot adapt to a size of the split-screen window. In other words, a control size corresponding to the application interface content displayed in each split-screen window is the same as that corresponding to the application interface content when being displayed in full screen. Consequently, one split-screen window may include only a part of the application interface content displayed in full screen. For example, as shown in FIG. 2(*e*), as the user reduces a size of the split-screen window 205-1, the WeChat chat interface displayed in the split-screen window 205-1 includes only a chat option with "Yuan", and a size of a "list (list) control" corresponding to the chat option between the user and "Yuan" is not reduced with the reduction of the split-screen window 205-1. However, as shown in FIG. 2(*b*), when the mobile phone displays the WeChat chat interface 202 of the WeChat application in full screen, chat options that are of the user and a plurality of friends (for example, five friends) and that are included on the screen 202 cannot be fully displayed. The display manner may not meet display effect expected by the user, thereby affecting operation and use experience of the user.

In another possible scenario, if the display of the mobile phone has displayed two split-screen windows, the user further expects to continue to run a third application without interrupting display of the two split-screen windows. In this case, the user may further trigger the mobile phone to continue to display a floating window on the split-screen view, and an interface of the third application is displayed in the floating window.

FIG. 3(*a*), FIG. 3(*b*), FIG. 3(*c*), and FIG. 3(*d*) are a schematic diagram of an example of a process in which a user triggers display of a specific application interface in a floating window on a split-screen view of a mobile phone.

For example, as shown in FIG. 3(*a*), two split-screen windows are displayed on a screen 301 in split screen. An interface of the WeChat application is displayed in a smaller split-screen window, and an interface of the Gallery application is displayed in a larger split-screen window. In this case, a user may further continue to trigger, by using the Multi-Window dock, the mobile phone to display a floating window.

For example, the user performs an operation shown in FIG. 3(*a*) to slide from outside to inside at a right screen edge of the mobile phone in a direction indicated by using a black arrow and pause for preset duration. In response to the operation of the user, the mobile phone displays a screen 302 shown in FIG. 3(*b*), that is, displays a Multi-Window dock 302-1 in a screen edge region close to a frame. Optionally, icons of one or more other applications other than the WeChat application and the Gallery application may be displayed in the Multi-Window dock 302-1, for example, icons of applications such as the Email application, the Notepad application, and the Calculator application. This is not limited in this embodiment of this application.

The user taps the icon of the Notepad application. In response to the tap operation of the user, the mobile phone may display a screen 303 shown in FIG. 3(*c*). On the screen 303, the Multi-Window dock 302-1 disappears, and a floating window 303-1 automatically pops up. A main interface of the Notepad application may be displayed in the floating window 303-1.

Optionally, as shown in FIG. 3(*d*), in addition to a region for displaying the interface of the Notepad application, the floating window 303-1 may further include a control menu region at the top. The control menu region at the top may include a maximize control 303-11, a minimize control 303-12, a "horizontal split-screen bar" 303-13 shown by using a thick black solid line, and a close control 303-14. The user may implement different control operations on the floating window 303-1 by using each control.

For example, the user may touch and hold the "horizontal split-screen bar" 303-13 shown by using the thick black solid line until the floating window 303-1 is in a scaled-down state, and drag the floating window 303-1 to any position on a display, to adjust a display position of the floating window 303-1. In addition, when the floating window 303-1 is dragged by the user to a top position of the display, the floating window 303-1 may replace the split-screen window corresponding to the WeChat application. In other words, the floating window 303-1 is changed to be displayed in a split-screen window form.

Alternatively, the user may touch and hold any position of two vertical frames or a bottom horizontal frame of the floating window 303-1 until a contour of the floating window 303-1 is in a highlighted state, and may control scaling of the floating window 303-1 by using sliding operations performed by a finger in different directions. This is not described herein.

It should be understood that, regardless of how the user adjusts a display position, a size, and the like of the floating window 303-1, display of the floating window 303-1 affects interface display of the two split-screen windows, and further affects use of applications in the two split-screen windows by the user, thereby affecting user experience.

In addition, the mobile phone runs a maximum of three applications. Herein, interfaces of two applications are respectively displayed in the two split-screen windows, and an interface of a third application is displayed in the floating window. In this implementation, a quantity of application interfaces simultaneously displayed by the mobile phone is still limited, and the user needs to separately start and run each application, and trigger split-screen display, floating window display, or the like of the mobile phone. The operation process is complex and time-consuming. In addition, a plurality of different applications cannot be simultaneously started, thereby reducing user experience.

Finally, when the user opens and runs a plurality of applications on the mobile phone in a floating window manner or a split-screen window manner, the user needs to tap an icon of an application, first enter a main interface (initial page) of the application, and sequentially perform a plurality of tap operations to enter a next-level interface until a target interface that the user expects to use is displayed. For example, if the user wants to invoke a two-dimensional code payment interface of the WeChat application, the user needs to sequentially perform a plurality of tap operations: an icon of the WeChat application—the "Me" menu—the Pay option—the Money option—the two-dimensional code interface. This process depends on the plurality of tap operations of the user, and the like. Steps in the operation process are complex, thereby affecting use experience of the user.

In conclusion, different implementations above cannot meet a requirement of the user for simultaneously using a plurality of applications, and cannot meet a requirement of the user for using different target interfaces of each application. In addition, due to a limitation of a quantity of applications, a size of a split-screen window, and the like, user experience is relatively poor.

For the foregoing problem, an embodiment of this application provides a method for combining a plurality of applications and simultaneously starting the plurality of applications. The method may support a user in combining a plurality of applications on an electronic device such as a mobile phone into a new application for use requirements of different users in different scenarios. When the user taps the new application, the plurality of applications included in the new application can be all simultaneously started, and a target interface expected by the user can be directly reached in each application, thereby simplifying an operation procedure, to meet a requirement of the user for simultaneously using a plurality of applications.

Figure 17:
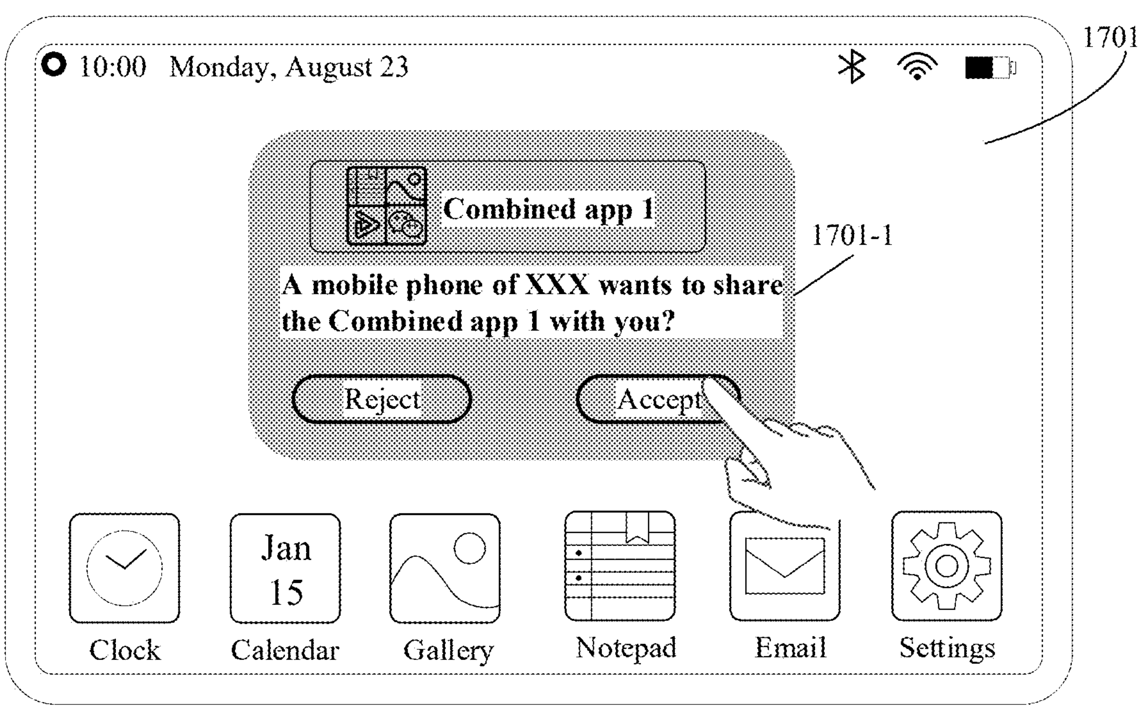
FIG. 17 is a schematic diagram of an example of a process in which a colleague A receives a file on a tablet according to an embodiment of this application.
Figure 17:
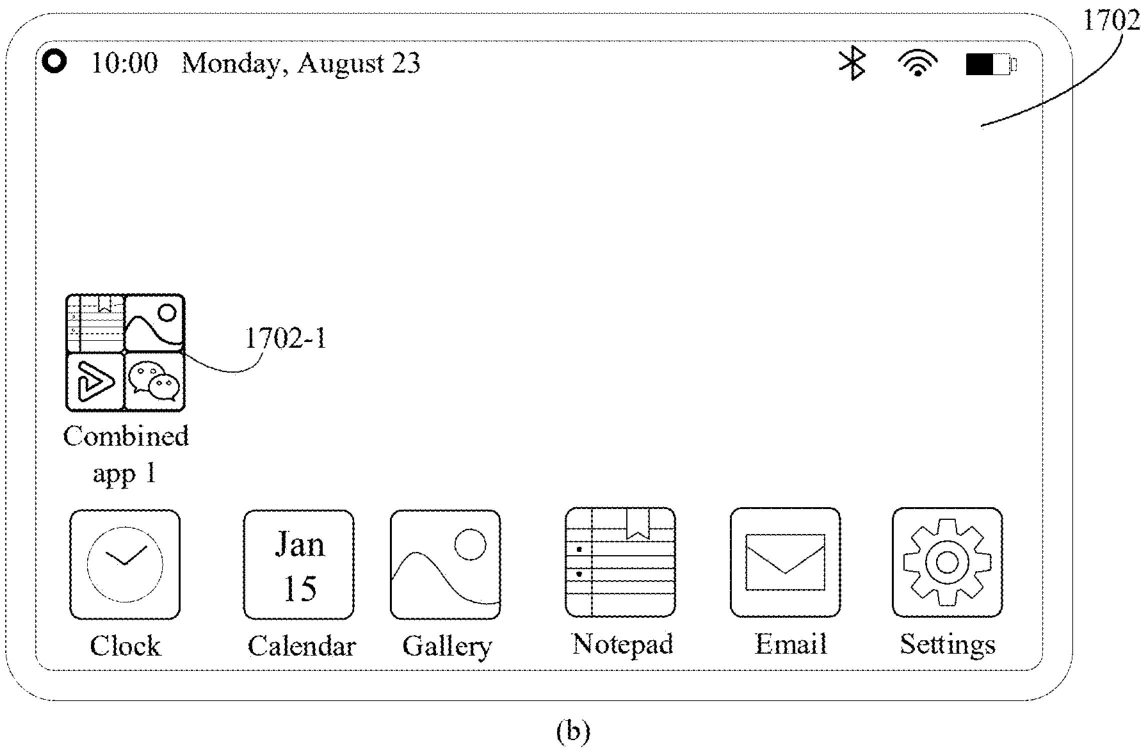

With reference to FIG. 4(*a*) to FIG. 17, the following describes a process of combining a plurality of applications and a process of simultaneously starting a plurality of applications according to embodiments of this application.

FIG. 4(*a*), FIG. 4(*b*), FIG. 4(*c*), FIG. 4(*d*), and FIG. 4(*e*) are a schematic diagram of an example of a process in which a user enables an application combination service on a mobile phone according to an embodiment of this application.

For example, as shown in FIG. 4(*a*), the mobile phone displays a home screen 401 in an unlock mode. The user may tap an icon of the Settings application on the home screen 401. In response to the tap operation of the user, the mobile phone displays a main interface 402 of the Settings application. Options and content included in the main interface 402 of the Settings application are not described herein.

The user performs an operation shown in FIG. 4(*b*) to tap the Apps option in the main interface 402. In response to the tap operation of the user, the mobile phone displays an interface 403 shown in FIG. 4(*b*). The interface 403 may include a plurality of options that are related to applications and that can be set by the user, for example, a plurality of options such as Apps, App launch, Permission management, Default apps, App assistant, and App twin, and the "Multi-app combination" option provided in this embodiment of this application. In addition, an application list may be further displayed on the interface 403. It should be understood that, due to a limitation of a size of a display, icons and names of some applications may be displayed in the application list outside a display region of the plurality of options related to the applications, and the user may view more other applications through performing a sliding operation on the application list. Details are not described herein.

Optionally, the "Multi-app combination" option provided in this embodiment of this application may provide the user with a capability of combining two or more applications into a new application without affecting display of an icon and a name of each of the "two or more applications" on the display of the mobile phone, independent use of each application, and the like.

It should be understood that, in this embodiment of this application, the new application obtained through combining the two or more applications is referred to as a "combined application X", for example, a combined application 1 or a combined application 2.

It should be further understood that, for each combined application, the user may tap an icon of the combined application to simultaneously start each of the two or more applications included in the combined application. In other words, through tapping the icon of the combined application only once, the user can simultaneously start each application associated with the combined application, and can directly access a target interface of each application. The target interface of each application is any interface that may be displayed in a process of running the application.

For example, the user performs an operation shown in FIG. 4(*c*) to tap the "Multi-app combination" option on the interface 403. In response to the tap operation of the user, the mobile phone displays a setting interface 404 of the "Multi-app combination" option shown in FIG. 4(*d*). The interface 404 may include the "Enable the multi-app combination service" switch, the "Add apps" option, the "Multi-app combination settings", and the like. This is not limited in this embodiment of this application.

As shown in FIG. 4(*d*), the user performs an operation 1, and taps the "Enable the multi-app combination service" switch, to ensure that the "Enable the multi-app combination service" switch is in an on (or "ON") state, that is, a multi-application combination function of the mobile phone is enabled. In a subsequent use process, the multi-application combination service may be provided for the user, to support the user in combining two or more applications into a new application.

In a possible implementation, when the "Enable the multi-app combination service" switch is in the on (or "ON") state, the user may manually select two or more applications by using the "Add apps" option on the interface 404, and combine the two or more selected applications into a new application.

For example, the user continues to perform an operation 2 shown in FIG. 4(*d*) to tap the "Add apps" option. In response to the operation of the user, the mobile phone displays an interface 405 shown in FIG. 4(*e*). The interface 405 may be understood as an interface on which the user adds a plurality of applications.

Optionally, the interface 405 displays an application search box and an application list. Icons and names of a plurality of applications locally installed on the mobile phone may be displayed in the application list. Each application can support application combination. In addition, the user may further view more other applications through tapping the "More" control, and/or view more other applications through performing a sliding operation on the application list. Details are not described herein.

For example, the user sequentially performs an operation 1, an operation 2, and an operation 3 in an operation sequence shown in FIG. 4(*e*), and selects the WeChat application, the Notepad application, and the Gallery application in the sequence. After the user confirms that all expected applications are selected, the user continues to perform an operation 4 to tap the "OK" control. In response to the tap operation of the user, the WeChat application, the Notepad application, and the Gallery application may be combined into a "Combined app 1". In addition, a new application icon is generated and displayed on a preset interface (for example, the home screen) of the mobile phone.

It should be understood that the "Multi-app combination" option shown in FIG. 4(*c*) may be added to another possible function interface. For example, the "Multi-app combination" option may be added to the interface 104 shown in FIG. 1(*d*), and the "Multi-app combination" option is added to an interface corresponding to a multi-window function of the mobile phone. In other words, a user entry of the multi-application combination service provided in this embodiment of this application is set on the interface corresponding to the multi-window function of the mobile phone. This is not limited in this embodiment of this application.

FIG. 5(*a*), FIG. 5(*b*), FIG. 5(*c*), FIG. 5(*d*), FIG. 5(*e*), FIG. 5(*f*), FIG. 5(*g*), and FIG. 5(*h*) are a schematic diagram of an example of a process in which a user sets display of a combined application according to an embodiment of this application.

For example, after the user selects the WeChat application, the Notepad application, and the Gallery application in the process described in FIG. 4(*a*), FIG. 4(*b*), FIG. 4(*c*), FIG. 4(*d*), and FIG. 4(*e*), an icon may be automatically generated for the "Combined app 1" on the mobile phone. As shown in FIG. 5(*a*), the icon and a name of the "Combined app 1" are displayed on a home screen 501 of the mobile phone.

In a possible implementation, the mobile phone may combine and arrange icons of a plurality of selected applications in an application selection sequence of the user, and then scale down the icons by a specific ratio, to generate an icon of a new combined application and display the icon on the home screen of the mobile phone.

For example, as shown in FIG. 5(*a*), the icon of the "Combined app 1" includes an icon of the WeChat application, an icon of the Notepad application, and an icon of the Gallery application, and has a same arrangement sequence as an application selection sequence of the user. To be specific, the icon of the WeChat application and the icon of the Notepad application are displayed in a first row, and the icon of the Gallery application is displayed in a second row.

It should be understood that sizes of icons of all applications displayed on the display of the mobile phone are the same. For example, a pixel (pixel, px) is used as a unit. It is assumed that a resolution of a display of the mobile phone is 1242 px×2208 px, a size of an icon of each application displayed on the display may be 180 px×180 px, and a size of a rounded corner is approximately an icon width×0.175. This is not limited in this embodiment of this application.

Optionally, in this scenario, when an odd quantity (three) of applications selected by the user are combined, to ensure that icons of the applications have a same scaling ratio, a blank box having a same size as the icon of the Gallery application may be filled after the icon of the Gallery application in the second row. In this way, the icon of the "Combined app 1" formed by the icon of the WeChat application, the icon of the Notepad application, the icon of the Gallery application, and the blank box has a regular shape, and the regular shape may be similar to the icon of each application displayed on the display. Then, after the icon of the "Combined app 1" in the regular shape is scaled down by a specific ratio, the icon of the "Combined app 1" may have the same size as the icon of each other application on the home screen 501.

Alternatively, when an odd quantity (three) of applications selected by the user are combined, icons of the three applications are directly sequentially arranged in parallel in a selection sequence of the user. In other words, the icon of the WeChat application, the icon of the Notepad application, and the icon of the Gallery application are displayed side by side. After being scaled down by a specific ratio, the icons of the three applications displayed side by side are located in a middle position of an icon display region of the "Combined app 1". The icon of the "Combined app 1" has the same size as that of each other icon on the home screen 501. This is not limited in this embodiment of this application.

According to the foregoing process of generating the icon of the combined application, a manner of generating the icon of the combined application is simple and direct, so that the user intuitively obtains the icon of each application included in the icon of the "Combined app 1", and the user accurately determines a specific application that can be associated when the “Combined app 1” is started, thereby improving visual experience of the user.

It should be understood that, after the user selects a plurality of applications, performs the operations 1 operation 4 shown in FIG. 4(*e*), and taps the “OK” control, the mobile phone may first automatically generate the icon of the “Combined app 1” according to one of the foregoing possible preset rules, and display the icon on the home screen of the mobile phone.

It should be further understood that in a subsequent use process, the user is supported in modifying the preset icon of the “Combined app 1” in this embodiment of this application. To be specific, the rule for generating the icon of the combined application is reset. The icon of the Combined app 1 displayed on the home screen is updated according to a new rule for generating the icon of the combined application.

In a possible implementation, when the user taps the icon of the “Combined app 1” for a first time, in response to the tap operation of the user, the mobile phone may simultaneously start the plurality of applications associated with the “Combined app 1”, and may first display one or more setting interfaces for the user before displaying the interfaces of the plurality of applications associated with the “Combined app 1”. The user may set, by using the one or more setting interfaces, display-related content of the icon, an interface display pattern, and the like of the “Combined app 1”. For example, the one or more setting interfaces may be used to set the interface display pattern of the “Combined app 1”, and/or the icon of the “Combined app 1”.

Optionally, in this embodiment of this application, the “interface display pattern” of each combined application may include one or more of a quantity of split-screen windows on the display, a layout and an arrangement sequence of a plurality of split-screen windows, a size of each split-screen window, and a target interface of each application in a split-screen window of each application associated with the combined application. It should be understood that in the description of this embodiment of this application, one or more pieces of the foregoing listed content that can be manually set or modified by the user are collectively referred to as the “interface display pattern”. Details are not described below.

For example, the user performs an operation shown in FIG. 5(*a*) to tap the icon of the “Combined app 1” for the first time. In response to the operation of the user, the mobile phone displays an interface 502 shown in FIG. 5(*b*). The interface 502 may be understood as a setting interface related to display of the icon, the interface display pattern, and the like of the “Combined app 1”. In other words, the interface 502 may be used by the user to set or modify the “icon” of the “Combined app 1”; and/or the interface 502 may be used by the user to set or modify the layout and the arrangement sequence of split-screen windows of the three applications included in the “Combined app 1”, a size of each split-screen window, a displayed interface in a split-screen window of each application associated with the combined application, and the like.

Optionally, a preset interface display pattern may be first displayed on the interface 502 for the user, and the interface display pattern may match the quantity (three) of applications selected by the user. For example, three split-screen windows have a preset layout and an arrangement pattern. And/or, the interface display pattern may match the sequence in which the user selects the three applications. For example, the interface display pattern is consistent with the arrangement sequence of icons of all applications in the icon of the “Combined app 1” generated on the screen 501. This is not limited in this embodiment of this application.

For example, as shown in FIG. 5(*b*), the interface 502 may include a pattern display region 502-1, the Other patterns control, and the “Next” control. The pattern display region 502-1 includes three split-screen windows (or three sub-regions). The interface of the WeChat application first selected by the user is displayed in a first split-screen window in a first row at an upper left corner. The interface of the Notepad application second selected by the user is displayed in a second split-screen window in a first row at an upper right corner. The interface of the Gallery application third selected by the user is displayed in a third split-screen window in a second row.

In another possible implementation, when the “interface display pattern” in the pattern display region 502-1 is not a pattern expected by the user, the user may manually modify the layout and the arrangement sequence of the three split-screen windows displayed in the pattern display region 502-1 and the size of each split-screen window, or view and select, by using the “Other patterns” control included on the interface 502, another target pattern that meets a use requirement. This is not limited in this embodiment of this application.

Optionally, the user may select any position in any split-screen window, pause for preset duration, and then perform dragging in a direction toward another split-screen window, to change display positions of the two split-screen windows.

For example, the user may perform an operation shown in FIG. 5(*b*), to tap and select any position in the split-screen window of the Notepad application, pause for preset duration, and then drag the split-screen window of the Gallery application in a direction indicated by using a black arrow. In response to the operation of the user, the display positions of the split-screen window of the Notepad application and the split-screen window of the Gallery application that are displayed in the pattern display region 502-1 are exchanged, and an interface 503 shown in FIG. 5(*c*) is displayed.

Optionally, the user may further select a boundary between any two split-screen windows and perform a drag operation, to modify a size of each split-screen window.

For example, the user may further perform an operation shown in FIG. 5(*c*) to tap and select a black boundary between the split-screen window of the Notepad application and the split-screen window of the Gallery application and perform a drag operation in a direction indicated by using a black arrow, to increase a size of the split-screen window of the Gallery application and reduce a size of the split-screen window of the Notepad application. In response to the operation of the user, the mobile phone displays an interface 504 shown in FIG. 5(*d*). The layout of the split-screen windows in the pattern display region on the interface 504 changes, and the size and the display position of the split-screen window of the WeChat application remain unchanged.

In this case, the user may further perform an operation 1 shown in FIG. 5(*d*), tap and select an intersection point position of boundaries of the three split-screen windows or a specific region that is close to an intersection point position and that is shown by using a thick black solid line, and perform a drag operation in a direction shown by using a black arrow, to increase the size of the split-screen window of the Notepad application and the size of the split-screen window of the WeChat application and reduce the size of the split-screen window of the Gallery application. Details are not described in this embodiment of this application.

Optionally, the user may further tap the "Other patterns" control to view a plurality of other possible "interface display patterns", so that an expected target pattern can be selected from the plurality of possible "interface display patterns" according to a personal requirement, thereby reducing a process of manually adjusting or modifying the interface display pattern by the user, simplifying an operation of the user, and improving use experience.

According to the foregoing method, in an application combination process, a plurality of possible combination manners can be provided for the user. First, an icon of a combined application may be automatically generated based on a quantity of applications selected by the user and a sequence of the applications selected by the user, and a preset interface display pattern may be matched for the combined application. In addition, the method may further provide a plurality of operation manners for the user, to support the user in actively modifying the icon of the combined application, the interface display pattern of the combined application, and the like. The operation is convenient, and can meet use requirements of different users in different scenarios.

In another possible implementation, in the pattern display region shown in FIG. 5(*b*), FIG. 5(*c*), or FIG. 5(*d*), in a split-screen window of any application, the user may further set a target interface of the application, or modify a target interface directly displayed after the application is started.

It should be understood that, in this embodiment of this application, the "target interface" that is of the application and that is set by the user for the split-screen window of each application is used as an interface that can be directly reached and displayed in the split-screen window of each application when the "Combined app 1" is subsequently used. This process does not need a plurality of operations of the user, thereby simplifying a procedure.

It should be further understood that, when the user performs the operation shown in FIG. 5(*a*), and the mobile phone displays the interface 502 in FIG. 5(*b*), the split-screen window of each application in the pattern display region 502-1 may first display an initial page (a main interface) that is opened after the application is started, and the user is supported in modifying, in the split-screen window of each application, the displayed interface in the split-screen window until the "target interface" expected by the user is displayed.

For example, when the mobile phone displays the interface 502 in FIG. 5(*b*), the WeChat chat interface 202 shown in FIG. 2(*b*) may be displayed in the split-screen window of the WeChat application in the pattern display region 502-1, and the user may sequentially perform tapping along an operation path: [the "Me" menu—the Pay option—the Money option], so that a two-dimensional code payment interface is displayed in the split-screen window of the WeChat application. In other words, the two-dimensional code payment interface is used as the "target interface" to be directly displayed in the split-screen window of the WeChat application when the "Combined app 1" is started. It should be understood that, for this process, reference may be made to an existing interface switching manner. For simplicity, this is not shown in FIG. 5(*b*), FIG. 5(*c*), or FIG. 5(*d*) one by one, and the target interface set by the user is represented by using only a text in any split-screen window. Details are not described below.

According to the foregoing method, when the user starts a newly generated combined application and triggers display of two or more split-screen windows on the display of the mobile phone, a target interface after each application is started may be set according to a personal use requirement of the user for each application, so that the application can be quickly started and the target interface can be directly displayed. In this way, the following case is avoided: The user can reach the target interface of the application only through performing a relatively long path of operations, thereby reducing the operation of the user and improving use experience of the user.

In another possible implementation, in the pattern display region shown in FIG. 5(*b*), FIG. 5(*c*), or FIG. 5(*d*), in a split-screen window of any application, the user may set a target interface of the application. In addition, the user may further set a specific display region used when the target interface of the application is displayed in the split-screen window. In other words, after the Combined app 1 is started, the user may perform setting by using the split-screen window of any application so that content (that is, interface elements) included in all of a region or content (that is, interface elements) included in a part of a region of the "target interface" of the application is displayed in the split-screen window.

For example, the WeChat application is used as an example. On the interface 504 shown in FIG. 5(*d*), the user sets an interface first displayed in the split-screen window of the WeChat application to a chat list interface. The chat list interface may be the screen 202 shown in FIG. 2(*b*). Optionally, on the interface 504 shown in FIG. 5(*d*), the user may set displayed content in the split-screen window of the WeChat application to content in all of a region of the screen 202 or to content in only a part of a region of the screen 202. This is not limited in this embodiment of this application.

For example, the user may set the displayed content in the split-screen window of the WeChat application to the content in the part of the region of the screen 202 based on the size of the screen of the mobile phone and the size of the split-screen window of the WeChat application. For example, chat options of only three contacts on the screen 202 are included, and chat options of more contacts are not included. Details are not described herein.

Optionally, when the user performs setting so that content in all of a region included in a "target interface" of a specific application is displayed in a split-screen window of the application, if a shape of the split-screen window of the application is similar to a shape of a display region of the display of the mobile phone, the displayed content in all of the region may be scaled down by a specific ratio k when the mobile phone displays the target interface of the application in full screen, so that the scaled-down displayed content in all of the region of the target interface can adapt to the size of the split-screen window of the application.

Herein, it should be noted that, in this embodiment of this application, "scaling down displayed content in all of a region of the WeChat list interface 202 by the specific ratio k" may be understood as: reducing a control size corresponding to each interface element in the displayed content in all of the region of the screen 202 by k times.

For example, as shown in FIG. 2(*b*), when the mobile phone displays the WeChat list interface 202 of the WeChat application in full screen, a chat option corresponding to each friend included in the displayed content in all of the region of the screen 202 may be displayed based on a list (list) control. A "list (list) control" corresponding to a chat option of a user and a friend "Yuan" is used as an example. A profile photo, an alias, a chat box, a latest chat record in the chat box, and the like of "Yuan" that are included in the "list (list) control" are all scaled down by k times. Similarly, for another interface element of the WeChat list interface 202, for example, a text, an icon, and the like in a bottom menu region shown in gray on the screen 202 are all scaled down by the same ratio k, and then displayed in the split-screen window of the WeChat application.

Optionally, when the user performs setting so that content in all of a region included in a "target interface" of a specific application is displayed in a split-screen window of the application, if a shape of the split-screen window of the application is not similar to a shape of a display region of the display of the mobile phone, when the mobile phone displays the target interface of the application in full screen, interface elements in all of the region may be scaled down by a specific ratio k, a layout and an arrangement manner of all the interface elements of the target interface of the application may be adjusted, and then adjusted content is filled to the split-screen window of the application to adapt to the shape and a size of the split-screen window of the application. For brevity, details are not described herein.

Optionally, when the user performs setting so that content in a part of a region included in a "target interface" of a specific application is displayed in a split-screen window of the application, the user may perform an operation such as finger sliding in the split-screen window of the application in FIG. 5(*d*), to determine a partial region to be displayed in the "target interface" based on the operation of the user. Optionally, the partial region determined through performing the operation such as finger sliding of the user may be in a regular shape or an irregular shape. This is not limited in this embodiment of this application.

If the shape of the split-screen window of the application is similar to the shape of the partial region manually determined by the user, content (an interface element) in the partial region manually determined by the user may be scaled down by the specific ratio k, so that the content in the partial region manually determined by the user after the scaling down can adapt to a size of the split-screen window of the application.

Alternatively, if the shape of the split-screen window of the application is not similar to the shape of the partial region manually determined by the user, content (an interface element) in the partial region manually determined by the user may be scaled down by the specific ratio k, a layout and an arrangement manner of all interface elements in the partial region manually determined by the user may be adjusted, and then adjusted content is filled in the split-screen window of the application to adapt to the shape and a size of the split-screen window of the application. For brevity, details are not described herein.

According to the foregoing method, when the user starts a newly generated combined application to trigger display of two or more split-screen windows on the display of the mobile phone, a target interface after each application is started may be set according to a personal requirement of the user for using each application, or customized setting may be performed according to a use requirement, a display requirement, and the like for the target interface so that content in all of a region of the target interface or content in a part of a region of the target interface is displayed in a split-screen window of each application. Correspondingly, based on the setting of the user and the size of the split-screen window, the mobile phone may automatically scale down the content or the interface element of the to-be-displayed target interface of the application by a specific ratio, and/or automatically adjust a layout and an arrangement manner of the content or the interface element of the to-be-displayed target interface of the application, so that the content or the interface element that is of the to-be-displayed target interface of the application and that is set by the user can adapt to the shape and the size of the split-screen window of the application. In this way, the following case can be avoided: Only a part or a small amount of content of an initial interface of the application is displayed when the size of the split-screen window is reduced. Therefore, the content and the interface element of the target interface of the application displayed in the split-screen window meet a requirement of the user, and display effect expected by the user and a requirement of using a plurality of application interfaces in split screen are implemented, to provide great convenience for the user to use the application, thereby improving operation experience and use experience of the user.

It is assumed that, based on the one or more possible operations described above, in FIG. 5(*d*), the user has set the split-screen window of each application to a size expected by the user, and has set the interface in the split-screen window of each application to the target interface that the user expects to display. The user may continue to perform the operation 2 shown in FIG. 5(*d*) to tap the "Next" control. In response to the operation of the user, the mobile phone may display an interface 505 shown in FIG. 5(*e*). The interface 505 may be understood as an interface for setting or modifying the icon of the Combined app 1.

Optionally, the interface 505 may include a currently generated preset icon, and one or more controls such as the "Skip" control, the "Save" control, and the "Previous" control. A pattern of the "currently generated preset icon" may be consistent with the pattern of the icon of the "Combined app 1" displayed on the home screen 501; or only sizes are different. For example, the preset icon on the interface 505 is obtained through magnifying the icon of the "Combined app 1" displayed on the home screen 501 by a fixed multiple. This is not limited in this embodiment of this application.

For example, as shown in FIG. 5(*e*), the preset icon of the "Combined app 1" is an icon obtained through sequentially combining and arranging the icon of the WeChat application, the icon of the Notepad application, and the icon of the Gallery application, and is filled with a blank box (which may include an "add" control) of the same size in a lower right corner region, to ensure that the preset icon of the "Combined app 1" is a regular figure.

Optionally, the "preset icon" displayed on the interface 505 may be used as an entirety to receive an icon modification operation of the user; or the "preset icon" displayed on the interface 505 may include four sub-regions, and each sub-region may independently receive an operation of the user. This is not limited in this embodiment of this application.

Optionally, the user may also tap the "Skip" control to skip the interface for setting or modifying the icon of the Combined app 1, and give up setting or modifying the icon of the Combined app 1, to directly display a screen 506 shown in FIG. 5(*f*). Alternatively, the user may tap the "Previous" control, and the mobile phone returns to the interface 504 shown in FIG. 5(*d*), so that the user can modify the "interface display pattern" of the Combined app 1 again. Details are not described herein.

For example, the user may perform an operation 1 shown in FIG. 5(*e*). A finger touches and holds any position of the icon of the Gallery application in a third sub-region. In response to the operation of the user, a prompt box 505-1 is popped up on the display of the mobile phone. An object of the operation of the user may be displayed in the prompt box 505-1, namely, the icon of the Gallery application. In addition, the prompt box 505-1 may include a plurality of operation options that can be performed by the user, for example, one or more options such as Delete, Color style, Customize, Edit, and Replace. This is not limited in this embodiment of this application.

The "Delete" option may be used to delete the icon of the Gallery application from the preset icon of the "Combined app 1" and automatically adjust sizes and positions of the icon of the WeChat application and the icon of the Notepad application that are reserved, for example, display in the middle, to ensure appearance aesthetics of a new icon of the "Combined app 1".

The "Color style" option may be used by the user to further manually set a color style of the icon of the Gallery application in the preset icon of the "Combined app 1". The "Customize" option and the "Edit" option may be used by the user to further manually add one or more types of content such as a text, a date, an annotation, a doodle, a watermark, and a photo frame to the preset icon of the "Combined app 1". The "Replace" option may be used by the user to further manually replace the icon of the Gallery application with another picture, for example, add another icon from a local album of the mobile phone. A picture source is not limited in this embodiment of this application.

Optionally, after the user modifies only a color style of an icon of a specific application in the preset icon of the "Combined app 1", the mobile phone may automatically adjust a color style of an icon of another application in the preset icon of the "Combined app 1", so that an overall color style of the icon of the "Combined app 1" can be consistent, to avoid a visual contrast and visual impact and improve visual experience.

Alternatively, if the user modifies only a color style of an icon of a specific application in the preset icon of the "Combined app 1", when a screen that includes a plurality of split-screen windows is displayed after the user starts the "Combined app 1", consistency adjustment may be performed on a color style of an interface in a split-screen window corresponding to the application on the screen to match the color style of the icon of the application.

Alternatively, if the user modifies an overall color style of the preset icon of the "Combined app 1", when a screen that includes a plurality of split-screen windows is displayed after the user starts the "Combined app 1", the mobile phone may automatically adjust a color style in each split-screen window on the screen, so that the color style of each split-screen window on the screen can be consistent with the icon color style set by the user. This is not limited in this embodiment of this application.

According to the foregoing method, the user may modify content, a color style, and the like of the preset icon of the "Combined app 1" according to a preference of the user, so that a new icon better meets a visual requirement of the user, to meet different requirements of different users. In addition, the mobile phone may automatically adjust the color style of the screen that includes the plurality of split-screen windows and that is displayed after the "Combined app 1" is started, so that the color style of each split-screen window on the screen can be consistent with the icon color style set by the user, to avoid a visual contrast and visual impact and improve visual experience.

It should be noted herein that, if the user resets the icon of the "Combined app 1" by using a related operation described in FIG. 5(*e*), the mobile phone automatically replaces the preset icon of the "Combined app 1" on the home screen 501 shown in FIG. 5(*a*) with the new icon set by the user, so that the icon of the "Combined app 1" on the home screen 501 is consistent with the setting of the user, to better meet a visual requirement of the user.

For example, it is assumed that the user sets the interface display pattern shown in FIG. 5(*d*), and further sets the color style of the icon of each application and the like by using only the "Color style" option on the interface 505 shown in FIG. 5(*e*). In response to the operation of the user, a change process of the icon of the Combined app 1 on the home screen 501 of the mobile phone may be shown in FIG. 5(*g*). The original preset icon of the Combined app 1 is changed to the new icon. A layout manner of an icon that is of each application and that is included in the new icon is consistent with a layout manner of the split-screen window of each application shown in FIG. 5(*d*). In addition, the user may change the name of the Combined app 1 to "WeChat/Gallery/Notepad" expected by the user. In this naming manner of combining names of all applications, a plurality of applications associated with and specifically included in the Combined app 1 can be intuitively displayed for the user, so that the user can quickly find the Combined app 1 and simultaneously start the plurality of applications.

Alternatively, for example, it is assumed that the user sets the interface display pattern shown in FIG. 5(*d*), and further sets, by using the "Customize" option on the interface 505 shown in FIG. 5(*e*), the icon of the Combined app 1 to be displayed in a superimposing manner according to a sequence in which the user selects the plurality of applications. In response to the operation of the user, a change process of the icon of the Combined app 1 on the home screen 501 of the mobile phone may be shown in FIG. 5(*h*). The original preset icon of the Combined app 1 is changed to a new icon. Icons of two adjacent applications in the new icon have overlapping regions of the same size, and a color style of each icon may automatically change, to display a visual hierarchy when the icons are displayed in the superimposing manner. In addition, when the icons of the two adjacent applications have the overlapping regions of the same size, it does not affect the user in determining the applications included in the Combined app 1, so that the user can quickly find the Combined app 1 and simultaneously start the plurality of applications. In addition, the name of the Combined app 1 may also be a combination of the names of the plurality of applications in a sequence in which the user selects the plurality of applications, for example, "WeChat/Notepad/Gallery". This is not limited in this embodiment of this application.

It should be understood that, regardless of a rule that is set by the user for the mobile phone and that is used for generating the new icon of the Combined app 1, for example, a possible new icon pattern shown in FIG. 5(*g*) or FIG. 5(*h*), a size of the new icon on the display may be the same, and is consistent with the size of the preset icon of the Combined app 1. In other words, the size of the new icon is also consistent with a size of an icon of each independent application on the display of the mobile phone. This is not limited in this embodiment of this application.

After the user modifies the content and the color style of the preset icon of the "Combined app 1" according to the preference of the user, the user may perform an operation 2 shown in FIG. 5(*e*) to tap the "Save" control. In response to the operation of the user, the mobile phone may further display a screen 506 shown in FIG. 5(*f*). The screen 506 may be understood as an initial page that is opened after the mobile phone runs the "Combined app 1", namely, the main interface of the "Combined app 1".

For example, as shown in FIG. 5(*f*), the screen 506 matches the "interface display pattern" determined by the user in FIG. 5(*d*). With reference to the foregoing definition of the "interface display pattern", the screen 506 may be described from the following aspects:

(1) A quantity of split-screen windows Specifically, the screen 506 includes three split-screen windows.

(2) A layout and an arrangement sequence of the split-screen windows Specifically, on the screen 506, a split-screen window 506-1 of the WeChat application, a split-screen window 506-2 of the Notepad application, and a split-screen window 506-3 of the Gallery application have a layout and an arrangement sequence shown in FIG. 5(*f*).

(3) Sizes of the split-screen windows Specifically, on the screen 506, the split-screen window 506-1 of the WeChat application and the split-screen window 506-2 of the Notepad application have a same width, and occupy a larger region on a left side of the display. The split-screen window 506-3 of the Gallery application has a relatively small width, and occupies a smaller region on a right side of the display in a long narrow pattern.

(4) A target interface of an application in each split-screen window Specifically, on the screen 506, the interface displayed in the split-screen window of each application is consistent with the "target interface" set by the user in FIG. 5(*d*). For example, in FIG. 5(*d*), the user sets a target interface of the WeChat application to a chat list interface, a target interface of the Notepad application to an initial interface of Notepad, and a target interface of the Gallery application to an album list interface.

In a possible implementation, in addition to the interface display patterns described in (1), (2), (3), and (4), the opened initial page (the screen 506) of the "Combined app 1" may be further displayed according to the following display rules in this embodiment of this application.

(5) For the "target interface" of each application displayed in the split-screen window of each application on the screen 506, displayed content of the target interface of the application may be consistent with displayed content displayed when the mobile phone displays the target interface of the application in full screen. In other words, content in all of a region of the target interface of each application or content in a part of a region of the target interface of each application may be displayed in the split-screen window of the application. This is not limited in this embodiment of this application.

Optionally, for the foregoing display rule (5), it is assumed that the user performs setting so that content in all of a region of a "target interface" of a specific application is displayed in a split-screen window of the application. Different display processes may correspond to whether a shape of the split-screen window of the application is similar to the shape of the display region of the display of the mobile phone. It should be understood that the "shape of the display region of the display of the mobile phone" herein may be a display region that is on the display of the mobile phone and that is used to display only an interface of a specific application, and does not include a top status bar that is on the top of the display and that is used to display content such as a signal identifier, a battery level, and current time. This is not limited in this embodiment of this application.

The following describes two possible display methods with reference to the screen 506 shown in FIG. 5(*f*) and a plurality of split-screen windows on the screen 506.

Display Method 1

Optionally, if the shape of the split-screen window of the application is similar to the shape of the display region of the display of the mobile phone, the displayed content in all of the region may be scaled down by the specific ratio k when the mobile phone displays the target interface of the application in full screen, so that the scaled-down displayed content in all of the region of the target interface can adapt to the size of the split-screen window of the application.

For example, as shown in FIG. 5(*f*), it is assumed that the split-screen window 506-1 of the WeChat application and the split-screen window 506-2 of the Notepad application have the same shape and the same size (that is, a width and a height), and a shape of the split-screen window 506-1 is similar to a shape of a full-screen display region of the display of the mobile phone, where a similarity ratio is k. In other words, the size of the entire display region of the display can be obtained after the size of the split-screen window 506-1 of the WeChat application (or the split-screen window 506-2 of the Notepad application) is scaled up by k times.

In this scenario, after all interface content of the WeChat list interface 202 shown in FIG. 2(*b*) is scaled down by k times, the scaled-down interface content is filled in the split-screen window 506-1 of the WeChat application shown in FIG. 5(*f*). Similarly, all interface elements on an initial page of the Notepad application may also be processed in the same manner. For brevity, details are not described herein again.

Through comparing the WeChat chat interface 204 or the screen 205 displayed in the split-screen window of the WeChat application shown in FIG. 2(*d*) or FIG. 2(*e*) in with the WeChat chat interface displayed in the split-screen window 506-1 of the WeChat application shown on the screen 506 in FIG. 5(*f*), it can be learned that, as the mobile phone performs split-screen display, the mobile phone is configured to display a display region of the interface of the WeChat application, that is, the display region is scaled down from the full-screen display region to the display region in the split-screen window 506-1 of the WeChat application.

In comparison, in some embodiments of this application, the following can be supported: All content of an interface of each application is scaled down by a specific ratio, and all the content is displayed in a split-screen window of the application, to ensure complete presentation of the interface content and better meet display effect expected by the user and a requirement for using the target interface.

Alternatively, in some other embodiments of this application, the following can be supported: Content in a part of a region of an interface of each application is scaled down by a specific ratio, and all the content is displayed in a split-screen window of the application, to ensure that the interface content can be presented based on a setting of the user and better meet display effect expected by the user and a requirement for using the target interface.

Display Method 2

Optionally, if a shape of a split-screen window of a specific application is not similar to the shape of the display region of the display of the mobile phone, all interface elements of a target interface of the application that are displayed in full screen by the mobile phone may be scaled down by a specific ratio, a layout and an arrangement manner of all the interface elements of the target interface of the application may be adjusted, and then adjusted content is filled in the split-screen window of the application, to adapt to the shape and a size of the split-screen window of the application.

For example, as shown in FIG. 5(*f*), it is assumed that a shape of the split-screen window 506-3 of the Gallery application is not similar to a size of the entire display region of the display. In other words, the size of the entire display region of the display of the mobile phone cannot be obtained through merely scaling up a size of the split-screen window 506-3 of the Gallery application. In this scenario, after all interface elements of the album list interface of the Gallery application displayed in full screen are scaled down, a layout and an arrangement manner of each interface element may be adjusted, and then the scaled-down interface elements are filled in the split-screen window 506-3 of the Gallery application shown in FIG. 5(*f*).

Through comparison with a display distance between two adjacent albums on the album list interface 205 displayed in the split-screen window of the Gallery application shown in FIG. 2(*e*), it can be learned that, in the split-screen window 506-3 of the Gallery application on the screen 506 shown in FIG. 5(*f*), icons and album names of the two adjacent albums change both horizontally and vertically, to better adapt to the display region and the size of the split-screen window 506-3. For example, during horizontal arrangement, icons and album names corresponding to the "All photos" album and the "Videos" album that are adjacent are closer, and a display distance is reduced; and during vertical arrangement, the icons and the album names corresponding to the "All photos" album and the "Camera photos" album that are adjacent are farther away, and a display distance is increased. In addition, menu names: "Photos", "Albums", "Highlights", and "Discover" in a bottom menu region of the album application in the split-screen window 506-3 may be adjusted to be displayed vertically, to ensure complete and clear presentation for the user.

According to the foregoing method, when the user starts a newly generated combined application to trigger display of two or more split-screen windows on the display of the mobile phone, the target interface after each application is started may be set according to a personal requirement of the user for using each application, or customized setting may be performed according to a use requirement, a display requirement, and the like for the target interface so that the content in all of the region of the target interface or the content in the part of the region of the target interface is displayed in the split-screen window of each application.

Correspondingly, based on the setting of the user and the size of the split-screen window, the mobile phone may automatically scale down the content or the interface element of the to-be-displayed target interface of the application by the specific ratio, and/or automatically adjust the layout and the arrangement manner of the content or the interface element of the to-be-displayed target interface of the application, so that the content or the interface element that is of the to-be-displayed target interface of the application and that is set by the user can adapt to the shape and the size of the split-screen window of the application. In this way, the following case can be avoided: Only a part or a small amount of content of an initial interface of the application is displayed when the size of the split-screen window is reduced. Therefore, the content and the interface element of the target interface of the application displayed in the split-screen window meet a requirement of the user, and display effect expected by the user and a requirement of using a plurality of application interfaces in split screen are implemented, to provide great convenience for the user to use the application, thereby improving operation experience and use experience of the user.

Optionally, an example in which interfaces of three applications are displayed in split screen is used. The screen 506 is used as an initial interface (main interface) that is directly opened and displayed after the "Combined app 1" is started. The screen 506 may be displayed based on a setting of the user and according to rule details in (1), (2), (3), (4), and (5) described above. In addition, in a use process, the user may also perform modification or adjustment.

For example, the user may adjust a display position, a size, a layout, and the like of the split-screen window of each application on the screen 506 based on a change of a personal use requirement. For a specific process, refer to the related operation processes described in FIG. 2(*d*) and FIG. 2(*e*), or the related operation processes described in FIG. 5(*b*), FIG. 5(*c*), and FIG. 5(*d*). For brevity, details are not described herein again.

Correspondingly, in a process of using the screen 506, if the user modifies a display position, a size, a layout, and the like of the split-screen window of each application on the screen 506 based on a change of a personal use requirement, the Combined app 1 may record and save a modification operation of the user, and update, based on a new display position, size, and layout of the split-screen window after the modification, an interface display pattern set by the user. Alternatively, if the user frequently modifies a display position, a size, a layout, and the like of the split-screen window, the Combined app 1 may ignore and does not record a modification operation of the user, and maintain a related interface pattern setting of the user in FIG. 5(*b*), FIG. 5(*c*), and FIG. 5(*d*). This is not limited in this embodiment of this application.

Optionally, in this embodiment of this application, the "one or more setting interfaces" related to display of the icon, the interface display pattern, and the like of the "Combined app 1" that are set by the user may be displayed when the user taps the icon of the "Combined app 1" for a first time, or may have different display occasions. This is not limited in this embodiment of this application.

It should be understood that FIG. 5(*b*), FIG. 5(*c*), FIG. 5(*d*), and FIG. 5(*e*) are the "one or more setting interfaces" described in this embodiment of this application. Specifically, after the user taps the icon of the "Combined app 1" and before the initial interface (main interface) 506 shown in FIG. 5(*f*) is displayed, the user can set the interface display pattern of the "Combined app 1", and/or set an interface of the icon of the "Combined app 1" by using the "one or more setting interfaces".

For example, a display occasion of the "one or more setting interfaces" may include any one of the following possible cases:

(1) Each time the user taps the icon of the "Combined app 1", the one or more setting interfaces are displayed.

(2) After a specific period or a specific time, for example, five or more days after a time at which the user previously uses the "Combined app 1", when the user taps the icon of the "Combined app 1" again, and the plurality of applications associated with the "Combined app 1" are simultaneously started, the one or more setting interfaces are all displayed.

(3) It is detected that an environment (or a geographical location, or the like) in which the user is located when the user uses the "Combined app 1" in a previous time is changed to a current environment (or a geographical location, or the like). For example, the previous environment is recorded as a company office environment.

In this case, when the mobile phone detects that the user is on a trip on a high-speed railway or the like, and the user taps the icon of the "Combined app 1" again, the one or more setting interfaces are all displayed. This is not limited in this embodiment of this application.

It should be further understood that, when the mobile phone displays the one or more setting interfaces, the user may modify, by using the one or more setting interfaces, content related to display of the icon and the interface display pattern of the "Combined app 1", or the user may choose to "Skip" the one or more setting interfaces. The mobile phone continues to perform display by default based on a previous setting of the user. This is not limited in this embodiment of this application.

In a possible scenario, in a process of using the "Combined app 1", the user may set or modify, for a plurality of times, rules or content related to display of the icon, the interface display pattern, and the like of the "Combined app 1". For this scenario, when developing a related function of the multi-application combination service, the developer may configure a quantity of enabling times of each combined application, and record a preset quantity of user settings or modify a configuration parameter related to display of the icon, the interface display pattern, and the like of the "Combined app 1".

Specifically, each combined application may be configured to record n times of setting or modifying a configuration parameter related to display of the icon, the interface display pattern, and the like of the "Combined app 1" by the user. In other words, each combined application may record n times of an enabling state of the "Combined app 1", and each time of the enabling state corresponds to different configuration parameters related to display of the icon, the interface display pattern, and the like. A first time of the enabling state of the "Combined app 1" corresponds to an "initial configuration parameter". Each modification or adjustment operation performed by the user in the process of using the "Combined app 1" is sequentially denoted as a second time of the enabling state, a third time of the enabling state, . . . , and an $n^{th}$ time of the enabling state respectively corresponding to a configuration parameter 2, a configuration parameter 3, . . . , and a configuration parameter n, where n is an integer greater than or equal to 1.

In addition, the process of using the "Combined app 1" by the user is related to adjustment of the configuration parameter of the enabling state. When the user closes the "Combined app 1", a prompt window may pop up to prompt the user whether to record a configuration parameter related to this time of the modification or configuration operation, and update, based on the configuration parameter in this time, a start interface for starting the "Combined app 1" next time. If the user chooses to save the configuration parameter in this time, the "Combined app 1" may record, as one time of the enabling state, the configuration parameter related to this time of modification or adjustment. If the user chooses not to save the configuration parameter in this time, the "Combined app 1" may delete the configuration parameter related to this time of modification or adjustment, and does not add a quantity of times of the enabling state. This is not limited in this embodiment of this application.

Optionally, the "Combined app 1" always records the "initial configuration parameter" corresponding to the first time of the enabling state. When the quantity that is of times of the enabling state and that is recorded by the "Combined app 1" is equal to n, if it is detected again that the user modifies or adjusts the related configuration parameter in the process of using the "Combined app 1", historical data such as the configuration parameter corresponding to the second time of the enabling state and the configuration parameter corresponding to the third time of the enabling state may be deleted in sequence, to ensure that the "Combined app 1" records a maximum of n groups of configuration parameters related to the enabling state of the "Combined app 1". Details are not described herein again.

Optionally, as shown in FIG. 4(*d*) or FIG. 4(*e*), in a function entry interface or a setting interface related to the multi-application combination service, more options and/or switches may be added for the user, for example, "save a latest setting of the user" or "save an initial setting of the user". The user may select an expected option and/or switch according to a use requirement and habit of the user. For example, by default, each combined application stores a configuration parameter and the like related to currently latest modification or adjustment of the user. This is not limited in this embodiment of this application.

According to the foregoing process, this embodiment of this application provides the multi-application combination service, and provides the user with a method for customizing and combining a plurality of applications. The user may combine two or more applications on a local device to generate a new combined application. The new combined application can provide use experience of simultaneously using a plurality of applications for the user. In a subsequent use process, the user can tap an icon of the combined application to simultaneously start and run each of the plurality of applications associated with the combined application. The display of the electronic device automatically displays an interface of each of the plurality of applications in a split-screen window form. Start speeds, color styles, and the like of the plurality of applications may be synchronized by default. The plurality of applications enable data sharing space. In the method, the plurality of applications are simultaneously started, to prevent the user from separately performing complex operations of starting each application and triggering split-screen display, thereby simplifying an operation procedure and shortening an operation time. In addition, in the method, a quantity of applications included in the plurality of applications is not limited, to meet a requirement for simultaneously using more applications by the user, thereby improving use experience of the user.

In addition, the method supports the user in customizing, according to different personal use requirements, the interface display pattern of split-screen display after the plurality of applications associated with the combined application are simultaneously started. For example, the user may set one or more of the layout and the arrangement sequence of the plurality of split-screen windows corresponding to the plurality of applications associated with the combined application displayed on the display, the size of each split-screen window, and the target interface of each application displayed in the split-screen window of the application. In this way, after the user simultaneously starts the plurality of applications, the sizes, the layout, and the like of split-screen windows of the plurality of applications displayed in split screen can better meet a display requirement of the user. In addition, a target interface expected by the user can be directly reached through each application. Therefore, the user does not need to perform a plurality of tap operations to display the expected target interface, to simplify an operation procedure, thereby improving use experience of the user.

In another possible implementation, the user can combine a plurality of applications on a local device, and this embodiment of this application may further support combination of more applications from other sources.

Optionally, the applications from the other sources may include a local application on the mobile phone, and/or an application on a super terminal device in a device-level mutual trust relationship with the mobile phone, and/or a distributed application on another device that is authorized by the user to establish a mutual trust relationship with a to-be-combined application on the mobile phone, and/or an application on another device that is found in a current scenario by the mobile phone in real time and that has no mutual trust relationship. A source of an application is not limited in this embodiment of this application.

In still another possible implementation, the user manually selects, based on the description in FIG. 4(*a*), FIG. 4(*b*), FIG. 4(*c*), FIG. 4(*d*), and FIG. 4(*e*), the plurality of applications expected to be combined. In addition, in this embodiment of this application, the user may be further supported in triggering combination of the plurality of applications in a plurality of possible manners such as a shortcut operation. An operation manner of triggering the combination of the applications is not limited in this embodiment of this application.

FIG. 6(*a*), FIG. 6(*b*), FIG. 6(*c*), and FIG. 6(*d*) are a schematic diagram of another example of a process in which a user enables an application combination service on a mobile phone according to an embodiment of this application.

For example, on an interface 601 shown in FIG. 6(*a*), the user taps the "Multi-app combination" option. In response to the tap operation of the user, the mobile phone displays a setting interface 602 of the "Multi-app combination" option shown in FIG. 6(*b*). On the interface 602, the "Enable the multi-app combination service" switch is kept in an on (or "ON") state, an operation shown in FIG. 6(*b*) is performed to tap the "Multi-app combination settings" option. In response to the tap operation of the user, the mobile phone displays an interface 603 shown in FIG. 6(*c*). The interface 603 may include a plurality of setting options related to the multi-application combination service, for example, options such as Multi-app sources, Multi-app combination manners, Combined app icon, and App start interface. When the user performs an operation 1 shown in FIG. 6(*c*) to tap the "Multi-app sources" option, in response to the operation of the user, the mobile phone may further display a plurality of possible application sources.

Optionally, the plurality of possible application sources may include options listed on an interface 604 shown in FIG. 6(*d*), for example, Local apps, Super terminal, Authorized distributed apps, and Others. The options may represent different application sources.

The "Local apps" option can authorize a plurality of local applications on the mobile phone to participate in a process of combining the plurality of applications. The plurality of local applications are not limited to factory-delivered applications or applications installed by the user.

The "Super terminal" option can authorize, to participate in the application combination process in this embodiment of this application, an application on one or more devices that have a same user account as the mobile phone nearby, and/or an application on a trusted device in a home group set by the user. It should be understood that the user can implement collaborative management of a plurality of devices, resource sharing, and one-touch collaboration with nearby devices such as a tablet, a computer, and a smart screen by using the "Super terminal" function of the mobile phone, to implement a service transfer function and the like.

For example, on the interface 604 shown in FIG. 6(*d*), if the user taps and selects the "Super terminal" option, for each device that can be found by the mobile phone, the device and the mobile phone form a super terminal group provided that the device meets any one of conditions, for example, the device has established a mutual trust relationship with the mobile phone, and/or the device logs in to the same user account as the mobile phone, and/or the device is a device in the same home scenario as the mobile phone. In this case, all applications on the device can be found, and can participate in the application combination process in this embodiment of this application.

The "Authorized distributed apps" option can authorize a distributed application on any nearby device to participate in the process of combining a plurality of applications. It should be understood that, in this scenario, if applications to be combined by the user include an application 1 on the mobile phone, for each device that can be found by the mobile phone, the device may be not in a device-level mutual trust relationship with the mobile phone. In other words, the device and the mobile phone may not form a super terminal group. Only an application 2 and an application 3 on the device have established a mutual trust relationship with the application 1 on the mobile phone. In this case, the application 2 and the application 3 on the device and the application 1 on the mobile phone may be combined to form a new combined application. Another application on the device does not have permission to participate in the application combination process in this embodiment of this application. Details are not described below.

For example, when the user performs an operation 2 shown in FIG. 6(*c*) to tap the "Multi-app combination manners" option, in response to the operation of the user, the mobile phone may further display a plurality of possible operation manners of combining a plurality of applications.

Optionally, the "Multi-app combination manners" may include a plurality of possible options listed on the interface 604 shown in FIG. 6(*d*): Add in the combination service, Drag and approach on the screen, Add in the shortcut icon on the screen, and Add a multi-task screen card. Each option can authorize the user to trigger combination of a plurality of applications by using a corresponding operation.

The "Add in the combination service" option may be understood as follows: Based on the processes shown in FIG. 4(*d*) and FIG. 4(*e*), on a function entry interface or a setting interface related to the multi-application combination service, the user may manually add a plurality of applications, and a new combined application may be generated based on the plurality of applications added by the user. Details are not described herein again.

With reference to the accompanying drawings, the following describes in detail several other possible operation processes of combining a plurality of applications by the user.

Operation manner 1: The "Drag and approach on the screen" operation triggers combination of a plurality of applications.

FIG. 7(*a*), FIG. 7(*b*), FIG. 7(*c*), and FIG. 7(*d*) are a schematic diagram of an example of a process in which a user combines a plurality of applications according to an embodiment of this application.

The user selects the "Drag and approach on the screen" option on the interface 604 shown in FIG. 6(*d*) according to the process described in FIG. 6(*a*), FIG. 6(*b*), FIG. 6(*c*), and FIG. 6(*d*). In other words, an authorized user can trigger combination of a plurality of applications through dragging an application on a screen to approach another application.

For example, the user performs an operation shown in FIG. 7(*a*) to select and touch and hold an icon of the WeChat application on a home screen 701 of a mobile phone and drag the icon of the WeChat application to approach an icon of the Notepad application. In response to the operation of the user, the WeChat application on the mobile phone is associated with the Notepad application, to generate a new Combined app 1. In addition, the mobile phone displays a screen 702 shown in FIG. 7(*b*). An icon and a name of a newly added application, namely, an icon and a name of the Combined app 1 are automatically displayed on the screen 702.

Optionally, the icon of the Combined app 1 may be automatically displayed on a screen of the mobile phone according to a preset rule. For example, the automatically generated icon of the Combined app 1 may be obtained through horizontally or vertically splicing and combining, and scaling down the icon of the WeChat application and the icon of the Notepad application. This is not limited in this embodiment of this application.

Optionally, the icon of the Combined app 1 may be further presented in an "unstable state". The "unstable state" is relative to a stable state presented for any application on the home screen 701. For example, the icon in the "unstable state" may present shaking dynamic change effect, and/or visual effect of a highlighted contour, and/or flickering-form effect, to indicate that the user can continue to add another application to the icon of the Combined app 1. This is not limited in this embodiment of this application.

For example, the user continues to perform an operation shown in FIG. 7(*b*) to select and touch and hold an icon of the Gallery application on the screen 702 and drag the icon of the Gallery application to approach the icon of the Combined app 1. In response to the operation of the user, the Gallery application is also added to the Combined app 1. In addition, the mobile phone displays a screen 703 shown in FIG. 7(*c*). On the screen 703, the icon of the Combined app 1 changes. For example, the icon of the Gallery application is added as a part of content of the icon of the Combined app 1, and each application icon is further scaled down.

On the screen 703, the icon of the Combined app 1 may continue to be presented in the "unstable state", and the user may continue to add more applications to the Combined app 1. After adding all expected applications to the Combined app 1, the user may exit the adding process. In other words, the icon of the Combined app 1 is switched to a stable state. For example, the user may perform an operation shown in FIG. 7(*c*) to slide on a display of the mobile phone in a direction shown by using a black arrow from a frame position of the display, that is, perform a "back" operation. In response to the operation of the user, the mobile phone displays a screen 704 shown in FIG. 7(*d*), and exits the application combination process. The icon of the Combined app 1 is switched to the stable state. It should be understood that the user may further trigger, by using another possible operation, the mobile phone to exit the application combination process. This is not limited in this embodiment of this application.

It should be further understood that the operation manner: "Drag and approach on the screen" provided in this embodiment of this application is different from an existing operation of adding a plurality of applications to one folder by the user, and the mobile phone can accurately determine different operations of the user and respond to the operations.

For example, when adding a plurality of applications to one folder, the user needs to select the icon of the WeChat application, and drag the icon to a region that overlaps the icon of the Notepad application or an overlapping region whose area is greater than or equal to a preset value. In this embodiment of this application, the user selects the icon of the WeChat application, and drags the icon to gradually approach the icon of the Notepad application, where the two icons do not overlap, or an area of the overlapping region is less than the preset value. Alternatively, in a process in which the user drags the two icons to approach, when the two icons do not overlap or the area of the overlapping region is less than the preset value, it may be detected that a finger stays for specific duration, so that the mobile phone can determine that a current operation of the user is an operation of combining a plurality of applications. This is not limited in this embodiment of this application.

Optionally, when the mobile phone cannot accurately determine whether the operation of the user is an operation of combining a plurality of applications or an operation of creating a folder for a plurality of applications, a pop-up window may be displayed on a screen of the mobile phone, to provide two different options for the user, for example, whether to perform the following operations: combine applications, create a new folder, . . . , and the like. The user may manually select an option according to a requirement of the user, to more accurately determine an operation objective of the user.

Operation manner 2: The "Add in the shortcut icon on the screen" operation triggers combination of a plurality of applications.

FIG. 8(*a*), FIG. 8(*b*), FIG. 8(*c*), and FIG. 8(*d*) are a schematic diagram of another example of a process in which a user combines a plurality of applications according to an embodiment of this application.

The user selects the "Add in the shortcut icon on the screen" option on the interface 604 shown in FIG. 6(*d*) according to the process described in FIG. 6(*a*), FIG. 6(*b*), FIG. 6(*c*), and FIG. 6(*d*). In other words, when the user turns on the "multi-app combination service" switch on the interface 602 shown in FIG. 6(*b*), the mobile phone may automatically display icons of one or more combined applications in a blank state on the home screen, for example, a Combined app 1 and a Combined app 2 with blank icons displayed on a screen 801 shown in FIG. 8(*a*). The user may tap a blank icon of any combined application, and add two or more applications to the combined application to trigger combination of the plurality of applications.

For example, when the user performs an operation shown in FIG. 8(*a*) to tap the Combined app 1 with the blank icon on the screen 801, in response to the operation of the user, the mobile phone displays a screen 802 shown in FIG. 8(*b*). A details window 802-1 of the Combined app 1 is displayed on the screen 802. It should be understood that currently, the user does not add any application to the Combined app 1. Therefore, the details window 802-1 of the Combined app 1 does not include an icon or a name of any application, and may include only an add control.

The user performs the operation shown in FIG. 8(*a*) to tap the add control in the details window 802-1 of the Combined app 1. In response to the operation of the user, the mobile phone displays a screen 803 shown in FIG. 8(*c*). Optionally, the screen 803 may include a window 803-1. Different sources corresponding to a plurality of applications, or a plurality of applications that can be added may be directly displayed for the user in the window 803-1. The user may select a plurality of applications, and add the selected plurality of applications as associated applications of the Combined app 1.

For example, as shown in FIG. 8(*c*), the sources of the plurality of applications that can participate in a process of combining a plurality of applications on the current mobile phone are displayed in the window 803-1. Examples are as follows:

(1) Some applications may be local applications, for example, the Notepad application, the Gallery application, the Videos application, and the WeChat application that have been installed on the mobile phone; and may be displayed in an application list corresponding to a "Local apps" category.

(2) Some applications may include applications from a super terminal device. For example, a "Super terminal device apps" category in the window 803-1 displays names of a plurality of found super terminal devices, for example, device names such as "Mate 30", "My tablet", and "Smart screen". The plurality of super terminal devices may have a same user account as the mobile phone, or may be trusted devices in a home group set by the user. The user may tap a device name of any super terminal device according to a requirement of the user, to view and select one or more applications that are included on the device and that can be combined.

(3) Some applications and an application that is to participate in the Combined app 1 on the mobile phone are distributed applications that have a mutual trust relationship. For example, if the user selects the Notepad application, the Gallery application, the Videos application, and the WeChat application in the "Local apps" category in the window 803-1, a mutual trust relationship has been established between an application 1 included in an "Authorized distributed apps" category and each of the Notepad application, the Gallery application, the Videos application, and the WeChat application on the mobile phone. If no mutual trust relationship is established between an application 2 and any one of the Notepad application, the Gallery application, the Videos application, and the WeChat application on the mobile phone, in this case, the application 2 may be not displayed in the "Authorized distributed apps" category. This is not limited in this embodiment of this application.

(4) Some applications may be applications on another device that can be currently found by the mobile phone, and may specifically include a distributed application with which a mutual trust relationship has been established, or an application on another device with which a mutual trust relationship is not established. The another device, the another application, and the like meeting this case may be classified into a "Search for other apps" category. For example, if the user taps the "Search for other apps" option, the mobile phone may start a search process, and further display another found device and/or another found application for the user. In this scenario, if the user expects to add an application 2 on another found device, no mutual trust relationship has been established between the application and any one of the Notepad application, the Gallery application, the Videos application, and the WeChat application on the mobile phone, and the user selects the application 2, the mobile phone may further trigger a trusted authentication process, and establish a mutual trust relationship between the application 2 and any one of the Notepad application, the Gallery application, the Videos application, and the WeChat application on the mobile phone. After the mutual trust relationship is established, the application 2 may be added to the Combined app 1. For brevity, details are not described herein.

For example, the user performs an operation 1 shown in FIG. 8(*c*) to sequentially select select boxes respectively corresponding to the Notepad application, the Gallery application, the Videos application, and the WeChat application; and performs an operation 2 to tap an "OK" control. In response to the operations of the user, the mobile phone determines the four selected applications as applications included in the "Combined app 1" and returns to a screen 804 shown in FIG. 8(*d*). On the screen 804, a new icon is generated for the Combined app 1 according to a preset rule. For example, icons are combined according to a sequence of an icon of the Notepad application, an icon of the Gallery application, an icon of the Videos application, and an icon of the WeChat application, and a combined icon is scaled down by a specific ratio, to obtain a new icon shown in FIG. 8(*d*). Details are not described herein.

In the foregoing manner, the user may directly and manually add a plurality of applications from different sources in a shortcut icon of a combined application on the screen of the mobile phone, for example, an application from the local device, an application from another authorized super terminal device in a mutual trust relationship, or an application from another device that is found by the current mobile phone and that is not in a mutual trust relationship. In the method, application sources are enriched, and a range of applications that can be used by the user in a combination manner is expanded. In a scenario in which a plurality of applications on a plurality of devices need to be used, a use requirement of the user can be met, and use experience of the user can be improved.

Operation manner 3: The "Add a multi-task screen card" operation triggers combination of a plurality of applications.

Figure 9A:
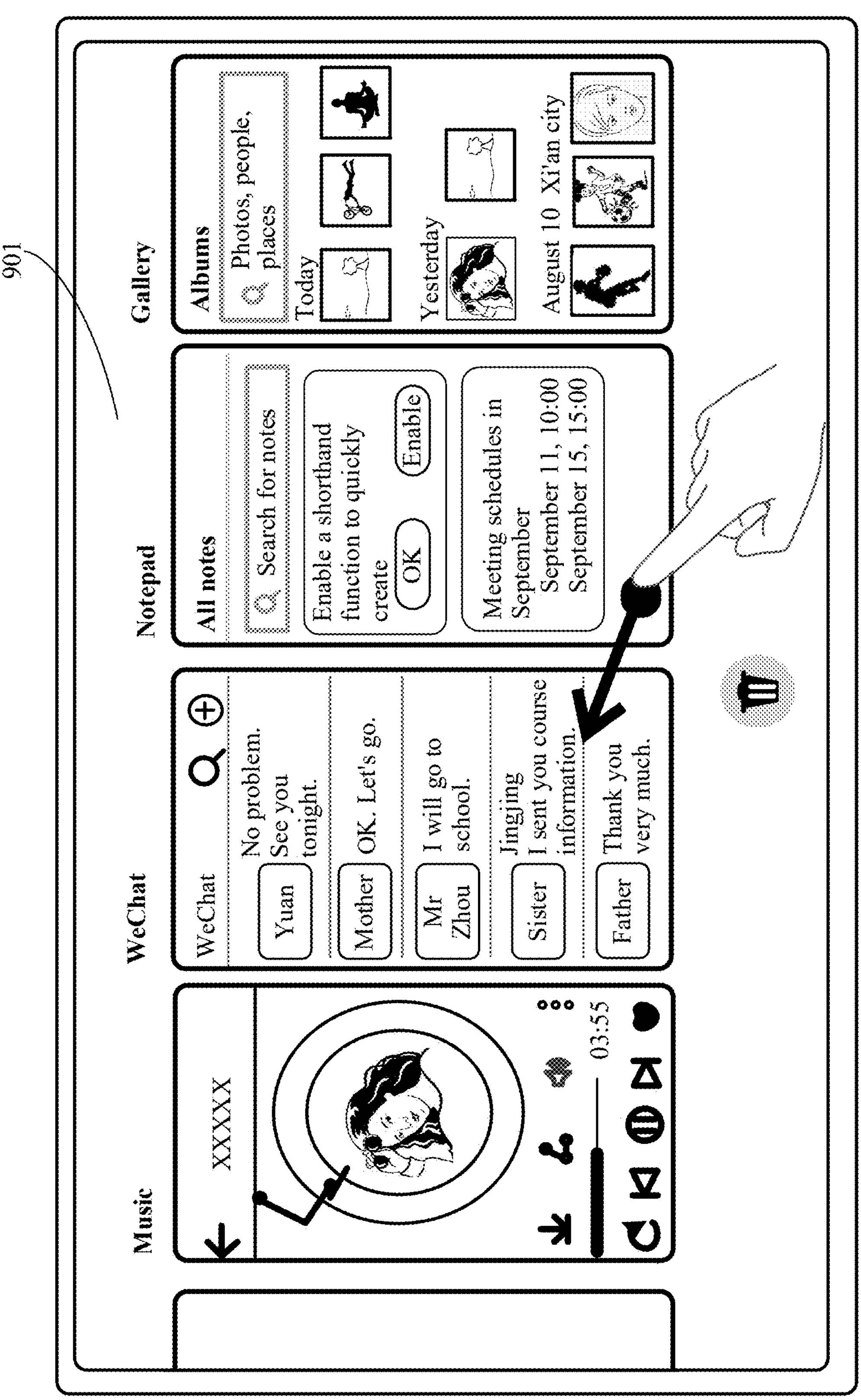
FIG. 9(*a*) and FIG. 9(*b*) are a schematic diagram of still another example of a process in which a user combines a plurality of applications according to an embodiment of this application.
Figure 9B:
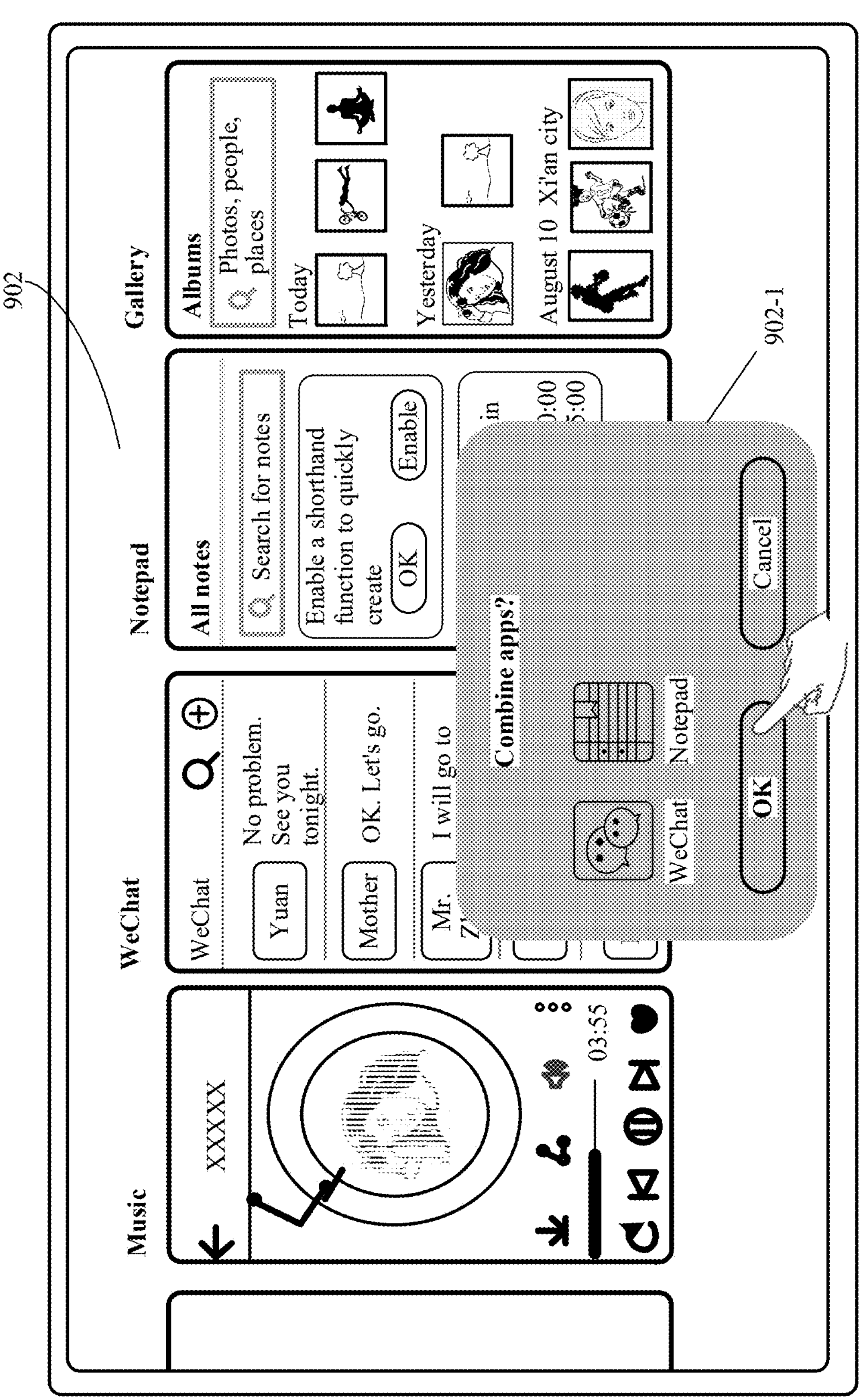

FIG. 9(*a*) and FIG. 9(*b*) are a schematic diagram of still another example of a process in which a user combines a plurality of applications according to an embodiment of this application.

The user selects the "Add a multi-task screen card" option on the screen 604 shown in FIG. 6(*d*) according to the process described in FIG. 6(*a*), FIG. 6(*b*), FIG. 6(*c*), and FIG. 6(*d*). In other words, an authorized user can trigger, by using an application card on a multi-task screen, combination of a plurality of applications through dragging a specific application card run in the background to approach another application card.

For example, a screen 901 shown in FIG. 9(*a*) is a multi-task screen on a tablet. A plurality of applications run in the background of a mobile phone are displayed on the multi-task screen 901 in an application card manner, for example, a Music application card, a WeChat application card, a Notepad application card, and a Gallery application card. It should be understood that the user may perform a leftward or rightward slide operation on the screen 901 to view more application cards, that is, view more applications run in the background. Details are not described in this embodiment of this application.

The user may perform an operation shown in FIG. 9(*a*) to select and touch and hold the Notepad application card on the screen 901 and drag the Notepad application card to approach the WeChat application card. In response to the operation of the user, the mobile phone may display a screen 902 shown in FIG. 9(*b*). The screen 902 includes an automatically popped up floating window 902-1. Prompt information: "Combine apps?" is displayed in the floating window 902-1. To-be-combined applications are determined as the WeChat application and the Notepad application. When content displayed in the floating window 902-1 meets a requirement of the user, the user may perform an operation shown in FIG. 9(*b*) to tap an "OK" control. In response to the operation of the user, the tablet generates a Combined app 1 on a home screen. The combined app 1 includes the WeChat application and the Notepad application. Details are not described herein.

Optionally, an application interface corresponding to each application card on the multi-task screen 901 may be used as a "target interface" of the application. For example, when using the Music application, the user may trigger display of the multi-task screen 901 when a playing interface of the Music application is displayed on the display. Correspondingly, a music playing interface is displayed in a thumbnail of the Music application card on the multi-task screen 901. If the user adds the Music application to the Combined app 1 based on the foregoing described operation by using the Music application card, the music playing interface displayed in the thumbnail of the Music application card on the multi-task screen 901 is a "target interface" of the Music application by default. If the user subsequently simultaneously starts, through tapping an icon of the Combined app 1, a plurality of applications associated with the Combined app 1, the music playing interface is directly displayed after the Music application is started. Similarly, the Notepad application and the WeChat application are used as applications associated with the Combined app 1. After the applications are simultaneously started, interfaces displayed in thumbnails of corresponding application cards on the multi-task screen 901 are directly displayed. For brevity, details are not described herein.

In any one of the plurality of possible implementations listed above, the user may complete a process of combining a plurality of applications to generate a new combined application. In addition, when the user taps an icon of the combined application on a device interface, each application associated with the combined application can be simultaneously started, and an interface of each application associated with the combined application is displayed in a split-screen window manner.

It should be understood that, in a process of using the combined application, the user may customize an interface display pattern of split-screen display based on the related description in FIG. 5(*a*), FIG. 5(*b*), FIG. 5(*c*), FIG. 5(*d*), FIG. 5(*e*), FIG. 5(*f*), FIG. 5(*g*), and FIG. 5(*h*) after the plurality of applications associated with the combined application are simultaneously started. For example, the user may set one or more of a layout and an arrangement sequence of a plurality of split-screen windows corresponding to the plurality of applications associated with the combined application displayed on the display, a size of each split-screen window, and a target interface of each application displayed in a split-screen window of the application. For brevity, details are not described herein again.

In conclusion, this embodiment of this application provides a multi-application combination service, and provides the user with a method for customizing and combining a plurality of applications. The user may combine, in a plurality of possible operation manners, two or more applications on a local device and/or an authorized super terminal device and/or any other found device, to generate a new combined application. Use experience of simultaneously using a plurality of applications is provided for the user by using the new combined application. In a subsequent use process, the user can tap the icon of the combined application to simultaneously start and run each of the plurality of applications associated with the combined application. A display of an electronic device automatically displays an interface of each of the plurality of applications in a split-screen window form. Start speeds, color styles, and the like of the plurality of applications may be synchronized by default. The plurality of applications enable data sharing space.

In the foregoing process, the plurality of applications can be simultaneously started through one operation performed by the user, that is, tapping the icon of the combined application, to prevent the user from separately performing complex operations of starting each application and triggering split-screen display, thereby simplifying an operation procedure and shortening an operation time. In addition, in the method, a quantity of applications included in the plurality of applications is not limited, to meet a requirement for simultaneously using more applications by the user, thereby improving use experience of the user.

In addition, the method supports the user in customizing, according to different personal use requirements, the icon of the combined application and the interface display pattern of split-screen display after the plurality of applications associated with the combined application are simultaneously started. Therefore, after the plurality of applications are simultaneously started, a size, a layout, and the like of the split-screen window of each application displayed in split screen can better meet a display requirement of the user. In addition, a target interface expected by the user can be directly reached for each application, or only content of all or a part of a region of a target interface set by the user is displayed in each split-screen window, so that the user does not need to perform a plurality of tap operations to display the expected target interface, thereby simplifying an operation procedure and improving user experience.

In a possible implementation, when the user selects a plurality of applications to generate a new combined application, the plurality of applications included in the combined application may correspond to different sources. When the plurality of applications included in the combined application correspond to at least two different sources, different scenarios may correspond to different operation processes.

For example, based on the foregoing description, the plurality of applications included in the Combined app 1 may correspond to the plurality of possible sources listed in the window 803-1 shown in FIG. 8(*c*). For example, the plurality of applications included in the Combined app 1 may come from a local application on the mobile phone, and/or an application on a super terminal device of the mobile phone, and/or a distributed application that has been authorized by the user to establish a mutual trust relationship with the to-be-combined application on the mobile phone, and/or an application of a device that is of another user and that is found by the mobile phone in real time in a current scenario. This is not limited in this embodiment of this application.

In a possible learning scenario, the user may use the mobile phone to participate in online course learning and watch a learning video. In addition, the user expects to run the Notepad application on the mobile phone in split screen to take class notes. In addition, the user may further expect to display a WeChat chat list in split screen, to communicate with and interact with a classmate or a teacher about class content and the like by using the WeChat application.

It should be understood that, in this scenario, the user expects to simultaneously run an online course application, the Notepad application, and the WeChat application by using the mobile phone, display an interface of each application on the display of the mobile phone in a split-screen window manner, and simultaneously watch the learning video, take the class notes, and communicate with the classmate or the teacher. With reference to the learning scenario, the user may add the online course application, the Notepad application, and the WeChat application as applications of the "Combined app 1" by using the method provided in this embodiment of this application.

Figure 10A:
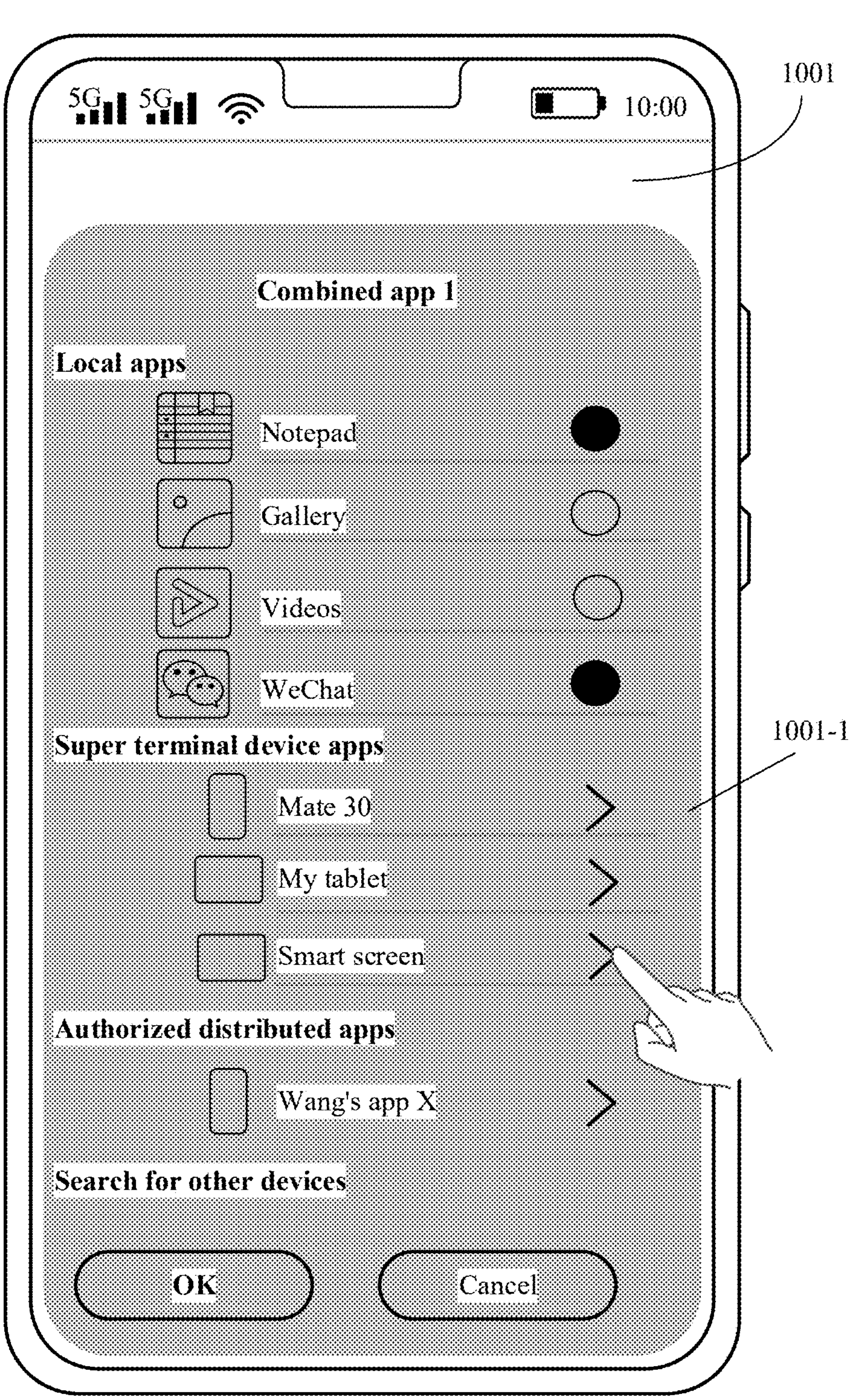
FIG. 10(*a*) and FIG. 10(*b*) are a schematic diagram of yet another example of a process in which a user combines a plurality of applications according to an embodiment of this application.
Figure 10B:
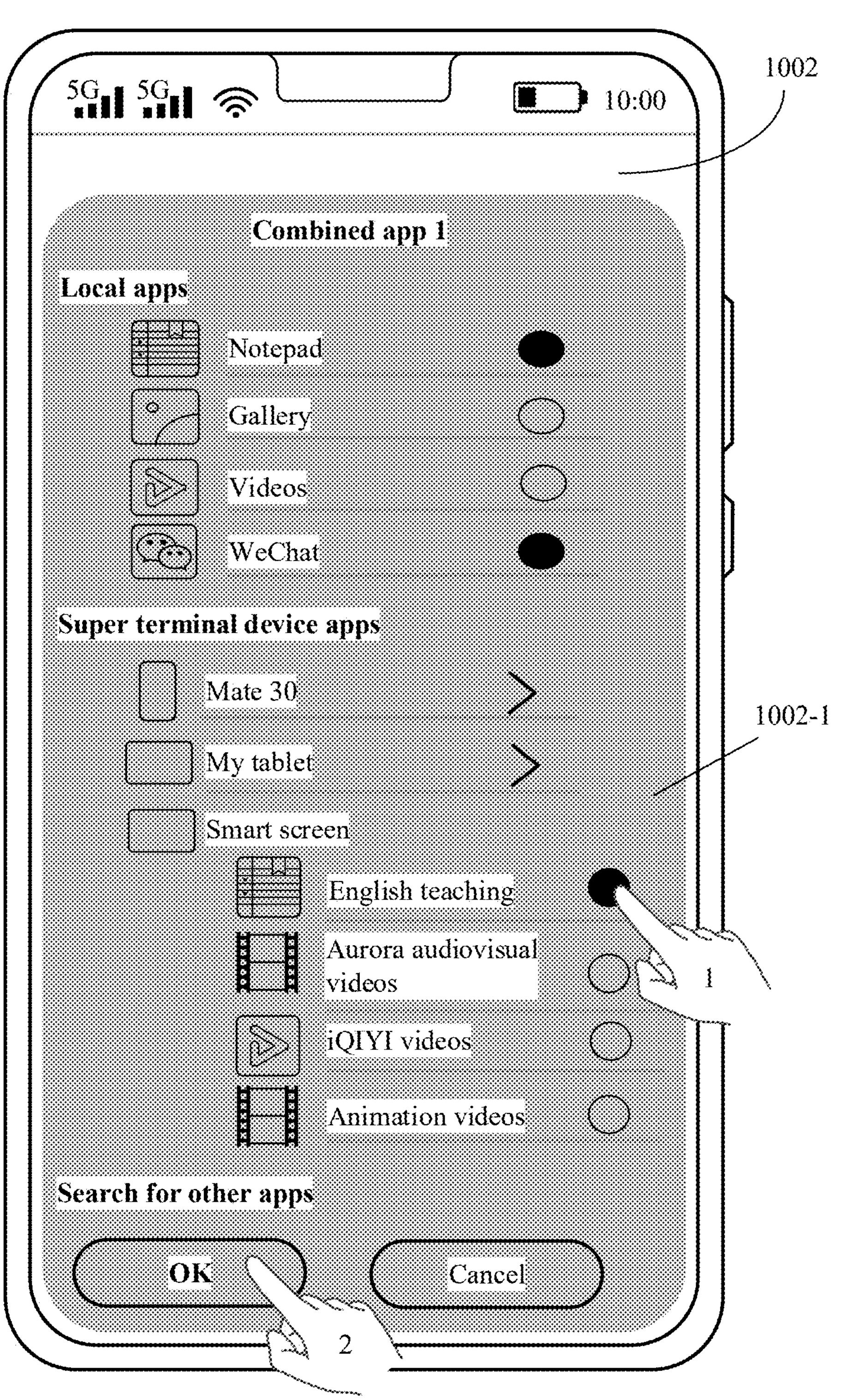

FIG. 10(*a*) and FIG. 10(*b*) are a schematic diagram of yet another example of a process in which a user combines a plurality of applications according to an embodiment of this application.

For example, it is assumed that the user triggers, based on the processes shown in FIG. 8(*a*) and FIG. 8(*b*), combination of a plurality of applications by using an operation process: "Add in the shortcut icon on the screen". When the user manually adds a plurality of applications to a Combined app 1, a screen 1001 shown in FIG. 10(*a*) may be displayed. A window 1001-1 is displayed on the screen 1001. A plurality of possible application sources and one or more possible applications in each application source category are displayed in the window 1001-1.

If an online course application is an application installed on a smart screen, and the Notepad application and the WeChat application are local applications on the mobile phone, the user may perform an operation shown in FIG. 10(*a*), select the Notepad application and the WeChat application in the "Local apps" category in the window 1001-1, and then tap the "Smart screen" option in the "Super terminal device apps" category.

It should be understood that the smart screen, as a device in a super terminal device group of the mobile phone, may be in a working state in which the smart screen is turned on and connected to a network, or in an off state or a non-working state in which the smart screen is not connected to a network. With reference to two different states of the smart screen, the following specifically describes a possible implementation process in which the user adds different applications to the Combined app 1.

State 1: The smart screen is in the working state in which the smart screen is turned on and connected to the network.

In a possible case, if the smart screen is in the working state in which the smart screen is turned on and connected to the network, the user selects the Notepad application and the WeChat application in the "Local apps" category in the window 1001-1, and then taps the "Smart screen" option in the "Super terminal device apps" category. In response to the operations of the user, the mobile phone may obtain one or more applications from the smart screen in the working state, and display a screen 1002 shown in FIG. 10(*b*). In the "Smart screen" option in the window 1002-1 on the screen 1002, applications on the smart screen are further displayed, for example, the English teaching application, the Aurora audiovisual videos application, the iQIYI videos application, and the Animation videos application. Types of and a quantity of applications on the smart screen are not limited in this embodiment of this application.

For example, the user may perform an operation 1 shown in FIG. 10(*b*) to select the English teaching application, and perform an operation 2 to tap an "OK" control. In response to the operations of the user, the mobile phone may obtain a "Combined app 1" through combining the local Notepad application, the local WeChat application, and the English teaching application on the smart screen. It should be understood that a preset icon of the "Combined app 1" may be automatically generated on a home screen of the mobile phone based on the foregoing related description. After the user taps the preset icon of the "Combined app 1", the Notepad application, the WeChat application, and the English teaching application are simultaneously started and then set, and an interface of each application is displayed in a split-screen window form. The user may set an interface display pattern of the "Combined app 1". For brevity, refer to the foregoing related description. Details are not described herein again.

State 2: The smart screen is in the off state or the non-working state in which the smart screen is not connected to the network.

In another possible case, the smart screen may be in the off state or the non-working state in which the smart screen is not connected to the network.

Figure 11A:
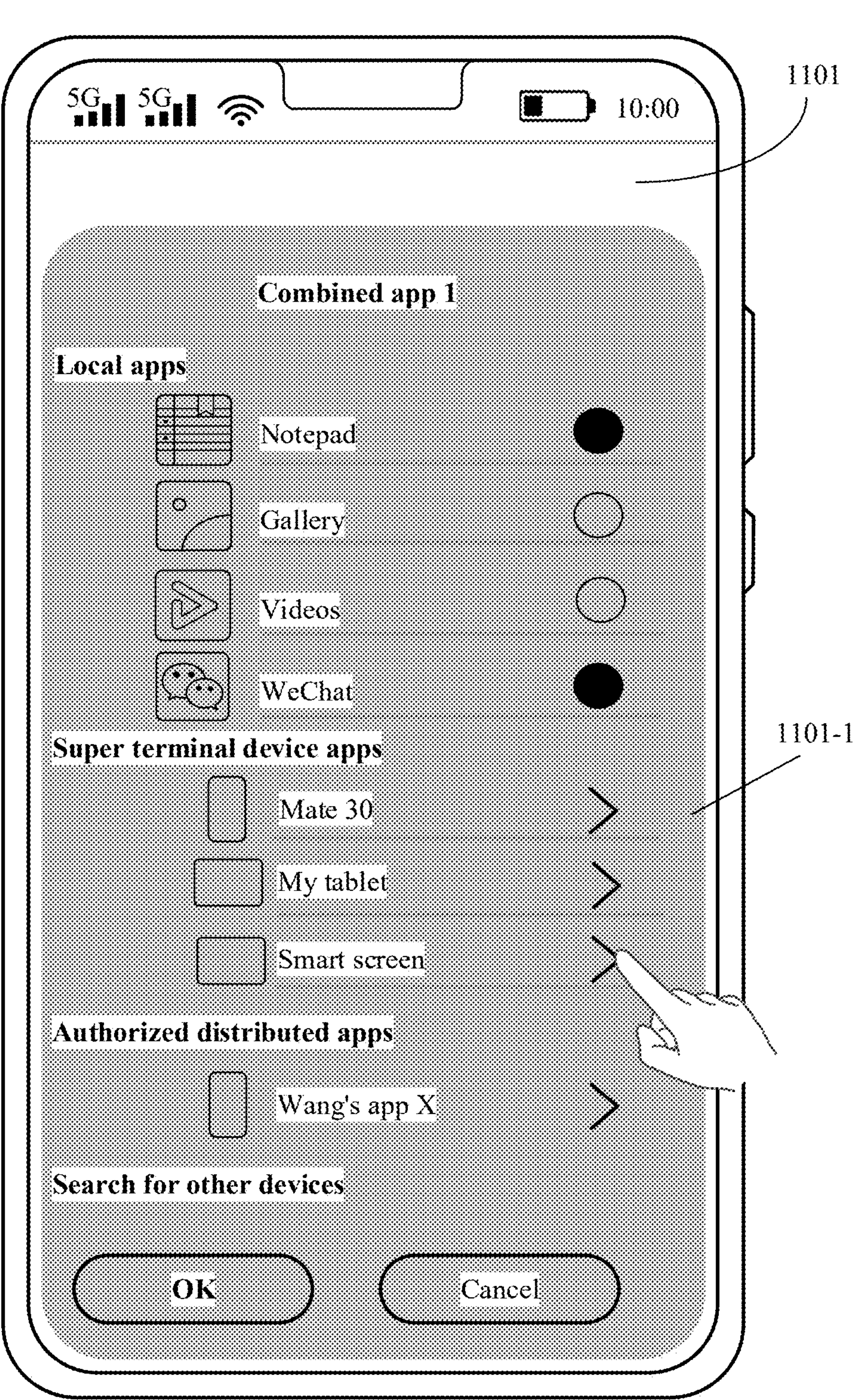
FIG. 11(*a*), FIG. 11(*b*), and FIG. 11(*c*) are a schematic diagram of still yet another example of a process in which a user combines a plurality of applications according to an embodiment of this application.
Figure 11B:
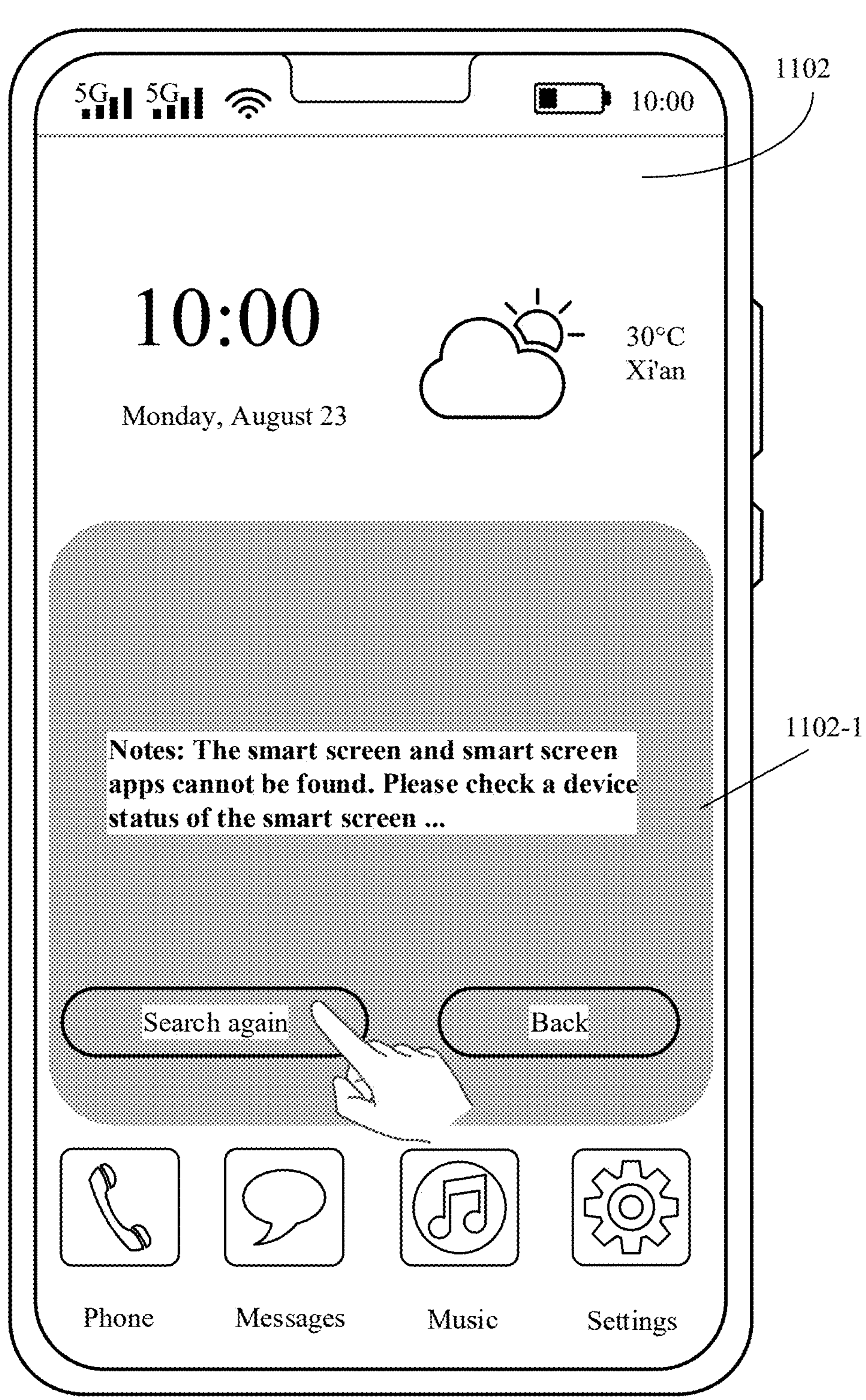
Figure 11C:
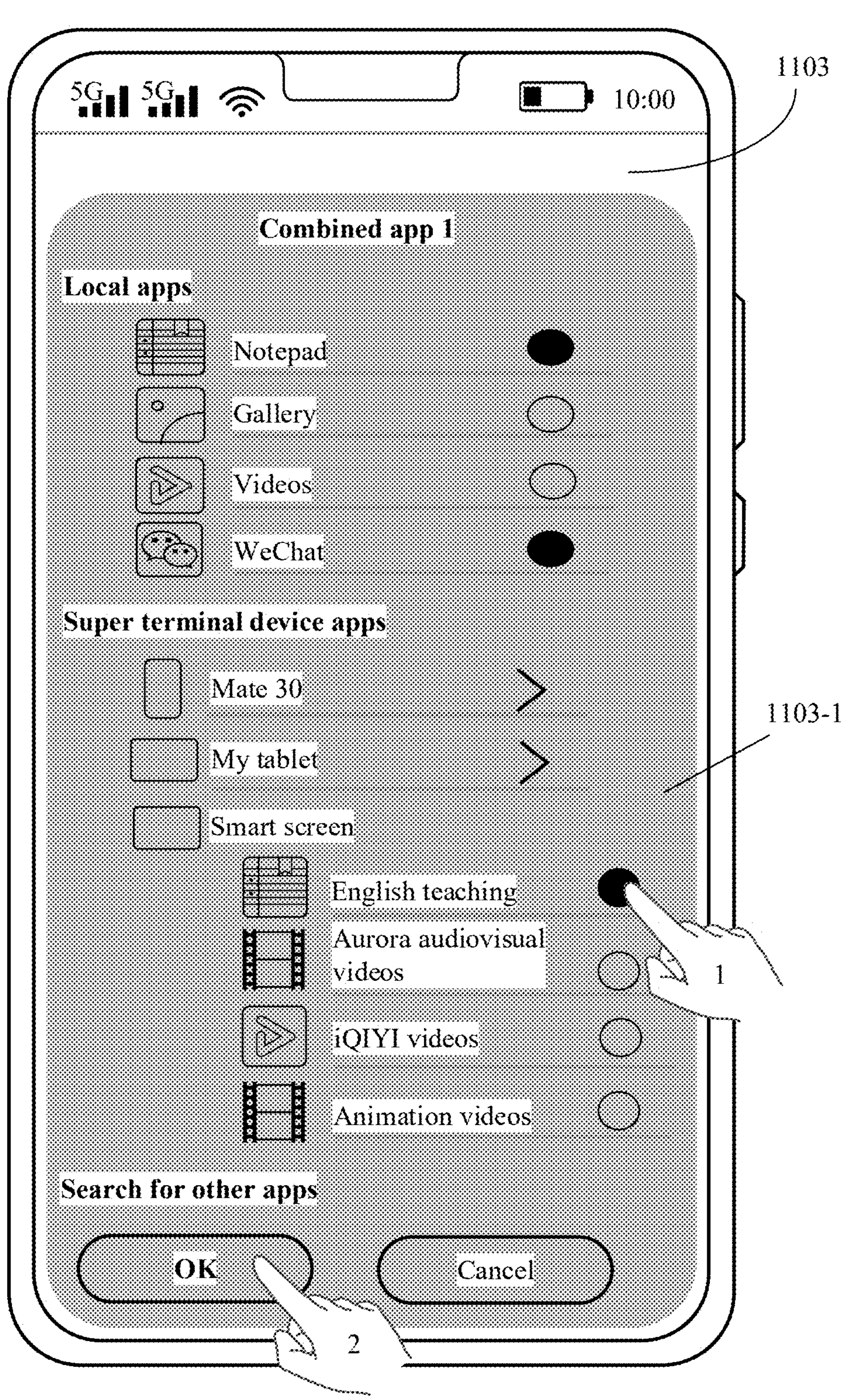
Figure 12A:
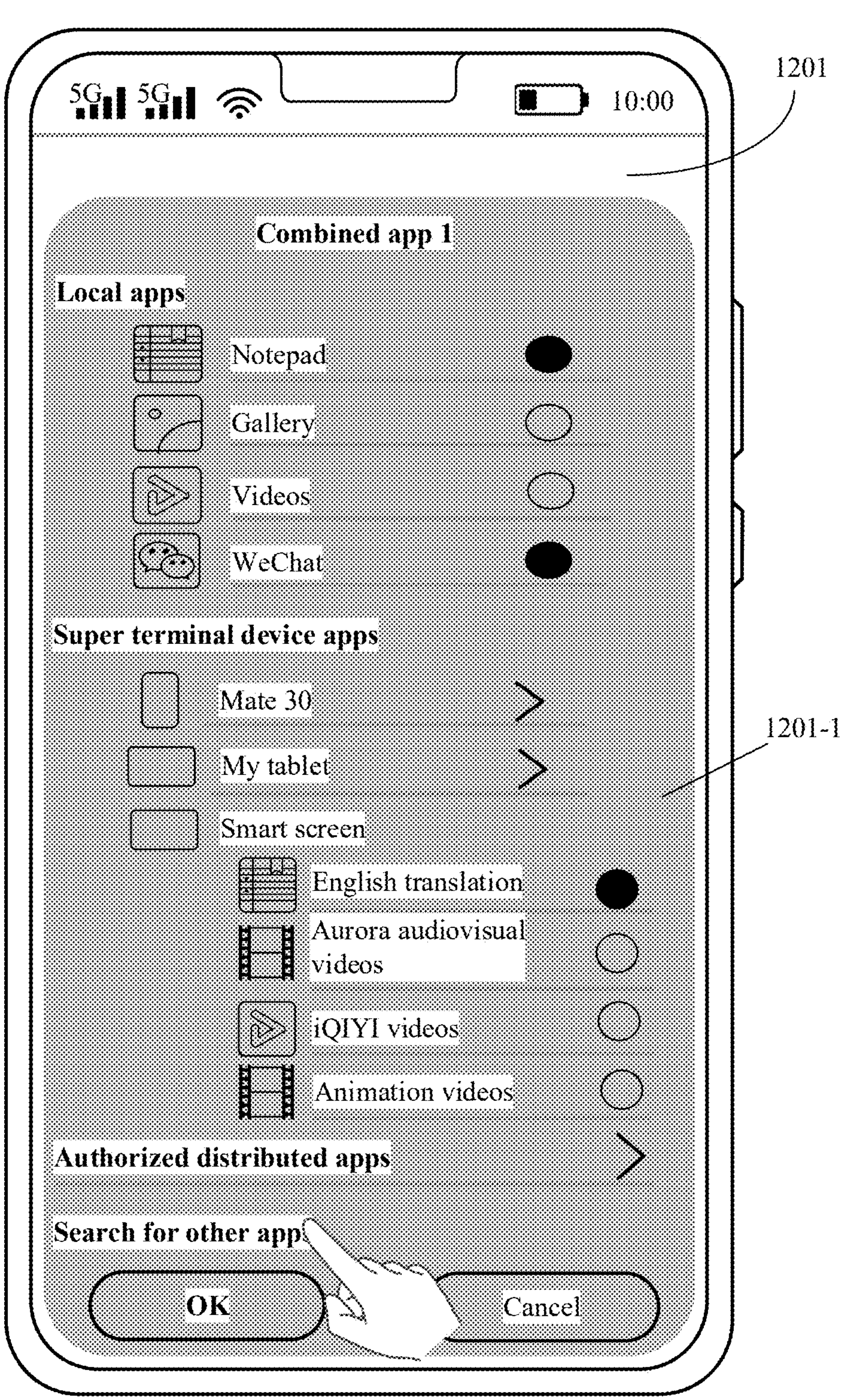
FIG. 12(*a*), FIG. 12(*b*), FIG. 12(*c*), and FIG. 12(*d*) are a schematic diagram of a further example of a process in which a user combines a plurality of applications according to an embodiment of this application.
Figure 12B:
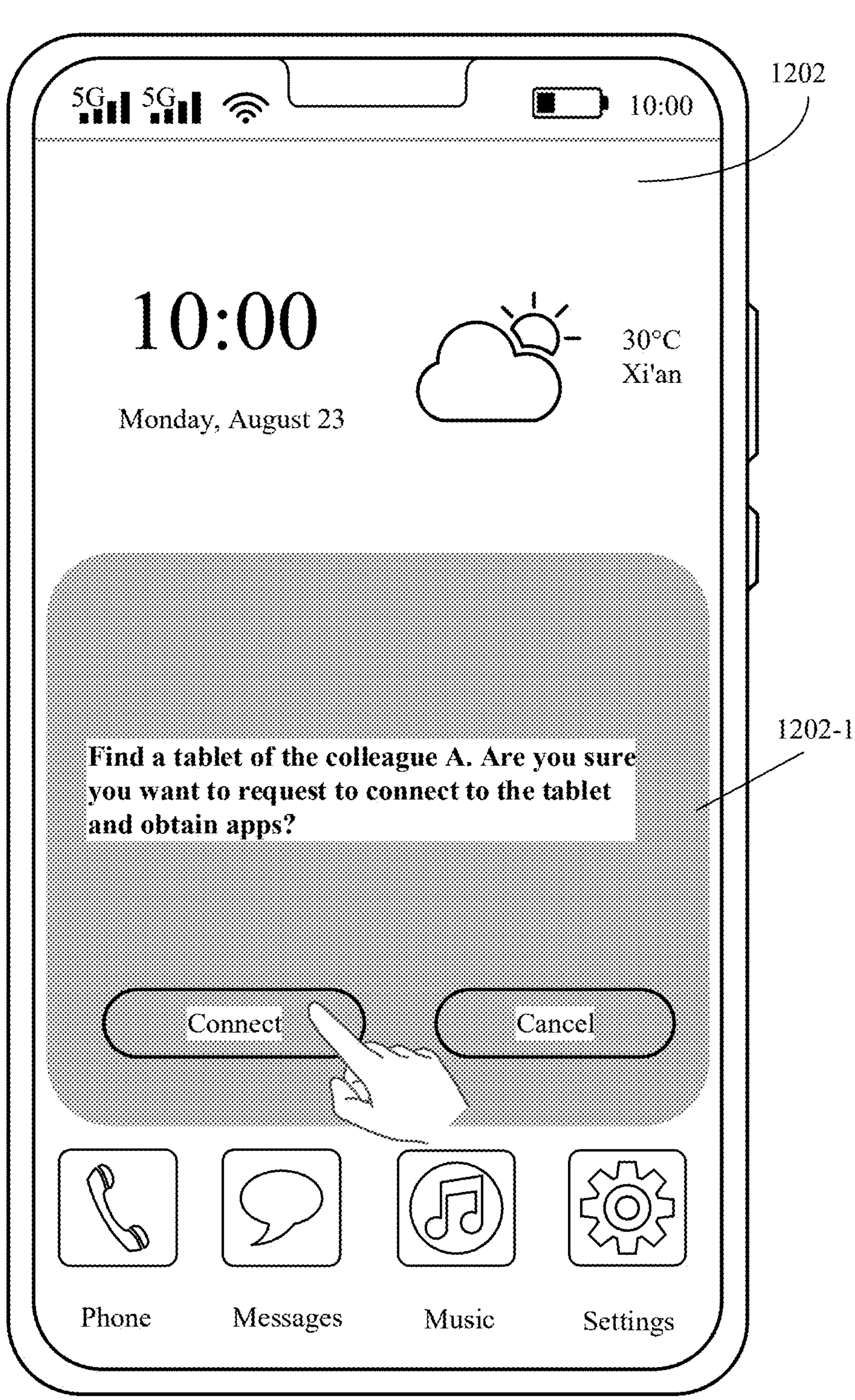
Figure 12C:
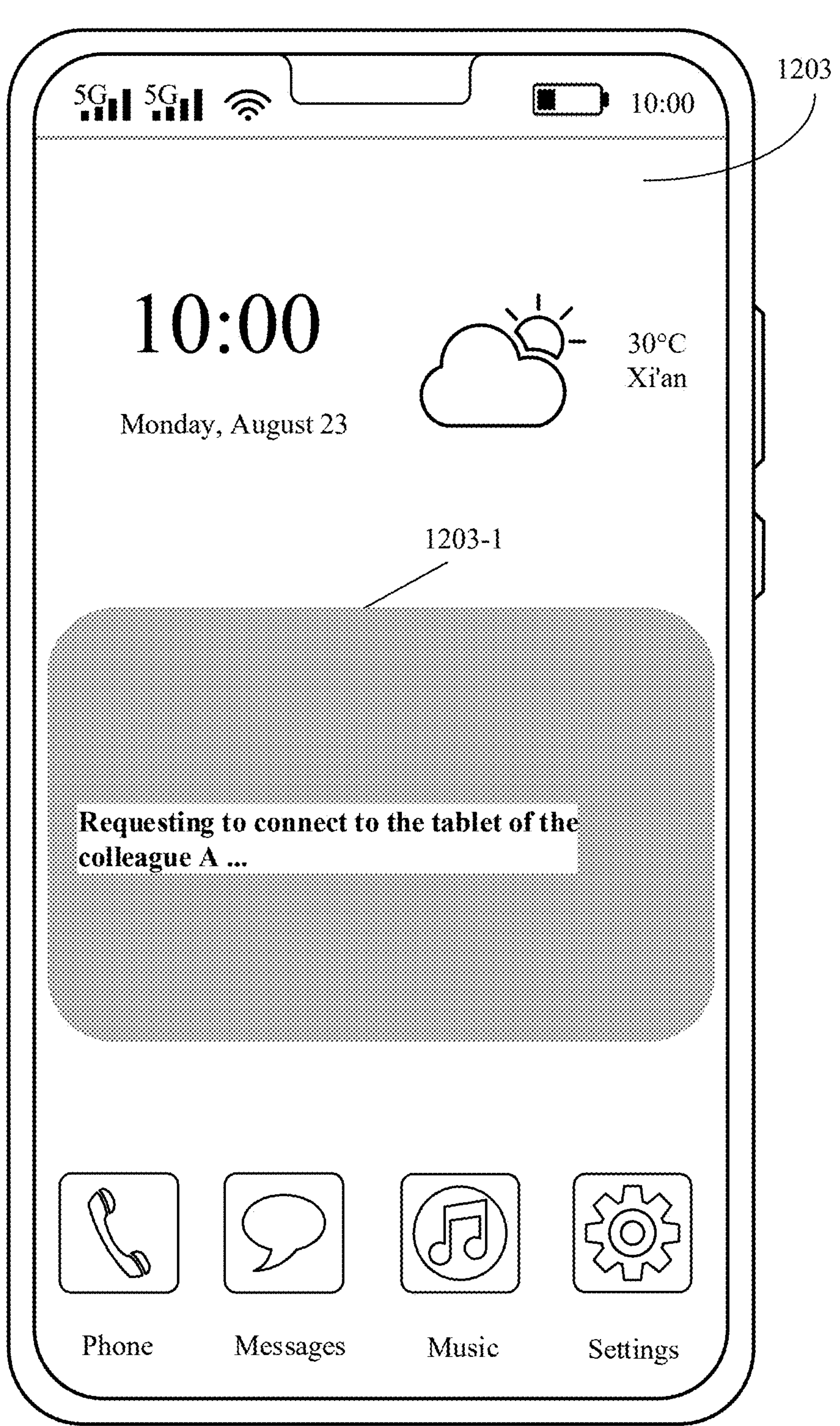
Figure 12D:
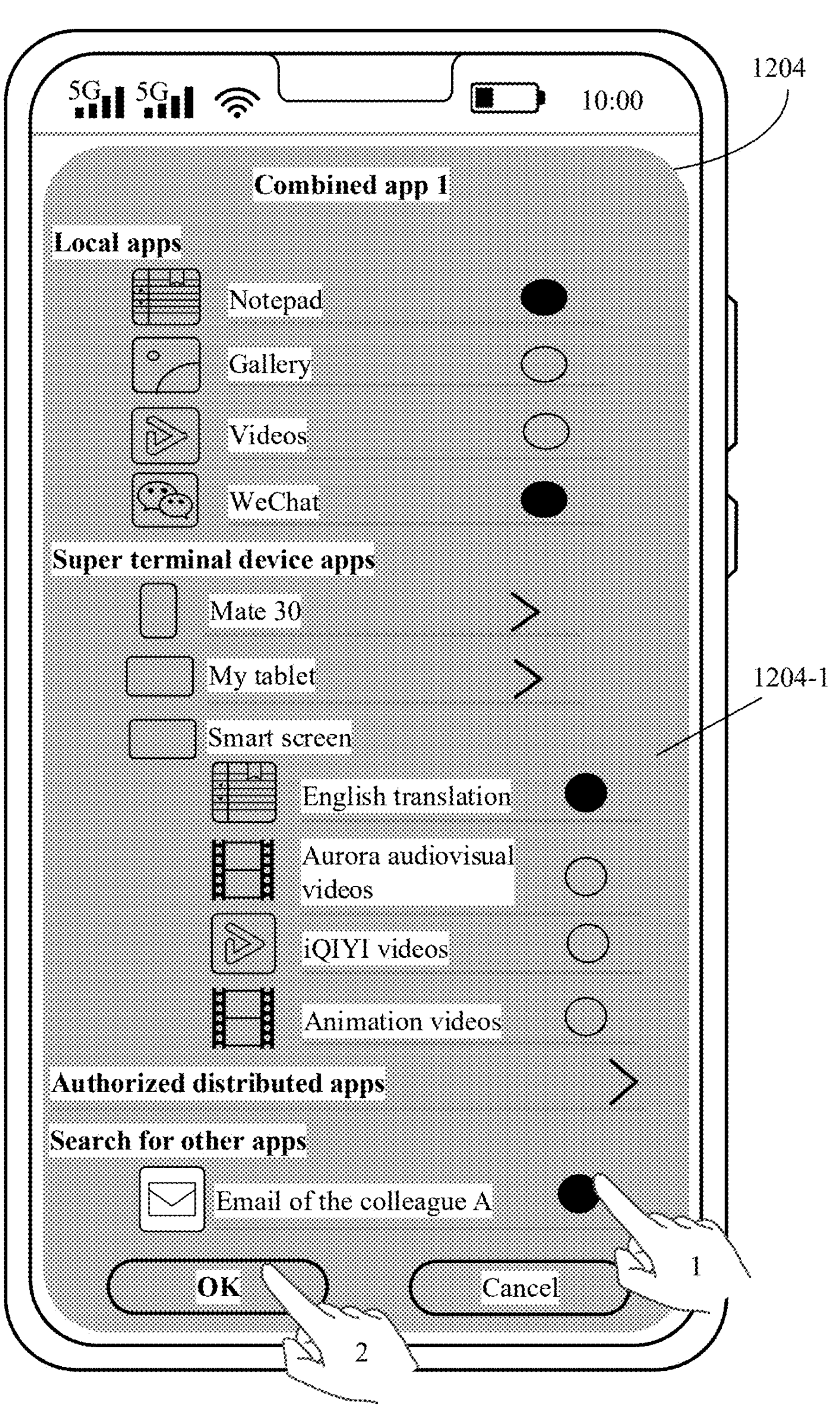

FIG. 11(*a*), FIG. 11(*b*), and FIG. 11(*c*) are a schematic diagram of still yet another example of a process in which a user combines a plurality of applications according to an embodiment of this application.

On a screen 1101 shown in FIG. 11(*a*), the user selects the Notepad application and the WeChat application in the "Local apps" category in a window 1101-1, and then taps the "Smart screen" option in the "Super terminal device apps" category. In response to the operations of the user, the mobile phone cannot detect a smart screen, and displays a screen 1102 shown in FIG. 11(*b*). A prompt window 1102-1 is displayed on the screen 1102, and is used to remind the user that "The smart screen and smart screen apps cannot be found. Please check a device status of the smart screen . . . ". In addition, the prompt window 1102-1 further includes a "Search again" control and a "Back" control.

In a possible implementation, when the user finds, based on the prompt information in the prompt window 1102-1, that the mobile phone cannot detect the smart screen and the smart screen applications, the user may check a working status, a network connection status, and the like of the smart screen as soon as possible. If the user restores the smart screen to a working state in which the smart screen is turned on and connected to a network, the user may perform an operation shown in FIG. 11(*b*) to tap the "Search again" control, and the mobile phone starts to request again to obtain one or more applications on the smart screen.

For example, after obtaining the one or more applications on the smart screen, the mobile phone may further display a screen 1103 shown in FIG. 11(*c*), and display the one or more applications on the smart screen in the "Smart screen" option in the window 1103-1. The user may sequentially perform an operation 1 and an operation 2 shown in FIG. 11(*c*) to select the English teaching application and tap an "OK" control. In response to the operations of the user, the mobile phone may obtain a "Combined app 1" through combining the local Notepad application, the local WeChat application, and the English teaching application on the smart screen. Details are not described herein.

In another possible implementation, when the user finds, based on the prompt information in the prompt window 1102-1, that the mobile phone cannot detect the smart screen and the smart screen applications, the user may select, from a device management module of the mobile phone, a virtual device model of a device bound to a user account. When the user selects the smart screen from a plurality of devices bound to a user account, the device management module of the mobile phone may automatically load the device model of the corresponding smart screen from a cloud or a local cache, to obtain software and hardware parameter information of the smart screen.

For example, when the user sees the prompt information in the prompt window 1102-1, the user may view all devices bound to the user account according to a [Settings-Huawei ID-Account center-Login device management] path, and tap "Smart screen" from the plurality of devices, to view the device model corresponding to the smart screen. In Table 1, a possible device model and an information type that may be included in the device model are listed.

TABLE 1

| Device model | | | | | |
|---|---|---|---|---|---|
| Device ID | Device type | Connect | Phy data | Soft data | Model |
| Device ID | Device type | Connection type | Hardware parameter information | Software parameter information | Model data (2D/3D) |

Optionally, as shown in Table 1, the device model may include a plurality of types of parameter information related to the smart screen. For example, the parameter information of the device model may include a device identifier (Identification, ID), a device type (device model), a connection type (for example, a Bluetooth connection), hardware parameter information, software parameter information, model data, and the like of the smart screen; and may further include one or more types of information such as login time, logout time, and cloud backup in a working process of the smart screen. This is not limited in this embodiment of this application.

For example, one or more types of information such as the device type, the device ID, and the device model may be collectively referred to as "device information".

The "hardware parameter information" may include one or more types of information about parameters of a hardware device: a size, a resolution, a pixel pitch, a scanning frequency, a refresh speed, power consumption, and electromagnetic radiation of a display of a device; power, a sound pressure level, and a total quality factor of a loudspeaker; and the like.

The "software parameter information" may include a software system version, a quantity of installed applications, an application type, an application use status, and the like of a device. The hardware parameter information and software parameter information can be used to determine capabilities supported by the device.

It should be further understood that, in this embodiment of this application, the mobile phone may obtain, based on the "software parameter information" of the smart screen in the information about the device model, information such as a quantity of applications installed on the smart screen, an application type, and an application use status. Details are not described in this embodiment of this application.

Optionally, if the mobile phone locally caches the device model corresponding to the smart screen, the mobile phone may obtain an application on the smart screen based on the device model corresponding to the smart screen; or if the mobile phone does not locally cache the device model corresponding to the smart screen, the device management module of the mobile phone may automatically request to load the device model corresponding to the smart screen from a cloud server. Based on the obtained device model corresponding to the smart screen, the mobile phone may be locally mapped to a corresponding virtual device model in a virtual device execution environment. If the user subsequently taps an icon of the Combined app 1 to simultaneously start a plurality of applications, the application from the smart screen may be run in the virtual device execution environment, and be displayed on a display of the mobile phone in split screen. In this way, use of the user is not affected. This is not limited in this embodiment of this application.

After the mobile phone obtains the one or more applications on the smart screen based on the device model corresponding to the smart screen, the user returns to an application combination process, and the mobile phone may further display the screen 1103 shown in FIG. 11(*c*), and display the one or more applications on the smart screen in the "Smart screen" option in the window 1103-1. Details are not described herein.

It should be understood that, for a process of adding "Authorized distributed apps" in this embodiment of this application, reference may be made to a process of adding "Super terminal device apps". Regardless whether an application included in the "Authorized distributed apps" category comes from a trusted device of the mobile phone or another device not in a trust relationship, the application and a local application selected by the user on the mobile phone are mutually trusted. Therefore, the application may also participate in an application combination process. For brevity, details are not described herein.

According to the foregoing method, the user may not only combine a plurality of local applications to generate a new combined application, but also combine a local application and applications from a super terminal device and another trusted device in a home device group. By using a data sharing capability between mutually trusted devices, the user can use an application on another device by using a portable personal device such as the mobile phone, thereby reducing a quantity of applications installed on the mobile phone and saving storage space of the mobile phone.

In addition, regardless of whether another trusted device is in a working state in which the trusted device is turned on and connected to a network, or is in an off state or in a non-working state in which the trusted device is not connected to a network, the mobile phone can obtain an application on the trusted device, to meet a requirement of the user for simultaneously using a plurality of applications. For example, in the foregoing described learning scenario, the user may separately use each application in a split-screen window of the mobile phone, to simultaneously watch the learning video, take the class notes, and communicate with the classmate or the teacher, thereby improving user experience.

In another possible working scenario, during a meeting, the user may use the mobile phone to view a work schedule in the Notepad application. In addition, the user expects to display a WeChat chat list in split screen and communicate with a colleague or a customer about a work progress by using the WeChat application. In addition, the user further expects to use an English translation application on a smart screen in a conference room and view an email of a colleague A.

It should be understood that, in this scenario, the user expects to simultaneously run the local Notepad application, the local WeChat application, the English translation application on the smart screen, and an email application of the colleague A on the display of the mobile phone in a split-screen window manner by using the mobile phone. With reference to the working scenario, the user may add the local Notepad application, the local WeChat application, the English translation application on the smart screen, and the email application of the colleague A as applications of the “Combined app 1” by using the method provided in this embodiment of this application. Specifically, for a process of adding the local Notepad application, the local WeChat application, and the English translation application on the smart screen, refer to the foregoing description. Herein, a process in which the user continues to add another found application that is not in a mutual trust relationship is mainly described.

FIG. 12(*a*), FIG. 12(*b*), FIG. 12(*c*), and FIG. 12(*d*) are a schematic diagram of a further example of a process in which a user combines a plurality of applications according to an embodiment of this application.

For example, on a screen 1201 shown in FIG. 12(*a*), it is assumed that the user has selected the Notepad application and the WeChat application in a “Local apps” category in a window 1201-1 based on the foregoing described process, and further selects an English translation application on the “smart screen” in a “Super terminal device apps” category. Next, the user further needs to find an email application of a colleague A, and add the email application of the colleague A to a Combined app 1.

Optionally, the email application of the colleague A may be installed on any possible electronic device of the colleague A, such as a mobile phone, a tablet, a PC, or a smart screen, and a target device on which the email application is installed is a near-field device that can be found by the mobile phone. For example, a mobile phone of the user and the target device that is of the colleague A and on which the email application is installed may be devices connected to the same Wi-Fi network, and the two devices may communicate with each other based on a Wi-Fi link; or a Bluetooth connection may be established between the two devices, and the two devices may communicate with each other based on a Bluetooth channel; or a connection may be established between the two devices based on an NFC technology such as a touch; or a connection may be established between the two devices based on an infrared technology (infrared, IR) and a wireless communication manner such as 2G/3G/4G/5G/6G. Correspondingly, for any one of the foregoing listed cases, the mobile phone can find the target device. This is not limited in this embodiment of this application.

For example, the user may perform an operation shown in FIG. 12(*a*) to tap a “Search for other apps” option in the window 1201-1. In response to the operation of the user, the mobile phone displays a screen 1202 shown in FIG. 12(*b*). A prompt window 1202-1 on the screen 1202 includes prompt information: Find the tablet of the colleague A. Are you sure you want to request to connect to the tablet and obtain the application? The user may perform an operation shown in FIG. 12(*b*) to tap a “Connect” control in the prompt window 1202-1. In response to the operation of the user, the mobile phone displays a screen 1203 shown in FIG. 12(*c*). Prompt information is displayed in a window 1203-1 on the screen 1203: Requesting to connect to the tablet of the colleague A . . . .

Correspondingly, in response to an operation of tapping the “Connect” control in the prompt window 1202-1 by the user, the mobile phone of the user sends a connection request to the tablet of the colleague A. When the tablet of the colleague A receives the connection request sent by the mobile phone of the user, the colleague A may choose whether to allow the connection, and perform operations, for example, set corresponding application permission.

Figure 13:
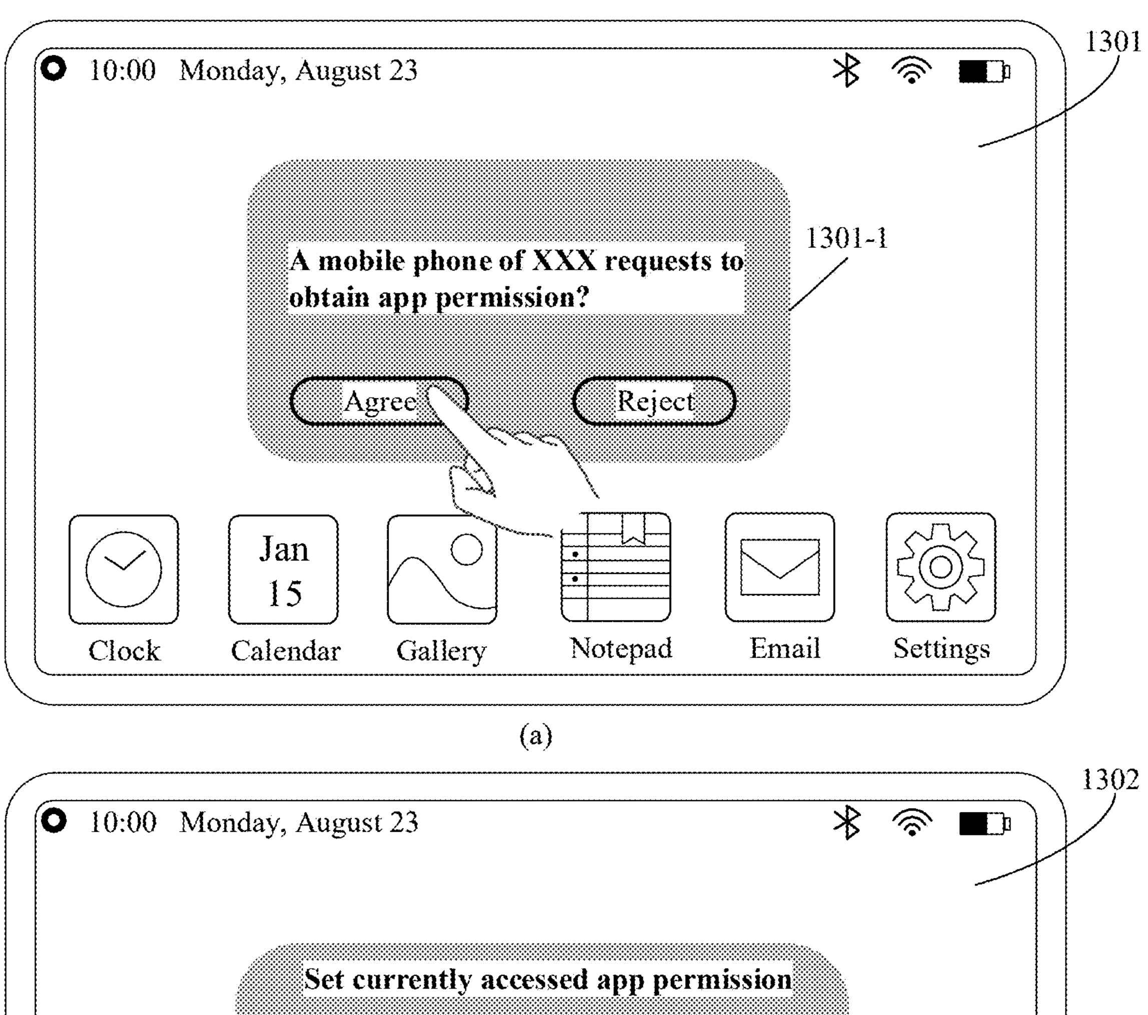
FIG. 13 is a schematic diagram of an example of a process in which a colleague A receives a connection request on a tablet according to an embodiment of this application.
Figure 14A:
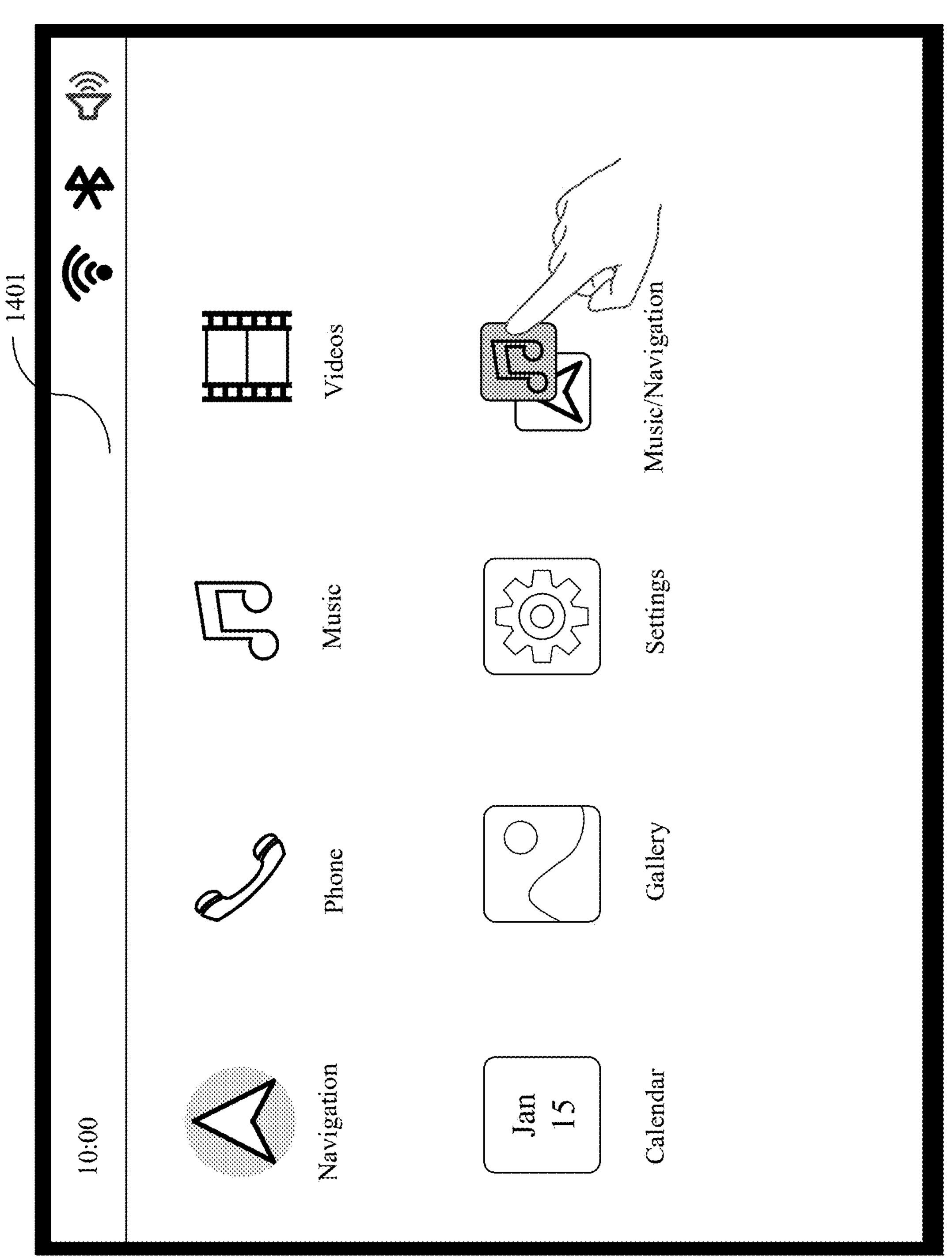
FIG. 14(*a*), FIG. 14(*b*), FIG. 14(*c*), and FIG. 14(*d*) are a schematic diagram of an example in which a user uses a combined application on a vehicle-mounted device according to an embodiment of this application.
Figure 14B:
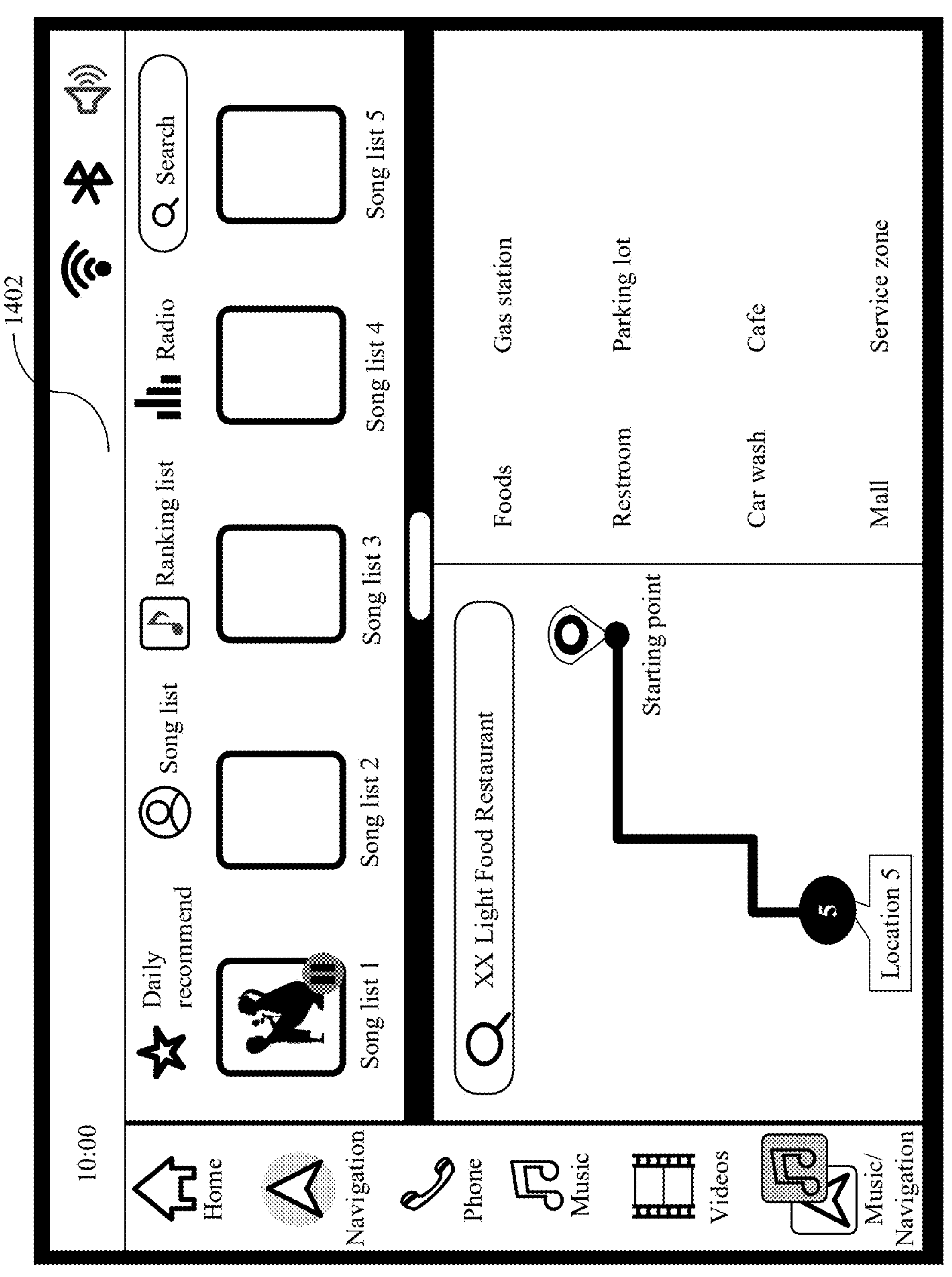
Figure 14C:
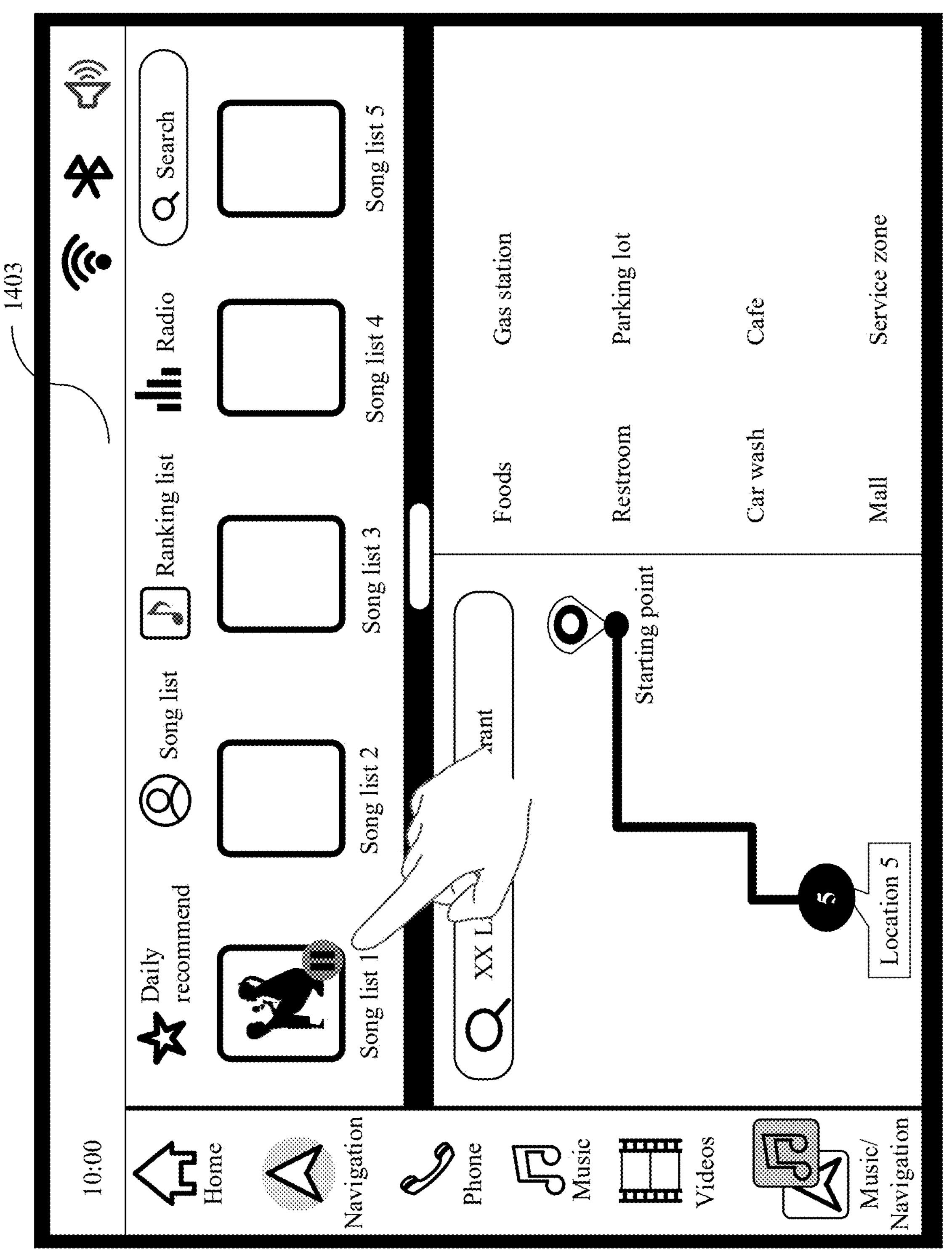
Figure 14D:
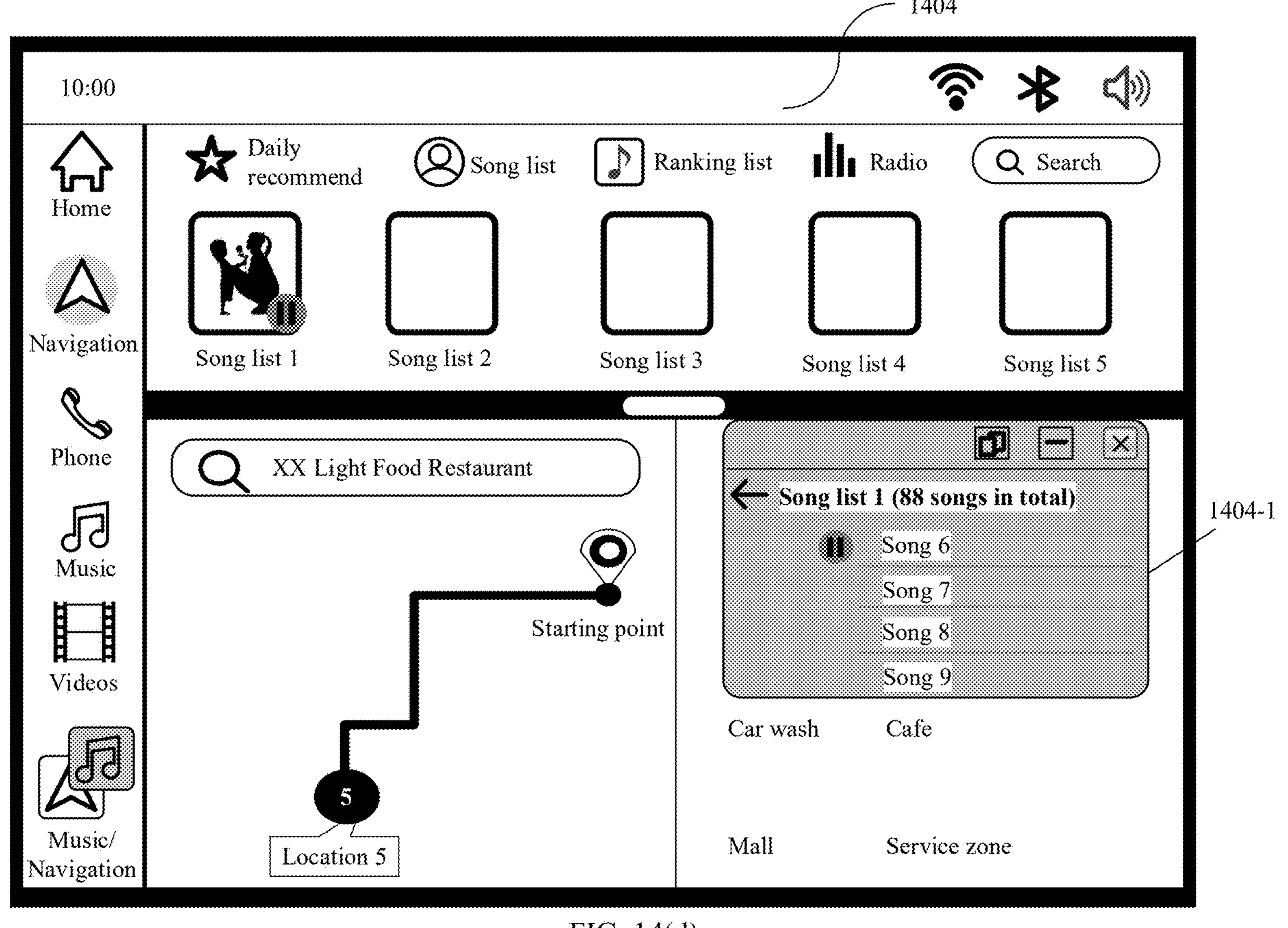
Figure 15A:
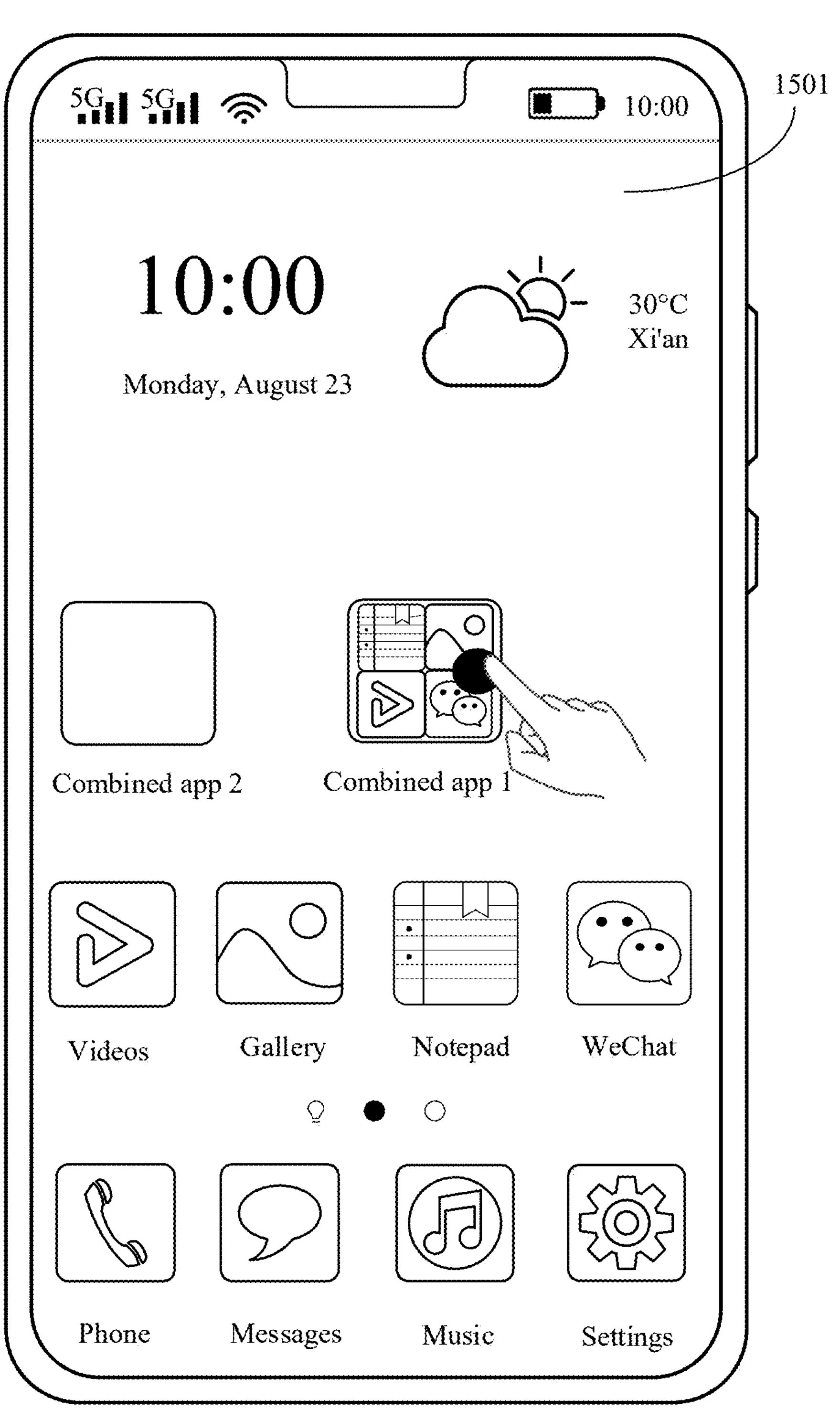
FIG. 15(*a*), FIG. 15(*b*), FIG. 15(*c*), FIG. 15(*d*), and FIG. 15(*e*) are a schematic diagram of another example in which a user uses a combined application according to an embodiment of this application.
Figure 15B:
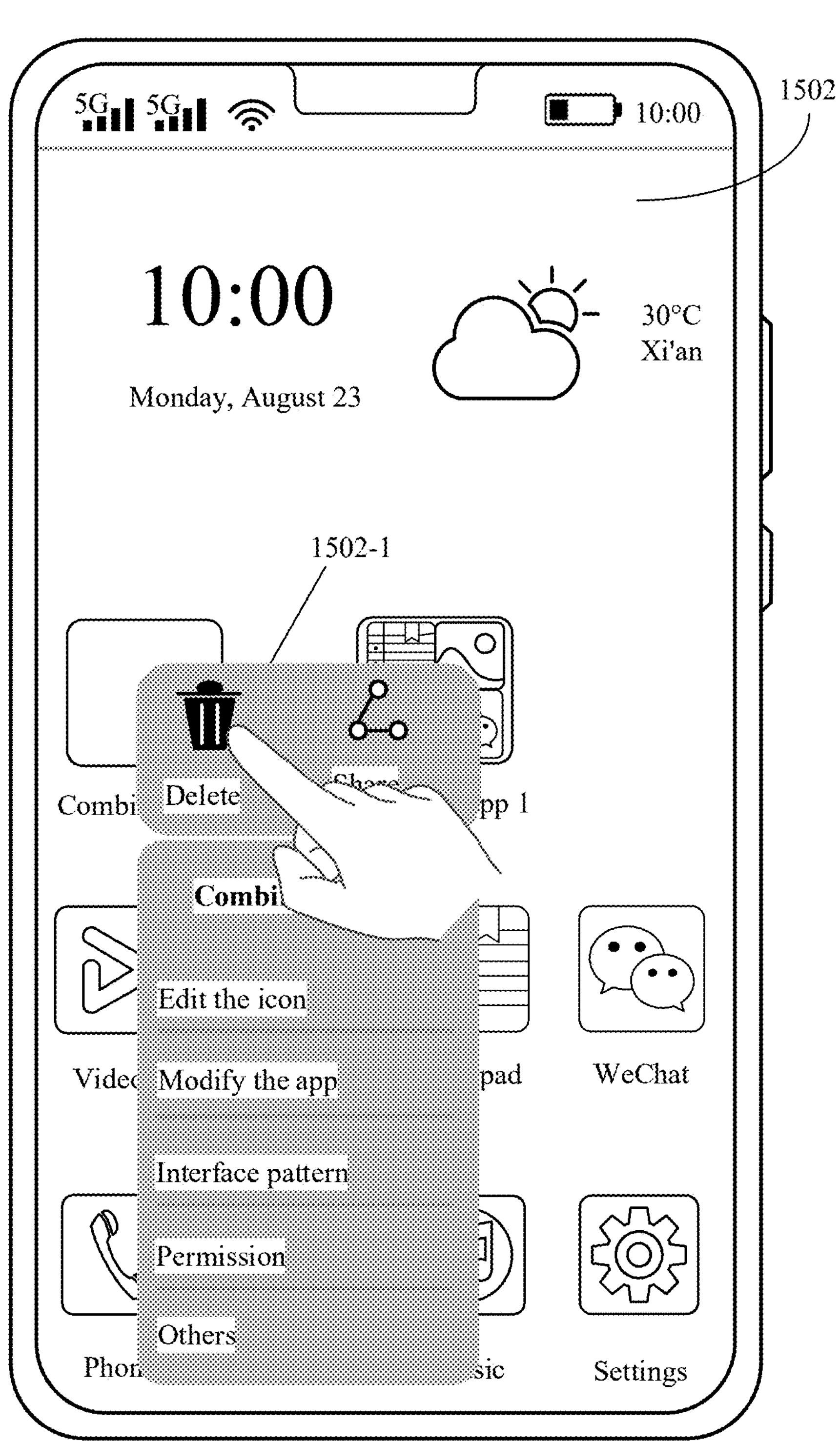
Figure 15C:
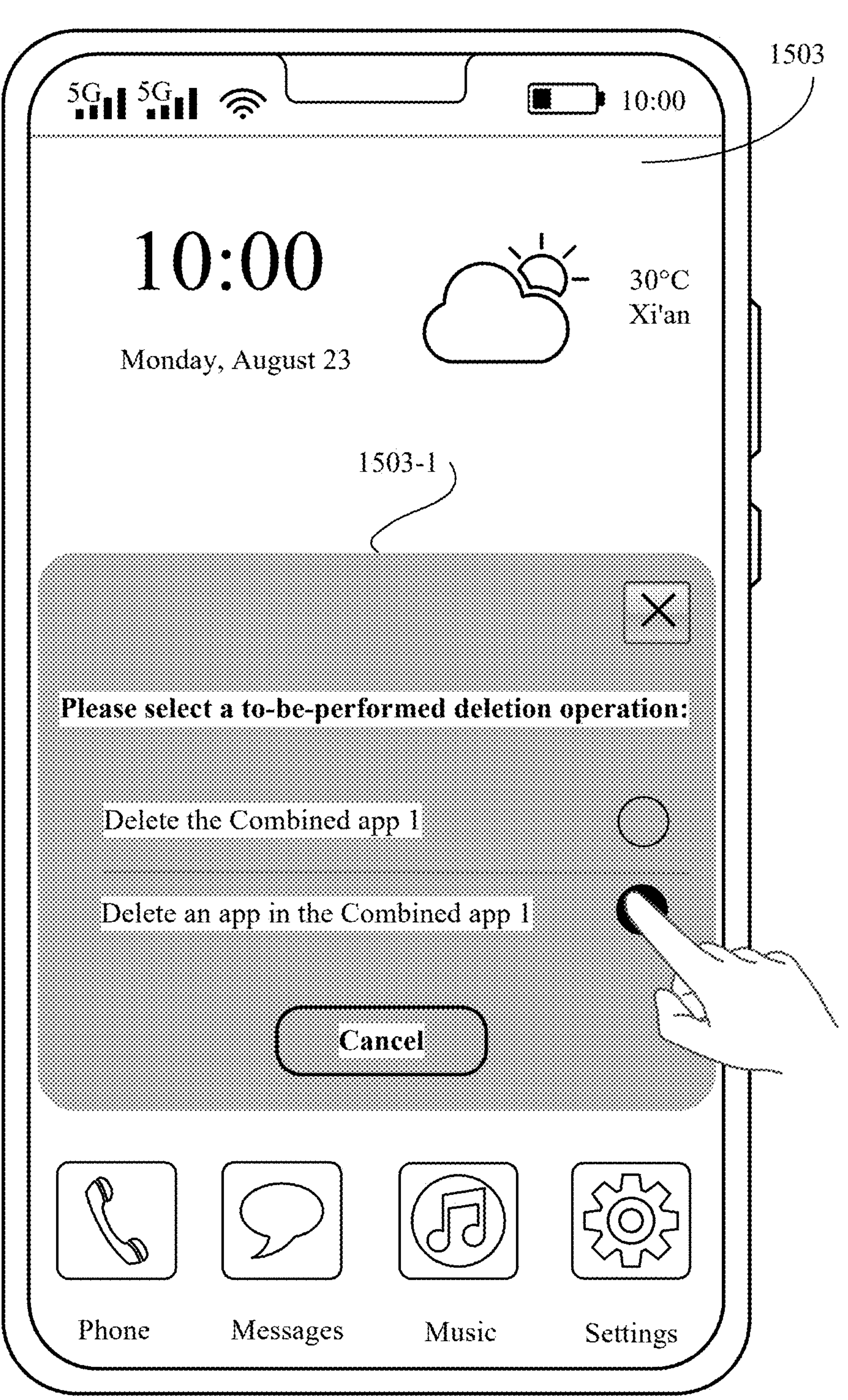
Figure 15D:
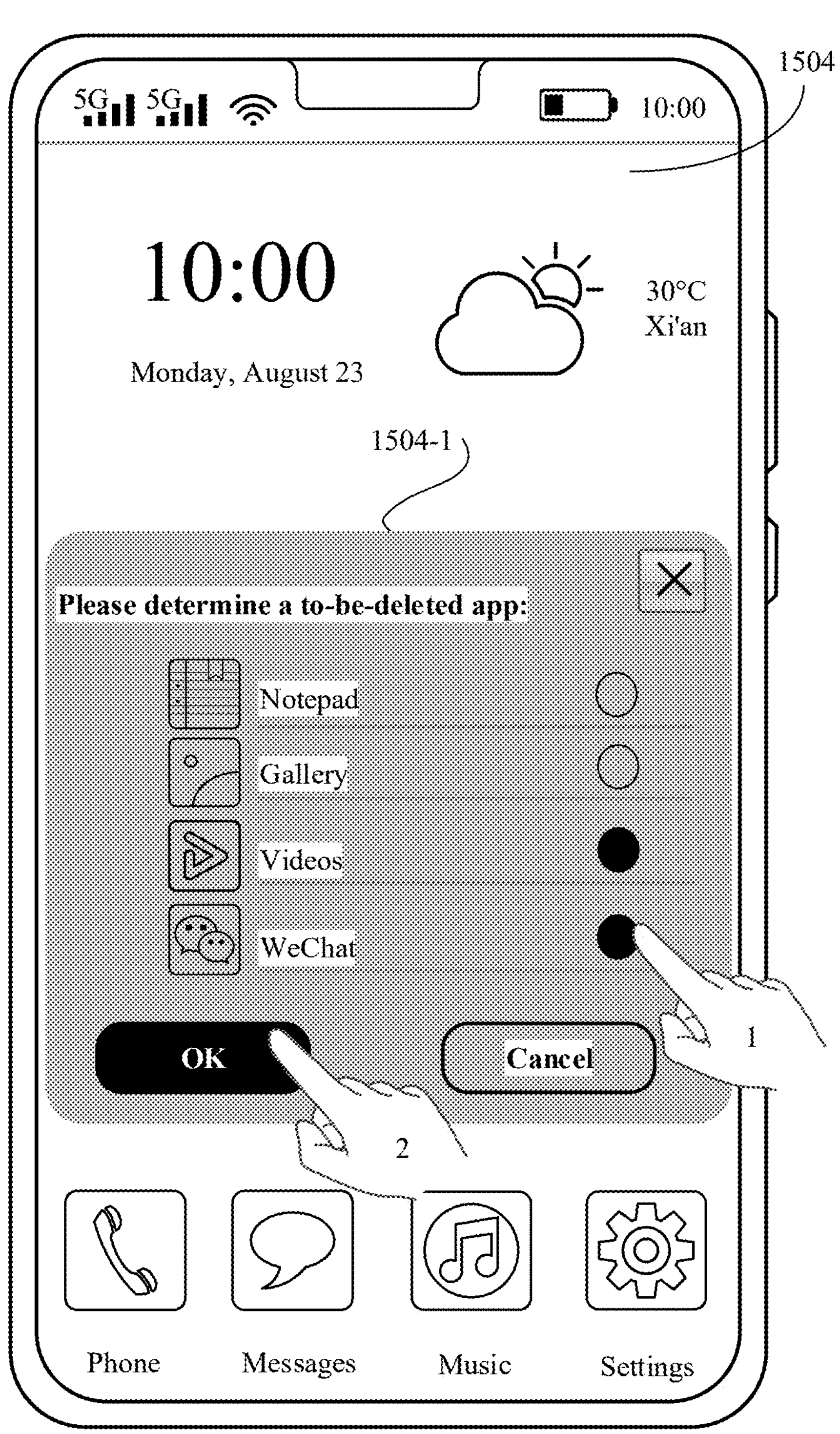
Figure 15E:
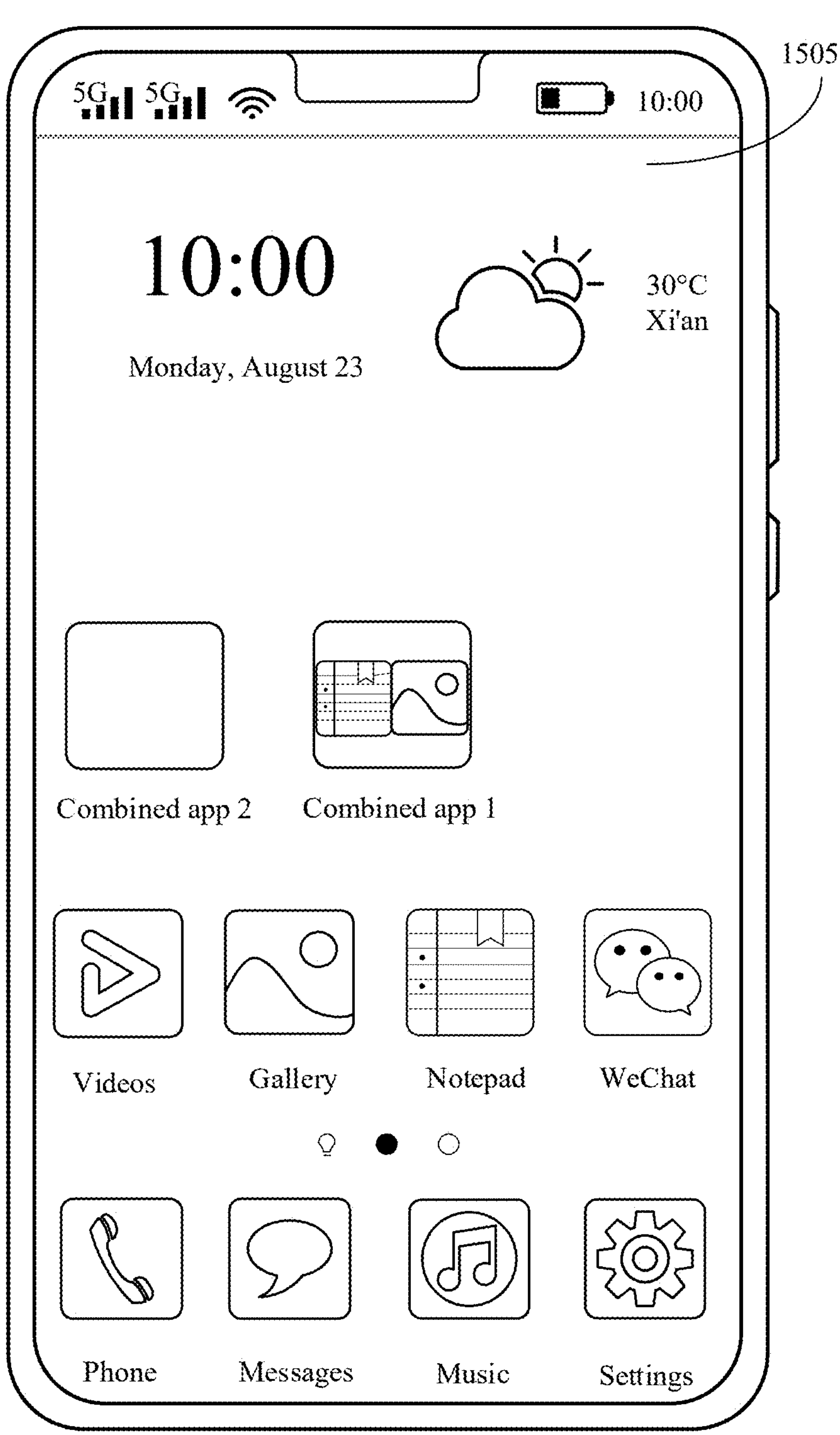
Figure 16A:
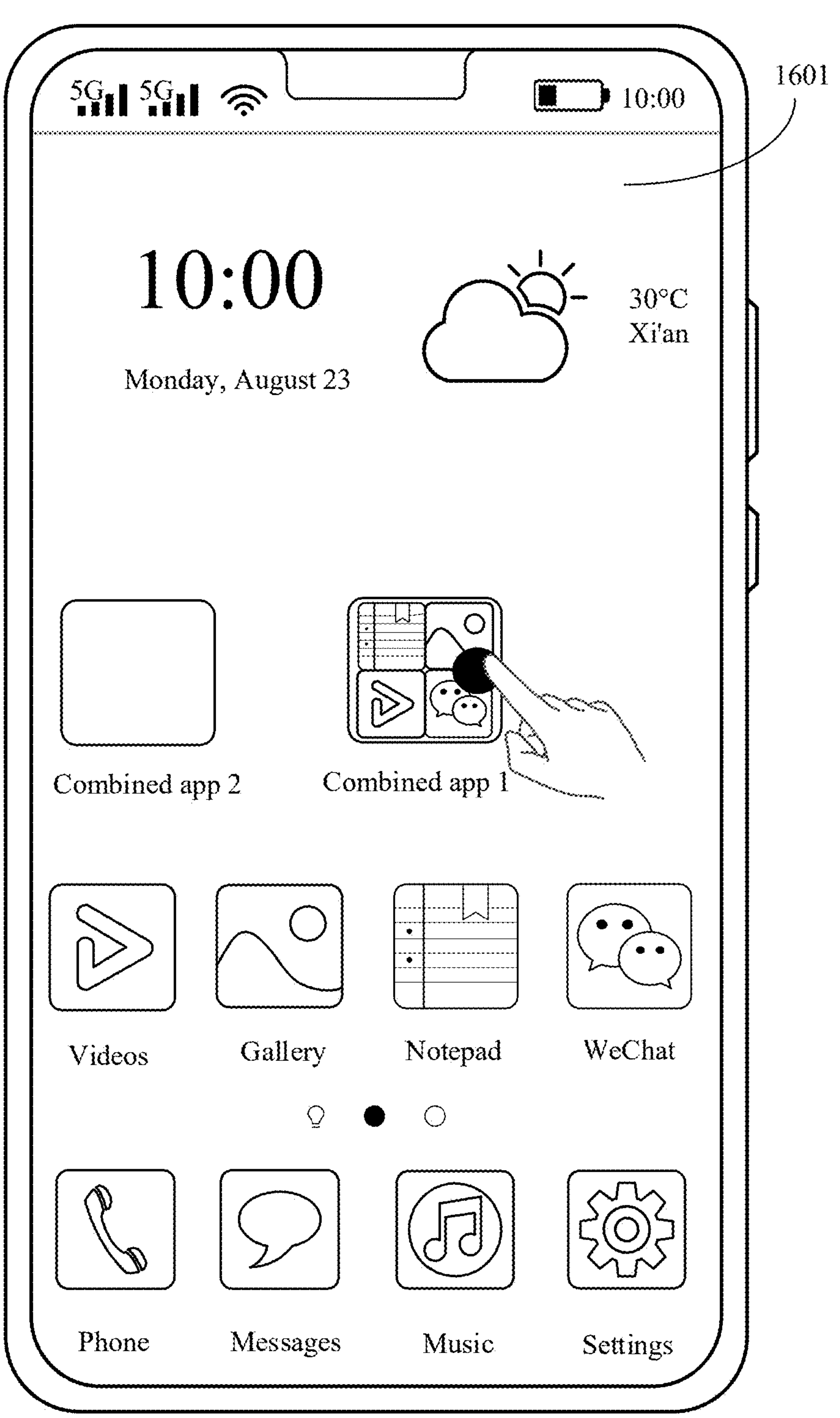
FIG. 16(*a*), FIG. 16(*b*), FIG. 16(*c*), and FIG. 16(*d*) are a schematic diagram of still another example in which a user uses a combined application according to an embodiment of this application.
Figure 16B:
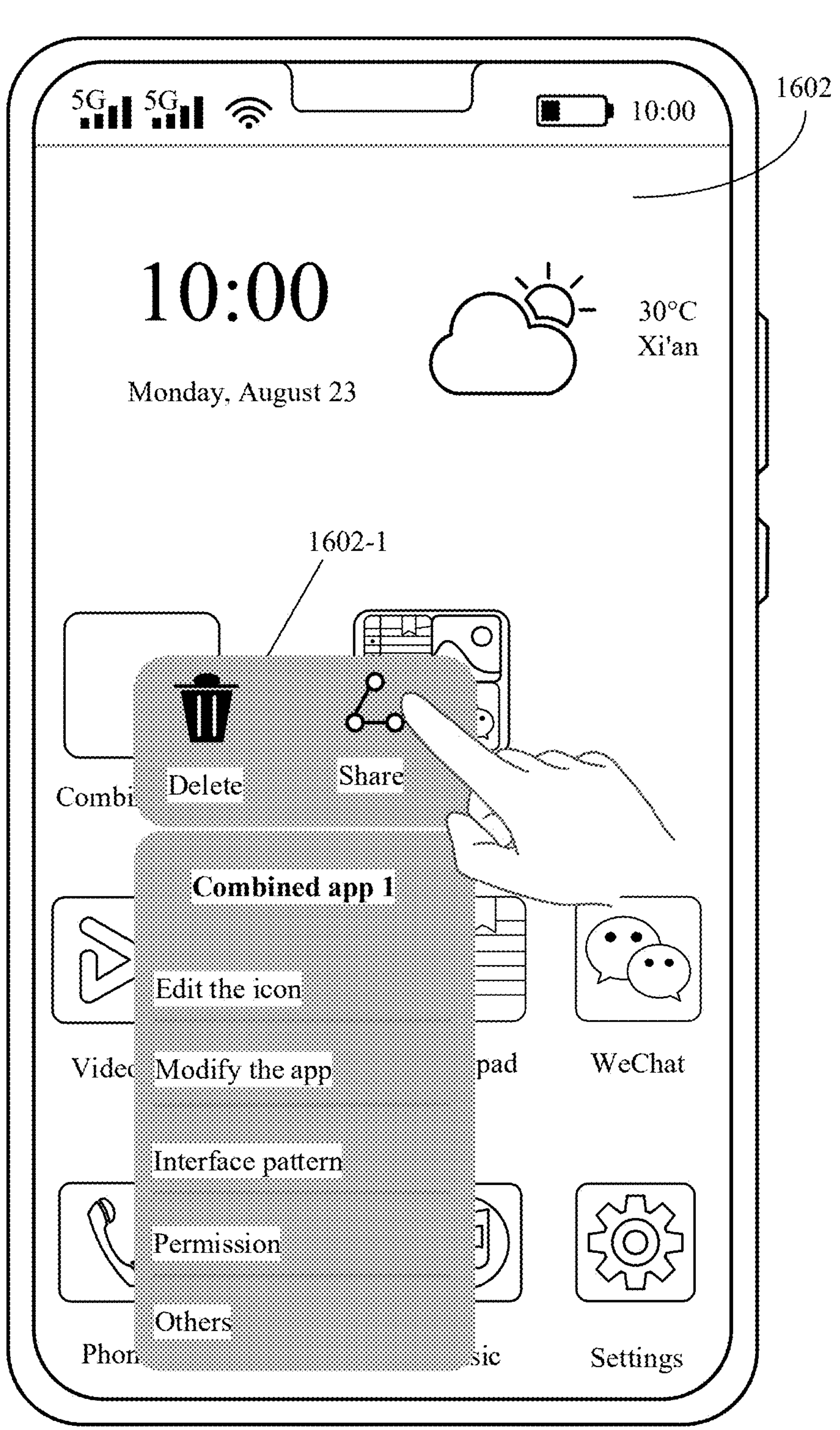
Figure 16C:
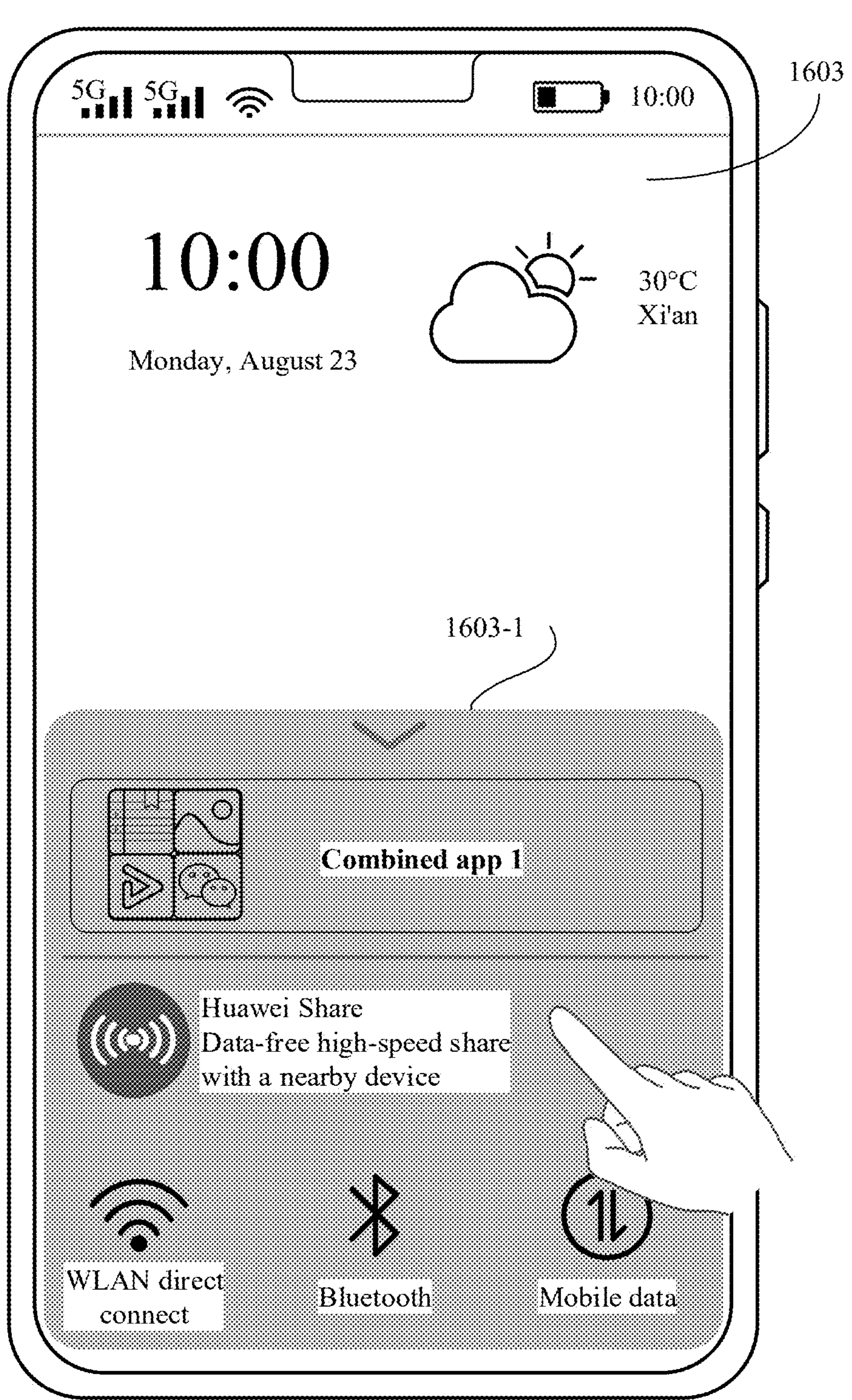
Figure 16D:
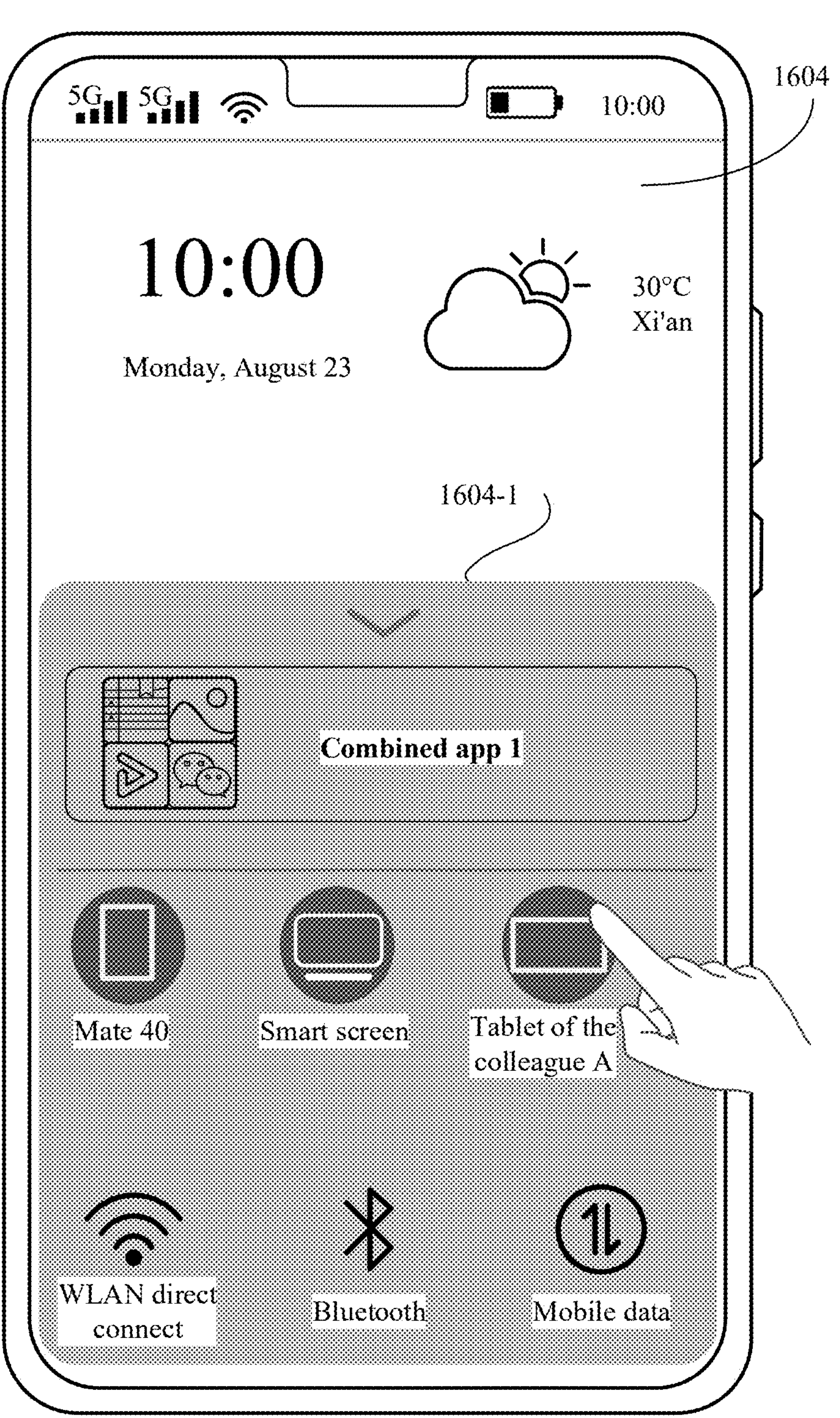

FIG. 13 is a schematic diagram of an example of a process in which a colleague A receives a connection request on a tablet according to an embodiment of this application.

For example, if a display of the tablet of the colleague A displays a home screen, when the tablet of the colleague A receives the connection request sent by a mobile phone of a user, the tablet may display a screen 1301 shown in (a) in FIG. 13. A connection confirm window 1301-1 is automatically popped up on the screen 1301, to prompt the user that a mobile phone of XXX requests to obtain application permission. When the colleague A taps an “OK” control in the connection confirm window 1301-1, in response to the operation of the user, the tablet of the colleague A may further display a screen 1302 shown in (b) in FIG. 13. The screen 1302 includes a window 1302-1. The window 1302-1 is used to set application permission that can be accessed and obtained by the mobile phone of XXX.

Optionally, the window 1302-1 may include one or more options such as a “Permanent access permission” option and a “Currently accessed permission” option. For example, when the user taps the “Currently accessed permission” option, an application list formed by one or more applications on the tablet is displayed under the “Currently accessed permission” option in the window 1302-1. The one or more applications in the application list may be all applications installed on the tablet, or some applications that can be set with access permission by default on the tablet. This is not limited in this embodiment of this application.

For example, the user sequentially performs an operation 1 and an operation 2 shown in (b) in FIG. 13 to first selects an email application from the one or more applications in the application list and then taps an “OK” control in the window 1302-1. In response to the operations of the user, the tablet of the colleague A may return a response message of the connection request to the mobile phone of XXX (that is, the mobile phone of the user). The mobile phone of the user may determine, based on the response message of the connection request, that the email application on the tablet of the colleague A is the only application that can be accessed. In other words, the mobile phone of the user has only permission to access related data of the email application on the tablet of the colleague A, and cannot access or obtain related data of more other applications on the tablet of the colleague A. Details are not described herein.

Through the foregoing process, the mobile phone of the user obtains information about the email application on the tablet of the colleague A. In addition, the mobile phone may switch from the screen 1203 shown in FIG. 12(*c*) to a screen 1204 shown in FIG. 12(*d*) based on the information about the email application on the tablet of the colleague A. In a window 1204-1 on the screen 1204, one or more of an icon, a source, and a name of the email application, for example, the email of the colleague A may be displayed in the “Search for other apps” category. This is not limited in this embodiment of this application.

In conclusion, through the implementation processes in FIG. 10(*a*) to FIG. 13, in this embodiment of this application, a plurality of applications from different sources can be combined in different scenarios, to generate a new combined application. The plurality of applications include a local application on the mobile phone, and/or an application on a super terminal device in a device-level mutual trust relationship with the mobile phone, and/or a distributed application on another device that is authorized by the user to establish a mutual trust relationship with a to-be-combined application on the mobile phone, and/or an application on another device that is found in a current scenario by the mobile phone in real time and that has no mutual trust relationship. Therefore, a requirement of the user for simultaneously using a plurality of applications in different scenarios can be met according to the method, to prevent the user from separately performing complex operations of starting each application and triggering split-screen display, thereby simplifying an operation procedure and shortening an operation time. In addition, in the method, a quantity of applications included in the plurality of applications is not limited, to meet a requirement for simultaneously using more applications by the user, thereby improving use experience of the user.

It should be understood that, when the user taps the icon of the combined application, the user can simultaneously start and run each of the plurality of applications associated with the combined application. A display of an electronic device automatically displays an interface of each of the plurality of applications in a split-screen window form. Start speeds, color styles, and the like of the plurality of applications may be synchronized by default. The plurality of applications enable data sharing space. In this way, use experience of simultaneously using a plurality of application is provided for the user.

It should be further understood that, in a subsequent use process, the user may customize, according to different personal use requirements by using the method described above, the icon of the combined application and an interface display pattern of split-screen display after the plurality of applications associated with the combined application are simultaneously started. Therefore, after the plurality of applications are simultaneously started, a size, a layout, and the like of a split-screen window of each application displayed in split screen can better meet a display requirement of the user. In addition, a target interface expected by the user can be directly reached for each application, thereby simplifying an operation procedure and improving use experience of the user.

With reference to the accompanying drawings, the foregoing describes an implementation process in which the user can combine a plurality of applications from different devices to generate a new application. In a subsequent process of using the combined application, the mobile phone simultaneously displays a plurality of split-screen windows. Each split-screen window may correspond to one application. In other words, an interface of one application is displayed in each split-screen window. Optionally, in this embodiment of this application, "the plurality of applications" that are combined may be different applications to be combined, for example, different applications such as the WeChat application, the Notepad application, and the Gallery application described above; or "the plurality of applications" that are combined may further include two same applications. For example, the user may add the WeChat application twice to the Combined app 1.

In a possible implementation, the two same applications that are combined may correspond to a same account. The "account" may include device accounts for logging in to electronic devices such as a mobile phone, a tablet, and a smart screen (for example, a plurality of home devices may correspond to one Huawei account), and/or a login account used for logging in to a specific application (for example, a WeChat account or a QQ account unique to each user).

Optionally, for a social application such as the WeChat application, the QQ application, or an email application, a process in which the user uses the social application depends on a login account of the user. If the user adds, to the Combined app 1, the WeChat application displayed on the home screen of the mobile phone, and the added WeChat application corresponds to the same icon and the login account of the same user, after the user starts the Combined app 1, two split-screen windows on the display of the mobile phone may be both used to display interfaces of the WeChat application, and the user may set different "target interfaces" for the two split-screen windows. In other words, the WeChat application is run in both the two split-screen windows, and two different interfaces of the WeChat application are displayed.

For example, it is assumed that the user performs the operation shown in FIG. 7(*a*) twice to add, to the Combined app 1 twice, the WeChat application (corresponding to only one WeChat login account) on the home screen 701 of the mobile phone. In response to the operation of the user, the mobile phone may determine that an interface of the WeChat application is displayed in the two split-screen windows. Further, the user may set a target interface in each split-screen window on any screen shown in FIG. 5(*b*), FIG. 5(*c*), or FIG. 5(*d*). For example, the two split-screen windows of the WeChat application are respectively used to display a chat list interface and a Moments interface. This is not limited in this embodiment of this application.

Optionally, some applications such as the WeChat application and the QQ application may have an application twin capability. In other words, the user may trigger, by using a preset operation, application twin of some applications such as the WeChat application and the QQ application.

For example, after the user triggers a twin application of the WeChat application (with a login account of a user 1) on the home screen of the mobile phone, an icon of a second WeChat application may be automatically displayed on the home screen of the mobile phone. In other words, the home screen of the mobile phone includes icons of two WeChat applications. The user taps the icon of the second WeChat application obtained through application twin, and logs in to the WeChat application by using a new login account (for example, a login account of a user 2). The two WeChat applications respectively correspond to different user login accounts. If the user adds, to the Combined app 1, both the two WeChat applications displayed on the home screen of the mobile phone, after the user starts the Combined app 1, an interface of the WeChat application of the user 1 and an interface of the WeChat application of the user 2 are respectively displayed in the two split-screen windows on the display of the mobile phone, and the user may set different "target interfaces" for the split-screen windows of the two WeChat applications. This is not limited in this embodiment of this application.

It should be understood that the two same applications added by the user to the Combined app 1 herein are obtained based on an application twin function of the application, and the two same applications correspond to different user login accounts. To ensure security and privacy of data of different users, data space of the two same applications obtained through application twin may be isolated, that is, to implement data isolation between the two same applications. For example, the WeChat application of the user 1 cannot obtain data of the WeChat application of the user 2, and the WeChat application of the user 2 cannot obtain data of the WeChat application of the user 1. Details are not described herein.

Optionally, when the two same applications that are added by the user to the Combined app 1 come from different devices, it may be determined based on device accounts whether data space of the two same applications needs to be isolated, that is, whether the two same applications have permission to access application data of each other.

For example, when the user adds the local WeChat application on the mobile phone to the Combined app 1, and also adds the WeChat application on the tablet to the Combined app 1, correspondingly, the Combined app 1 includes two WeChat applications. In this scenario, if the tablet and the mobile phone both correspond to a same device account, for example, the mobile phone and the tablet both log in to a Huawei ID of the user 1, the mobile phone and the tablet are mutually trusted devices.

Optionally, regardless of whether the WeChat application on the tablet and the WeChat application on the mobile phone correspond to the same login account, for example, the two WeChat applications both correspond to a WeChat login account of the user 1, or the two WeChat applications respectively correspond to a WeChat login account of the user 1 and a WeChat login account of the user 2, it may be considered by default that the two WeChat applications can access application data of each other. In other words, the data space of the two WeChat applications does not need to be isolated.

Alternatively, regardless of whether the tablet and the mobile phone correspond to the same device account, provided that it is detected that the WeChat application on the tablet and the WeChat application on the mobile phone correspond to different login accounts, for example, the WeChat application on the mobile phone corresponds to a WeChat login account of the user 1, and the WeChat application on the tablet corresponds to a WeChat login account of the user 2, it may be considered by default that the two WeChat applications do not have permission to access application data of each other. In other words, the mobile phone isolates data of the WeChat application on the mobile phone from data of the WeChat application on the tablet.

In the foregoing implementation, according to the method for combining a plurality of applications provided in this embodiment of this application, the user may add a same application from a same device to a combined application, and different interfaces of the application are displayed in different split-screen windows, to help the user simultaneously use different interfaces of the application in different split-screen windows. Alternatively, based on an application twin capability of an application, the user may add the application and a twin of the application from the same device to a combined application, to help the user simultaneously log in to interfaces corresponding to the application by using different login accounts in different split-screen windows, thereby improving use experience of the user. In addition, the mobile phone may determine different data access permission based on whether login accounts used by the user to log in to the application are the same. For example, data space used when different login accounts are used to log in to the application is isolated, thereby improving security and privacy of data of different users.

In another possible implementation, in addition to the foregoing description in which the user manually selects a plurality of applications and combines the plurality of applications to generate a new combined application, the electronic device may automatically select a plurality of applications and combine the plurality of applications to generate anew combined application.

Optionally, the electronic device may select, based on a use scenario of the user, a plurality of applications for automatic combination. The "use scenario of the user" may be determined by the electronic device through collecting information about a surrounding environment by using a component such as a camera or a sensor; or determined based on location information determined by using a positioning chip or the like of the electronic device; or determined based on a working mode set when the user uses the electronic device. Alternatively, a use scenario of the electronic device may be determined based on a type of the electronic device. This is not limited in this embodiment of this application.

For example, for an electronic device that has a relatively fixed use scenario, for example, a vehicle-mounted device, the user usually uses the vehicle-mounted device in a driving scenario. For the driving scenario, the vehicle-mounted device may obtain information such as a use habit of the user and frequency of using a plurality of applications in a specific time period (for example, a time period of one week), and automatically select and combine a plurality of applications that are frequently used by the user, to generate a new combined application 2. For example, in the driving scenario, the vehicle-mounted device detects that a navigation application and a music application are most frequently used by the user, and other applications are less frequently used. Correspondingly, the vehicle-mounted device may automatically combine the music application and the navigation application to obtain a new combined application 2, and display the new combined application 2 on a display of the vehicle-mounted device.

Optionally, the user may set a start target interface for each application associated with the combined application 2 on the vehicle-mounted device. For example, a home page of the navigation application is determined as a start target interface, and a "My Favorites" song list interface of the music application is determined as a start target interface. This is not limited in this embodiment of this application.

For example, when the user uses the tablet to take classes online, in a time period from 14:00 to 18:00 in the afternoon, a working mode of the tablet is adjusted to an "online class mode". In the online class mode, a system message such as a software update message on the tablet is not automatically prompted and does not automatically pop up. Based on the working mode and an effective time period of the mode that are set by the user for the tablet, the tablet may combine an online course learning application such as English teaching, the Notepad application, and the WeChat application to obtain a new combined application 3, and display the new combined application 3 on a display of the tablet.

Optionally, the tablet may record a use habit of the user in a normal online course learning process, and automatically set a target interface of each started application associated with the combined application 3. For example, an interface corresponding to a video playlist of an online course learning application such as English teaching is automatically determined as a "target interface" for starting the English teaching application, a group chat interface of an "English learning group of Class XXX" of the WeChat application is determined as a "target interface" for starting the WeChat application, and a details interface corresponding to "English class notes" of the Notepad application is determined as a "target interface" for starting the Notepad application. This is not limited in this embodiment of this application.

According to the foregoing method, the electronic device may automatically select a plurality of applications according to a plurality of possible preset rules, and generate a combined application based on the plurality of applications. A process of automatically generating the combined application is more intelligent, and a daily use requirement of the user is better met. The combined application can be directly used without a manual operation of the user. Operation steps of the user are reduced, thereby improving use experience of the user.

It should be understood that the plurality of applications automatically combined by the electronic device may be local applications on the electronic device, or may be applications on another electronic device that can be found by the electronic device and that has access permission. For example, the plurality of applications on the vehicle-mounted device may be local applications installed on the vehicle-mounted device, or may be applications on the mobile phone that are obtained by using an application such as Hicar after the vehicle-mounted device is connected to the mobile phone. For sources of the applications, refer to the foregoing related descriptions. For brevity, the sources of the plurality of applications are not limited herein.

FIG. 14(*a*), FIG. 14(*b*), FIG. 14(*c*), and FIG. 14(*d*) are a schematic diagram of an example in which a user uses a combined application on a vehicle-mounted device according to an embodiment of this application.

For example, a screen 1401 shown in FIG. 14(*a*) may be a home screen of the vehicle-mounted device. A plurality of applications are displayed on the home screen 1401. Optionally, the plurality of applications on the home screen 1401 may include local applications installed on the vehicle-mounted device, for example, the Navigation application, the Music application, the Videos application, the Calendar application, and the Settings application on the home screen 1401. In addition, the plurality of applications on the home screen 1401 may further include applications on a mobile phone that are obtained by using an application such as Hicar after the vehicle-mounted device is connected to the mobile phone, for example, the Phone application and the Gallery application. Sources of the applications included on a display of the vehicle-mounted device are not limited in this embodiment of this application.

For example, as shown in FIG. 14(*a*), the home screen 1401 may further include a new combined application that is generated based on a plurality of applications described in this embodiment of this application. It is assumed that the combined application is a new application generated through combination of the Music application and the Navigation application.

Optionally, the combined application may be a new combined application that is obtained through manually selecting the Music application and the Navigation application and combining the two applications by the user according to any one of the foregoing possible operation manners of combining a plurality of applications. Alternatively, the vehicle-mounted device detects that the Navigation application and the Music application are most frequently used by the user during driving, and other applications are less frequently used. Therefore, the Music application and the Navigation application may be automatically selected, the Music application and the Navigation application are combined to obtain a new combined application, and the combined application is displayed on the home screen of the display of the vehicle-mounted device. This is not limited in this embodiment of this application.

For the newly generated combined application on the vehicle-mounted device, it is assumed that the user sets the new combined application according to an icon generating rule and a naming manner described in FIG. 5(*h*). An icon of the Navigation application and an icon of the Music application are superimposed to generate a new icon of the combined application with a sense of hierarchy, and "Music/Navigation" is used as a name of the combined application. In addition, it is assumed that the user has also set an interface display pattern of a split-screen window of the Music application and a split-screen window of the Navigation application after the Navigation application and the Music application are simultaneously started.

For example, the user performs an operation shown in FIG. 14(*a*) to tap an icon of "Music/Navigation" on the vehicle-mounted device. In response to the operation of the user, the vehicle-mounted device simultaneously starts the Music application and the Navigation application, and displays, on the display, a split-screen view 1402 shown in FIG. 14(*b*). A left-side main menu region on the view 1402 is always displayed on the display. A plurality of menus and/or a plurality of applications that can be selected by the user include two split-screen windows. An interface of the Music application and an interface of the Navigation application are respectively displayed in the two split-screen windows.

It is assumed that the interface display pattern set by the user is as follows: The split-screen window of the Music application is displayed in an upper half part of the display of the vehicle-mounted device in a smaller size, and an initial interface directly displayed after the Music application is started is an interface including a plurality of song lists; and the split-screen window of the Navigation application is displayed in a lower half part of the display of the vehicle-mounted device in a larger size, and an initial interface directly displayed after the Navigation application is started is a map interface that includes a destination search box and a preset range centered on a current location of the user. This is not limited in this embodiment of this application.

It should be understood that the interface display pattern may be manually set by the user. Related setting content such as sizes and display positions of the two split-screen windows and a target interface in each split-screen window conforms to a use habit of the user, and facilitate the user in clearly viewing content such as a navigation route and a song classification list of the Music application. When the user enters a destination: "XX Light Food Restaurant" in the destination search box on the initial interface, and triggers the vehicle-mounted device to start voice navigation for the user, in response to the operations of the user, a route details interface is displayed in the split-screen window of the navigation application for the user, and a specific driving route and the like are broadcast for the user in a voice broadcast manner. For brevity, details are not described herein.

In another possible implementation, for each application associated with the combined application, the user may further independently set permission of each application for whether the application supports floating window display. Therefore, an electronic device can automatically match, based on a current interface display pattern and an operation of the user, an interface display pattern in response to the operation of the user.

For example, a mobile phone is used as an example. The user may access a permission management interface by using the "Permission management" option on the screen 601 shown in FIG. 6(*a*), find a target application that is expected to be independently set, and switch a "floating window permission" switch of the target application to an on state. Similarly, for the vehicle-mounted device and the like, refer to the same setting path. For brevity, refer to an existing implementation. Details are not described herein.

It should be understood that an interface of the electronic device may include a plurality of types of interface layouts (layouts). A software development kit (software development kit, SDK) of Android defines a plurality of interface layout (layout) modes. Regardless of an interface layout (layout) mode, the interface of the electronic device may include one or more layout types of a frame layout (frame layout), a linear layout (linear layout), an absolute layout (absolute layout), a relative layout (relative layout), and a table layout (table layout), to display a user interface. Details are not described in this embodiment of this application.

Optionally, in this embodiment of this application, when a display of the electronic device displays windows of a plurality of applications, an interface layout (layout) mode may include at least a split mode and an overlay mode.

The "split mode" may be understood as follows: A screen display region of the display of the electronic device is divided into grids of different sizes, and an interface needs to be arranged for a combined application based on the sizes of the grids. In other words, when split-screen windows of a plurality of applications are displayed in the screen display region of the display, the screen display region of the display is divided into the split-screen windows of the plurality of applications. There is no overlapping region between any two of the split-screen windows of the plurality of applications. For example, for the screen 506 shown in FIG. 5(*f*) or the view 1402 shown in FIG. 14(*b*), the interface layout (layout) mode is the "split mode".

The "overlay mode" may be understood as follows: When the split-screen windows of the plurality of applications are displayed in the interface display region of the display of the electronic device, there is an overlapping region between another split-screen window and at least one or more split-screen windows. For example, a split-screen window of at least one application may be displayed in a floating manner, and there is an overlapping region between the floating window of the application and a split-screen window of one or more other applications. The two windows have different hierarchies in a display relationship. It should be understood that, if a re-arrangement function of a specific application is abnormal, or a local layout is required in an interface of the application, an interface layout (layout) mode of the application may be the overlay mode by default. For example, for the screen 303 shown in FIG. 3(*c*) or the screen 902 shown in FIG. 9(*b*), the interface layout (layout) mode is the "overlay mode".

In a possible scenario, when the user switches a "floating window permission" switch of a specific application to an on state, in some scenarios, the electronic device may automatically adapt to an interface layout (layout) of the application based on an interface that is triggered to be displayed based on an operation of the user. In other words, when the application is an associated application in a combined application, in a scenario in which the electronic device displays a plurality of split-screen windows, the electronic device may automatically adapt to an interface layout (layout) mode based on an operation of the user and an interface that is triggered by the operation for switch. For example, the "split mode" is changed to the "overlay mode".

For example, in the scenario shown in FIG. 14(*a*), if the user switches a "floating window permission" switch of the Music application to an on state in advance, when the user taps an icon of the combined application "Music/Navigation" on the screen 1401, in response to the operation of the user, the vehicle-mounted device simultaneously starts the Music application and the Navigation application, and displays, on the display, the split-screen view 1402 shown in FIG. 14(*b*).

Still, when the user expects to view a song list included in a song list 1, the user may perform an operation shown in FIG. 14(*c*) to tap an icon of the song list 1. In response to the operation of the user, the vehicle-mounted device may further display a screen 1404 shown in FIG. 14(*d*). On the screen 1404, an interface is not switched in the split-screen window of the Music application, the song list included in the song list 1 is displayed in a form of a floating window 1404-1, and the floating window 1404-1 is displayed at a display hierarchy above that of the split-screen window of the Navigation application in an overlay manner.

It should be understood that, in the foregoing scenario, the user switches the "floating window permission" switch of the Music application to the on state, that is, the split-screen window of the Music application supports display in a form of a floating window. In addition, the vehicle-mounted device may determine that the Navigation application broadcasts a specific driving route for the user in a voice form. In this case, if a right-side partial region of the split-screen window of the Navigation application is overlaid by a window of another split-screen application, a use process of the Navigation application is not affected. In this case, content of a song list that the user expects to view may be displayed in the floating window 1404-1. The floating window 1404-1 and the split-screen window of the Navigation application include a partially overlapping region. In addition, because a current operation of the user is performed on the Music application, a display hierarchy of the floating window 1404-1 is above a display hierarchy of the split-screen window of the Navigation application.

It should be further understood that "the display hierarchy of the floating window 1404-1 is above the display hierarchy of the split-screen window of the Navigation application" may be understood as follows: A display priority of the floating window 1404-1 is higher than a display priority of the split-screen window of the Navigation application. Currently, the vehicle-mounted device preferentially monitors whether a touch (touch) event occurs on the floating window 1404-1. If an operation of the user is detected, the operation is an operation on the floating window 1404-1.

In another possible scenario, a developer may configure an automatic layout function for an application in an application development process. In this case, when an application interface such as a long list is displayed for the application, or in a scenario in which an interface of the application is displayed in a split-screen window with a relatively small size in a split-screen mode thereby causing poor user experience, in an interface layout process, the application may invoke an application programming interface (application programming interface, API) of an operating system of an electronic device to generate the floating window 1404-1 shown in FIG. 14(*d*). Alayout window of another application interface is overlaid with the floating window 1404-1. The system may consider by default display the floating window 1404-1 as a display layer that currently has a highest priority, and preferentially monitor whether a touch (touch) event occurs on the floating window 1404-1. A layout scenario of the floating window is not limited in this embodiment of this application.

In the foregoing manner, on the screen 1404 shown in FIG. 14(*d*), the user does not need to manually adjust an interface layout of the split-screen window of the Music application and the split-screen window of the Navigation application. In other words, the user does not need to change an interface display pattern set by the user. The floating window may be automatically displayed above the split-screen window of the Navigation application in an overlay manner based on an operation of the user. The floating window is a display layer that currently has a highest priority by default. In this process, an interface does not need to be switched in the split-screen window of the Music application, so that the user can view interfaces corresponding to a plurality of song lists and perform operations such as changing and playing a song in the floating window. This reduces an operation procedure of the user without affecting viewing a route details interface of the Navigation application by the user, thereby improving user experience.

In still another possible scenario, the plurality of applications associated with the new combined application automatically generated by the electronic device are not applications expected by the user. For example, the new combined application includes an application that the user does not need to continue to use in a specific time period. Alternatively, after the new combined application is generated based on a plurality of applications selected by the user, the user may not continue to use a specific application in the new combined application in a specific time period.

Optionally, in this scenario, the user may manually delete the new combined application, that is, delete each of the plurality of applications associated with the new combined application and cancel the combination manner; or the user may delete only any one of the plurality of applications associated with the new combined application.

Alternatively, the user may further replace, with another application expected by the user, one application or any quantity of applications associated with the new combined application, to update the combined application. In this way, a plurality of applications associated with an updated combined application are all applications expected by the user, thereby meeting a new use requirement of the user. This is not limited in this embodiment of this application.

FIG. 15(*a*), FIG. 15(*b*), FIG. 15(*c*), FIG. 15(*d*), and FIG. 15(*e*) are a schematic diagram of another example in which a user uses a combined application according to an embodiment of this application.

For example, FIG. 15(*a*) shows a possible home screen 1501 displayed on a display of a mobile phone. The home screen 1501 includes a Combined app 1 and a plurality of local applications such as Videos, Gallery, Notepad, WeChat, Phone, Messages, Music, and Settings. It is assumed that the Combined app 1 is associated with the local Notepad application, the local Gallery application, the local Videos application, and the local WeChat application on the mobile phone. An icon and an application name shown in FIG. 15(*a*) may be displayed for the Combined app 1. This is not limited in this embodiment of this application.

The user performs an operation shown in FIG. 15(*a*) to touch and hold the icon or the application name of the Combined app 1. In response to the operation of the user, the mobile phone may display a screen 1502 shown in FIG. 15(*b*). An operation window 1502-1 is automatically displayed on the screen 1502. The operation window 1502-1 includes a plurality of operation options, for example, a plurality of options of different types such as Delete, Share, Edit the icon, Modify the application, Interface pattern, Permission, and Others. This is not limited in this embodiment of this application.

For example, the user performs an operation shown in FIG. 15(*b*) to tap the Delete option in the operation window 1502-1. In response to the operation of the user, the mobile phone may display a screen 1503 shown in FIG. 15(*c*). The screen 1503 includes a prompt window 1503-1. Prompt information: "Please select a delete operation to be performed" and at least two options: a "Delete the Combined app 1" option, a "Delete an application in the Combined app 1" option, and the like are displayed in the prompt window 1503-1. The user may select any option from the at least two options according to a requirement of the user and based on the prompt information. In addition, the prompt window 1503-1 further includes a "Cancel" control, and the user may tap the "Cancel" control to break off the deletion process.

For example, the user performs an operation shown in FIG. 15(*c*) to select the "Delete an application in the Combined app 1" in the prompt window 1503-1. In response to the operation of the user, the mobile phone may display a screen 1504 shown in FIG. 15(*d*). The screen 1504 includes a prompt window 1504-1. Four applications associated with the Combined app 1 are listed in the prompt window 1504-1, for example, the Videos application, the WeChat application, the Notepad application, and the Gallery application.

With reference to a use requirement of the user, the user may sequentially perform an operation 1 and an operation 2 shown in FIG. 15(*d*) to select the Videos application and the WeChat application in four applications and tap an "OK" control. In response to the operations of the user, the mobile phone may delete the Videos application and the WeChat application that are associated with the original Combined app 1. In other words, an updated Combined app 1 is associated with only the Notepad application and the Gallery application. Correspondingly, the mobile phone may display a screen 1505 shown in FIG. 15(*e*), and the icon of the Combined app 1 on the screen 1505 may also be replaced with an icon of the new Combined app 1. Optionally, the updated icon no longer includes an icon of the Videos application and an icon of the WeChat application. This is not limited in this embodiment of this application.

Optionally, the user selects the "Delete the Combined app 1" option in the prompt window 1503-1 on the screen 1503 shown in FIG. 15(*c*). In response to the operation of the user, the mobile phone may directly display a home screen 1505 of the mobile phone shown in FIG. 15(*e*). The home screen 1505 no longer includes the icon and the name of the Combined app 1. For brevity, details are not described herein.

By using the foregoing operations, the user may delete an entire generated combined application, that is, delete an icon and a name of the combined application on the home screen of the mobile phone; or the user may delete only any one or more of a plurality of applications associated with the combined application; or the user may replace, by using the "Modify the application" option on the screen 1502, any one or more of a plurality of applications associated with the combined application, for example, with another local application or an application on another device from a different source. This is not limited in this embodiment of this application.

In another possible scenario, the user may have a plurality of electronic devices, and the user may use different electronic devices in different time periods and different scenarios in life. If the user has added a new combined application on the mobile phone according to a use requirement of the user by using any one of the foregoing possible operations, and set an icon of the new combined application, an interface display pattern of split-screen display after a plurality of applications associated with the combined application are simultaneously started, and the like. Further, in different time periods and different scenarios in life, the user may expect to use different electronic devices to continue to use the combined application.

For example, the user adds, on the mobile phone, the Combined app 1 associated with the plurality of applications. In a daytime working scenario, the user may directly use the Combined app 1 on the mobile phone. In a home scenario in the evening, the user may expect to use the Combined app 1 by using a large-screen device such as a tablet. In this scenario, the user may further share, to another electronic device such as a tablet, the Combined app 1 that is added on the mobile phone and that is associated with the plurality of applications.

It should be understood that, in this embodiment of this application, in a process in which a transmit-end device shares a combined application with a receive-end device, both the transmit-end device and the receive-end device are electronic devices that have a multi-application combination function, that is, that can provide a multi-application combination service. Specifically, with reference to the process described in FIG. 6(*a*), FIG. 6(*b*), FIG. 6(*c*), and FIG. 6(*d*), both the transmit-end device and the receive-end device can enable a switch of the multi-application combination service on the screen 602 shown in FIG. 6(*b*) to be in an on state. Details are not described below.

FIG. 16(*a*), FIG. 16(*b*), FIG. 16(*c*), and FIG. 16(*d*) are a schematic diagram of still another example in which a user uses a combined application according to an embodiment of this application.

For example, FIG. 16(*a*) shows a possible home screen 1601 displayed on a display of a mobile phone. The user performs an operation shown in FIG. 16(*a*) to touch and hold an icon or an application name of a Combined app 1. In response to the operation of the user, the mobile phone displays a screen 1602 shown in FIG. 16(*b*).

The user may tap a "Share" option in an operation window 1602-1 on the screen 1602. In response to the operation of the user, the mobile phone may determine the Combined app 1 as a "to-be-shared combined application". The mobile phone may obtain information about the Combined app 1, generate a "to-be-shared file" based on the information about the Combined app 1, and display a screen 1603 shown in FIG. 16(*c*). On the screen 1603, a sharing window 1603-1 may automatically pop up. The sharing window 1603-1 provides a plurality of sharing manners for the user, for example, a "Huawei Share (Huawei Share)" option, a "wireless local area network (wireless local area network, WLAN) direct connect" option, a Bluetooth option, and a Mobile data option. The user may select any sharing manner from the plurality of sharing manners.

It is assumed that the user performs an operation shown in FIG. 16(*c*) to tap the "Huawei Share (Huawei Share)" option in the sharing window 1603-1. The mobile phone may further display a screen 1604 shown in FIG. 16(*d*). One or more near-field devices found by the mobile phone are displayed in a window 1604-1 on the screen 1604, for example, a plurality of near-field devices such as Mate 40, a smart screen, and a tablet of a colleague A. The user may find a receive-end device, that is, the tablet of the colleague A according to a requirement of the user, and tap an icon of "Tablet of the colleague A". In response to the operation of the user, the mobile phone may send the "to-be-shared file" to the tablet of the colleague A.

In this embodiment of this application, a process of "sharing the Combined app 1" may be understood as a process in which a transmit-end device may obtain the information about the Combined app 1, and send, to the receive-end device, a file including the information about the Combined app 1, and then the receive-end device obtains the information about the Combined app 1 based on the received file.

Table 2 shows an example of content that may be included in the information about the Combined app 1 (a configuration file of the combined application), that is, content of the information that is about the Combined app 1 and that is included in the "to-be-shared file".

For example, with reference to the to-be-shared Combined app 1 shown in FIG. 16(*b*), in this embodiment of this application, the "information about the Combined app 1" included in the "to-be-shared file" may be listed as Table 2 and specifically include one or more of the following types of information: for example, a device ID of the transmit-end device, a device type of the transmit-end device, hardware parameter information of the transmit-end device, software parameter information of the transmit-end device, a quantity of applications of the Combined app 1, an application list (package names) associated with the Combined app 1, an application identifier (for example, an application package name) associated with the Combined app 1, an icon of each application, whether a remote application/distributed application (remote device) is included, information about a remote device (for example, information about a plurality of devices such as a super terminal), an application start page (target interface) link, application layout information (a size/position coordinates of a split-screen window, and the like), and whether a single-application multi-open window (App mirror) is included. This is not limited in this embodiment of this application.

TABLE 2

| Information about the Combined app 1 (the configuration file of the combined application) | | | | |
|---|---|---|---|---|
| Device ID of the transmit-end device | Device ID | | | |
| Device type of the transmit-end device | Device type | | | |
| Hardware parameter information of the transmit-end device | Phy data (a size and a resolution of a screen display region of the display) | | | |
| Software parameter information of the transmit-end device | Soft data (application version information, application source information, and the like) | | | |
| Quantity of applications in the Combined app 1 | 4 | | | |
| List of applications associated with the Combined app 1 (package names) | Videos | Gallery | Notepad | WeChat |
| Identifiers of applications associated with the Combined app 1 (application package names) | Package name of the Videos application | Package name of the Gallery application | Package name of the Notepad application | Package name of the WeChat application |
| Icon of each application | Icon of the | Icon of the | Icon of the | Icon of the |

TABLE 2-continued

| Information about the Combined app 1 (the configuration file of the combined application) | | | | |
|---|---|---|---|---|
| | Videos application | Gallery application | Notepad application | WeChat application |
| Icon of the Combined app 1 | The icons of the four applications are combined in a sequence of adding the applications by the user | | | |
| Whether a remote application/distributed application is included (remote device) | No | No | No | No |
| Information about the remote device (for example, information about a plurality of devices such as a super terminal) | / | / | / | / |
| Application start page link (a link to a target interface) | Start page 1 | Start page 2 | Start page 3 | Start page 4 |
| Application layout information (size/position coordinates of a split-screen window) | Layout 1 | Layout 2 | Layout 3 | Layout 4 |
| Whether a single-application multi-open window is included (App mirror) | No | No | No | No |

It should be understood that the content shown in Table 2 is merely used as an example. The to-be-shared Combined app 1 may be different in different scenarios.

For example, the to-be-shared Combined app 1 may include applications from different sources, for example, an application on a super terminal device trusted for the mobile phone. In this case, the information about the Combined app 1 may include the "Information about the remote device" listed in Table 2. Optionally, the "information about the remote device" is not limited to one or more types of information: a device ID of the remote device, a device type of the remote device, hardware parameter information of the remote device, and software parameter information of the remote device. This is not limited in this embodiment of this application.

It should be further understood that the "Interface display pattern" described in the foregoing embodiment may be determined based on information about the "application start page link (target interface link)" and the application layout information (for example, a size/position coordinates of a split-screen window) in Table 2. This is not limited in this embodiment of this application.

The "mobile phone of the user" serves as a transmit-end device, and "Tablet of the colleague A" serves as a receive-end device. The mobile phone of the user may send, to the tablet of the colleague A, the "to-be-shared file" that includes the information about the Combined app 1.

Correspondingly, a receiving window may pop up on the display of the tablet of the colleague A, and the receiving window may be used by the user to choose whether to receive the "to-be-shared file" sent by the mobile phone.

FIG. 17 is a schematic diagram of an example of a process in which a colleague A receives a file on a tablet according to an embodiment of this application.

For example, a user performs an operation shown in FIG. 16(*d*) to tap "Tablet of the colleague A" serving as a receive-end device. In response to the operation of the user, the mobile phone of the user may start to invoke a Bluetooth module of a mobile phone and send a "to-be-shared file" to the tablet of the colleague A in a Huawei Share (Huawei Share) manner by using a Bluetooth channel.

In a possible implementation, after receiving the "to-be-shared file" sent by the mobile phone of the user, the tablet of the colleague A may prompt, in an automatic pop-up window manner, the user whether to choose to receive the file. And/or, the mobile phone may display a prompt icon, text prompt information, and the like on a status bar at the top of a display, and the user may view the prompt through performing a pull-down operation, and choose whether to receive the file. And/or, the tablet of the colleague A may send a preset prompt tone such as "beep . . . " to prompt the user whether to choose to receive the "to-be-shared file" sent by the mobile phone of the user. This is not limited in this embodiment of this application.

For example, after detecting the "to-be-shared file" sent by the mobile phone of the user, the tablet of the colleague A may display a screen 1701 shown in (a) in FIG. 17, and automatically pop up a prompt window 1701-1 on the screen 1701 of a display of the tablet. The prompt window 1701-1 may include prompt information: The mobile phone of XXX wants to share the Combined app 1 with you. It should be understood that the screen 1701 of the current display of the tablet may be a home screen of the tablet, a running interface of any application, or the like. This is not limited in this embodiment of this application.

As shown in (a) in FIG. 17, the user may tap a "Receive" control in the prompt window 1701-1. In response to the operation of the user, the tablet may obtain, based on the received "to-be-shared file", information about the Combined app 1 listed in Table 2, and add the Combined app 1 to the screen of the display of the tablet based on the information about the Combined app 1. The display of the tablet may display a screen 1702 shown in (b) in FIG. 17. The screen 1702 includes an icon that is of the Combined app 1 and that has a same pattern as that on the home screen 1601 of the mobile phone shown in FIG. 16(*a*).

Optionally, an appearance pattern of the icon of the Combined app 1 may be consistent with that of the icon on the home screen 1601 of the mobile phone, and a size of the icon of the Combined app 1 may be adaptively adjusted based on a size of the display of the tablet. For example, the icon of the Combined app 1 may be scaled up by a specific multiple on the display of the tablet. This is not limited in this embodiment of this application.

In a possible implementation, if a plurality of applications associated with a shared combined application are all local applications on a transmit-end device, when the user shares the combined application to a receive-end device and displays an icon of the combined application on an interface of the receive-end device, the sharing process may be understood as follows: The plurality of applications associated with the combined application are still actually installed on the transmit-end device. When the user taps the icon of the combined application on the receive-end device, the tap operation of the user may be sent back to the transmit-end device, to trigger simultaneous starting and running of each application associated with the combined application in the background of the transmit-end device, and display, in a split-screen window corresponding to the receive-end device, a target interface after each application is started.

For example, the processes of sharing the Combined app 1 shown in FIG. 16(*a*), FIG. 16(*b*), FIG. 16(*c*), FIG. 16(*d*), and FIG. 17 are used as examples. Four applications associated with the Combined app 1 are actually still run on the mobile phone of the user. Only use permission of the plurality of applications associated with the Combined app 1 is opened to the tablet of the colleague A. The plurality of applications associated with the Combined app 1 may be not actually installed on the tablet of the colleague A. When the colleague A taps the icon of the Combined app 1 on the display of the tablet, the mobile phone is triggered to simultaneously start and run each application associated with the Combined app 1 in the background, and target interfaces (start pages) of corresponding applications are displayed on the display of the tablet in a manner of a plurality of split-screen windows. Each application runs in the background of the mobile phone of the user.

In another possible implementation, the sharing process may be further understood as follows: After the combined application is shared to the receive-end device, the receive-end device and the transmit-end device may implement application sharing. In other words, the receive-end device and the transmit-end device can share each application associated with the combined application.

Optionally, if the receive-end device does not have an application 1 associated with the combined application, the receive-end device may automatically download and install the application 1 by using an application market, to ensure that each application associated with the combined application is installed on the receive-end device.

Optionally, if an application 1 associated with the combined application is installed on the receive-end device, after receiving the combined application sent by the transmit-end device, the receive-end device detects that a version of the application 1 associated with the combined application on the transmit-end device is different from a version of the application 1 installed on the receive-end device, or a card pattern of the application 1 on the transmit-end device is different from that of the application 1 on the receive-end device, and the receive-end device may automatically update the application 1 or a card of the application 1. This is not limited in this embodiment of this application.

For example, the processes of sharing the Combined app 1 shown in FIG. 16(*a*), FIG. 16(*b*), FIG. 16(*c*), FIG. 16(*d*), and FIG. 17 are used as examples. After the tablet of the colleague A receives the Combined app 1 shared by the mobile phone, the tablet detects that the Videos application, the Notepad application, and the Gallery application that are associated with the combined application are locally installed, but the WeChat application is not installed. In this case, the tablet may automatically download and install the WeChat application by using an application market of the tablet, and share application data with the WeChat application on the mobile phone.

Alternatively, for example, when detecting that a version of the locally installed Videos application is different from that of the Videos application installed on the mobile phone, the tablet may automatically update the local Videos application, to keep consistent with the version of the Videos application on the mobile phone; or when a version of the Videos application on the mobile phone is earlier than a version of the Videos application on the tablet, the tablet may return an update message to the mobile phone, to trigger the mobile phone to automatically update the Videos application, so that the vision of the Videos application on the mobile phone is consistent with that of the Videos application on the tablet. This is not limited in this embodiment of this application.

Alternatively, for example, for a card pattern, a card version, and the like of each application associated with the combined application, refer to the foregoing scenario of version information. For brevity, details are not described herein again.

In still another possible implementation, if the plurality of applications associated with the shared combined application include a local application of the transmit-end device, an application 2 on a trusted device B of the transmit-end device is further included. Therefore, when the user shares the combined application to the receive-end device, and the icon of the combined application is displayed on the interface of the receive-end device, the sharing process may be understood as follows: The receive-end device and the transmit-end device may share the local application on the transmit-end device, and the receive-end device and the trusted device B of the transmit-end device may further share the application 2 on the device B. For another application other than the plurality of applications associated with the combined application, the receive-end device does not have access permission for neither another local application on the transmit-end device nor another application other than the application 2 on the trusted device B of the transmit-end device. Details are not described in this embodiment of this application.

In the foregoing method, for different electronic devices, the user may share the generated combined application on the transmit-end device to another electronic device with the multi-application combination function, and the user is supported in using the combined application on the another electronic device. In this process, the user does not need to independently perform a process of downloading an application, installing an application, and combining a plurality of applications, to simultaneously start the plurality of applications on the another electronic device and display interfaces of the plurality of applications in split-screen windows. This implementation is more intelligent. Operation steps of the user are reduced, thereby improving user experience of using a plurality of devices.

In addition, in the process of sharing the combined application, information such as an icon that is associated with the combined application and that is set by the user on the transmit-end device, information about the plurality of applications associated with the combined application, and the interface display pattern of split-screen display after the plurality of applications are simultaneously started may be shared to the another electronic device, so that the user can directly use the plurality of associated applications on the another electronic device through the combined application in a manner that best conforms to a use habit of the user, thereby improving use experience of the user.

For all the processes described above, first, a possible implementation process in which the user may combine the plurality of applications in different operation manners according to different personal use requirements is described. Then, a process in which the user customizes the icon of the combined application and the interface display pattern of split-screen display after the plurality of applications associated with the combined application are simultaneously started is described. Afterward, in a subsequent process of using the combined application, the user may further modify, delete, or replace one or more applications associated with the combined application, to update the combined application; or the user may share the combined application to another electronic device, so that the user can use the combined application on a plurality of devices. Finally, the user may tap the icon and/or the name of the combined application, to simultaneously start the plurality of applications associated with the combined application, where an interface of each application is displayed in a split-screen window of the application.

It should be understood that, regardless of whether the user uses the combined application on the mobile phone of the user, or uses the combined application on the another electronic device such as the receive-end device, the user can trigger, by performing only one tap operation to tap the icon and/or the name of the combined application, simultaneous start of each application associated with the combined application, where an interface of one application is displayed in each split-screen window in a form of a plurality of split-screen windows. The following describes in detail a process of starting each application.

In a possible scenario, for the plurality of applications associated with the combined application, different applications have different start duration; or different versions of the same application may have different start duration.

It should be understood that, in this embodiment of this application, "start duration" of an application may be understood as duration from a moment at which the application is triggered to be started to a moment at which a target interface of the application is displayed. The user sets a specific function interface of the application as an initial interface after the application is started.

Optionally, an electronic device such as a mobile phone may collect statistics of use of each application by using a related category such as package usage states. The statistics include start duration, a quantity of use times, use duration, and the like of the application. Details are not described in this embodiment of this application.

Optionally, for the combined application in this embodiment of this application, in addition to the information about the combined application listed in Table 2, the electronic device may further store more other information, for example, whether the electronic needs to read a remote web page resource and duration of the reading in a process of starting each application, duration of reading an input/output (input/output, I/O) interface during access to a local application resource, and duration of obtaining a displayed interface through performing drawing and rendering based on display data of a target interface after each application is started.

For example, Table 3 shows content that may be included in the information that is about the combined application (a configuration file of the combined application) and that is obtained by the mobile phone. As shown in Table 3, after the combined application is generated on the mobile phone, a system of the mobile phone can accurately obtain all information listed in Table 3. The electronic device may calculate, based on a preset quantity of tracing times, total duration T from starting each application to displaying the target interface set by the user, and then adaptively adjust, based on the total duration T, a resource configuration status that the system needs to configure for the application in a process of starting each application, and the like.

It should be noted herein that the foregoing "preset quantity of tracing times" may be understood as a test process and an adaptive adjustment process in which the user taps the combined application on the mobile phone. For example, the user may test average start duration of each application in five different processes in which the combined application is started for five times. The mobile phone may determine, based on one or more types of information shown in Table 3, duration of starting each application, and control an actual process of starting each application.

TABLE 3

| Information about a combined application (a configuration file of the combined application) | | | | |
|---|---|---|---|---|
| Quantity of applications in the combined application | 4 | | | |
| List of applications associated with the combined application (package names) | Application 1 | Application 2 | Application 3 | Application 4 |
| Identifiers of applications associated with the combined application (application package names) | Package name of Application 1 | Package name of Application 2 | Package name of Application 3 | Package name of Application 4 |
| Icon of each application | Icon of Application 1 | Icon of Application 2 | Icon of Application 3 | Icon of Application 4 |
| Icon of the combined application | Preset manner 1, Preset manner 2, Preset manner 3, . . . | | | |
| Whether a remote application/distributed application (remote device) is included | Yes | Yes | No | No |
| Information about the remote device (for example, information about a plurality of devices such as a super terminal) | Device 1 | Device 2 | / | / |
| Application start page link (target interface link) | Start page 1 | Start page 2 | Start page 3 | Start page 4 |
| Application layout information (size/position coordinates of a split-screen | Layout 1 | Layout 2 | Layout 3 | Layout 4 |

TABLE 3-continued

| Information about a combined application (a configuration file of the combined application) | | | | |
|---|---|---|---|---|
| window) | | | | |
| Whether a single-application multi-open window is included (App mirror) | No | No | No | No |
| Whether a remote web page resource needs to be read + reading duration | t1 | t2 | t3 | t4 |
| Reading I/O interface + reading duration during access of a local application resource | t11 | t22 | t33 | t44 |
| Target interface obtained through drawing and rendering + consumed duration | t111 | t222 | t333 | t444 |
| Quantity of tracing times required for a resource in a start process (boot profile data boot profile data) | 5 | 5 | 5 | 5 |
| Advertisement settings in a start process (startup ads) | Setting 1 | Setting 2 | Setting 3 | Setting 4 |
| . . . | . . . | . . . | . . . | . . . |

It should be further understood that, for an application, if the user saves a specific function interface of the application as an "initial interface (that is, a target interface)" that is directly reached after start, a combined-application service of the electronic device captures an access link of the interface from the initial interface (that is, the target interface), to accurately locate the target interface based on the access link of the interface.

Optionally, if no external access link is configured for the initial interface (that is, the target interface), the electronic device may further capture a page stack address of the initial interface (that is, the target interface) through traversing a page stack of the application. This is not limited in this embodiment of this application. It should be noted herein that internal access links of some head application require authorization of a developer account. In other words, the developer account needs to be configured. Details are not described in this embodiment of this application.

In a possible implementation, the electronic device may detect a running time of each phase and a dependency on a system resource in a process from starting each application associated with the combined application to displaying the target interface, and adaptively adjust resource configuration and scheduling priority allocation in the process of starting each application. Specifically, the electronic device may determine a scheduling priority of each application in the start process and/or determine a resource requirement of each application in the start process based on total duration from starting each of the plurality of applications associated with the combined application to displaying the target interface.

For example, for a plurality of applications, longer start duration of each application indicates a higher scheduling priority of the application in a start process. In other words, a slower start of an application indicates earlier resource scheduling of the application; and a faster start of an application indicates later resource scheduling of the application.

Alternatively, longer start duration of an application indicates a higher resource configuration requirement of the application in a start process. In other words, a slower start of an application indicates more resources configured by the system for the application; and a faster start of an application indicates fewer resources configured by the system for the application.

It should be understood that, in the process of starting the combined application, the system may sort system resource requests in a start priority process according to a system resource requirement in a process of starting each application, for example, a high time-consuming operation such as an I/O request or a network request. In each time of the process of starting the combined application, an operation and a delay in the process of starting each application are measured. In the start process, a resource access priority is adjusted based on the boot profile data (boot profile data). After a plurality of positive feedbacks in the start process, total duration of starting a plurality of applications to target pages may be adjusted to be consistent.

In the plurality of possible implementations above, different applications may be controlled to have same actual start duration. In other words, when the user taps the icon of the combined application, all the applications associated with the combined application can be simultaneously started, and start duration of all the applications can be controlled to be the same.

In another possible scenario, for the plurality of applications associated with the combined application, different applications may correspond to different advertisements; or for different versions of the same application, advertisements of each application may be different in different time periods.

For example, in the content included in the information about the combined application (the configuration file of the combined application) shown in Table 3, in advertisement setting (startup ads) information in the start process, an advertisement start type corresponding to a package name of each application may be separately recorded based on the package name of the application, and advertisement duration of each application may be recorded, for example, 3 seconds or 5 seconds. Further, with reference to the advertisement duration, the system may further determine a scheduling priority of each application in the start process, and/or determine a resource requirement of each application in the start process.

Alternatively, optionally, the user may intercept an open-screen advertisement of any application through setting a privacy option of the application and the like, or replace an open-screen advertisement of any application with a system advertisement. This is not limited in this embodiment of this application.

In conclusion, this application provides the method for combining a plurality of applications provided in this application. A plurality of applications can be combined according to the method. Specifically, the user may select a plurality of applications from a local device according to different personal use requirements; or the user may select a plurality of applications from different electronic devices; or the user may further trigger application twin of a same application and select different twin applications of the same application; or the user selects a same application and different function interfaces of the same application for a plurality of times; or the like. The user may combine the plurality of applications in different operation manners, to generate a new combined application and display the new combined application on the display of the electronic device.

It should be understood that a single application usually cannot meet a use requirement of the user. In a scenario in which a plurality of applications need to be used repeatedly or simultaneously, in this application, for such a requirement of the user, the user can freely combine different function interfaces in a plurality of required different applications in a user-defined manner, or combine different function interfaces of the same application in a user-defined manner, to generate anew combined application.

Based on the new combined application, each application associated with the combined application can be no longer an isolated data island and/or an isolated function island. In a subsequent use process, the user can tap an icon of the combined application to simultaneously start and run each of the plurality of applications associated with the combined application. The display of the electronic device automatically displays an interface of each of the plurality of applications in a split-screen window form. Start speeds, color styles, and the like of the plurality of applications may be synchronized by default. The plurality of applications enable data sharing space. In the method, the plurality of applications are simultaneously started, to prevent the user from separately performing complex operations of starting each application and triggering split-screen display, thereby simplifying an operation procedure and shortening an operation time. In addition, in the method, a quantity of applications included in the plurality of applications is not limited, to meet a requirement for simultaneously using more applications by the user, thereby improving use experience of the user.

In addition, this application further provides a plurality of methods for setting a combined application and a plurality of methods for modifying content related to a combined application. The method can support the user in customizing a possible operation process of setting an icon and/or a name of the combined application and an interface display pattern of split-screen windows after a plurality of applications associated with the combined application are simultaneously started. Specifically, the method supports the user in customizing, based on different use scenarios and according to personal use requirements, the interface display pattern of split-screen display after the plurality of applications associated with the combined application are simultaneously started. For example, the user may set one or more of a layout and an arrangement sequence of a plurality of split-screen windows displayed on the display, a size of each split-screen window, and a target interface of each application displayed in a split-screen window of the application. In this way, after the user simultaneously starts the plurality of applications, the sizes, the layout, and the like of split-screen windows of the plurality of applications displayed in split screen can better meet a display requirement of the user. In addition, a target interface expected by the user can be directly reached through each application. Therefore, the user does not need to perform a plurality of tap operations to display the expected target interface, to simplify an operation procedure, thereby improving use experience of the user. In a subsequent process of using the combined application, the user may further modify, delete, or replace one or more applications associated with the combined application, to update the combined application.

In addition, this application further provides a method for sharing a combined application. The user may share the combined application to another electronic device, so that the user can use the combined application on a plurality of electronic devices. In this process, the user does not need to independently perform a process of downloading an application, installing an application, and combining a plurality of applications on different electronic devices, to use the combined application on different electronic devices, that is, to simultaneously start the plurality of applications and display interfaces of the plurality of applications in a split-screen window form. This implementation is more intelligent. Operation steps of the user are reduced, thereby improving user experience of using a plurality of devices.

In addition, this application further provides a method for simultaneously starting a plurality of applications. The user can tap the icon and/or the name of the combined application to simultaneously start the plurality of applications associated with the combined application. An interface of each application is displayed in a split-screen window of the application. In the method, different applications may be controlled to have same actual start duration. To be specific, when the user taps the icon of the combined application, the applications associated with the combined application can be simultaneously started, and start duration of the applications is controlled to be the same. In this way, the following problem is avoided: A current super application has an excessively long function path in use, thereby meeting use experience of the user.

Finally, in this application, for different scenarios and different requirements of the user in different scenarios, the electronic device may automatically select a plurality of applications according to a plurality of possible preset rules, and generate a combined application based on the plurality of applications. A process of automatically generating the combined application is more intelligent, and a daily use requirement of the user is better met. The combined application can be directly used without a manual operation of the user. Operation steps of the user are reduced, thereby improving use experience of the user.

With reference to FIG. 1(*a*) to FIG. 17, the foregoing embodiments describe the possible implementation processes and the possible implementations of combining the plurality of applications from an aspect of user interaction. From an aspect of a bottom-layer implementation policy, the following describes a bottom-layer implementation process corresponding to the method for combining a plurality of applications and simultaneously starting the plurality of applications provided in embodiments of this application.

Before the method for combining a plurality of applications and simultaneously starting the plurality of applications provided in embodiments of this application is described, an electronic device that can implement the method, and a hardware structure and a software structure of the electronic device are first described.

It should be understood that the method for combining a plurality of applications and simultaneously starting the plurality of applications provided in embodiments of this application may be applied to the mobile phone, the tablet computer, the vehicle-mounted device, and the like in FIG. 1(*a*) to FIG. 17. In addition, the method may be further applied to a plurality of types of electronic devices such as a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, and a personal digital assistant (personal digital assistant, PDA). A specific type of the electronic device is not limited in this embodiment of this application.

Figure 18:
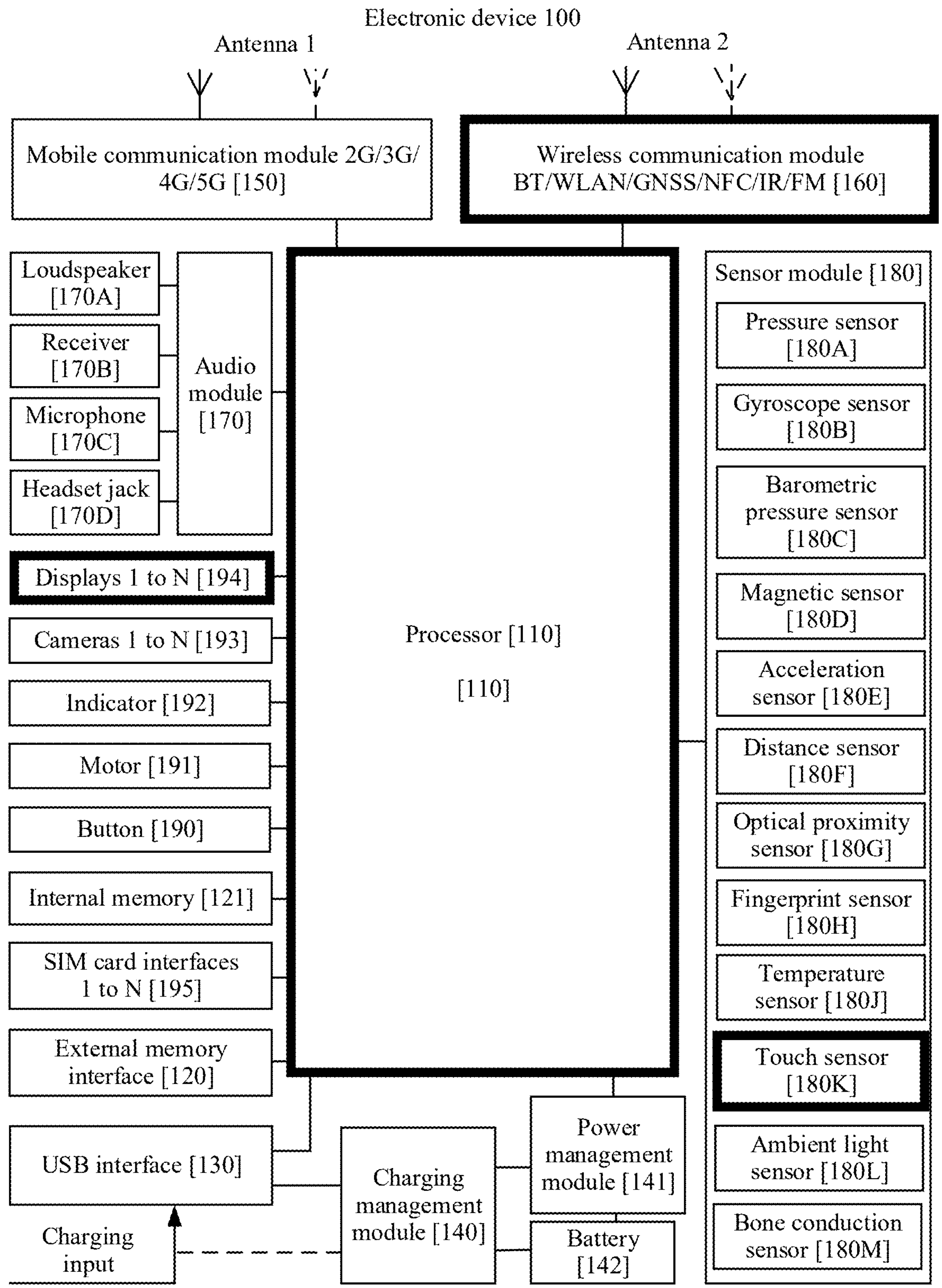
FIG. 18 is a schematic diagram of an example of a hardware structure of an electronic device according to an embodiment of this application.

FIG. 18 is a schematic diagram of an example of a hardware structure of an electronic device according to an embodiment of this application.

It should be understood that the electronic device in this embodiment of this application may include some or all structures of the electronic device 100 shown in FIG. 18, or may include more other structures that are not shown. This is not limited in this embodiment of this application.

For example, as shown in FIG. 18, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a loudspeaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application constitutes no specific limitation on the electronic device 100. In some other embodiments of this application, the electronic device 100 may include more or fewer components than those shown in the figure, or combine some components, or split some components, or have a different component arrangement. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instruction or the data again, the processor 110 may directly invoke the instruction or the data from the memory. This avoids repeated access and reduces a waiting time of the processor 110, thereby improving system efficiency.

In this embodiment of this application, the processor 110 of the electronic device 100 stores a computer program or an instruction corresponding to a method for combining a plurality of applications and a method for simultaneously starting a plurality of applications.

For example, the method for combining a plurality of applications that is stored in the processor 110 may be used to implement combination of a plurality of applications. Specifically, the method may support the following content: A user may select a plurality of applications from a local device according to different personal use requirements; or a user may select a plurality of applications from different electronic devices; or a user may further trigger application twin of a same application and select different twin applications of the same application; or a user selects a same application and different function interfaces of the same application for a plurality of times; or the like. The user may combine the plurality of applications in different operation manners, to generate a new combined application and display the new combined application on the display of the electronic device.

For example, the processor 110 stores the method for simultaneously starting a plurality of applications. The method may support the following content: When it is determined that the user taps an icon and/or a name of a combined application, the plurality of applications associated with the combined application can be simultaneously started, and an interface of each application is displayed in a split-screen window of the application. In the method, different applications may be controlled to have same actual start duration. To be specific, when the user taps the icon of the combined application, the applications associated with the combined application can be simultaneously started, and start duration of the applications is controlled to be the same. In this way, the following problem is avoided: A current super application has an excessively long function path in use, thereby meeting use experience of the user.

For example, in this embodiment of this application, according to the method stored by the processor 110, the electronic device 100 can be controlled to automatically select a plurality of applications according to a plurality of possible preset rules for different scenarios and different requirements of the user, generate a combined application based on the plurality of applications, and display the combined application on a home screen of the electronic device 100.

In addition, in this embodiment of this application, the electronic device 100 may be used as a transmit-end device or a receive-end device.

For example, for the transmit-end device, when sharing the combined application, the user may invoke, by using an application interface, a method that is for sharing a combined application and that is stored in the processor 110, to support the user in sharing the combined application on the transmit-end device to another device. The processor 110 may obtain information about the combined application (for example, a configuration file of the combined application), invoke a device discovery capability of the electronic device 100, search for one or more near-field devices that can receive a "to-be-shared file", and then invoke a communication module such as a Bluetooth module to send the "to-be-shared file" to a specific near-field device selected by the user.

For the receive-end device, when the receive-end device receives the "to-be-shared file" sent by the transmit-end device and the user determines to receive the "to-be-shared file", the processor 110 may detect the received "to-be-shared file", for example, obtain the information about the combined application (for example, the configuration file of the combined application) based on the "to-be-shared file"; and control the display 194 based on the obtained information about the combined application (for example, the configuration file of the combined application), to display the icon and/or the name of the combined application on the home screen of the receive-end device. Details are not described herein again.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like. The I2C interface is a bidirectional synchronous serial bus. The processor 110 communicates with the touch sensor 180K through the I2C bus interface, to implement a touch function of the electronic device 100. The I2S interface may be configured to perform audio communication. The PCM interface may also be configured to: perform audio communication, and sample, quantize, and encode an analog signal. The UART interface is a universal serial data bus, and is configured to perform asynchronous communication. In some embodiments, the audio module 170 may transmit an audio signal to the wireless communication module 160 through the UART interface, to implement a function of playing music through the Bluetooth headset. The MIPI interface may be configured to connect the processor 110 to a peripheral component such as the display 194 or the camera 193. The processor 110 communicates with the display 194 through the DSI, to implement a display function of the electronic device 100. The GPIO interface may be configured by using software. The GPIO interface may be configured as a control signal or a data signal. The USB interface 130 is an interface that conforms to a USB standard specification, and may be specifically a mini USB interface, a micro USB interface, a USB type C interface, or the like.

It may be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. The charging management module 140 may supply power to the electronic device through the power management module 141 while charging the battery 142.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communication module 160, and the like.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover a single communication frequency band or a plurality of communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide solutions for wireless communication such as 2G/3G/4G/5G/6G that are applied to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. In some other embodiments, the modem processor may be independent of the processor 110, and is disposed in a same device as the mobile communication module 150 or another functional module.

The wireless communication module 160 may provide wireless communication solutions including a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like applied to the electronic device 100.

In this embodiment of this application, in a process in which the transmit-end device shares the combined application with the receive-end device, both the transmit-end device and the receive-end device are electronic devices that have a multi-application combination function, that is, that can provide a multi-application combination service.

For example, the mobile phone shown in FIG. 16(*a*), FIG. 16(*b*), FIG. 16(*c*), and FIG. 16(*d*) is used as the transmit-end device, and the tablet shown in FIG. 17 is used as the receive-end device. The mobile phone and the tablet may be devices connected to the same Wi-Fi network. Alternatively, a Bluetooth connection may be established between the mobile phone and the tablet. Alternatively, a connection may be established between the mobile phone and the tablet based on an NFC technology such as a touch. Alternatively, a connection may be established between the mobile phone and the tablet in a wireless communication manner such as an infrared technology (infrared, IR).

It should be understood that, in all the foregoing enumerated manners, when the user triggers sharing of the "to-be-shared file" or performs a device search operation on the mobile phone, the mobile phone may find one or more near-field devices such as the tablet. In addition, the mobile phone and the tablet may communicate with each other in a corresponding manner, for example, in a Wi-Fi manner or Bluetooth. A communication manner between the mobile phone and the tablet is not limited in this embodiment of this application.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology.

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. In some embodiments, the electronic device 100 may include one or N displays 194, where N is a positive integer greater than 1.

It should be understood that, in this embodiment of this application, all the interface display processes described in FIG. 1(*a*) to FIG. 17 depend on display of the display 194.

For example, in this embodiment of this application, in a process in which the transmit-end device shares the combined application with the receive-end device, the mobile phone shown in FIG. 16(*a*), FIG. 16(*b*), FIG. 16(*c*), and FIG. 16(*d*) is used as the transmit-end device, and the tablet shown in FIG. 17 is used as the receive-end device. The display 194 of the mobile phone may receive the sharing operation of the user, trigger the mobile phone to start processes such as device search and device connection, and display a corresponding interface on the display 194 of the mobile phone, for example, the screen 1603 of selecting a sharing manner and the selection screen 1604 on the receive-end device.

Correspondingly, for the receive-end device, the tablet may receive the configuration file that is of the combined application and that is sent by the mobile phone, further display, on the display 194 of the tablet, the window 1701-1 shown in (a) in FIG. 17, detect whether the user agrees to receive the configuration file of the combined application, and then make a response according to an operation of the user. Details are not described herein again.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image.

The camera 193 is configured to capture a static image or a video.

The digital signal processor is configured to process a digital signal, and may process another digital signal in addition to a digital image signal.

The video codec is configured to compress or decompress a digital video.

The NPU is a neural-network (neural-network, NN) computing processor. The NPU quickly processes input information with reference to a structure of a biological neural network, for example, a transfer mode between human brain neurons, and may further continuously perform self-learning.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a sound playing function and an image playing function), and the like. The data storage area may store data (such as audio data and an address book) created during use of the electronic device 100, and the like. In addition, the internal memory 121 may include a high-speed random access memory, and may further include a non-volatile memory, for example, at least one magnetic disk storage device, a flash storage device, or a universal flash storage (universal flash storage, UFS).

The electronic device 100 may implement an audio function through the audio module 170, the loudspeaker 170A, the receiver 170B, the microphone 170C, the headset jack 170D, the application processor, and the like. The audio module 170 is configured to convert digital audio information into an analog audio signal for output, and is further configured to convert an analog audio input into a digital audio signal. The loudspeaker 170A, also referred to as a "speaker", is configured to convert an electrical audio signal into a sound signal. The electronic device 100 may be used to listen to music or answer a hands-free call through the loudspeaker 170A. The receiver 170B, also referred to as an "earpiece", is configured to convert an electrical audio signal into a sound signal. When a call is answered or voice information is received through the electronic device 100, the receiver 170B may be put close to a human ear for listening to a voice. The microphone 170C, also referred to as a "mike" or a "mic", is configured to convert a sound signal into an electrical signal. The headset jack 170D is configured to connect to a wired headset. The pressure sensor 180A is configured to sense a pressure signal, and can convert the pressure signal into an electrical signal. The gyroscope sensor 180B may be configured to determine a motion gesture of the electronic device 100. The barometric pressure sensor 180C is configured to measure barometric pressure. In some embodiments, the electronic device 100 calculates an altitude based on a value of the barometric pressure measured by the barometric pressure sensor 180C, to assist in positioning and navigation. The magnetic sensor 180D includes a Hall sensor. The acceleration sensor 180E may detect accelerations in various directions (usually on three axes) of the electronic device 100. The distance sensor 180F is configured to measure a distance. The electronic device 100 may measure the distance in an infrared manner or a laser manner. The optical proximity sensor 180G may include, for example, a light emitting diode (LED) and an optical detector, for example, a photodiode. The light-emitting diode may be an infrared light-emitting diode. The ambient light sensor 180L is configured to sense ambient light brightness. The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like. The temperature sensor 180J is configured to detect a temperature. In some embodiments, the electronic device 100 executes a temperature processing policy based on the temperature detected by the temperature sensor 180J. The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided by using the display 194. In some other embodiments, the touch sensor 180K may be alternatively disposed on a surface of the electronic device 100 at a position different from that of the display 194.

Optionally, in this embodiment of this application, the touch sensor 180K may detect operations such as touch, tap, touch and hold, and drag of the user, generate an operation (touch) event, and transfer the operation (touch) event to the processor 110. The processor 110 determines that the operation (touch) event includes related parameters such as coordinates of a touch point and a touch status, and responds to the operation event. Details are not described herein.

The bone conduction sensor 180M may obtain a vibration signal. The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or withdrawn from the SIM card interface 195, to implement contact with or separation from the electronic device 100. The electronic device 100 may support one or N SIM card interfaces, where N is a positive integer greater than 1.

A software system of the electronic device 100 may use a layered architecture, an event-driven architecture, a microkernel architecture, a microservice architecture, or a cloud architecture. In an embodiment of this application, an Android® system with a layered architecture is used as an example to illustrate a software structure of the electronic device 100.

Figure 19:
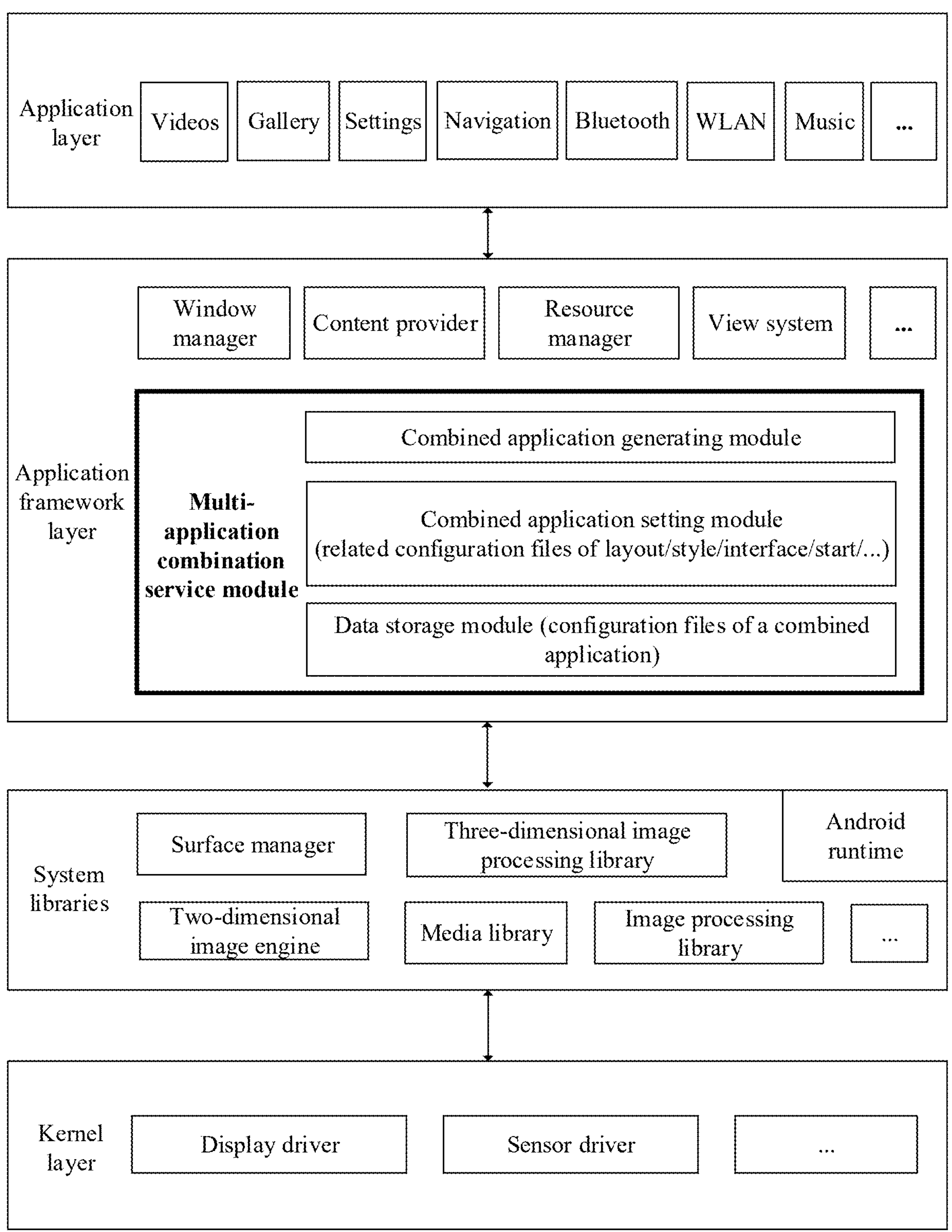
FIG. 19 is a block diagram of an example of a software structure of an electronic device according to an embodiment of this application.

FIG. 19 is a block diagram of an example of a software structure of an electronic device according to an embodiment of this application.

Optionally, it is assumed that the electronic device 100 in this embodiment of this application has an Android® system. In other words, the electronic device 100 has a hierarchical architecture shown in FIG. 19. The hierarchical architecture may include several layers, each layer has a clear role and division of labor, and the layers communicate with each other by using a software interface.

For example, in some embodiments, as shown in FIG. 19, the Android® system may be divided into four layers: an application layer, an application framework layer, Android runtime (Android® runtime) and system libraries, and a kernel layer from top to bottom.

The application layer may include a series of application packages. For example, as shown in FIG. 19, the application layer may include application packages corresponding to applications such as Videos, Gallery, Navigation, WLAN, Bluetooth, Music, and Settings. This is not limited in this embodiment of this application.

The application framework layer provides an application programming interface (application programming interface, API) and a programming framework for an application at the application layer. The application framework layer includes some predefined functions.

For example, as shown in FIG. 19, the application framework layer may include a window manager, a content provider, a view system, a resource manager, and the like. In addition, the application framework layer may include a "multi-application combination service module" related to application combination in this embodiment of this application.

The window manager is configured to manage a window program. The window manager may obtain a size of a display, determine whether there is a status bar on a screen, perform screen locking, take a screenshot, or the like.

The content provider is configured to: store and obtain data, and enable the data to be accessible to an application. The stored data may include video data, image data, audio data, and the like, and may further include data such as call record data of dialing and answering, a browsing history of a user, and a bookmark. Details are not described herein.

The resource manager provides various resources such as a localized character string, an icon, an image, a layout (layout) file, and a video file for an application.

It should be understood that, in this embodiment of this application, the resource manager may detect a running time of each phase and a dependency on a system resource in a process from starting each application in a combined application to displaying the target interface, to adjust resource configuration, priority allocation, and the like in a process of starting the combined application. Optionally, the resource manager may further intercept an open-screen advertisement of an application or replace an open-screen advertisement with a system advertisement, and record related data of the application based on the started application.

The view system includes visual controls such as a control for displaying a text and a control for displaying an image. The view system may be used to construct an application. A display interface may include one or more views. For example, a display interface including an SMS message notification icon may include a text display view and an image display view.

In this embodiment of this application, the "multi-application combination service module" at the application framework layer can implement the method for combining a plurality of applications, the method for simultaneously starting a plurality of applications, and the like that are provided in embodiments of this application.

For example, as shown in FIG. 19, the "multi-application combination service module" may include at least a combined application generating module, a combined application setting module, a data storage module, and the like.

The "combined application generating module" can perform start and entry management of the combined application. For example, the "Multi-app combination" option on the screen 601 shown in FIG. 6(*a*), options related to the multi-application combination service function on the screens shown in FIG. 6(*b*), FIG. 6(*c*), and FIG. 6(*d*), and an option related to the multi-application combination service function on each screen may be all understood as start and entry options controlled by the combined application generating module.

In addition, the "combined application generating module" can detect a plurality of applications selected by the user, combine the plurality of applications selected by the user into a new combined application, generate an icon and/or a name of the new combined application according to a preset rule, and automatically display the icon and/or the name on a home screen of the display of the electronic device 100.

The "combined application setting module" may provide one or more setting interfaces for the user. Specifically, the one or more setting interfaces may be related to setting performed by the user for display in aspects such as the icon, an interface display pattern, and the like of the combined application.

For example, for one or more setting interfaces shown in FIG. 5(*b*), FIG. 5(*c*), FIG. 5(*d*), and FIG. 5(*e*), the one or more setting interfaces may have different display occasions. For example, the one or more setting interfaces are displayed when the user uses the combined application for a first time, or are displayed each time the user uses the combined application; or the one or more setting interfaces are triggered to be displayed after the user manually executes a setting option related to the combined application. This is not limited in this embodiment of this application.

In addition, the "combined application setting module" can provide a convenient manner of setting a combined application for the user, and can further monitor operations such as adjustment and modification performed by the user on the one or more setting interfaces. The one or more setting interfaces may include an interface related to content such as a setting of an initial interface (that is, a target interface) after the combined application is started, a layout of each split-screen window, an adjustment, a color style, an icon pattern, icon content, and an application name.

It should be understood that the "combined application generating module" of the electronic device 100 may first automatically generate and display the icon and/or the name of the new combined application according to a preset rule. In a process of using the combined application by the user, the "combined application setting module" can continue to monitor and accept an operation such as a manual adjustment and modification of the user, record and save a newest configuration parameter after the user performs the adjustment and modification operation, and notify the "combined application generating module" of the newest configuration parameter, so that the "combined application generating module" updates related display of the combined application. This is not limited in this embodiment of this application.

It should be further understood that, for each of the plurality of applications associated with the combined application, the user may preset a function interface for the application as an initial interface (that is, a "target interface") after start.

In addition, when controlling the combination, the layout, and color matching of the plurality of split-screen windows, the "combined application setting module" may display only a partial interface of an application to the user. After the user performs adjustment, for more other interfaces involved in the combined application, the "combined application setting module" may further control an adaptive adjustment of an overall color style and the like for more other interfaces, to maintain consistency of the color style. Details are not described herein.

The "data storage module" may store information about the combined application, or a configuration file of the combined application. For example, based on the combined application generated by the "combined application generating module", and a newest configuration parameter stored by the "combined application setting module", the "data storage module" may generate the configuration file of the combined application, for example, a plurality of pieces of content listed in Table 2 or Table 3. When the user performs an operation of sharing the combined application, the configuration file of the combined application generated by the "data storage module" may be shared. Details are not described herein.

Android® runtime includes a kernel library and a virtual machine. Android® runtime is responsible for scheduling and management of the Android system.

The kernel library includes two parts: a function that needs to be invoked in Java language and a kernel library of Android.

The application layer and the application framework layer are run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (media library), a three-dimensional (three-dimensional, 3D) graphics processing library (for example, OpenGL ES), and a two-dimensional (two-dimensional, 2D) graphics engine.

The surface manager is configured to manage a display subsystem of the electronic device and provide fusion of 2D and 3D layers for a plurality of applications.

The media library supports playback and recording in a plurality of commonly used audio and video formats, static image files, and the like. The media library may support a plurality of audio and video coding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The two-dimensional graphics engine is a drawing engine for two-dimensional drawing.

The kernel layer is a layer between hardware and software. The kernel layer includes at least a display driver, a sensor driver, and the like.

For ease of understanding, in the following embodiments of this application, the electronic device 100 having the structure shown in FIG. 18 or FIG. 19 is used as an example to describe, in detail with reference to the accompanying drawings and application scenarios, the method and that is for combining a plurality of applications and simultaneously starting the plurality of applications and that is provided in embodiments of this application.

FIG. 20 is a schematic flowchart of an example of a method for simultaneously starting a plurality of applications according to an embodiment of this application.

For example, as shown in FIG. 20, an execution entity of the method 2000 may be understood as a processor 110 of an electronic device, for example, the processor 110 of the mobile phone of the user described in the foregoing embodiment, or a software module such as a multi-application combination service module that is shown in FIG. 19 and that is related to implementation of the method in this embodiment of this application. This is not limited in this embodiment of this application.

Specifically, the method 2000 may include the following steps:

2001: Obtain information about M applications, and combine the M applications to generate a first combined application.

Optionally, information about the M applications includes one or more types of information: an application identifier, an application name, an application icon, or a source of each of the M applications.

After the M applications are combined to generate the first combined application, a display may display an icon and/or a name of the first combined application.

It should be understood that, in this embodiment of this application, two or more applications may be combined to obtain a new application, that is, the first combined application. This process does not affect display of an icon and a name of each application in the "two or more applications" on the display of the electronic device, independent use of each application, and the like.

It should be further understood that, for the first combined application, a user may tap the icon of the first combined application to simultaneously start each of the two or more applications included in the first combined application. In other words, through tapping the icon of the first combined application only once, the user can simultaneously start each application associated with the first combined application, and can directly access a target interface of each application. The target interface of each application is any interface that may be displayed in a process of running the application.

For example, in this embodiment of this application, a combination process of the "M applications" is used as an example. Optionally, a specific application in the M applications may be combined twice or more times. For example, different function interfaces of the same application are used as "target interfaces", and the application is added twice or more times. Alternatively, some applications such as the WeChat application and the QQ application may have an application twin capability, and the user may trigger, by using a preset operation, application twin of some applications such as the WeChat application and the QQ application. In this case, when the user adds, to the first combined application, a WeChat application obtained by using an application twin function, the two WeChat applications may be understood as the same application corresponding to different login accounts.

Therefore, in this embodiment of this application, it is assumed that the first combined application is associated with the M applications, and the M applications correspond to N target interfaces. In other words, the "first combined application" in this embodiment of this application is associated with the "N target interfaces". To be specific, the N target interfaces are running interfaces from the M applications, where N≥M, M is an integer greater than or equal to 1, and N is an integer greater than or equal to 2. Details are not described below again.

Optionally, when M=N, that is, N applications are combined in the first combined application, the N applications are simultaneously started, and interfaces of the N applications are displayed in N split-screen windows.

It should be further understood that when the display displays a running interface of a corresponding application in full screen, each of the N target interfaces includes content in all of a display region of the running interface.

Optionally, the M applications include a local application of the electronic device; and/or the M applications include any application from a trusted device that has access permission on the electronic device; and/or the M applications include an application from any device that can be currently found by the electronic device.

Optionally, the M applications are applications that are manually selected by the user; and/or the M applications are applications that are automatically selected by the electronic device based on a current use scenario or use frequency of the user in a preset period; and/or the M applications are preset applications that are determined based on a device type of the electronic device.

Optionally, the N target interfaces are interfaces that are separately manually set by the user from the running interfaces of the M applications; the N target interfaces are interfaces that are automatically selected by the electronic device based on at least one of a current use scenario or use frequency of the user in a preset period; or when N is equal to M, the N target interfaces include a preset interface of each of the M applications.

For example, the preset interface of each application may be a start page (that is, an initial interface) of each application, or any other interface. For example, for the WeChat application, a two-dimensional code payment interface may be used as a start page of the WeChat application, or a WeChat chat list interface may be used as a start page of the WeChat application. This is not limited in this embodiment of this application.

2002: Generate the icon and/or the name of the first combined application according to a preset rule.

In a possible implementation, the icon and/or the name of the first combined application is generated according to any one of the following rules:

(1) combining icons and/or names of the M applications in a sequence of adding the M applications, to generate the icon and/or the name of the first combined application;
(2) combining icons and/or names of the M applications in a sequence of installing the M applications, to generate the icon and/or the name of the first combined application;
(3) combining icons and/or names of the M applications in descending order of frequency of using the M applications by the user, to generate the icon and/or the name of the first combined application;
(4) combining icons and/or names of the M applications in descending order of memory resources occupied during running of the M applications, to generate the icon and/or the name of the first combined application; or
(5) combining icons and/or names of the M applications in descending order of required duration from starting the M applications to displaying the preset interfaces, to generate the icon and/or the name of the first combined application.

For example, the electronic device may combine and arrange icons of a plurality of selected applications in an application selection sequence of the user, and then scale down the icons by a specific ratio, to generate an icon of a new combined application and display the icon on a home screen of the electronic device. As shown in FIG. 5(*a*), the icon of the "Combined app 1" includes an icon of the WeChat application, an icon of the Notepad application, and an icon of the Gallery application, and has a same arrangement sequence as an application selection sequence of the user. To be specific, the icon of the WeChat application and the icon of the Notepad application are displayed in a first row, and the icon of the Gallery application is displayed in a second row.

It should be understood that after the user selects the M applications, the electronic device may first automatically generate the icon of the "first combined application" according to one of the foregoing possible preset rules, and display the icon on the home screen of the electronic device.

It should be further understood that in a subsequent use process, the user is supported in modifying a preset icon of the "first combined application" in this embodiment of this application. To be specific, a rule for generating an icon of a combined application is reset. The icon of the first combined application displayed on the home screen is updated according to a new rule for generating an icon of a combined application.

Setting 1: The user manually modifies related content of the first combined application.

2003: Update the icon and/or the name and/or an interface display rule of the first combined application based on the related content manually modified by the user.

In a possible implementation, when the user taps the icon of the "first combined application" for a first time, in response to the tap operation of the user, the electronic device may simultaneously start the plurality of applications associated with the "first combined application", and may first display one or more setting interfaces for the user before displaying the interfaces of the plurality of applications associated with the "first combined application". The user may set, by using the one or more setting interfaces, display-related content of the icon, an interface display pattern, and the like of the "first combined application". For example, the one or more setting interfaces may be used to set the interface display pattern of the "first combined application", and/or the icon of the "first combined application".

Optionally, in this embodiment of this application, an "interface display pattern" of each combined application may include one or more of a quantity of split-screen windows on the display, a layout and an arrangement sequence of a plurality of split-screen windows, a size of each split-screen window, and a target interface of each application in a split-screen window of each application associated with the combined application.

In another possible implementation, when the interface display pattern of the first combined application is not a pattern expected by the user, the user may manually modify a layout and an arrangement sequence of the N split-screen windows of the first combined application, a size of each split-screen window, a target interface of each split-screen window, and the like. This is not limited in this embodiment of this application.

Setting 2: The user does not perform modification.

Optionally, the user may not modify the interface display pattern of the first combined application, and/or the icon and/or the name of the first combined application, and/or the like.

For example, the "Skip" control in FIG. 5(*b*), FIG. 5(*c*), FIG. 5(*d*), and FIG. 5(*e*) is used to skip an interface for setting or modifying an icon of a Combined app 1, and give up setting or modifying the icon of the Combined app 1. Instead, the screen 506 shown in FIG. 5(*f*) is directly displayed. Details are not described herein again.

2004: Receive a first operation performed by the user on the icon of the first combined application, simultaneously start the M applications in response to the first operation, and determine the N to-be-displayed split-screen windows and a first pattern of the N split-screen windows.

Any two of the N split-screen windows do not include an overlapping region. The first pattern corresponds to a first configuration parameter. The first configuration parameter includes one or more types of information: a size of each of the N split-screen windows, position coordinates of each split-screen window, or a one-to-one correspondence between each of the N split-screen windows and each of the N target interfaces.

Optionally, the first operation may be a tap operation performed by the user on the icon of the first combined application.

2005: Obtain a target interface corresponding to each of the N split-screen windows, and determine a target display region of the target interface corresponding to each split-screen window, where the target display region is all or a part of a region of the target interface.

2006: Simultaneously display content in the corresponding target display region in each of the N split-screen windows in the first pattern at a first moment based on the size of each of the N split-screen windows and the content in the target display region corresponding to each split-screen window and by using a moment of starting the M applications as a start moment.

In a possible implementation, the electronic device may obtain required duration from the start moment to a moment at which the electronic device displays each of the N target interfaces; and allocate a memory resource for running of each of the M applications based on the required duration for displaying each of the N target interfaces, so that the electronic device can simultaneously display the content in the corresponding target display region in each of the N split-screen windows at the first moment.

In another possible implementation, the first combined application corresponds to a target storage area of the electronic device, the target storage area can store data of each of the M applications, and any two of the M applications have permission to access each other and obtain data of each other.

In still another possible implementation, the electronic device may further receive a second operation that is performed by the user on the icon of the first combined application; and display an operation window in response to the second operation. The operation window includes at least one operation option that can be performed by the user on the first combined application. The at least one operation option includes one or more of a share option, a delete option, an icon editing option, an application modification option, an interface pattern option, or a permission setting option.

Optionally, when the operation window includes the share option, the electronic device may further receive a tap operation that is performed by the user on the share option; in response to the tap operation, obtain information about the N target interfaces associated with the first combined application, and generate a configuration file of the first combined application based on the information about the N target interfaces; receive a third operation of the user, and determine a sharing manner of the first combined application and a receive-end device with which sharing is to be performed that are set by the user; and in response to the third operation, send the configuration file of the first combined application to the receive-end device in the sharing manner.

The configuration file of the first combined application includes one or more types of information: the icon of the first combined application; the name of the first combined application; the first configuration parameter corresponding to the first pattern; an application identifier, an application icon, or an application name corresponding to each of the N target interfaces; a device identifier or a device type of an application source device; a link of each of the N target interfaces; duration between the start moment and the first moment; or advertisement setting information in a process of starting an application corresponding to each target interface.

It should be understood that the electronic device serves as a transmit-end device in this embodiment of this application. In a process in which the transmit-end device shares a combined application with the receive-end device, both the transmit-end device and the receive-end device are electronic devices that have a multi-application combination function, that is, that can provide a multi-application combination service.

In this embodiment of this application, a process of "sharing the first combined application" may be understood as a process in which the transmit-end device may obtain the information about the first combined application, and send, to the receive-end device, a file including the information about the first combined application, and then the receive-end device obtains the information about the first combined application based on the received file.

In this embodiment of this application, the to-be-shared "configuration file of the first combined application" may include one or more of the following types of information: for example, a device ID of the transmit-end device, a device type of the transmit-end device, hardware parameter information of the transmit-end device, software parameter information of the transmit-end device, a quantity of applications of the first combined application, an application list (package names) associated with the first combined application, an application identifier (for example, an application package name) associated with the first combined application, an icon of each application, whether a remote application/distributed application (remote device) is included, information about a remote device (for example, information about a plurality of devices such as a super terminal), an application start page link (target interface link), application layout information (a size/position coordinates of a split-screen window, and the like), and whether a single-application multi-open window (App mirror) is included. This is not limited in this embodiment of this application.

The "interface display pattern" described in the foregoing embodiment may be determined based on information about the "application start page link (target interface link)" and the application layout information (for example, a size/position coordinates of a split-screen window). This is not limited in this embodiment of this application.

In a possible implementation, after receiving the "configuration file of the first combined application" sent by the transmit-end device, the receive-end device may prompt, in an automatic pop-up window manner, the user whether to choose to receive the configuration file. And/or, the mobile phone may display a prompt icon, text prompt information, and the like on a status bar at the top of a display, and the user may view the prompt through performing a pull-down operation, and choose whether to receive the file. And/or, the receive-end device may send a preset prompt tone such as "beep . . . " to prompt the user whether to choose to receive the "configuration file of the first combined application" sent by the mobile phone of the user. This is not limited in this embodiment of this application.

In another possible implementation, if the plurality of applications associated with the shared first combined application are all local applications on the transmit-end device, when the user shares the first combined application to the receive-end device and displays the icon of the first combined application on an interface of the receive-end device, the sharing process may be understood as follows: The plurality of applications associated with the first combined application are still actually installed on the transmit-end device. When the user taps the icon of the first combined application on the receive-end device, the tap operation of the user may be sent back to the transmit-end device, to trigger simultaneous starting and running of each application associated with the first combined application in the background of the transmit-end device, and display, in a split-screen window corresponding to the receive-end device, a target interface after each application is started.

In still another possible implementation, the sharing process may be further understood as follows: After the first combined application is shared to the receive-end device, the receive-end device and the transmit-end device may implement sharing of the first combined application. In other words, the receive-end device and the transmit-end device can share each application associated with the first combined application.

Optionally, if the receive-end device does not have an application 1 associated with the first combined application, the receive-end device may automatically download and install the application 1 by using an application market, to ensure that each application associated with the first combined application is installed on the receive-end device.

Optionally, if an application 1 associated with the first combined application is installed on the receive-end device, after receiving the first combined application sent by the transmit-end device, the receive-end device detects that a version of the application 1 associated with the first combined application on the transmit-end device is different from a version of the application 1 installed on the receive-end device, or a card pattern of the application 1 on the transmit-end device is different from that of the application 1 on the receive-end device, and the receive-end device may automatically update the application 1 or a card of the application 1. This is not limited in this embodiment of this application.

In yet another possible implementation, if the plurality of applications associated with the shared combined application include a local application of the transmit-end device, an application 2 on a trusted device B of the transmit-end device is further included. Therefore, when the user shares the first combined application to the receive-end device, and the icon of the first combined application is displayed on the interface of the receive-end device, the sharing process may be understood as follows: The receive-end device and the transmit-end device may share the local application on the transmit-end device, and the receive-end device and the trusted device B of the transmit-end device may further share the application 2 on the device B. For another application other than the plurality of applications associated with the first combined application, the receive-end device does not have access permission for neither another local application on the transmit-end device nor another application other than the application 2 on the trusted device B of the transmit-end device. Details are not described in this embodiment of this application.

In the foregoing method, for different electronic devices, the user may share the generated combined application on the transmit-end device to another electronic device with the multi-application combination function, and the user is supported in using the first combined application on the another electronic device. In this process, the user does not need to independently perform a process of downloading an application, installing an application, and combining a plurality of applications, to simultaneously start the plurality of applications on the another electronic device and display interfaces of the plurality of applications in split-screen windows. This implementation is more intelligent. Operation steps of the user are reduced, thereby improving user experience of using a plurality of devices.

In addition, in the process of sharing the combined application, information such as an icon that is associated with the first combined application and that is set by the user on the transmit-end device, information about the plurality of applications associated with the first combined application, and the interface display pattern of split-screen display after the plurality of applications are simultaneously started may be shared to another electronic device, so that the user can directly use the plurality of associated applications on the another electronic device through the first combined application in a manner that best conforms to a use habit of the user, thereby improving use experience of the user.

In another possible implementation, when the operation window includes the delete option, the electronic device may further receive a tap operation performed by the user on the delete option, and in response to the tap operation, delete the M applications associated with the first combined application.

Alternatively, in response to the tap operation, the electronic device displays the icons and/or the names of the M applications associated with the first combined application; receives a fourth operation of the user, and determines one or more target applications that are selected by the user from the M applications; and deletes, from the first combined application, a target interface corresponding to the one or more target applications selected by the user, and updates and saves information that is included in the configuration file of the first combined application.

In still another possible implementation, when the operation window includes the interface pattern option, the electronic device may further receive a tap operation that is performed by the user on the interface pattern option; and in response to the tap operation, display a setting interface of one or more interface patterns. The setting interface of the one or more interface patterns can be used by the user to change the first pattern to a second pattern. The second pattern corresponds to a second configuration parameter. The electronic device updates and saves information that is included in the configuration file of the first combined application.

A plurality of applications can be combined according to the method for combining a plurality of applications provided in this application. Specifically, the user may select a plurality of applications from a local device according to different personal use requirements; or the user may select a plurality of applications from different electronic devices; or the user may further trigger application twin of a same application and select different twin applications of the same application; or the user selects a same application and different function interfaces of the same application for a plurality of times; or the like. The user may combine the plurality of applications in different operation manners, to generate a new combined application and display the new combined application on the display of the electronic device.

It should be understood that a single application usually cannot meet a use requirement of the user. In a scenario in which a plurality of applications need to be used repeatedly or simultaneously, in this application, for such a requirement of the user, the user can freely combine different function interfaces in a plurality of required different applications in a user-defined manner, or combine different function interfaces of the same application in a user-defined manner, to generate anew combined application.

Based on the new combined application, each application associated with the combined application can be no longer an isolated data island and/or an isolated function island. In a subsequent use process, the user can tap an icon of the combined application to simultaneously start and run each of the plurality of applications associated with the combined application. The display of the electronic device automatically displays an interface of each of the plurality of applications in a split-screen window form. Start speeds, color styles, and the like of the plurality of applications may be synchronized by default. The plurality of applications enable data sharing space. In the method, the plurality of applications are simultaneously started, to prevent the user from separately performing complex operations of starting each application and triggering split-screen display, thereby simplifying an operation procedure and shortening an operation time. In addition, in the method, a quantity of applications included in the plurality of applications is not limited, to meet a requirement for simultaneously using more applications by the user, thereby improving use experience of the user.

In addition, this application further provides a plurality of methods for setting a combined application and a plurality of methods for modifying content related to a combined application. The method can support the user in customizing a possible operation process of setting an icon and/or a name of the combined application and an interface display pattern of split-screen windows after a plurality of applications associated with the combined application are simultaneously started. Specifically, the method supports the user in customizing, based on different use scenarios and according to personal use requirements, the interface display pattern of split-screen display after the plurality of applications associated with the combined application are simultaneously started. For example, the user may set one or more of a layout and an arrangement sequence of a plurality of split-screen windows displayed on the display, a size of each split-screen window, and a target interface of each application displayed in a split-screen window of the application. In this way, after the user simultaneously starts the plurality of applications, the sizes, the layout, and the like of split-screen windows of the plurality of applications displayed in split screen can better meet a display requirement of the user. In addition, a target interface expected by the user can be directly reached through each application. Therefore, the user does not need to perform a plurality of tap operations to display the expected target interface, to simplify an operation procedure, thereby improving use experience of the user. In a subsequent process of using the combined application, the user may further modify, delete, or replace one or more applications associated with the combined application, to update the combined application.

In addition, this application further provides a method for sharing a combined application. The user may share the combined application to another electronic device, so that the user can use the combined application on a plurality of electronic devices. In this process, the user does not need to independently perform a process of downloading an application, installing an application, and combining a plurality of applications on different electronic devices, to use the combined application on different electronic devices, that is, to simultaneously start the plurality of applications and display interfaces of the plurality of applications in a split-screen window form. This implementation is more intelligent. Operation steps of the user are reduced, thereby improving user experience of using a plurality of devices.

In addition, this application further provides a method for simultaneously starting a plurality of applications. The user can tap the icon and/or the name of the combined application to simultaneously start the plurality of applications associated with the combined application. An interface of each application is displayed in a split-screen window of the application. In the method, different applications may be controlled to have same actual start duration. To be specific, when the user taps the icon of the combined application, the applications associated with the combined application can be simultaneously started, and start duration of the applications is controlled to be the same. In this way, the following problem is avoided: A current super application has an excessively long function path in use, thereby meeting use experience of the user.

Finally, in this application, for different scenarios and different requirements of the user in different scenarios, the electronic device may automatically select a plurality of applications according to a plurality of possible preset rules, and generate a combined application based on the plurality of applications. A process of automatically generating the combined application is more intelligent, and a daily use requirement of the user is better met. The combined application can be directly used without a manual operation of the user. Operation steps of the user are reduced, thereby improving use experience of the user.

It should be noted that, in descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the description of embodiments of this application, "a plurality of" means "two or more".

It should be understood that division of manners, cases, types, and embodiments in embodiments of this application are merely for ease of description, but should not constitute a special limitation, and features in various manners, types, cases, and embodiments may be combined when there is no contradiction.

It should be further understood that the terms "first", "second", and "third" in embodiments of this application are merely used for distinguishing, and should not be construed as any limitation on this application. For example, "a first operation" and "a second operation" in embodiments of this application indicate different operations performed by the user on the touchscreen of the electronic device.

It should be further understood that sequence numbers of the processes do not mean execution sequences in various embodiments of this application. The execution sequences of the processes should be determined based on functions and internal logic of the processes, and should not be construed as any limitation on the implementation processes of embodiments of this application.

It should be further noted that in this embodiment of this application, "preset", "fixed value", or the like may be implemented through prestoring corresponding code, a table, or another manner that may be used to indicate related information in the electronic device (for example, a transmit-end device or a receive-end device). A specific implementation of the electronic device is not limited in this application, for example, a "preset rule", "preset duration", and a "preset range" in this embodiment of this application.

It may be understood that, to implement the foregoing functions, the electronic device includes corresponding hardware and/or software modules for performing the functions. With reference to algorithm steps of examples described in embodiments disclosed in this specification, this application can be implemented in a form of hardware or a combination of hardware and computer software. Whether a function is performed by hardware or by driving hardware by computer software depends on particular applications and design constraints of the technical solutions. A person skilled in the art may use, with reference to embodiments, different methods to implement the described functions for each particular application, but it should not be considered that the implementation goes beyond the scope of this application.

In embodiments, the electronic device may be divided into functional modules based on the foregoing method examples. For example, the functional modules may be obtained through division in a one-to-one correspondence with the functions, or two or more functions may be integrated into one processing module. The integrated module may be implemented in a form of hardware. It should be noted that module division in this embodiment is an example and is merely logical function division. In actual implementation, there may be another division manner.

When each functional module is obtained through division based on each corresponding function, in a possible schematic composition diagram of the electronic device in the foregoing embodiment, the electronic device may include a display unit, a detection unit, and a processing unit.

The display unit, the detection unit, and the processing unit cooperate with each other, and may be configured to support the electronic device in performing the foregoing steps and the like, and/or used in another process of the technology described in this specification.

It should be noted that all related content of the steps in the foregoing method embodiments may be cited in function description of corresponding functional modules. Details are not described herein.

The electronic device provided in this embodiment is configured to perform the foregoing method for combining a plurality of applications and simultaneously starting the plurality of applications, to achieve same effect as the foregoing implementation method.

When an integrated unit is used, the electronic device may include a processing module, a storage module, and a communication module. The processing module may be configured to control and manage actions of the electronic device, for example, may be configured to support the electronic device in performing steps performed by the display unit, the detection unit, and the processing unit. The storage module may be configured to support the electronic device in storing program code, data, and the like. The communication module may be configured to support communication between the electronic device and another device.

The processing module may be a processor or a controller. The processor may implement or execute various example logical blocks, modules, and circuits described with reference to content disclosed in this application. The processor may also be a combination for implementing computing functions, for example, a combination of one or more microprocessors, a combination of a digital signal processor (digital signal processing, DSP) and a microprocessor. The storage module may be a memory. The communication module may be specifically a device, for example, a radio frequency circuit, a Bluetooth chip, or a Wi-Fi chip, that interacts with another electronic device.

In an embodiment, when the processing module is a processor and the storage module is a memory, the electronic device in this embodiment may be a device having the structure shown in FIG. 18.

An embodiment further provides a computer-readable storage medium. The computer-readable storage medium stores computer instructions. When the computer instructions are run on an electronic device, the electronic device is enabled to perform the foregoing related method steps, to implement the method for combining a plurality of applications and simultaneously starting the plurality of applications in the foregoing embodiments.

An embodiment further provides a computer program product. When the computer program product runs on a computer, the computer is enabled to perform the related steps, to implement the method for combining a plurality of applications and simultaneously starting the plurality of applications in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to enable the chip to perform the method for combining a plurality of applications and simultaneously starting the plurality of applications in the foregoing method embodiments.

The electronic device, the computer-readable storage medium, the computer program product, or the chip provided in embodiments is configured to perform the corresponding method provided above. Therefore, for beneficial effects that can be achieved, refer to the beneficial effects in the corresponding method provided above. Details are not described herein.

Based on the descriptions about the foregoing implementations, a person skilled in the art may understand that, for convenient and brief descriptions, division into the foregoing functional modules is used as an example for illustration. In actual application, the foregoing functions may be allocated to different functional modules for implementation according to requirements. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between apparatuses or units may be implemented in electrical, mechanical, or other forms.

Units described as separate components may or may not be physically separate. A component displayed as a unit may be one or more physical units, and may be located in one place, or may be distributed in a plurality of places. Some or all of the units may be selected according to actual requirements to achieve the objectives of the solutions in embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technologies, or all or some of the technical solutions may be implemented in a form of a software product. The software product is stored in a storage medium, and includes several instructions for instructing a device (which may be a single-chip microcomputer, a chip, or the like) or a processor (processor) to perform all or some of the steps of the method described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to a protection scope of the claims.

What is claimed is:

1. A method for simultaneously starting a plurality of applications, applied to an electronic device comprising a display, wherein the method comprises:

receiving a first operation that is performed by a user on an icon of a first combined application, wherein the first combined application is associated with N target interfaces, the N target interfaces are running interfaces from M applications, at least two target interfaces of the N target interfaces are two interfaces from a same application of the M applications, each target interface of the N target interfaces comprises all content displayed by the display when the display displays a running interface of a corresponding application in full screen, N≥M, M is an integer greater than or equal to 1, and N is an integer greater than or equal to 2;

simultaneously starting the M applications in response to the first operation;

determining N to-be-displayed split-screen windows and a first pattern of the N split-screen windows, wherein any two split-screen windows of the N split-screen windows do not comprise an overlapping region, the first pattern corresponds to a first configuration parameter, and the first configuration parameter comprises at least one of a size of each split-screen window of the N split-screen windows, position coordinates of each split-screen window of the N split-screen windows, or a one-to-one correspondence between each split-screen window of the N split-screen windows and each target interface of the N target interfaces;

obtaining a target interface corresponding to each split-screen window of the N split-screen windows;

determining a target display region of the target interface corresponding to each split-screen window of the N split-screen windows, wherein the target display region is all or a part of a region of the target interface; and simultaneously displaying, by the display in the first pattern at a first moment, content of the N target interfaces in N target display regions corresponding to the N split-screen windows based on the size of each split-screen window of the N split-screen windows, wherein a moment of starting the M applications is a start moment.

2. The method according to claim 1, wherein the M applications comprise:

a local application of the electronic device;

any application from a trusted device that has access permission on the electronic device; or at least one application of any device that is currently found by the electronic device.

3. The method according to claim 1, wherein:

the M applications are applications that are manually selected by the user;

the M applications are applications that are automatically selected by the electronic device based on at least one of a current use scenario or a use frequency of the user in a preset period; or the M applications are preset applications that are determined based on a device type of the electronic device.

4. The method according to claim 1, wherein:

the N target interfaces are interfaces that are separately and manually set by the user from the running interfaces of the M applications;

the N target interfaces are interfaces that are automatically selected by the electronic device based on at least one of a current use scenario or a use frequency of the user in a preset period; or when N is equal to M, the N target interfaces comprise a preset interface of each application of the M applications.

5. The method according to claim 1, wherein the obtaining a target interface corresponding to each split-screen window of the N split-screen windows comprises:

determining, based on the first configuration parameter, the target interface corresponding to each split-screen window of the N split-screen windows; and wherein the determining a target display region of the target interface corresponding to each split-screen window of the N split-screen windows comprises:

determining all region of the target interface corresponding to each split-screen window of the N split-screen windows as the target display region corresponding to each split-screen window of the N split-screen windows;

receiving a setting operation that is performed by the user on the target interface corresponding to each split-screen window of the N split-screen windows, and determining, as the target display region corresponding to each split-screen window of the N split-screen windows, a region manually set by the user;

determining a preset region of the target interface corresponding to each split-screen window of the N split-screen windows as the target display region corresponding to each split-screen window of the N split-screen windows; or determining, based on the size of each split-screen window of the N split-screen windows and a preset ratio, the target display region corresponding to each split-screen window of the N split-screen windows.

6. The method according to claim 1, wherein the simultaneously displaying, by the display in the first pattern at a first moment, content of the N target interfaces in N target display regions corresponding to the N split-screen windows comprises:

obtaining an interface element and a size of the target display region corresponding to each split-screen window of the N split-screen windows;

determining a display parameter of each split-screen window of the N split-screen windows based on the size of each split-screen windows of the N split-screen windows, the size of the target display region corresponding to each split-screen window of the N split-screen windows, and the interface element, wherein the display parameter of each split-screen window of the N split-screen windows comprises at least one of a size or position coordinates of the interface element in each split-screen window of the N split-screen windows; and simultaneously displaying, by the display in the first pattern at the first moment, the content of the N target interfaces in the N target display regions corresponding to the N split-screen windows based on the display parameter of each split-screen window of the N split-screen windows.

7. The method according to claim 1, wherein the method further comprises:

obtaining information about the M applications, wherein the information about the M applications comprises at least one of an application identifier, an application name, an application icon, or a source of each application of the M applications;

combining the M applications to generate the first combined application; and displaying at least one of the icon or a name of the first combined application on the display.

8. The method according to claim 7, wherein the at least one of the icon or the name of the first combined application is generated according to any one of the following rules:

combining at least one of the icons or the names of the M applications in a sequence of adding the M applications to generate the at least one of the icon or the name of the first combined application;

combining at least one of the icons or the names of the M applications in a sequence of installing the M applications to generate the at least one of the icon or the name of the first combined application;

combining at least one of the icons or the names of the M applications in descending order of frequency of using the M applications by the user to generate the at least one of the icon or the name of the first combined application;

combining at least one of the icons or the names of the M applications in descending order of memory resources occupied during running of the M applications to generate the at least one of the icon or the name of the first combined application; or combining at least one of the icons or the names of the M applications in descending order of required duration from starting the M applications to displaying preset interfaces to generate the at least one of the icon or the name of the first combined application.

9. The method according to claim 1, wherein the first combined application corresponds to a target storage area of the electronic device, the target storage area stores data of each application of the M applications, and any two applications of the M applications have permission to access and to obtain data from each other.

10. The method according to claim 1, wherein the method further comprises:

obtaining required duration from the start moment to a moment at which the electronic device displays each target interface of the N target interfaces; and allocating a memory resource for running each application of the M applications based on the required duration, wherein the electronic device simultaneously displays the content in the corresponding target display region in each split-screen window of the N split-screen windows at the first moment.

11. The method according to claim 1, wherein the method further comprises:

receiving a second operation that is performed by the user on the icon of the first combined application; and displaying an operation window in response to the second operation, wherein the operation window comprises at least one operation option that is performed by the user on the first combined application, and the at least one operation option comprises one or more of a share option, a delete option, an icon editing option, an application modification option, an interface pattern option, or a permission setting option.

12. The method according to claim 11, wherein when the operation window comprises the share option, the method further comprises:

receiving a tap operation that is performed by the user on the share option;

in response to the tap operation, obtaining information about the N target interfaces associated with the first combined application;

generating a configuration file of the first combined application based on the information about the N target interfaces;

receiving a third operation of the user;

determining a sharing manner of the first combined application and a receive-end device with which sharing is to be performed that are set by the user; and in response to the third operation, sending the configuration file of the first combined application to the receive-end device in the sharing manner, wherein the configuration file of the first combined application comprises one or more types of information:

the icon of the first combined application;

a name of the first combined application;

the first configuration parameter corresponding to the first pattern;

an application identifier, an application icon, or an application name corresponding to each target interface of the N target interfaces;

a device identifier or a device type of an application source device;

a link of each target interface of the N target interfaces;

duration between the start moment and the first moment; or advertisement setting information in a process of starting an application corresponding to each target interface of the N target interfaces.

13. The method according to claim 11, wherein when the operation window comprises the delete option, the method further comprises:

receiving a tap operation that is performed by the user on the delete option;

in response to the tap operation:

deleting the M applications associated with the first combined application; or displaying at least one of the icons or names of the M applications associated with the first combined application;

receiving a fourth operation of the user;

determining one or more target applications that are selected by the user from the M applications;

deleting, from the first combined application, a target interface corresponding to the one or more target applications selected by the user; and updating and saving information that is comprised in a configuration file of the first combined application.

14. The method according to claim 11, wherein when the operation window comprises the interface pattern option, the method further comprises:

receiving a tap operation that is performed by the user on the interface pattern option;

in response to the tap operation, displaying a setting interface of one or more interface patterns, wherein the setting interface of the one or more interface patterns is used by the user to change the first pattern to a second pattern, and wherein the second pattern corresponds to a second configuration parameter; and updating and saving information that is comprised in a configuration file of the first combined application.

15. An electronic device, comprising:

a display;

one or more processors; and one or more memories coupled to the one or more processors and storing programming instructions for execution by the one or more processors to perform operations comprising:

receiving a first operation that is performed by a user on an icon of a first combined application, wherein the first combined application is associated with N target interfaces, the N target interfaces are running interfaces from M applications, at least two target interfaces of the N target interfaces are two interfaces from a same application of the M applications, each target interface of the N target interfaces comprises all content displayed by the display when the display displays a running interface of a corresponding application in full screen, N≥M, Mis an integer greater than or equal to 1, and N is an integer greater than or equal to 2;

simultaneously starting the M applications in response to the first operation;

determining N to-be-displayed split-screen windows and a first pattern of the N split-screen windows, wherein any two split-screen windows of the N split-screen windows do not comprise an overlapping region, the first pattern corresponds to a first configuration parameter, and the first configuration parameter comprises at least one of a size of each split-screen window of the N split-screen windows, position coordinates of each split-screen window of the N split-screen windows, or a one-to-one correspondence between each split-screen window of the N split-screen windows and each target interface of the N target interfaces;

obtaining a target interface corresponding to each split-screen window of the N split-screen windows;

determining a target display region of the target interface corresponding to each split-screen window of the N split-screen windows, wherein the target display region is all or a part of a region of the target interface; and simultaneously displaying, by the display in the first pattern at a first moment, content of the N target interfaces in N target display regions corresponding to the N split-screen windows based on the size of each split-screen window of the N split-screen windows, wherein a moment of starting the M applications is a start moment.

16. The electronic device according to claim 15, wherein the M applications comprise:

a local application of the electronic device;

any application from a trusted device that has access permission on the electronic device; or at least one application of any device that is currently found by the electronic device.

17. The electronic device according to claim 15, wherein:

the M applications are applications that are manually selected by the user;

the M applications are applications that are automatically selected by the electronic device based on at least one of a current use scenario or a use frequency of the user in a preset period; or the M applications are preset applications that are determined based on a device type of the electronic device.

18. A non-transitory computer-readable storage medium, wherein the non-transitory computer-readable storage medium stores computer instructions, and when the computer instructions are run on an electronic device, the electronic device is enabled to perform operations comprising:

receiving a first operation that is performed by a user on an icon of a first combined application, wherein the first combined application is associated with N target interfaces, the N target interfaces are running interfaces from M applications, at least two target interfaces of the N target interfaces are two interfaces from a same application of the M applications, each target interface of the N target interfaces comprises all content displayed by the display when the display displays a running interface of a corresponding application in full screen, N≥M, M is an integer greater than or equal to 1, and N is an integer greater than or equal to 2;

simultaneously starting the M applications in response to the first operation;

determining N to-be-displayed split-screen windows and a first pattern of the N split-screen windows, wherein any two split-screen windows of the N split-screen windows do not comprise an overlapping region, the first pattern corresponds to a first configuration parameter, and the first configuration parameter comprises at least one of a size of each split-screen window of the N split-screen windows, position coordinates of each split-screen window of the N split-screen windows, or a one-to-one correspondence between each split-screen window of the N split-screen windows and each target interface of the N target interfaces;

obtaining a target interface corresponding to each split-screen window of the N split-screen windows;

determining a target display region of the target interface corresponding to each split-screen window of the N split-screen windows, wherein the target display region is all or a part of a region of the target interface; and simultaneously displaying, by the display in the first pattern at a first moment, content of the N target interfaces in N target display regions corresponding to the N split-screen windows based on the size of each split-screen window of the N split-screen windows, wherein a moment of starting the M applications is a start moment.

19. The non-transitory computer-readable storage medium according to claim 18, wherein the M applications comprise:

a local application of the electronic device;

any application from a trusted device that has access permission on the electronic device; or at least one application of any device that is currently found by the electronic device.

20. The non-transitory computer-readable storage medium according to claim 18, wherein:

the M applications are applications that are manually selected by the user;

the M applications are applications that are automatically selected by the electronic device based on at least one of a current use scenario or a use frequency of the user in a preset period; or the M applications are preset applications that are determined based on a device type of the electronic device.

* * * * *